(12) United States Patent
Asobe et al.

(10) Patent No.: US 9,065,243 B2
(45) Date of Patent: Jun. 23, 2015

(54) OPTICAL AMPLIFIER

(75) Inventors: Masaki Asobe, Atsugi (JP); Takeshi Umeki, Atsugi (JP); Kouji Enbutsu, Atsugi (JP); Akio Tokura, Atsugi (JP); Yutaka Miyamoto, Yokosuka (JP); Hidehiko Takara, Yokosuka (JP); Hirokazu Takenouchi, Atsugi (JP); Isao Tomita, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 112 days.

(21) Appl. No.: 13/980,756

(22) PCT Filed: Jan. 20, 2012

(86) PCT No.: PCT/JP2012/000360
§ 371 (c)(1),
(2), (4) Date: Sep. 6, 2013

(87) PCT Pub. No.: WO2012/098911
PCT Pub. Date: Jul. 26, 2012

(65) Prior Publication Data
US 2015/0036210 A1    Feb. 5, 2015

(30) Foreign Application Priority Data

| Jan. 20, 2011 | (JP) | 2011-009894 |
| Mar. 3, 2011 | (JP) | 2011-046975 |
| Mar. 3, 2011 | (JP) | 2011-046976 |
| Jun. 20, 2011 | (JP) | 2011-136297 |

(51) Int. Cl.
*H01S 3/067* (2006.01)
*G02F 1/39* (2006.01)
(Continued)

(52) U.S. Cl.
CPC ............. *H01S 3/06754* (2013.01); *G02F 1/37* (2013.01); *G02F 1/39* (2013.01); *G02F 1/3532* (2013.01); *G02F 1/3534* (2013.01);
(Continued)

(58) Field of Classification Search
CPC .. H01S 3/06754; H01S 3/0092; H01S 3/1083
USPC .................................. 359/333, 341.3, 341.1
See application file for complete search history.

(56) References Cited

U.S. PATENT DOCUMENTS

2009/0244695 A1*  10/2009  Marcinkevicius et al.  ... 359/340

OTHER PUBLICATIONS

Extended European Search Report dated Apr. 4, 2014, from related European Application No. 12736206.9.
(Continued)

*Primary Examiner* — Mark Hellner
(74) *Attorney, Agent, or Firm* — Workman Nydegger

(57) ABSTRACT

The phase sensitive amplifier according to the present invention is a phase sensitive amplifier that uses the optical mixing using a nonlinear optical effect to amplify the signal light. The phase sensitive amplifier according to the present invention includes: the first second-order nonlinear optical element; and the second second-order nonlinear optical element. The first second-order nonlinear optical element causes the fundamental wave light to generate second harmonic light used as pump light and separates only the second harmonic light. The second second-order nonlinear optical element includes a multiplexer to multiplex the signal light with the second harmonic light and spectrally separates only the amplified signal light. The multiplexed signal light and second harmonic light are used subjected to parametric amplification.

29 Claims, 59 Drawing Sheets

(51) Int. Cl.
  *G02F 1/35* (2006.01)
  *H01S 3/00* (2006.01)
  *H01S 3/108* (2006.01)
  *G02F 1/37* (2006.01)
  *H01S 3/23* (2006.01)

(52) U.S. Cl.
  CPC ............ *G02F 1/3536* (2013.01); *G02F 1/3544* (2013.01); *G02F 2001/392* (2013.01); *H01S 3/2391* (2013.01); *H01S 3/0092* (2013.01); *H01S 3/1083* (2013.01)

(56) References Cited

OTHER PUBLICATIONS

Andrekson et al., *Phase-Sensitive Fiber-Optic Parametric Amplifiers and Their Applications*, ECOC 2010, Sep. 19-23, 2010, Torino, Italy, 6 pages.
Imajuku et al., *In-line Phase-sensative Amplifier with Optical-PLL-controlled Internal Pump Light Source*, Electronics Letters, vol. 4, No. 25, Dec. 4, 1997, 2 pages.
Lundstrom et al., *Experimental Characterization of the Phase Squeezing Properties of a Phase-Sensitive Parametric Amplifier in Non-Degenerate Idler Configuration*, ECOC 2010, Sep. 19-23, 2010, Torino, Italy, 3 pages.
J. A. Levenson et al., *Reduction of Quantum Noise in Optical Parametric Amplification*, Journal of Opt. Soc. Am. B, Vo. 10, No. 11, Nov. 1993, pp. 2233-2238.
Wataru Imajuku et al., *Gain Characteristics of Coherent Optical Amplifier Using a Mach-Zehnder Interferometer with Kerr Media*, IEEE Journal of Quantum Electronics, vol. 35 No. 11, Nov. 1999, pp. 1657-1665.
Radan Slavik et al., *All-Optical Phase and Amplitude Regenerator for Next-Generation Telecommunications Systems*, Nature Photonics, vol. 4, Oct. 2010, pp. 690-695.
Takeshi Umeki et al., *Highly Efficient Wavelength Converter Using Direct-Bonded PPZnLN Ridge Waveguide*, IEEE Journal of Quantum Electronics, vol. 46, No. 8, Aug. 2010, pp. 1206-1213.
Radan Slavik et al., *All-Optical Phase-Regenerative Multicasting of 40 Gbit/s DPSK Signal in a Degenerate Phase Sensitive Amplifier*, In Proceedings of the European Conference and Exhibition on Optical Communication (ECOC 2010, Torino, Italy), Sep. 2010, 3 pages.
Isao Morohashi et al., *100 fs-level Pulse Generation Using Mach-Zehnder-Modulator-Based Comb Generator and Soliton Compression*, Dai 72 Kai Ouyou Butsuri Gakkai Gakuzyutsu Kouen Yokou (Ouyou Butsuri Gakkai, 2011 Aki, Yamagata Daigaku), 2011, 1 page.
R. Tang et al., *In-Line Phase-Sensitive Amplification of Multichannel CW Signals Based on Frequency Nondegenerate Four-Wave-Mising in Fiber*, Optics Express, vol. 16, No. 12, Jun. 9, 2008, pp. 9046-9053.
Kiyoshi Nagakawa et al., *Optical Amplifier and Its Application*, ISBN 4-274-03392-9, 1992, 10 pages.
Nishihara et al., *Optical Intergrated Circuit*, ISBN 4-274-12944-6, 1993, 5 pages.
K. J. Lee, et al., *Phase Sensitive Amplification Based on Quadratic Cascading in a Periodically Poled Lithium Niobate Waveguide*, Optics Express, vol. 17, No. 22, Oct. 2009, p. 20393-20400.
J. Kakande, et al., *Detailed Characterization of a Fiber-Optic Parametric Amplifier in Phase-Sensitive and Phase-Intensive Operation*, Optics Express, vol. 18, No. 5, Mar. 1, 2010, p. 4130-4317.
International Search Report dated Feb. 3, 2012, issued in PCT Application No. PCT/JP2012/000360, filed Jan. 20, 2012.
International Preliminary Report dated Aug. 1, 2013, from related PCT Application No. PCT/JP2012/000360.
T. Ohara et al., *160 Gbit/s Timing Extraction Using PLL with Optical Phase Modulator and Periodically-Poled Lithium Niobate*, Institute of Electronics, Information, and Communication Engineers, 2003, 1 page.

* cited by examiner

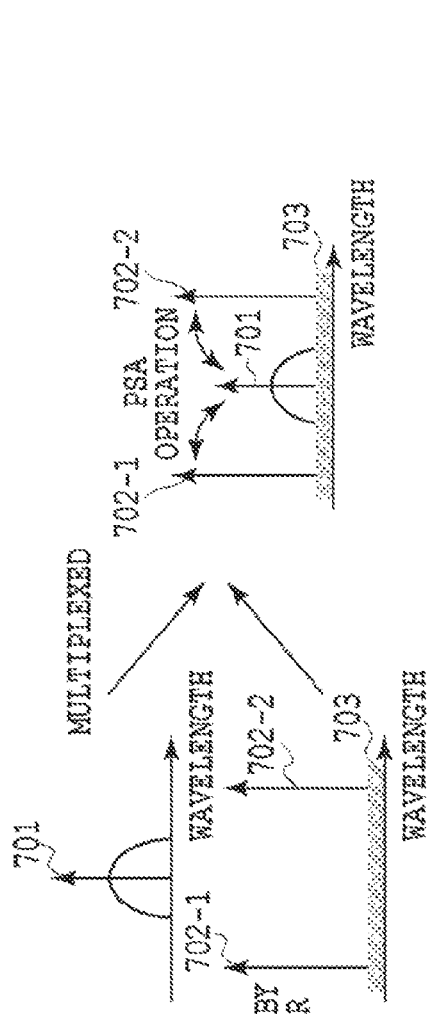
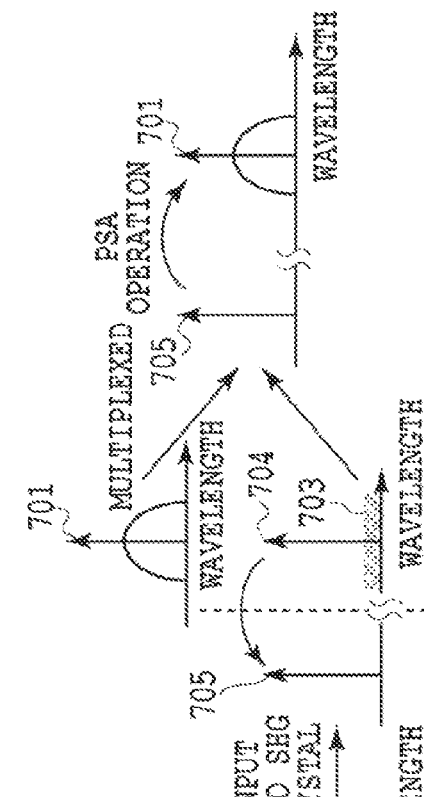
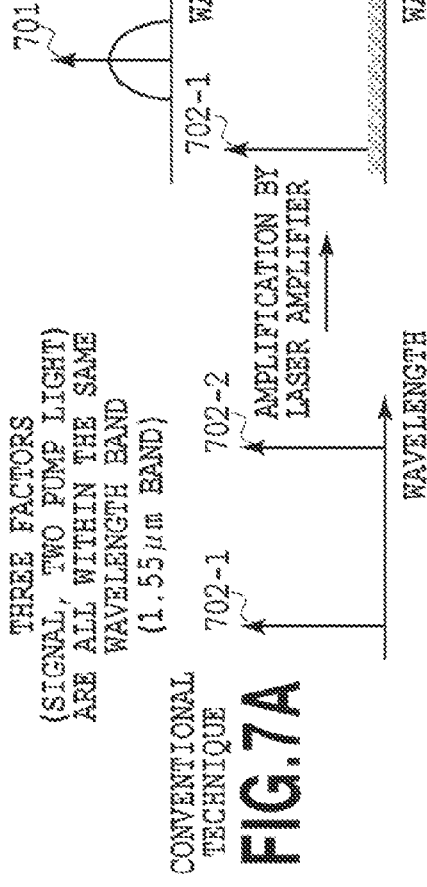
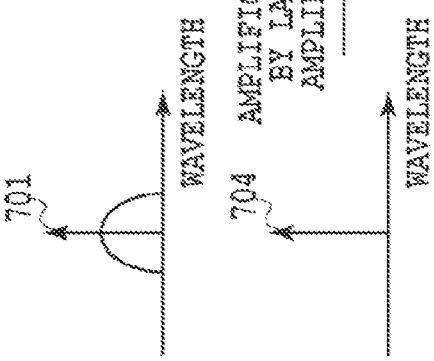
FIG. 7A CONVENTIONAL TECHNIQUE
FIG. 7B THIS EMBODIMENT

FIG. 17A CONVENTIONAL TECHNIQUE

THREE FACTORS (SIGNAL, TWO PUMP LIGHT) ARE ALL WITHIN THE SAME WAVELENGTH BAND (1.55 μm BAND)

FIG. 17B THIS EMBODIMENT

WAVELENGTH CAN BE SEPARATED BY FILTER

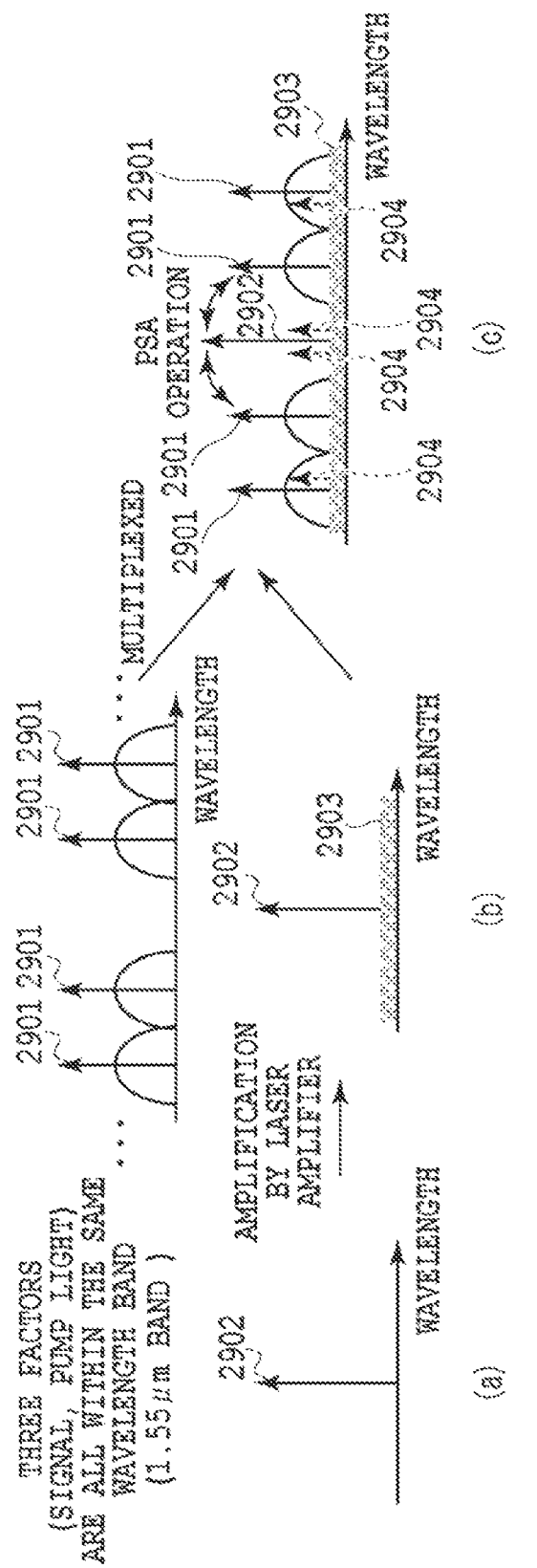
FIG. 29 CONVENTIONAL TECHNIQUE

OPTICAL AMPLIFIER

TECHNICAL FIELD

The present invention relates to an optical amplifier. Specifically, the present invention relates to an optical amplifier used in an optical communication system and an optical measurement system as well as an optical transceiver and an optical receiver including this optical amplifier.

BACKGROUND ART

In a conventional optical transmission system, a regenerating optical repeater has been used to regenerate a signal attenuated through optical fibers. The regenerating optical repeater converts an optical signal to an electric signal, and then discriminates the digital signal in order to regenerate an optical signal. However, this regenerating optical repeater had a disadvantage in that operation speed of an electronic component was limited when converting an optical signal to an electric signal, and power consumption was increasing as transmission speed became higher for example.

For solving this problem, a fiber laser amplifier or a semiconductor laser amplifier was widely used. The fiber laser amplifier boosts signal light by passing through optical fibers doped with rare earth element (e.g., erbium or praseodymium) excited by a pump light. The fiber laser amplifier and the semiconductor laser amplifier can directly amplify signal light and thus is not limited by the electric processing speed which has been a problem in a regenerating optical repeater. In addition, the fiber laser amplifier and the semiconductor laser amplifier also have an advantage that the configuration is relatively simple. However, these laser amplifiers do not have a function to reshape a degraded pulse waveform of a signal light. Furthermore, in the case of these laser amplifiers, amplified spontaneous emission, which is generated unavoidably and randomly, is irrespectively mixed with a signal component, thus causing a reduction of the S/N ratio of the signal light by at least 3 dB before and after the amplification. They cause an increase of a bit error rate and the decrease of the transmission quality in the digital transmission systems.

As an Amplifier for solving the limit on the conventional laser amplifiers as described above, a phase sensitive amplifier (PSA) has been studied. This phase sensitive amplifier has a function to reshape a signal light waveform degraded due to the dispersion of the transmission fibers. The phase sensitive amplifier also, in principle, is able to keep the same S/N ratio of the signal light without degradation before and after the amplification because the phase sensitive amplifier can suppress the spontaneous emission with a quadrature phase irrespective of the signal.

CITATION LIST

Non Patent Literature

NPL 1: J. A. Levenson, I. Abram, T. Rivera, and P. Grainger, "Reduction of quantum noise in optical parametric amplification", J. Opt. Soc. Am. B, vol. 10, pp. 2233-2238 (1993).
NPL 2: W. Imajuku, and A. Takada, "Gain characteristics of coherent optical amplifiers using a Mach-Zehnder interferometer with Kerr Media", IEEE J. Quantum Electron., vol. 35, no. 11, pp. 1657-1665 (1999).
NPL 3: R. Slavik et al., "All-optical phase and amplitude regenerator for next-generation telecommunications system", Nature Photonics., vol. 4, pp. 690-695 (2010).
NPL 4: T. Umeki, O. Tadanaga, and M. Asobe, "Highly efficient wavelength converter using direct-bonded PPZnLN ridge waveguide", IEEE J. Quantum Electron., vol. 46, no. 8, pp. 1206-1213 (2010).
NPL 5: R. Slavik et al., "All-optical phase-regenerative multicasting of 40 Gbit/s DPSK signal in a degenerate phase sensitive amplifier", In Proceedings of the European Conference and Exhibition on Optical Communication (ECOC 2010, Torino, Italy) MO.1.A.2.
NPL 6: Isao Morohashi, Takahide Sakamoto, Hideyuki Sotobayashi, Tetsuya Kawanishi, Iwao Housako, "100 fs-level pulse generation using Mach-Zehnder-modulator-based comb generator and soliton compression", Dai 72 Kai Ouyou Butsuri Gakkai Gakuzyutsu Kouenkai Kouen Yokou (Ouyou Butsuri Gakkai, 2011 Aki, Yamagata Daigaku) 30a-P3-1
NPL 7: R. Tang et al., "In-line phase-sensitive amplification of multichannel CW signals based on frequency nondegenerate four-wave-mixing in fiber", Optics Express., vol. 16, pp. 9046-9053 (2008).
NPL 8: Kiyoshi Nagakawa and three others, "Optical amplifier and its application", Oomu-sya, 1992/05, p. 26
NPL 9: Nishihara et al., "Optical integrated circuit", Oomu-sya

SUMMARY OF INVENTION

Technical Problem

However, the above-described conventional technique has a problem as described below.

FIG. 1 illustrates a basic configuration of a conventional phase sensitive amplifier. This optical amplifier is composed of: a phase sensitive light amplification section 101; a pump light source 102; a pump light phase control section 103; and two light splitting sections 104-1 and 104-2.

This optical amplifier amplify an input signal light when the phase of the signal light and the phase of the pump light satisfy a specific relation (which will be described later) in the phase sensitive amplification section 101. On the other hand, the input signal light 110 is attenuated when the phase of the signal light and the phase of the pump light satisfy a specific relation dislocated by 90 degrees from the above mentioned specific relation. When this characteristic is used to control and synchronize the phase between the pump and signal lights so as to maximize the amplification gain, the signal light can be amplified without generating the spontaneous emission with the orthogonal phase to the signal light (i.e., without degrading the S/N ratio).

In order to achieve the phase synchronization of the signal light and the pump light, the phase of the pump light 111 is controlled so as to be synchronized with the phase of the input signal light 110 splitted by the light splitting section 104-1. The pump light phase control section 103 allows a part of the output signal light 112 splitted by the light splitting section 104-2 to be detected by a narrow band detector and controls the phase of the pump light 111 so that the output signal is maximum. As a result, the phase sensitive amplification section 101 can be controlled so as to synchronize the signal light phase and the pump light phase, thereby realizing light amplification without causing a degraded S/N ratio.

The pump light phase control section 103 may have, in addition to a configuration as shown in FIG. 1 in which the output side of the pump light source 102 controls the phase of the pump light, another configuration in which the phase of the pump light source 102 is directly controlled. When a light source generating signal light is located in the vicinity of the phase sensitive amplification section, then the signal light source may be partially splitted and the splitted light can be used as pump light.

The phase sensitive amplification section contains a second-order or third-order nonlinear medium. Conventionally, these phase sensitive amplifiers have been mainly used in a basic research field such as squeezing for controlling quantum states of light. According to an earlier research for a phase sensitive amplifier, the research using a second-order nonlinear optical crystal has been reported.

As shown in Non-patent Literature 1, when the second-order nonlinear optical effect is used, optical crystals are used as a nonlinear medium. A wavelength corresponding to the second harmonic wave of the signal light is used as pump light. The phase sensitive amplification can be achieved by optical parametric amplification (OPA) using the three-wave-mixing which is caused by inputting the pump light and the signal light into the nonlinear medium.

As shown in FIG. 2, in the case of the conventional technique, the laser light with relatively-high intensity from the laser light source 201 is used. One of the splitted lights is input into the Second Harmonic Generation (SHG) crystal 202 and the other is used as the signal light 210. The pump light 211, which is generated as the second harmonic wave, and the signal light 210 are input to the nonlinear optical crystal 203 which is capable of performing degenerate parametric amplification, resulting in performing phase sensitive amplification.

In the phase sensitive amplifier, amplification occurs only when a phase of the signal light satisfies a specific relation with the phase of the pump light. Specifically, it is required that the phase diffidence between the signal light and the pump light is 0 or π radian. Specifically, when the second-order nonlinear optical effect is used, it is required that the relation of the following (formula 1) must be satisfied by the phase $\phi_{2\omega s}$ of the pump light, which is a wavelength corresponding to the second harmonic wave, and the phase $\phi_{\omega s}$ of the signal light.

$$\Delta\phi = \frac{1}{2}\phi_{2\omega s} - \phi_{\omega s} = n\pi \text{ (wherein } n \text{ is an integer)} \quad \text{(formula 1)}$$

FIG. 3 is a graph illustrating the relation between the gain (dB) and the phase difference $\Delta\phi$ of the input signal light and the pump light in a phase sensitive amplifier using a conventional second-order nonlinear optical effect. As can be seen, the gain is maximum when $\Delta\phi$ is $-\pi$, 0, or $\pi$.

Similar to FIG. 1, the configuration shown in FIG. 2 is structured so that a part of the output signal light is tapped and detected by a narrow band detector. The phase of pump light can be controlled so as to maximize the output signal, thus achieving the phase synchronization of the signal light and the pump light.

Although the details will be described later, the above-described degenerate parametric amplification shows a special case where signal light and idler light have an identical wavelength in non-degenerate parametric amplification. When the second-order nonlinear optical effect is used, the phase sensitive amplification based on the non-degenerate parametric amplification can be performed by allowing the phase $\phi_{SH}$ of the pump light having a wavelength corresponding to the second harmonic wave, the phase $\phi_S$ of the signal light, and the phase $\phi_i$ of the idler light to satisfy the following relation (formula 2).

$$\Delta\phi = \frac{1}{2}\phi_{SH} - \frac{1}{2}(\phi_S + \phi_i) = n\pi \text{ (where } n \text{ is an integer)} \quad \text{(formula 2)}$$

With the development of optical communication in recent years, application of optical communication to a phase sensitive amplifier attracts increasing attention. In the field of optical communication, the third-order nonlinear optical effect by optical fibers compatible with an optical communication component has been reported. When the third-order nonlinear effect is used, optical fibers for example are used as a nonlinear medium. As shown in Non-patent Literature 2, one pump light with the same wavelength as that of signal light is used. The pump light and the signal light are input into the nonlinear medium. Then, optical parametric amplification using four-wave mixing can be performed to thereby achieve phase sensitive amplification.

When a third-order nonlinear medium is used and one pump light having the same wavelength as that of signal light is used, it is required for the phase $\phi_{\omega p}$ of the pump light and the phase $\phi_{\omega s}$ of the signal light to satisfy the relation of the following (formula 3).

$$\Delta\phi = \phi_{\omega p} - \phi_{\omega s} = n\pi \text{ (wherein } n \text{ is an integer)} \quad \text{(formula 3)}$$

As shown in Non-patent Literature 3, the one pump light with the same wavelength as that of the signal light can be substituted by two pump lights that have the light frequencies $\omega_{p1}$ and $\omega_{p2}$ when assuming that the frequency of the signal light is $\omega_s$, respectively.

$$2\omega_s = \omega_{p1} + \omega_{p2} \quad \text{(formula 4)}$$

When the third-order nonlinear medium is used and the two pump lights having a wavelength corresponding to the two light frequencies $\omega_{p\,1}$ and $\omega_{p\,2}$ are used, it is required for the phase $\phi_{\omega p\,1}$ and $\phi_{\omega p\,2}$ of the pump light and the phase $\phi_{\omega s}$ of the signal light to satisfy the relation of the following (formula 5).

$$\Delta\phi = \frac{1}{2}(\phi_{\omega p1} + \phi_{\omega p2}) - \phi_{\omega s} = n\pi \text{ (wherein } n \text{ is an integer)} \quad \text{(formula 5)}$$

Even when a third-order nonlinear medium is used, as in a second-order nonlinear optical effect, a part of the output signal light can be tapped and can be detected by a narrow band detector and the phase of the pump light can be controlled so as to maximize the output signal to thereby achieve the phase synchronization of the signal light and the pump light.

As described above, phase sensitive amplification using optical fibers include a method of using one pump light having the same wavelength as that of signal light or pump light having two wavelengths different from that of the signal light. When one pump light is used, the pump light must be separated from the signal light. Thus, as shown in Non-patent Literature 2, a loop fiber interferometer is used to separate the signal light from the pump light. However, in the case of this method, the phase modulation caused from the GAWBS (guided acoustics wave Brillouin scattering) in optical fibers is added to signal lights propagating in the fibers, thus noise characteristic is degraded. In order to avoid this problem, methods using two pump lights as shown in Non-patent Literature 3 have been researched in recent years.

FIG. 4 shows the configuration of optical-fiber-based phase sensitive amplifier in the case where two pump lights are used. First, as shown in Non-patent Literature 3, two pump lights (411-1 and 411-2) synchronized with an average phase of an incoming signal 410 is generated by four-wave mixing in an optical fiber. Next, the two pump lights (411-1 and 411-2) and the signal light 410 are amplified by the erbium-doped fiber amplifier (EDFA) 402 and then input into highly non-linear optical fibers 403. In FIG. 4, the signal light 410 and the two pump lights (411-1 and 411-2) are multiplexed and are amplified by the EDFA. However, the same effect also may be obtained by another configuration in which only the two pump lights are amplified by the EDFA and are multiplexed with the signal light before being input into the optical fibers. By adjusting the phase so that the above-described relation shown by (formula 5) is established between the signal light and the two pump lights, phase sensitive amplification by the four-wave mixing can be achieved. However, the above-described conventional technique has a disadvantage as described below.

In the case of a conventional phase sensitive amplifier using second-order nonlinear optical crystals, only such a configuration has been shown that can be operated by a sufficiently-high-power pulsed laser source to perform SHG or parametric amplification. Thus, such a configuration has not been disclosed yet that can be applied to an optical communication system which is generally operated at low power.

In phase sensitive amplification using optical fibers, a configuration that can be applied to an optical communication system has been shown. However, since this configuration uses four-wave mixing, wavelengths of signal light and pump light are in the vicinity to each other. In particular, FIG. 4 shows a configuration in which sufficient power is obtained by optical fiber amplifier such as EDFA so that the nonlinear optical effect in the optical fibers can be used. However, undesirable amplified spontaneous emission light (ASE light) from the EDFA is added to the pump light as noise when amplification. Since the wavelengths of the pump light and the signal light are in the vicinity to each other, removing the ASE light is difficult, thus the undesirable ASE light generated from the EDFA is also added to the signal light. This results in a degradation of S/N ratio of the signal light, thus preventing low-noise amplification.

In view of the disadvantage of the conventional technique as described above, it is an objective of the present invention to provide such a phase sensitive amplifier that can be applied to optical communication and that can achieve low-noise amplification.

By the way, in optical communication technique in recent years, a transmission method for a large-capacity signal with a high spectral efficiency has been studied as typically represented by an optical OFDM (Orthogonal Frequency Division Multiplexing). In this method, high-speed data is divided to multiple carriers which are called super channels. In order to perform the method in which multiple carriers are modulated by high-speed data as described above in an optical region, optical combs consisting of multiple carriers having frequencies arranged with an equal interval is generated by using a mode-locked laser or an optical modulator. The generated optical combs are spectrally distributed by a demultiplexer. Each demultiplexed carrier is modulated with the optical modulator and is multiplexed again and is launched into a transmission line.

However, the above-described conventional technique has a disadvantage as described below. Generally, when optical combs consisting of multiple carriers are demultiplexed with a demultiplexer and are modulated by optical modulators and are multiplexed with a multiplexer, each component has a high insertion loss. Thus, the optical power of the modulated data is remarkably attenuated when compared with the original optical combs. For example, as shown in Non-patent Literature 6, a method in which a light source with a single wavelength and a modulator are used to generate optical combs also has been proposed. However, the configuration as described above cannot generate high-power optical combs because of the loss of the optical modulators or a reduced optical power in proportion to the conversion efficiency to multiple carriers.

Recent optical communication required an improved spectral efficiency. As is known from the Shannon's communication theory, a high spectral efficiency requires a high S/N ratio of the optical signal. However, the transmission method as described above for modulating optical comb causes a high optical power loss in light generation and modulation. Thus, if the optical signal generation is followed by the amplification with a conventional optical amplifier using a laser medium in order to obtain power required for optical fiber transmission, the S/N ratio of optical signal is remarkably degraded because the input power to the optical amplifier is low.

Although the low-noise light amplification principle using a phase sensitive amplifier has been known, the phase sensitive amplifier can generally amplify only a single wavelength because it is based on degenerate parametric amplification. Thus it cannot amplify optical signal with multiple carriers simultaneously.

A method for achieving simultaneous amplification of multiple wavelengths has been proposed as shown in Non-patent Literature 7. This method uses a phase sensitive amplifier configuration using a non-degenerate parametric amplifier using the four-wave mixing in optical fibers. FIG. 5 is a schematic view illustrating the conventional amplification method of multiple wavelengths using the four-wave mixing in optical fibers. According to this method, multiple modulated optical signals and pump lights are input into the first optical fibers 501 in the Copier section and are performed wavelength conversion by the four-wave mixing to thereby generate idler light with an inverted phase when compared with that of the input signal light. Next, signal light group and corresponding idler light group are input into the second optical fibers 502 and non-degenerate parametric amplification is performed. By using this configuration, signal lights with multiple wavelengths can be amplified with phase sensitive amplifier.

However, in the case of the optical-fiber-based phase sensitive amplification using the four-wave mixing as described above, all of the pump lights and the signal lights are placed within 1.55-µm communication wavelength band. Pump light is generated and amplified by an optical fiber amplifier 503. This optical fiber amplifier generates the amplified spontaneous emission (ASE) light that is mixed in the amplified signal light, so that S/N ratio of the output signal light becomes lower than that of the input.

Solution to Problem

The present invention is an amplifier that amplifies signal light based on the optical mixing using nonlinear optical effects includes an optical fiber laser amplifier for amplifying fundamental wave light, a second-order nonlinear optical element that consists of a periodically-poled second-order nonlinear optical material and that includes an optical waveguide for generating a sum frequency light from fundamental wave light, a filter for spectrally separating the sum frequency light from among the fundamental wave light and the sum frequency light, a multiplexer for multiplexing the signal light and the sum frequency light that is pump light, a second-order nonlinear optical element that consists of a periodically-poled second-order nonlinear optical material and that includes an optical waveguide for parametric amplification of the signal light by using pump light, a filter for spectrally separating the amplified signal light from the pump light and a synchronization system for synchronizing the phase of the signal light with the phase of the pump light.

In one embodiment of the present invention, the sum frequency light is second harmonic wave.

In one embodiment of the present invention, the parametric amplification is degenerate parametric amplification.

In one embodiment of the present invention, the parametric amplification is non-degenerate parametric amplification.

In one embodiment of the present invention, the signal lights consist of one or multiple pair (s) of signal lights and each pair is symmetric about a half frequency of the sum frequency light as the pump light and has the same or conjugate phase information.

In one embodiment of the present invention, the synchronization system for synchronizing the phase of the signal light with the phase of the pump light is composed of a phase modulator and an expander of an optical path length, a system for splitting a part of the amplified signal light or a part of the pump light, a photodetector for detecting intensity change which corresponds to a phase change modulated by the phase modulator, of the light splitted by the splitting system and a phase-locked loop circuit for performing, based on the intensity change of the light detected by the photodetector, a feedback on the phase modulator and the expander of an optical path length for the purpose of maximizing the intensity of the amplified signal light.

In one embodiment of the present invention, the synchronization system for synchronizing the phase of the signal light with the phase of the pump light is composed of a semiconductor laser for generating fundamental wave light or a semiconductor laser for generating light whose phase is synchronized with the fundamental wave light or the pump light, a circuit for splitting a part of the amplified signal light or a part of the pump light, a photodetector for detecting intensity change of the light splitted by the splitting system, and a phase-locked loop circuit for performing, based on the intensity change of the light detected by the photodetector, a feedback on the driving current of the semiconductor laser for generating fundamental wave light or the semiconductor laser for generating light whose phase is synchronized with the fundamental wave light or the pump light for the purpose of maximizing the intensity of the amplified signal light.

In one embodiment of the present invention, the signal light further includes pilot tone of continuous wave light, wherein the phase sensitive amplifier further includes: a system for splitting the signal light; and a semiconductor laser light source, wherein the semiconductor laser light source is injection-locked by the pilot tone of continuous wave light, and wherein the continuous wave light that is phase-locked with injection light and that is output from the semiconductor laser light source is used as fundamental wave light.

In one embodiment of the present invention, the phase sensitive amplifier further includes a system for splitting the signal light; and a semiconductor laser light source, wherein the semiconductor laser light source is injection-locked with the sum frequency light output from a filter for spectrally separating only the sum frequency light, and wherein continuous wave light that is phase-locked with injection light and that is output from the semiconductor laser light source is used as the pump light.

In one embodiment of the present invention, the phase sensitive amplifier further includes a circuit for splitting a part of the signal light, a semiconductor laser light source, a light source for generating the first fundamental wave light, a second-order nonlinear optical element that consists of a periodically-poled second-order nonlinear optical material and that includes an optical waveguide for generating a second harmonic wave of the signal light, and a second-order nonlinear optical element that consists of a periodically-poled second-order nonlinear optical material and that includes an optical waveguide for generating a difference frequency light between the generated second harmonic wave and the first fundamental wave light, wherein the semiconductor laser is phase-locked with the generated difference frequency light by injection-locking technique, and the phase-locked continuous-wave light is used as the second fundamental wave light, and the sum frequency light is generated using the first fundamental wave light and the second fundamental wave light in a second-order nonlinear optical element including an optical waveguide for generating the sum frequency light from fundamental wave lights.

In one embodiment of the present invention, the phase sensitive amplifier further includes a circuit for splitting a part of the signal light, a semiconductor laser light source, a light source for generating first fundamental wave light, and a second-order nonlinear optical element that consists of a periodically-poled second-order nonlinear optical material and that includes an optical waveguide for generating a second harmonic wave of the signal light and for generating a difference frequency light between the generated second harmonic wave and the first fundamental wave light, wherein the semiconductor laser is phase-locked with the generated difference frequency light by injection-locking technique, the phase-locked continuous-wave light output from the semiconductor laser light source is used as the second fundamental wave light, the sum frequency light is generated using the first fundamental wave light and the second fundamental wave light in the second-order nonlinear optical element including an optical waveguide for generating the sum frequency light from fundamental wave lights.

In one embodiment of the present invention, the filter for spectrally separating only the sum frequency light from among the fundamental wave light and the sum frequency light is a dichroic mirror using a dielectric film or a light splitting element using a multimode interferometer.

In one embodiment of the present invention, the multiplexer for multiplexing the signal light and the sum frequency light that is the pump light is a dichroic mirror using a dielectric film or a light multiplexing element using a multimode interferometer.

In one embodiment of the present invention, the phase sensitive filter for spectrally separating the amplified signal light from the pump light is a dichroic mirror using a dielectric film or a light splitting element using a multimode interferometer.

In one embodiment of the present invention, the sum frequency light is transmitted by single-mode polarization-maintaining fibers at the wavelength of the sum frequency light.

In one embodiment of the present invention, the phase sensitive amplifier further includes a bandpass filter located between an optical fiber laser amplifier and a second-order nonlinear optical element includes an optical waveguide for generating the sum frequency light.

In one embodiment of the present invention, a second-order nonlinear optical element including an optical waveguide for generating the sum frequency light and a second-order nonlinear optical element including an optical waveguide for performing parametric amplification are individually temperature-adjustable.

In one embodiment of the present invention, an optical receiver consists of the phase sensitive amplifier and a photodiode, wherein the phase sensitive amplifier further includes an optical fiber laser amplifier connected just after a phase sensitive amplifier and a bandpass filter for passing through a wavelength at around the amplified signal light wavelength.

In one embodiment of the present invention, an optical transceiver consists of the phase sensitive amplifier according to claim 1, a light source for generating the signal light, an optical modulator, and a circuit for splitting an output from the light source, wherein the part of the splitted output from the light source is used as the fundamental wave light.

In one embodiment of the present invention, the phase sensitive amplifier further includes a phase modulator placed at the output side of the optical fiber laser amplifier, wherein the phase modulator consists of an optical waveguide fabricated by direct bonding technique.

In one embodiment of the present invention, the phase sensitive amplifier further includes a phase modulator, wherein the phase modulator is integrated in a second-order nonlinear optical element including an optical waveguide for generating the sum frequency light, and wherein the phase modulator is formed to be adjacent to the same waveguide as that of an optical waveguide for generating the sum frequency light and is connected to the front stage or the rear stage of the optical waveguide for generating the sum frequency light wherein the phase modulator is formed on the same waveguide as an optical waveguide for generating the sum frequency light to be adjacent to the optical waveguide and is connected to the input side or the output side of the optical waveguide for generating the sum frequency light.

In one embodiment of the present invention, the phase sensitive amplifier further includes a phase modulator, wherein the phase modulator, a filter for spectrally separating the sum frequency light from among the fundamental wave light and the sum frequency light, and a multiplexer for multiplexing signal light and pump light are integrated in a second-order nonlinear optical element including an optical waveguide for generating the sum frequency light, wherein the filter and the multiplexer are formed to be adjacent to each other on the same waveguide as the optical waveguide, wherein the phase modulator is connected to the input side of the multiplexer, wherein the filter is connected to the input side of the multiplexer, and wherein the optical waveguide for generating the sum frequency light is connected to the input side of the filter and the multiplexer.

In one embodiment of the present invention, the phase sensitive amplifier further includes a phase modulator, wherein the phase modulator, a filter for spectrally separating the sum frequency light from among the fundamental wave light and the sum frequency light, and a multiplexer for multiplexing signal light and pump light are integrated in a second-order nonlinear optical element including an optical waveguide for performing parametric amplification, wherein the phase modulator and the multiplexer are formed to be adjacent to each other on the same waveguide as the optical waveguide, wherein the filter is connected to the input side of the multiplexer, wherein the optical waveguide is connected to the output side of the multiplexer, and wherein the phase modulator is connected to the input side of the multiplexer.

In one embodiment of the present invention, the phase sensitive amplifier further includes a phase modulator, wherein the phase modulator, a filter for spectrally separating the sum frequency light from among the fundamental wave light and the sum frequency light, and a multiplexer for multiplexing signal light and pump light are integrated in a second-order nonlinear optical element including an optical waveguide for generating the sum frequency light, wherein the second-order nonlinear optical element that is used to generating the sum frequency light and second-order nonlinear optical element that is used to perform parametric amplification is integrated as one optical element wherein the second-order nonlinear optical element for generating the sum frequency light and a second-order nonlinear optical element for performing parametric amplification is integrated as one optical element, wherein the optical waveguide for generating the sum frequency light, a filter for separating the sum frequency light from among the fundamental wave light and the sum frequency light, a multiplexer for multiplexing signal light and pump light, and an optical waveguide for performing parametric amplification are formed to be adjacent to one another on the same waveguide, wherein the phase modulator is connected to the input side of the multiplexer for multiplexing signal light and pump light, the filter for spectrally separating only the sum frequency light from among the fundamental wave light and the sum frequency light is connected to the input side of the multiplexer, wherein the optical waveguide for generating the sum frequency light is connected to the input side of filter for spectrally separating the sum frequency light from among the fundamental wave light and the sum frequency light and the multiplexer, and wherein the optical waveguide for performing parametric amplification is connected to the output side of the multiplexer.

In one embodiment of the present invention, the phase sensitive amplifier further includes a phase modulator, a reflector for reflecting a sum frequency light, an optical circulator that input fundamental wave light into a second-order nonlinear optical element including an optical waveguide for generating the sum frequency light and that allows amplified signal light to pass through, a first optical waveguide that is used to input signal light and that is used to output fundamental wave light separated by a filter for spectrally separating only the sum frequency light from among the fundamental wave light and the sum frequency light, and a second optical waveguide for connecting the reflector and the multiplexer for multiplexing signal light and pump light, wherein the filter, the multiplexer, and the first optical waveguide and the second optical waveguide are integrated in the second-order nonlinear optical element including an optical waveguide for generating the sum frequency light, wherein the optical waveguide of a second-order nonlinear optical element for generating the sum frequency light and an optical waveguide of a second-order nonlinear optical element for performing parametric amplification of the signal light using the pump light are shared, wherein the filter and the multiplexer are shared, wherein the shared optical waveguide, the shared multiplexer, and the second optical waveguide are formed to be adjacent to one another on the same waveguide, and wherein the shared optical waveguide, the first optical waveguide, and second optical waveguide are connected to the multiplexer.

In one embodiment of the present invention, the cross section of the first optical waveguide at an opposite side of the contact surface connected to the multiplexer is cut to have such an angle with the axis of the first optical waveguide that the angle is larger than 0° and is smaller than 90°, and at least one input/output end face of the shared optical waveguide is processed to have such an angle with the axis of the shared optical waveguide that the angle is larger than 0° and is smaller than 90°.

In one embodiment of the present invention, the phase modulator is integrated in a second-order nonlinear optical element including an optical waveguide for generating the sum frequency light from fundamental wave, and the phase modulator is formed to be adjacent to the multiplexer on the same waveguide.

In one embodiment of the present invention, the periodically-poled second-order nonlinear optical material includes $LiNbO_3$, $KNbO_3$, $LiTaO_3$, $LiNb_xTa_{1-x}O_3$ ($0 \leq x \leq 1$), $KTiOPO_4$, or one of those optical materials which further includes at least one selected from a group consisting of Mg, Zn, Fe, Sc, or In as dopant.

In one embodiment of the present invention, the optical waveguide for generating the sum frequency light and the optical waveguide for performing parametric amplification are a directly bonded optical waveguide fabricated by directly bonding a first substrate having a nonlinear optical effect to a second substrate having a lower refractive index than that of the first substrate.

Advantageous Effects of Invention

According to the present invention, in a phase sensitive amplifier by using parametric amplification as a nonlinear optical effect to amplify a specific phase component of signal light, while using an optical fiber amplifier in order to obtain optical signal with sufficient power to use parametric amplification from weak optical signal used for optical communication, the phase sensitive amplifier can be configured without causing ASE light generated by the amplification to be added on the signal light. Thus, high-quality optical signal amplification can be achieved while suppressing degradation of S/N ratio. Furthermore, by using the present invention, multiple wavelengths can be simultaneously amplified and signal light having a phase correlation with pump light can be selectively amplified, thereby suppressing noise due to uncorrelated light such as ASE light.

As a result, the S/N ratio of the signal in optical fibers can be improved by a phase sensitive amplifier that can be applied to optical communication and that can achieve low-noise amplification. Thus, the long-distance transmission of a signal with a higher speed than the conventional case can be performed at low power. Furthermore, the phase chirp of input signal light can be suppressed with the phase sensitive amplifier. Suppression of the signal degradation leads to increase the transmission distance of the amplified signal light. Furthermore, in an application requiring a long-distance transmission, an optical signal without chirping can be generated by using a low-cost or simple optical modulator remaining phase chirp. Furthermore, the suppression of the ASE light can improve the S/N ratio of a degraded optical signal. Furthermore, the selective amplification of signal light with a phase correlation can improve the S/N ratio of the signal light degraded due to the beat noise between ASE light and signal light.

BRIEF DESCRIPTION OF DRAWINGS

FIG. 7A is a diagram for explaining the operation of the phase sensitive amplification and shows a case where the configuration based on conventional technique is used;

FIG. 7B is a diagram for explaining the operation of the phase sensitive amplification and shows a case where the configuration according to the first embodiment of the present invention is used;

FIG. 17A is a diagram for explaining the operation of the phase sensitive amplification and shows the configuration based on conventional technique;

FIG. 17B is a diagram for explaining the operation of the phase sensitive amplification and shows a case where the configuration according to the fifth embodiment of the present invention is used;

FIG. 29 is a diagram for explaining the operation of a phase sensitive amplification according to conventional technique;

DESCRIPTION OF EMBODIMENTS

The following section will describe an embodiment of the present invention with reference to the drawings.

First Embodiment

Figure 6:
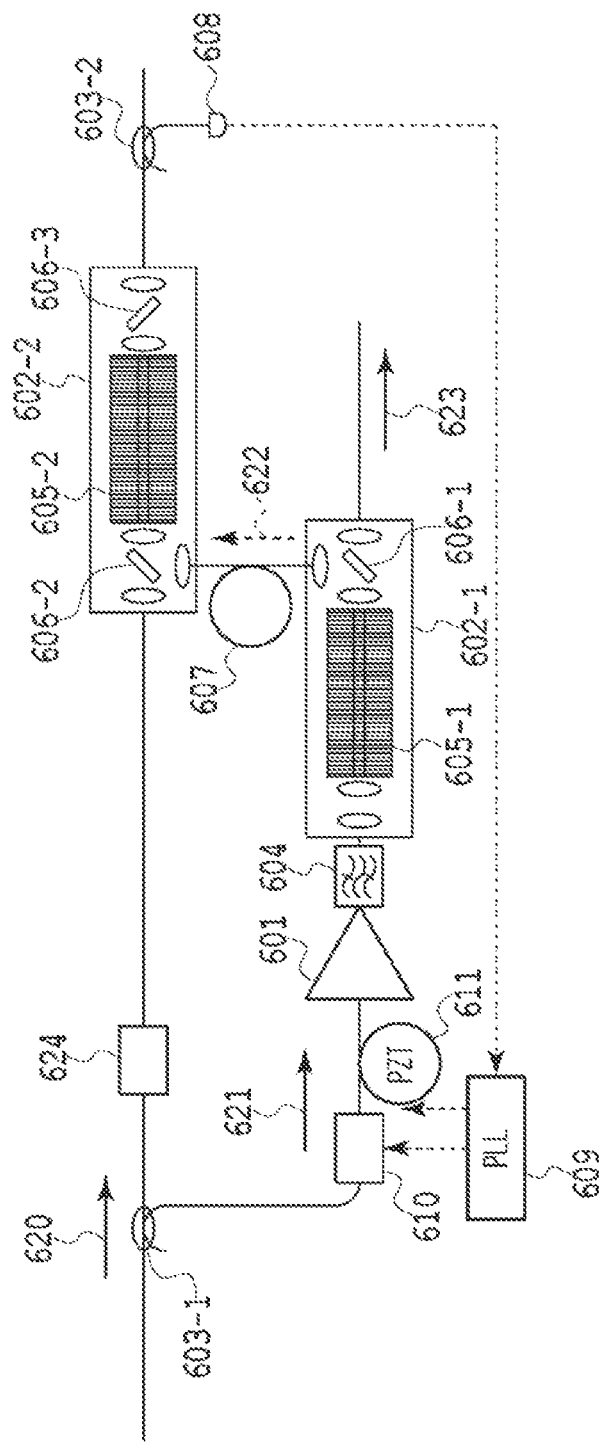
FIG. 6 is a diagram for explaining the configuration of a phase sensitive amplifier according to the first embodiment of the present invention.

FIG. 6 shows the configuration of this embodiment. In this embodiment, in order to obtain sufficient power to generate nonlinear optical effect from weak laser light used for optical communication, an erbium-doped fiber amplifier (EDFA) 601 is used to amplify fundamental wave light 621. The amplified fundamental wave light 621 is input into the first second-order nonlinear optical element 602-1 to thereby cause the generation of the second harmonic wave 622. The signal light 620 and the second harmonic wave 622 are input into the second second-order nonlinear optical element 602-2 to thereby perform optical parametric amplification, thus performing phase sensitive amplification. The configuration of the phase sensitive amplifier as described above is a basic feature of the invention of this application.

Although the details of the configuration shown in FIG. 6 will be described later, the use of the configuration as described above provides an effect as described below that cannot be obtained by conventional technique.

Figure 1:
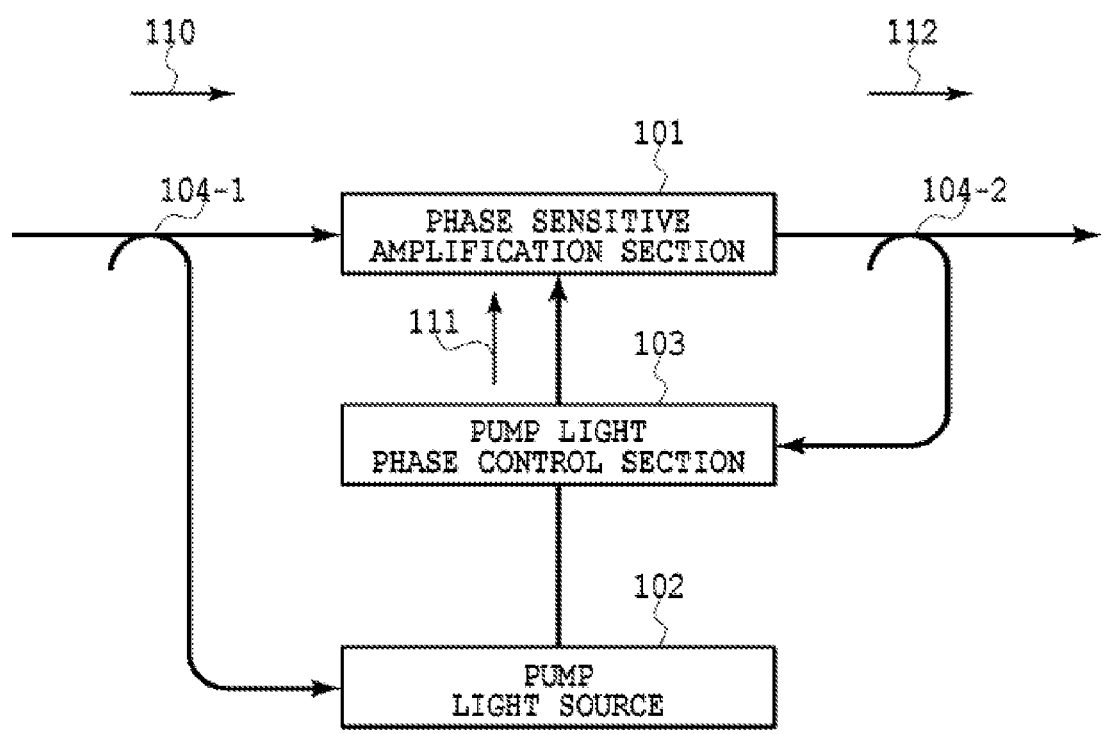
FIG. 1 is a diagram for explaining the configuration of a conventional phase sensitive amplifier.
Figure 2:
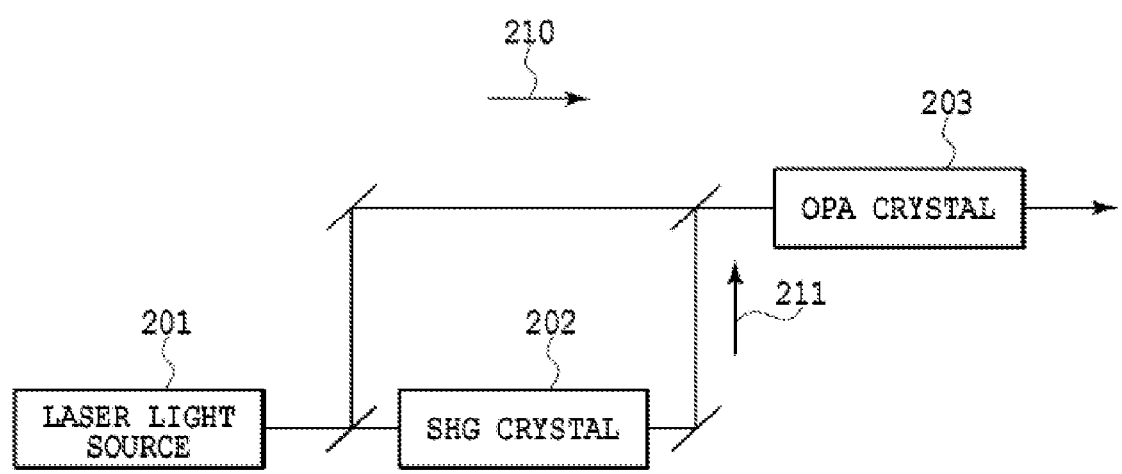
FIG. 2 is a diagram for explaining the configuration of a conventional phase sensitive amplifier using a second-order nonlinear optical effect.
Figure 3:
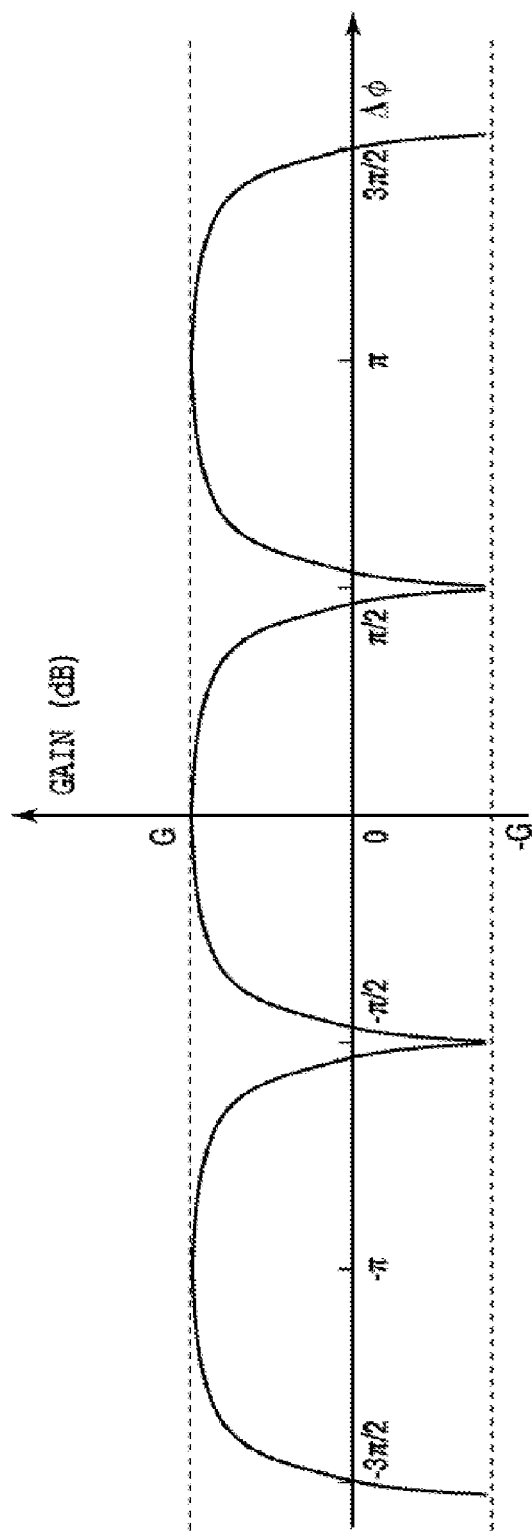
FIG. 3 is a graph illustrating the relation between the gain (dB) and the phase difference Δφ of the input signal light and the pump light in the conventional phase sensitive amplifier using the second-order nonlinear optical effect.
Figure 4:
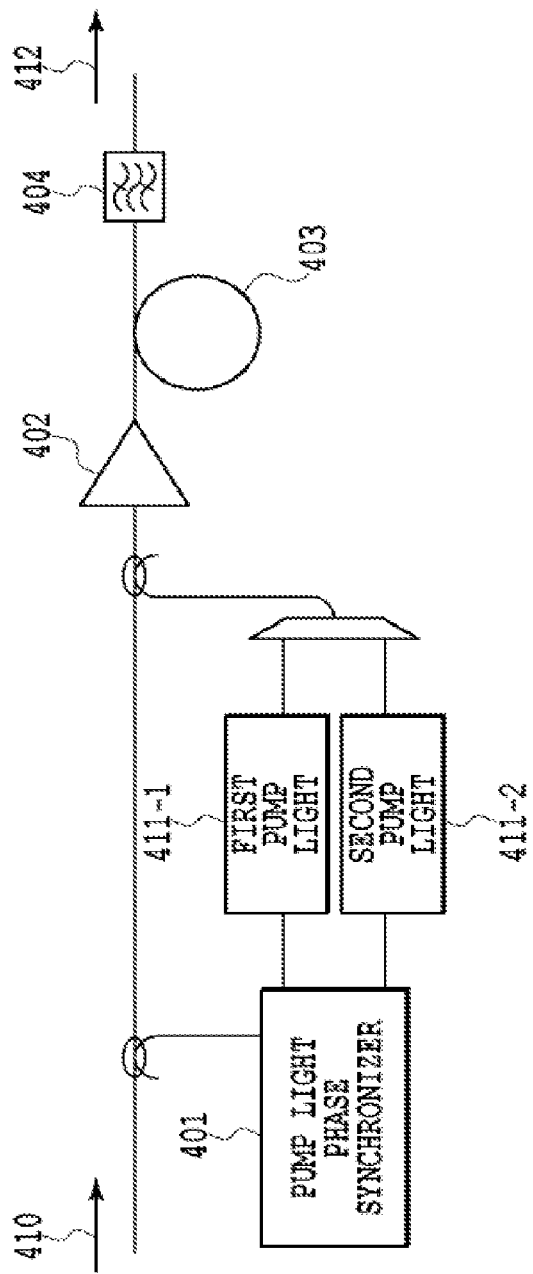
FIG. 4 is a diagram for explaining the configuration of a conventional phase sensitive amplifier using a third-order nonlinear optical effect.

FIG. 7A and FIG. 7B are schematic views of the spectra of the signal light and pump light used in the phase sensitive amplification. FIG. 7A shows a case where the configuration using optical fibers is used as nonlinear medium and the conventional fiber laser amplifier shown in FIG. 4. FIG. 7B shows a case where the configuration according to this embodiment shown in FIG. 6 is used.

The conventional phase sensitive amplifier using optical fibers uses the four-wave mixing. Thus, in order to allow the pump light and the signal light for preforming optical parametric amplification to have wavelengths satisfying the phase matching conditions, these wavelengths must be in the vicinity to each other.

As illustrated in FIG. 7A, when the signal light 701 and the pump light 702 have the same 1.55-μm wavelength band and two pump lights 702-1 and 702-2 are used, it is desirable that the two pump light are amplified with one optical fiber amplifier for making the entire configuration simple. However, this simplified configuration undesirably causes, in the vicinity of the pump light wavelength, ASE light 703 generated from the optical fiber amplifier. In order not to mix ASE light in the signal wavelength band, a configuration in which signal light do not pass through the optical fiber amplifier can be theoretically implemented. However, it is difficult to realize an ultra-narrow-bandwidth optical filter because the pump light and the signal light are in the vicinity each other. Thus, ASE light cannot be completely eliminated. As a result, ASE light generated in the signal wavelength band is undesirably mixed in the signal wavelength, thus S/N ratio of signal light is degraded due to the mixed ASE light.

On the other hand, in the case of the configuration according to this embodiment, the signal light 701 has the same wavelength as that of the fundamental wave light 704. In order to obtain sufficient power to generate optical parametric amplification from weak laser light used for optical communication, the fundamental wave light 704 is amplified with an optical fiber amplifier. The ASE light 703 is added on a wavelength in the vicinity of the fundamental wave light 704.

In the configuration according to this embodiment, the amplified fundamental wave light 704 on which the ASE light 703 is added is input into the first second-order nonlinear optical element, resulting in generating the second harmonic wave 705. Here, in a wavelength band around the second harmonic wave 705 used as pump light, wideband ASE light as noise does not generate except for the slight second harmonic of the ASE light 703. The wavelength of the second harmonic wave 705 is a half of that of the fundamental wave light 704 and the two wavelengths are sufficiently separated from each other. Thus, an optical filter, a dichroic mirror for example, having a high extinction ratio for separating spectrally only a second harmonic wave from the fundamental wave light and the second harmonic wave can be relatively easily fabricated. By connecting the filter as described above to the output of the first second-order nonlinear optical element, the fundamental wave light 704 and the ASE light 703 of the pump light wavelength band can be removed completely. Next, only the signal light 701 and the second harmonic wave 705 can be multiplexed and are input into the second second-order nonlinear optical element, thus realizing the phase sensitive amplification based on degenerate parametric amplification.

With reference to FIG. 6 again, the configuration of this embodiment will be described in detail. In this embodiment, in order to amplify the 1.54 μm signal light 620, a part of the signal light 620 is splitted by the light splitting section 603-1 to use the splitted light as the fundamental wave light 621. The fundamental wave light 621 is amplified by an erbium-doped fiber amplifier (EDFA) 601. The amplified fundamental wave light 621 is input into the first second-order nonlinear optical element 602-1.

In this embodiment, in order to prevent the wideband ASE light generating from the EDFA 601 from being converted by the first second-order nonlinear optical element 602-1, a bandpass filter 604 is inserted between the EDFA 601 and the first second-order nonlinear optical element 602-1 to cut off unnecessary ASE light. The second-order nonlinear optical element 602 includes an optical waveguide 605 consisting of periodically-poled lithium niobate (PPLN). The PPLN waveguide 605 can use the highest nonlinear optical constant d33 of lithium niobate thanks to the quasi-phase matching and also can obtain a high optical power density by the light waveguide structure. By the shown configuration, high wavelength conversion efficiency can be obtained. When high power is input into the PPLN waveguide, there may be a case where a phase-matching wavelength changes due to the optical damage caused by a photorefractive effect. In this embodiment, by using a waveguide by the direct bonding technique, the problem shown in Non-patent Literature 4 can be avoided.

In this embodiment, the fluctuation of the phase-matching wavelength is suppressed by the direct bonding waveguide with a core composed of Zn-doped lithium niobate having a high optical damage resistance. Furthermore, a dry etching processing is used to reduce the core diameter to about 4 μm, thereby realizing high wavelength conversion efficiency. The second harmonic wave 622 and the fundamental wave light 623 output from the first PPLN waveguide 605-1 are spectrally separated by a dichroic mirror 606-1. The 0.77 μm second harmonic wave 622 reflected by the dichroic mirror 606-1 is guided to the second second-order nonlinear optical element 602-2 via the polarization-maintaining fiber 607 having a single mode propagation characteristic in this wavelength of 0.77 μm. During this process, the fundamental wave light and ASE light in the wavelength range of about 1.54 μm that could not be completely removed by the dichroic mirror 606-1 are also input into the polarization-maintaining fiber 607. However, this fiber, which is in a single mode at 0.77 μm weakly confines light with a wavelength of 1.54 μm thereby effectively attenuating these unnecessary light during propagating the fiber with a length of about 1 m. The second harmonic wave 622 output from the polarization-maintaining fiber 607 is multiplexed by the dichroic mirror 606-2 with the signal light 620 with a wavelength of 1.54 μm. The dichroic mirror 606-2 reflects only the second harmonic wave 622. Thus, the remaining components of the fundamental wave light 621 and the ASE light with a wavelength of about 1.54 μm which is emitted from the first PPLN waveguide 605-1 through the dichroic mirror 606-1 and the polarization-maintaining fiber 607, can be removed effectively.

The signal light 620 and the second harmonic wave 622 are multiplexed and are input into the second PPLN waveguide 605-2. The second PPLN waveguide 605-2 has the same performance (including phase-matching wavelength) as those of the first PPLN waveguide 605-1. Therefore, the signal light can be amplified by phase sensitive amplification by using the degenerate parametric amplification.

In this embodiment, the two PPLN waveguides 605-1 and 605-2 are independently controlled to have fixed temperature by temperature controllers. There may be a case where the fabrication error of the two PPLN waveguides causes different phase-matching wavelengths at the same temperature. Even in such a case, these two PPLN waveguides can be individually temperature-controlled so that the PPLN waveguides can have an identical phase-matching wavelength. The light output from the second PPLN waveguide 605-2 is spectrally divided by the dichroic mirror 606-3 to a second harmonic wave as pump light and amplified signal light. Since the second harmonic wave and the amplified signal light have completely-different wavelengths as described above, an unnecessary second harmonic component can be effectively removed at the output of the phase sensitive amplifier.

In the phase sensitive amplification, the phases of the pump light and the signal light must be synchronized. In this embodiment, a part of the output amplified signal light is tapped by the light splitting section 603-2 and is received by the photodetector 608 and is subsequently phase-synchronized by the phase-locked loop circuit (PLL) 609. The phase modulator 610 provided in front of the EDFA 601 is used to perform weak phase modulation by a sinusoidal wave to the fundamental wave light 621. A phase shift of the phase modulation is detected by the photodetector 608 and the PLL circuit 609. By providing a feedback to the driving voltage of the optical fiber expander 611 by the PZT connected in front of the EDFA 601 and the bias voltage of the phase modulator 610, the vibration of an optical fiber component or the fluctuation of the optical phase due to a temperature fluctuation can be compensated for in order to thereby provide stable phase sensitive amplification. In this embodiment, an LN Mach-Zehnder modulator was used as the intensity modulator 624 to evaluate the amplification characteristic when a 10-Gbit/s NRZ signal was input.

Figure 8A:
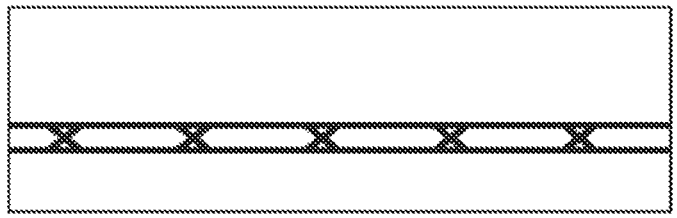
FIG. 8A is a diagram for explaining the time waveform of a signal amplified by the phase sensitive amplifier according to the first embodiment of the present invention and shows the output waveform when no pump light enters.
Figure 8B:
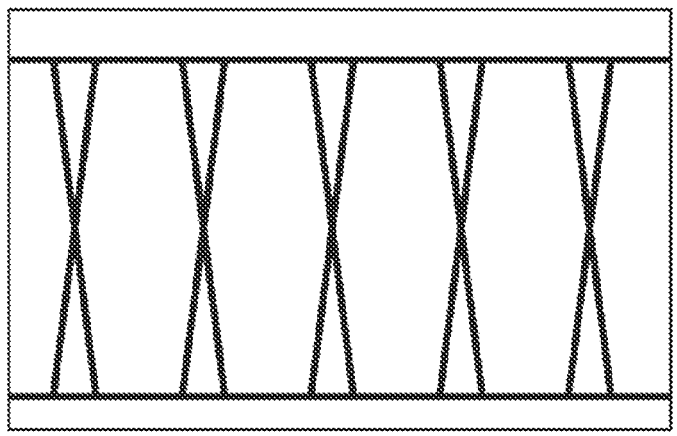
FIG. 8B is a diagram for explaining the time waveform of the signal amplified by the phase sensitive amplifier according to the first embodiment of the present invention and shows the output waveform when the pump light and the signal light have the same phase.
Figure 8C:
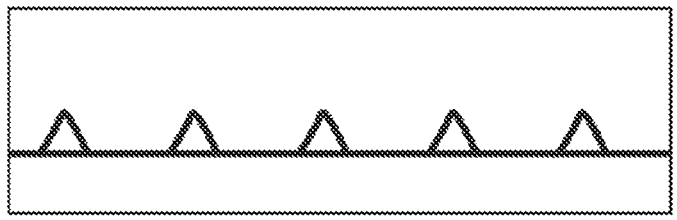
FIG. 8C is a diagram for explaining the temporal waveform of the signal amplified by the phase sensitive amplifier according to the first embodiment of the present invention and shows the output waveform when the pump light has a phase dislocated by 90 degrees from that of the signal light.

FIG. 8A, FIG. 8B, and FIG. 8C illustrate the temporal waveform of a signal amplified by the phase sensitive amplifier according to this embodiment. FIG. 8A shows the output waveform of the input signal light when pump light does not exist. FIG. 8B shows the output waveform when the PLL is set so that the pump light and the signal light satisfy the relation of (formula 1). FIG. 8C shows the output waveform when the PLL is set so that the pump light and the signal light satisfy the relation deviated to 90 degrees from that of (formula 1).

In this embodiment, the phase of the pump light and the phase of the signal light are synchronized so as to satisfy the relation of the (formula 1). Thus, the gain of about 11 dB could be obtained under conditions in which the power of second harmonic wave 622 was 300 mW at the input of the second PPLN waveguide 605-2. In this embodiment, the use of the optical fiber amplifier could achieve the operation by CW pump light, which is a condition required in an optical communication application. Furthermore, the configuration according to this embodiment could prevent ASE light which is generated from the optical fiber amplifier from being mixed while using the optical fiber amplifier. This consequently has resulted in phase sensitive amplification while preventing degradation of S/N ratio.

In this embodiment, an optical waveguide fabricated by a direct bonding was used as a second-order nonlinear optical element for a sum frequency generation and the parametric amplification. However, this method is not limited to this embodiment. Thus, an optical waveguide fabricated by a direct bonding can also be used in other embodiments.

When the phase of the pump light and the phase of the signal light are satisfied the relation deviated to 90 degrees from that of (formula 1), as shown in FIG. 8C, only a transient waveform between the ON level and the OFF level was amplified. This shows that a single-drive-type intensity modulator was used as a LN Mach-Zehnder modulator to generate an NRZ signal and thus chirp is caused by a data modulator. Specifically, the transition between ON and OFF causes the fluctuation of the output phase of the modulator. Based on an ON status as a reference, an orthogonal phase component is caused. Thus, when the phase of the signal light phase and the phase of the pump light are set to be orthogonal to each other, only a phase chirp component is amplified by a phase sensitive amplifier. This shows that, when the phase of the pump light is matched to the signal light ON status, even when an input signal includes a phase chirp, the chirp component can be removed and a chirpless signal can be obtained through phase sensitive amplification.

Furthermore, it was also found that, as described below, the operation according to this embodiment could provide an advantage which is not provided by conventional technique. In the case of a conventional configuration in which the four-wave mixing in optical fibers is used and two pump lights are used to perform phase sensitive amplification, as shown in Non-patent Literature 5, this conventional configuration cannot cause only the four-wave mixing between the two pump lights around wavelength of the signal light as a center wavelength, thus undesirably satisfying phase-matching conditions between various wavelengths. Thus, a process may be caused for example in which signal light around one pump light as a center wavelength is converted to another wavelength. This undesirably causes a situation where amplified signal lights are copied one by one, thus generating a plurality of signals. Thus, the power of the amplified signal light is undesirably dissipated, thus limiting the power to amplify the desired signal light. On the other hand, in this embodiment, only signal light and a second harmonic wave are input into the second PPLN waveguide. Thus, an unwanted wavelength conversion process as in the conventional technique is prevented. In this embodiment, even when output power is increased to +22 dBm, no output saturation is observed and stable amplification can be performed.

In this embodiment, a case was described in which the phase sensitive amplifier based on the degenerate parametric amplification using signal light with a single wavelength of 1.54 μm was used as input signal light. However, the configuration of the phase sensitive amplifier according to this embodiment also can be applied to a case where the phase sensitive amplifier based on the non-degenerate parametric amplification using carrier waves with multiple wavelengths as an input signal. In this embodiment, as periodically-poled second-order nonlinear optical material, Zn-doped lithium niobate ($LiNbO_3$) was used. However, the invention is not limited to lithium niobate. Thus, the same effect also can be obtained by typical second-order nonlinear optical materials can also be used including, for example, mixed crystal of lithium niobate and lithium tantalate ($LiNb_xTa_{1-x}O_3$ (0≤x≤1), potassium niobate ($KNbO_3$), potassium titanyl phosphate ($KTiOPO_4$). A dopant to the second-order nonlinear optical material is not limited to Zn and Mg, Zn, Sc, In, or Fe also may be used instead of Zn or no dopant may be added.

Second Embodiment

Figure 9:
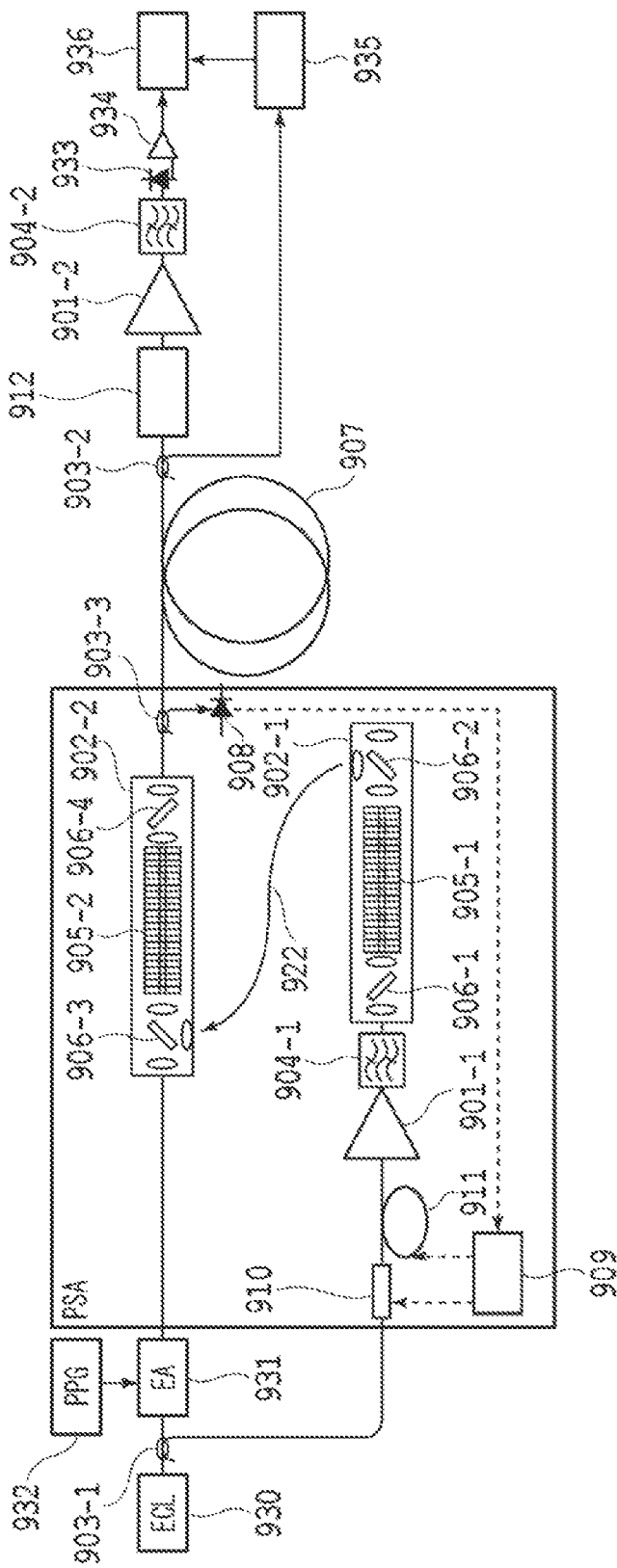
FIG. 9 illustrates the configuration of an optical transceiver including a phase sensitive amplifier according to the second embodiment of the present invention.

FIG. 9 shows the configuration of this embodiment. By using the waveform shaping effect of the phase sensitive amplifier according to the present invention, even when a modulator which causes chirping to a signal is used, a signal can be sent with being removed the chirping of the signal. The output from an external cavity semiconductor LD (ECL) 930 is intensity-modulated with an electro-absorption (EA) modulator for generating a NRZ signal at a data rate of 40-Gbit/s. Thereafter, a phase sensitive amplifier similar to the phase sensitive amplifier according to the first embodiment is used to amplify the modulation signal to thereby constitute a transceiver.

Electro-absorption (EA) modulators can be manufactured in a large amount because these modulators made of semiconductor. However, since these modulators use the electric field absorption, a frequency chirp component is superposed on a modulated signal, thus resulting in degraded signal quality. Specifically, the transition between ON and OFF causes the fluctuation of the output phase of the modulator. When the ON status is used as a reference, an orthogonal phase component is undesirably generated. It is known that, when such a signal is used for optical fiber transmission, a long-distance transmission is difficult because the waveform of a transmitted signal is degraded by the fiber dispersion.

Figure 10:
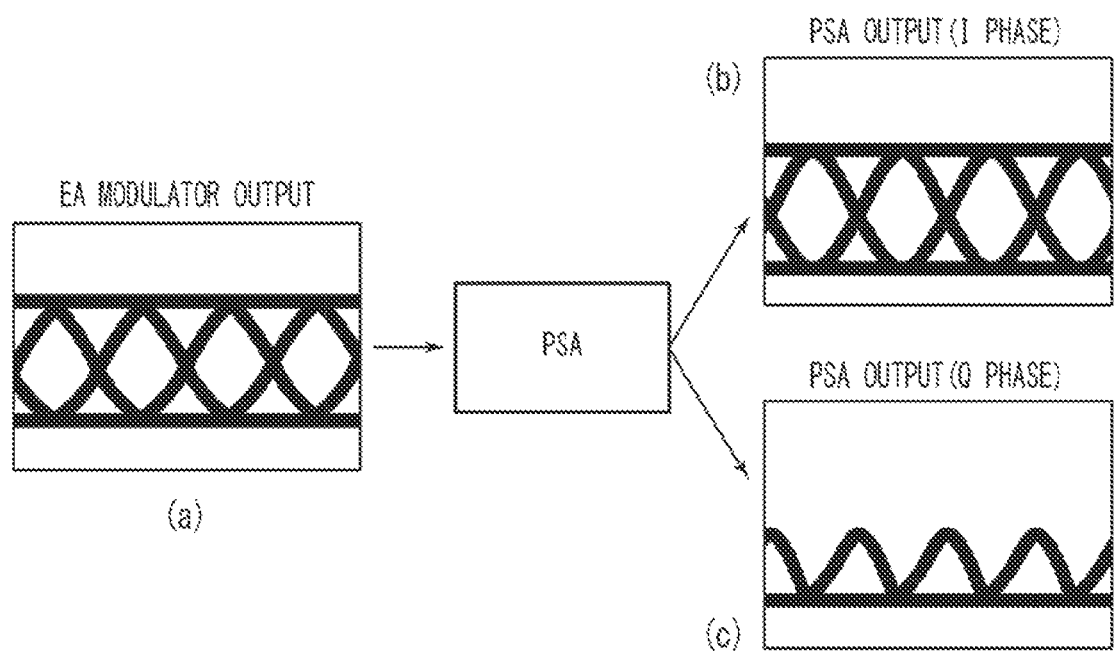
FIG. 10 is a diagram for explaining the temporal waveform of a signal amplified with the phase sensitive amplifier according to the second embodiment of the present invention.

FIG. 10 is a diagram illustrating the temporal waveform of the signal amplified by the phase sensitive amplifier according to this embodiment. FIG. 10(a) shows the modulation signal prior to the amplification. FIG. 10(b) shows the output waveform when the phase-locked loop circuit (PLL) is used to set the pump light phase and the signal light phase so as to satisfy the relation of (formula 1). FIG. 10 (c) shows the output waveform when the PLL is used to set the pump light phase and the signal light phase to be satisfied the relation deviated to 90 degrees from that of (formula 1).

When the pump light phase and the signal light phase are set to be satisfied the relation deviated to 90 degrees from that of (formula 1), as shown in FIG. 10(c), only the transient part between the ON level and the OFF level of the NRZ signal was observed in the amplified waveform. This shows that the use of the EA modulator for generating an NRZ signal cause the chirping to the signal. Specifically, the transition between ON and OFF causes the output phase of the modulator to fluctuate. When the ON status is used as a reference, an orthogonal phase component is generated. Thus, when the signal light phase and the pump light phase are set to be satisfied the relation deviated to 90 degrees from that of (formula 1), only a chirping component is amplified by a phase sensitive amplifier.

In other words, when the phase is matched to the ON status of the signal light, even when the input signal includes a phase chirping, the chirp component can be removed and a chirpless signal can be reshaped and amplified. In order to confirm this effect, a signal before amplifying with a phase sensitive amplifier and a signal after amplifying with the phase sensitive amplifier were transmitted through a single mode fiber (SMF) and the dispersion tolerances were compared.

Figure 11A:
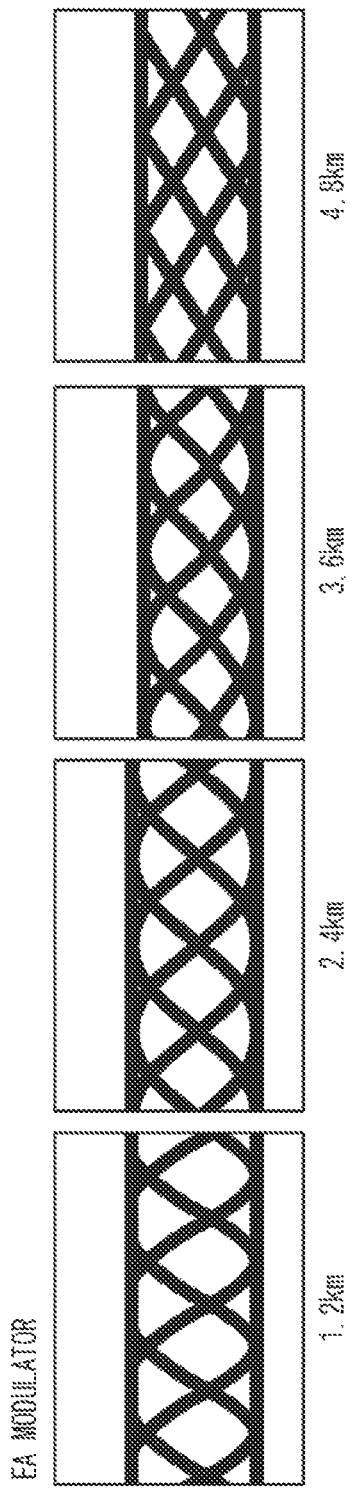
FIG. 11A is a diagram for explaining the temporal waveform of a signal after passing through conventional single mode fibers (SMF) for a predetermined distance.
Figure 11B:
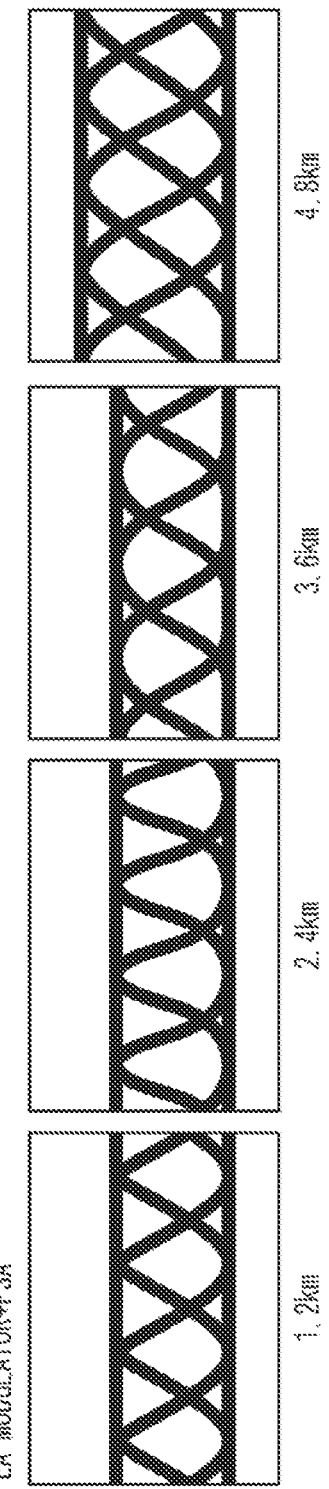
FIG. 11B is a diagram for explaining the temporal waveform of a signal after passing through single mode fibers (SMF) for a predetermined distance, the signal is amplified by the phase sensitive amplifier of the present invention.

FIG. 11A and FIG. 11B illustrate the temporal waveform of the signal transmitted through the single mode fiber (SMF). FIG. 11A shows the output waveforms when a modulation signal before amplification is transmitted through the single mode fibers (SMF) with lengths of 1.2 km, 2.4 km, 3.6 km, and 4.8 km, respectively. FIG. 11B shows the output waveforms when a signal after passing through the phase sensitive amplifier according to the present invention and is subsequently transmitted through the single mode fibers (SMF) with lengths of 1.2 km, 2.4 km, 3.6 km, and 4.8 km, respectively.

In order to quantitatively compare the dispersion tolerances, the bit error rates were measured under the each condition shown in FIG. 11A and FIG. 11B. When a signal before amplifying with the phase sensitive amplifier is transmitted through the single mode fiber (SMF) with a length longer than 2.4 km, the bit error rate was increased extremely. On the other hand, the signal after passing through the phase sensitive amplifier according to the present invention showed, even after the transmission of the signal through the single mode fiber (SMF) of 4.8 km, a bit error rate similar to that of a signal before amplifying with the phase sensitive amplifier and being transmitted through the single mode fiber (SMF) of 2.4 km. Specifically, by using the transceiver configuration according to this embodiment, the dispersion tolerance to the transmission could be doubled.

By combining the use of the waveform shaping effect of the phase sensitive amplifier according to this embodiment with the use of a low-cost semiconductor EA modulator, even when an input signal includes a phase chirp, the amplifier can remove the chirp component of the signal. In this embodiment, an electro-absorption (EA) modulator was used as a modulator. However, modulators other than the electro-absorption (EA) modulator can also be used.

Third Embodiment

Figure 12:
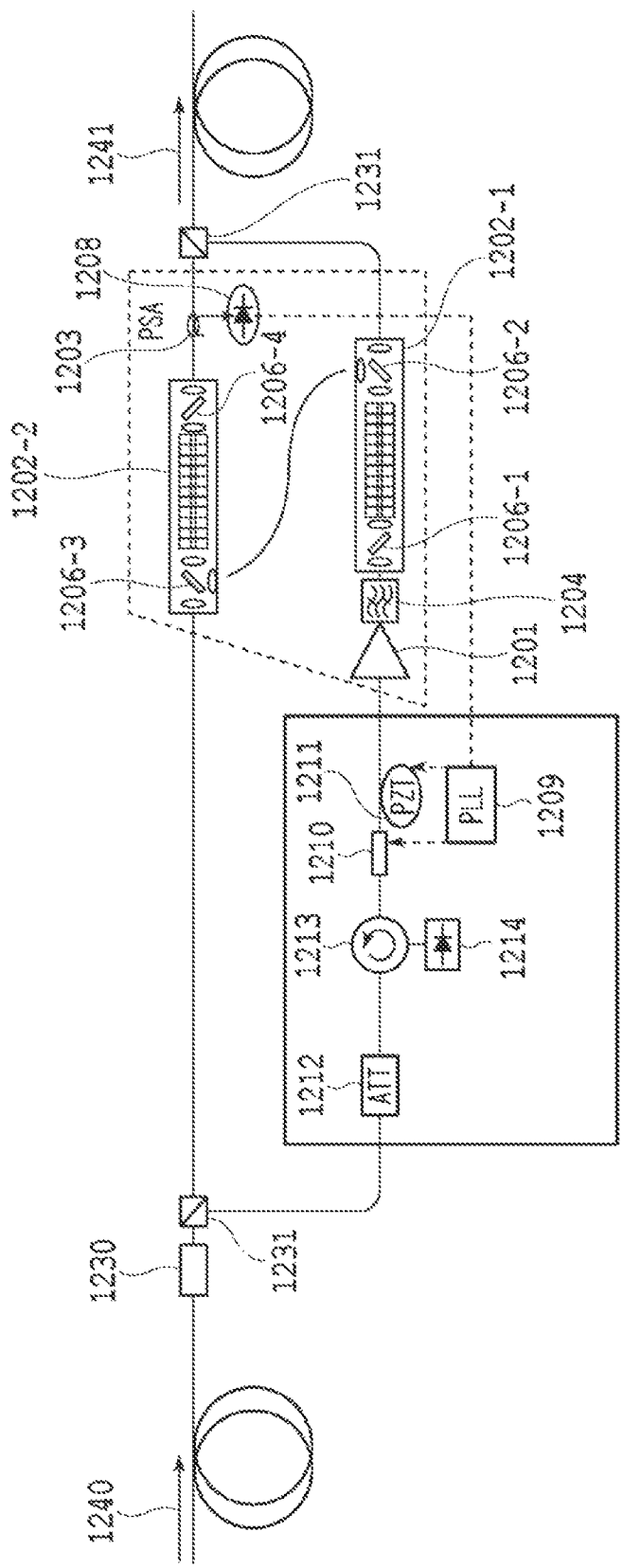
FIG. 12 is a diagram for explaining the configuration of a phase sensitive amplifier according to the third embodiment of the present invention.

FIG. 12 shows the configuration of this embodiment. The signal light 1240 with data modulation propagates through a transmission medium such as optical fibers. FIG. 12 shows a configuration example to apply this phase sensitive amplifier as a repeater amplifier to compensate for the loss of the light intensity in the transmission medium.

When a phase sensitive amplifier is located closer with a light source for a signal light, the light source can be used as a fundamental wave light by dividing the light from the light source. However, when the phase sensitive amplifier is used as a repeater optical amplifier for an optical transmission, a phase synchronization system, which described below for an example, must be used to synchronize the phase of fundamental wave light and phase of the signal light in the phase sensitive amplifier.

In this embodiment, a light which is generated by combining two polarization components is used as an input signal light. One polarization component of the signal light is a light with data modulation. The other polarized component is a CW light without data modulation.

Figure 13:
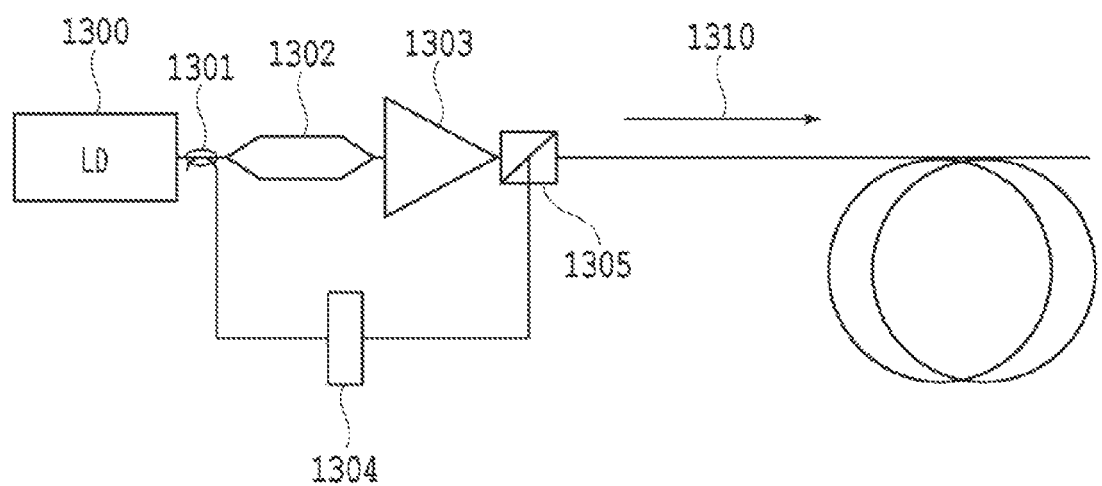
FIG. 13 is a diagram for explaining one example of a transceiver configuration for generating a transmission signal according to the third embodiment of the present invention.

FIG. 13 shows the configuration to generate the input signal light in this embodiment. An external cavity semiconductor laser diode 1300 is used to generate CW light and a light splitting device 1301 is used to split the light to two optical paths. For one splitted path, a LN Mach-Zehnder modulator 1302 is used as an intensity modulator to superpose a 10-Gbit/s NRZ signal. For the other splitted path, a polarizer 1304 is inserted and a polarization component is rotated at 90°, then the polarization component is adjusted to be an orthogonal polarization component of the signal light with intensity modulation. Two signals are multiplexed by a polarization beam splitter (PBS) 1305, thus a modulated signal light 1310 with a pilot tone which is the CW light in orthogonal polarization component is generated.

In order to obtain a phase synchronization system, the phase sensitive amplifier was configured as shown in FIG. 12. However, this configuration of the phase sensitive amplifier is the same as in the second embodiment and thus will not be described further (see FIG. 9). A modulated signal light 1240 with a pilot tone of the CW light in the orthogonal polarization component is sent through the transmission medium. Optical fibers are used for the transmission medium. The rotation of the polarization in the optical fibers was corrected by a polarization controller 1230. Then, the polarization beam splitter (PBS) 1231 was used to separate only the pilot tone of the CW light. Light intensity of the signal is very small because of the loss of the transmission optical fibers, thus S/N ratio of the signal light is degraded. Optical intensity of the splitted CW pilot tone was adjusted by an attenuator (ATT) 1212. Then, the CW pilot tone is injected into the CW light source 1214 in the phase sensitive amplifier through the circulator 1213 for an optical injection locking. The CW light source was DFB type semiconductor laser. The oscillating wavelength of the DFB laser was dislocated from the wavelength of the pilot tone of the CW light by 0.04 nm. An attenuator (ATT) 1212 is used to change the light intensity of the inputted pilot tone to the CW light source. Then, the performance was observation by an optical spectrum analyzer was performed.

Figure 14:
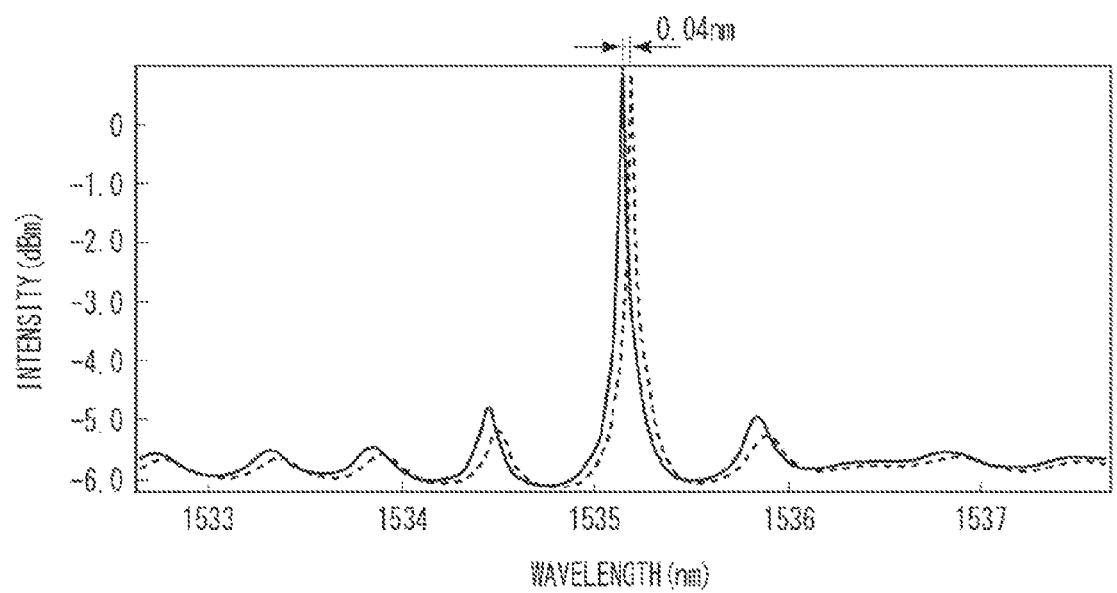
FIG. 14 is a spectrum diagram for explaining the operation of the injection locking according to the third embodiment of the present invention.

FIG. 14 shows the measured optical spectrum diagram when the inputted light intensity was a few hundreds of In FIG. 14, the solid line shows the optical spectrum before the injection of the CW pilot tone, and the broken line shows the optical spectrum after the injection of the CW pilot tone. As can be seen in FIG. 14, the wavelength of the semiconductor laser is moved closer to the wavelength of the pilot tone. As a result, the phase of the CW light source in the phase sensitive amplifier is synchronized with phase of the pilot tone. Thus, a fundamental wave light with a superior S/N ratio can be generated even if S/N ratio of the pilot tone is degraded.

The fundamental wave light which is phase-synchronized with the pilot tone of the signal light was applied to the phase sensitive amplifier, configuration of which is described in the first embodiment for optical amplification. The result showed that the same characteristics were obtained as in the first embodiment.

By using the configuration according to this embodiment, even for repeater amplification, which means that a phase sensitive amplifier is not located closer to a light source for a signal light, the phase sensitive amplification could be performed by the above-described phase synchronization system.

Fourth Embodiment

In the third embodiment, the configuration of phase sensitive amplification for a signal light modulated in advance was shown to achieve a repeater device for an optical communication. However, in the case of the configuration of the third embodiment, a pilot tone for phase synchronization has an orthogonal polarization component to a modulated signal light. Thus, a disadvantage is caused in that another optical signal cannot be superposed in the pilot tone-side polarization direction. In this embodiment, a configuration for solving this disadvantage will be described.

Figure 15:
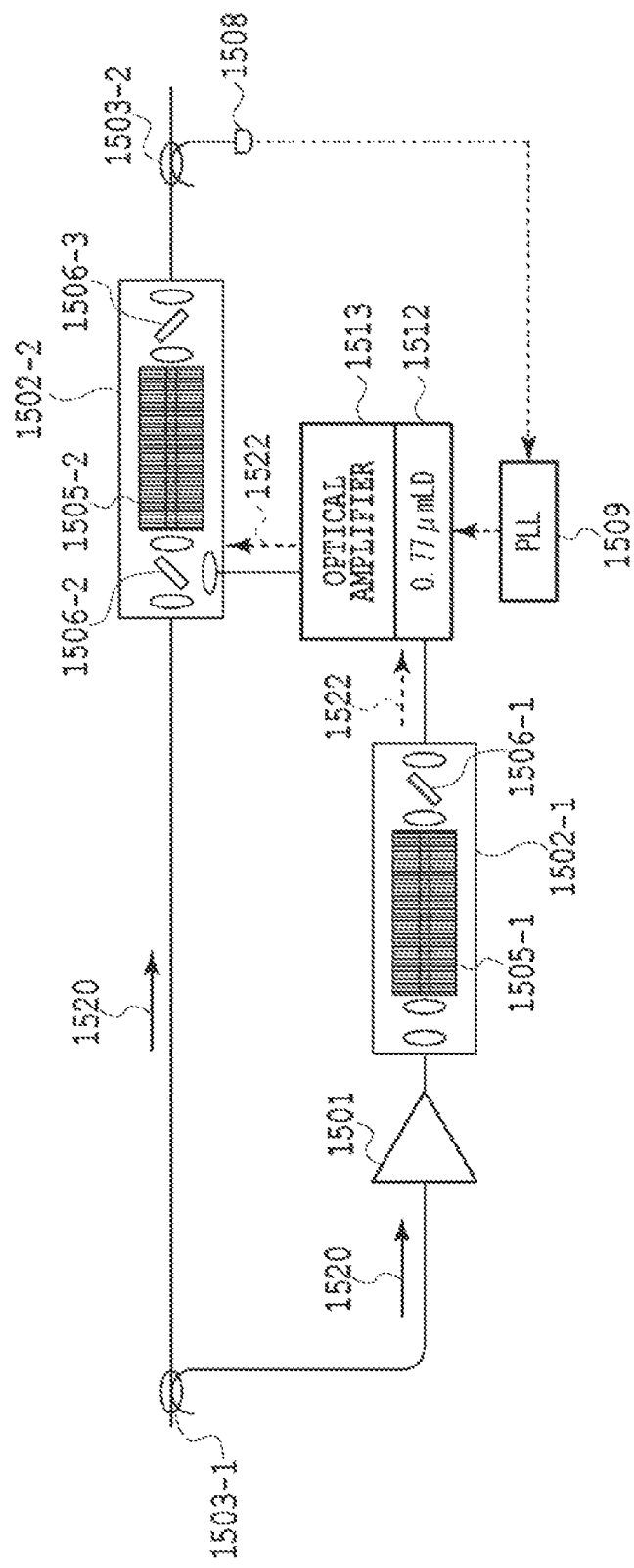
FIG. 15 is a diagram for explaining the configuration of the phase sensitive amplifier according to the fourth embodiment of the present invention.

FIG. 15 shows the configuration according to this embodiment. The device according to this embodiment can amplify a binary phase-shift keying (BPSK) or a binary differential phase-shift keying (DPSK) signal or a general intensity-modulated signal without excess noise.

In this embodiment, in order to obtain fundamental wave light, signal light is tapped by a light splitting section 1503-1 and the tapped signal light is amplified by an EDFA 1501. The amplified signal light is launched into the first PPLN waveguide 1505-1 in the first second-order nonlinear optical element 1502-1, thereby generating a second harmonic wave of the signal light. A dichroic mirror 1506-1 is used to separate only the second harmonic wave 1522 from the light emitted from the first PPLN waveguide 1505-1. Optical injection locking was achieved by injecting the separated second harmonic wave 1522 into the semiconductor laser 1512 oscillating at a wavelength of 0.77 µm. The output of the semiconductor laser 1512 is amplified by the semiconductor optical amplifier 1513 with a gain in the same wavelength band as that of the semiconductor laser 1512. Then, the amplified output is multiplexed by the dichroic mirror 1506-2 with the signal light 1520 at a wavelength of 1.54 µm. The signal light 1520 and the second harmonic wave 1522 as a pump light at the wavelength of 0.77 µm are multiplexed and subsequently launched into the second PPLN waveguide 1505-2. Then, phase sensitive amplification of the signal light can be achieved by the degenerated parametric amplification.

In order to achieve the phase sensitive amplification, generation of the pump light which synchronized with the average phase of the signal light is required. In this embodiment, even when a signal is added to binary phase modulation, pump light which synchronized with the average phase of the signal can be generated.

The following section will briefly describe the operation principle. Binary phase modulation is carried out by modulating a signal phase to two values of 0 or $\pi$ radian to transmit the signal. The signal with modulation as described above is amplified by the EDFA 1501 and the signal is launched into the first PPLN waveguide 1505-1 to generate a second harmonic wave. In this case, the phase of the second harmonic wave $\phi_{2\omega}$ is represented by the following (formula 6).

$$\phi_{2\omega}=2\phi_{\omega s} \quad \text{(formula 6)}$$

In the formula 6, $\phi_{\omega s}$ represents the phase of the signal light. Thus, with regard to the modulated signal to have the phases of the two values of 0 and $\pi$, the second harmonic wave has phases of two values of 0 and $2\pi$. Thus, the resultant light is outputted from which the phase fluctuation due to the phase modulation is cancelled. In an actual phase modulation signal, it is difficult to modulate only the phase in an ideal manner, thus the phase modulated signal is accompanied with intensity modulation. To obtain pump light without intensity-modulated component, the method which described in this embodiment is very important. That is, above mentioned cancellation of the phase modulation using the second harmonic generation, and phase synchronization of the pump light, which has a half wavelength as that of the signal light, with the average phase of the signal light using optical injection of the second harmonic wave.

In this embodiment, pump light that is synchronized with the average phase and that has no intensity modulation can be generated from signal light with phase modulation by using injection locking. Thus, even when the signal light is accompanied with phase noise, the noise of the signal phase and the quadrature phase will be removed and signal will be regenerated because phase sensitive amplification attenuates quadrature phase components to the original signal phase.

In this illustrative embodiment, a part of the outputted amplified signal light is tapped by the light splitting section 1503-2 and is received by the photodetector 1508. To achieve stable phase sensitive amplification, phase drifts due to vibration of the optical component and a temperature fluctuation are corrected by a feedback from the phase-locked loop circuit (PLL) 1509 to the driving current of the semiconductor laser oscillating at 0.77 μm. In addition, addition of weak phase modulation on the output of the semiconductor laser to detect a phase mismatch is useful for the phase synchronization.

In this embodiment, the EDFA 1501 is used to obtain power to achieve the generation of a second harmonic wave in the first PPLN 1505-1. However, the ASE light generated from the EDFA 1501 does not enter the second PPLN waveguide 1505-2 for performing phase sensitive amplification. This can consequently prevent a degradation of S/N ratio of the signal light due to the ASE light of the optical amplifier.

The ASE light is also generated from the semiconductor optical amplifier 1513 operating at the wavelength of 0.77 μm. However, since this light has a wavelength completely different from that of signal light, this light can be substantially completely removed by the dichroic mirrors (1506-2 and 1506-3). Thus, in the repeater device for optical communication, the phase sensitive amplification can be achieved in a single polarized wave without degradation of the S/N ratio of the signal light and without using an orthogonal polarization component.

Fifth Embodiment (1) First Configuration

In the case where a light source generating signal light is located closer with the phase sensitive amplification section (e.g., in the case where the phase sensitive amplifier is placed immediately after the optical signal transmitter), the light from the signal light source can be splitted and the splitted light can be used as fundamental wave light. However, when a phase sensitive amplifier is used as a repeater amplifier in the optical transmission, an average phase must be extracted from signal light with modulation to generate fundamental wave light synchronized with the carrier wave phase of the signal. Thus, when an amplifier is used as a repeater amplifier in actual optical transmission, it is important to configure a phase sensitive amplifier including a carrier wave phase recovery system.

When second harmonic light from a second-order optical nonlinear medium is used, a wavelength of second harmonic light, which is used as pump light, is a half that of signal light. Thus, the usage of optical components which operate with a wavelength different from that of a communication wavelength band is required in configuration for a carrier wave phase recovery and so on. For example, at the configuration shown in the fourth embodiment, usage of a 780 nm-band laser and optical amplifier is necessary.

However, the use of components which operate a different wavelength from a communication wavelength band causes various disorders. Since degree of maturity of a device depends on operating wavelength, several disadvantages are caused. The characteristics of these devices cannot be satisfied the necessary specifications to construct the phase sensitive amplifier. Alternatively, an extremely high-cost component must be used to satisfy the specifications. More specifically, it is difficult to obtain a high-quality semiconductor laser, for example. Thus the light intensity, the line width of light, and an available wavelength will be limited, for example.

There is another disadvantage in terms of the optical amplifier. In a shorter wavelength region (like a second harmonic wave for example) than the communication wavelength, an optical fiber laser amplifier for example cannot be used. Although some amplifiers based on semiconductor in some wavelength region have been used in a practical application, sometimes disadvantages have been caused for phase sensitive amplification. For example, a sufficient light intensity for the pump light used for phase sensitive amplification cannot be obtained because of the insufficient an amplification gain or a saturation intensity of the semiconductor based optical amplifiers. Another example is that, a degradation of S/N ratio of the pump light used for the phase sensitive amplifier will be caused because of the insufficient noise figure (NF) of the semiconductor based optical amplifiers.

Furthermore, depending on a component, some optical devices which have a shorter operating wavelength (e.g., second harmonic wave) than the communication wavelength may have a problem in terms of reliability. Thus, it is difficult to apply a phase sensitive amplifier using such components to an actual optical communication system.

In view of these disadvantages as described above, in this embodiment, the phase sensitive amplifier including the carrier wave phase recovery system is configured only by using optical components which operate communication wavelength band.

As shown in Non-patent Literature 3, the recovery method of the carrier wave phase using the four-wave mixing in optical fibers having a third-order nonlinear effect has been shown. However, as described above, the conventional method was disadvantageous due to the four-wave mixing. For the configuration to use the four-wave mixing, a wavelength of the pump light must be located closer to a wavelength of the signal light. The optical amplification by EDFA causes undesirable amplified spontaneous emission light (ASE light) to be superposed as noise on the pump light, for example. Since the wavelength of the pump light is close to the wavelength of the signal light, the removal of the ASE light is difficult. Thus, the ASE light generated from the EDFA is also undesirably superposed on the signal light. Consequently, degradation of the S/N ratio of the signal light will be caused, thus the low noise optical amplification cannot be performed.

In this embodiment, in view of the disadvantage of the conventional technique as described above, a phase sensitive amplifier that can be applied for optical communication system and can achieve low noise amplification is provided. Specifically, such a phase sensitive amplifier that includes the signal carrier wave phase recovery system and that can be used as a repeater amplifier in optical transmission is provided only by using optical components which operate a communication wavelength band.

Figure 16:
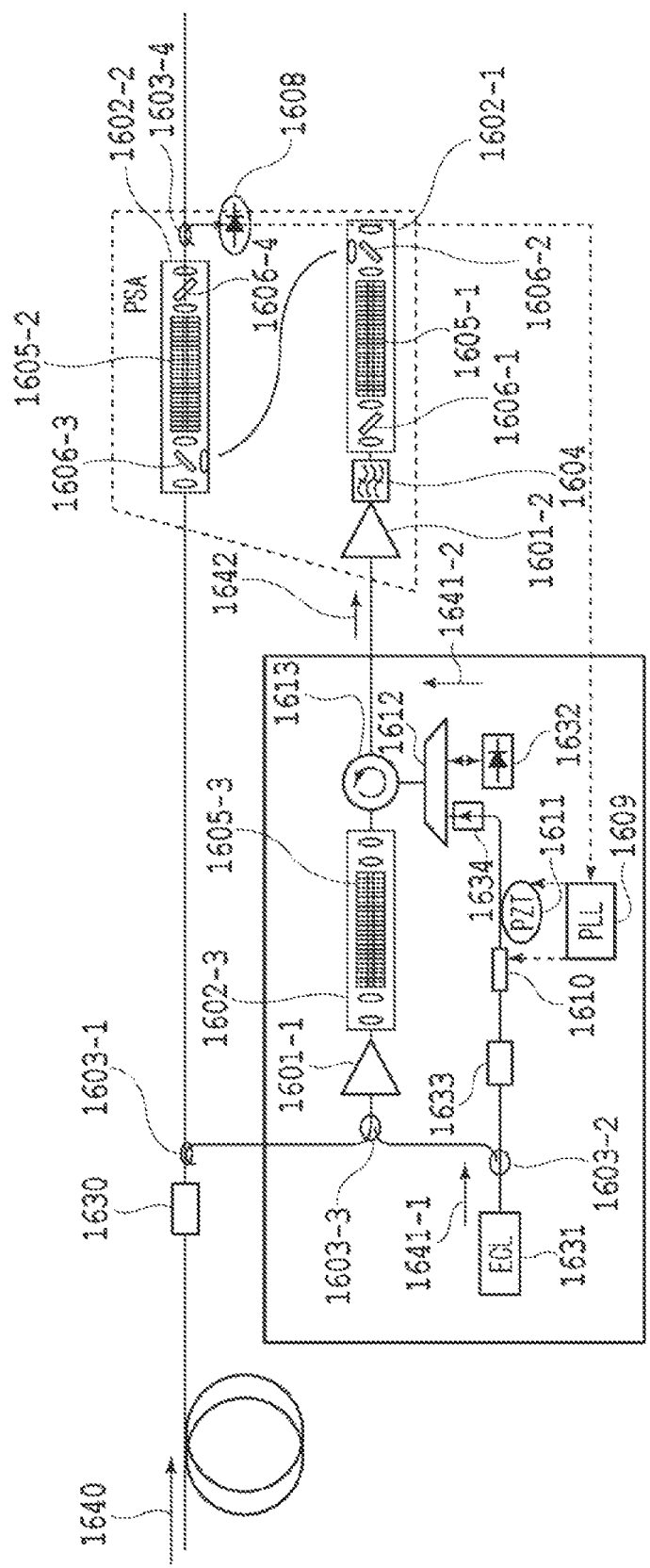
FIG. 16 is a diagram for explaining the configuration of a phase sensitive amplifier according to the fifth embodiment of the present invention.

FIG. 16 shows the configuration of this embodiment. In this embodiment, a part of the signal light 1640 from weak laser light used for optical communication is amplified using the fiber laser amplifier (EDFA) 1601-1 to obtain sufficient power of the light for a nonlinear optical effect. The amplified signal light is multiplexed with a first fundamental wave light 1641-1 generated by the external cavity laser 1631 with an oscillating wavelength of 1534 nm. Then, the multiplexed lights are amplified and launched into the third second-order nonlinear optical element 1602-3.

A second harmonic wave of the signal light is generated in the third second-order nonlinear optical element 1602-3. At the same time, a carrier wave phase is recovered by generating a difference frequency between the generated second harmonic wave and the first fundamental wave light 1641-1. The difference frequency light is injection-locked with a second fundamental wave light 1641-2 oscillating at the same wavelength. Then, the injection-locked second fundamental wave light is multiplexed with the first fundamental wave light 1641-1.

After the multiplexing, the fiber laser amplifier (EDFA) 1601-2 is used to amplify the fundamental wave light 1642 composed of the fundamental wave light 1641-1 and the fundamental wave light 1641-2. The amplified fundamental wave light is launched into the first second-order nonlinear optical element 1602-1 to generate the sum frequency light that is used for a pump light. The signal light 1640 and the sum frequency light are launched into the second second-order nonlinear optical element 1602-2 to perform degenerate parametric amplification. Then, phase sensitive amplification is achieved. The details of the configuration shown in FIG. 16 will be described later. The configuration as described above can provide an effect which is difficult to achieve by conventional technique. The effect is described below.

FIG. 17A and FIG. 17B are schematic views illustrating the spectra of the signal light, pump light, and fundamental wave light for the phase sensitive amplification. FIG. 17A shows a conventional configuration shown in FIG. 4. In this configuration, optical fibers are used as nonlinear medium and the conventional fiber laser amplifier is also used. FIG. 17B shows a case where the configuration according to this embodiment shown in FIG. 16 is used.

A conventional optical fiber based phase sensitive amplifier uses four-wave mixing. Thus, wavelength of the pump light and the signal light for parametric optical amplification must be close to each other to satisfy the phase matching conditions. As illustrated in FIG. 17A (a-1), when the signal light 1701 and the pump light 1702 have the same wavelength band of a 1.55-μm band and two pump lights 1702-1 and 1702-2 are used. In this case, amplification of the two pump lights by using one optical fiber amplifier is desirably to simplify the entire configuration.

However, ASE light 1703 will be caused by the optical fiber amplifier near the wavelength of the pump light. A configuration, like that the signal light is not passing through the optical fiber amplifier, is possible to prevent the ASE light generation in the signal wavelength band. However, when the pump light is multiplexed with the signal light, it is difficult to achieve the complete cut off of the ASE light from the pump light because the pump light have a wavelength close to that of the signal light, then it makes difficult to realize a high wavelength-selective optical filter. As a result, the ASE light in which has the same wavelength as that for the signal light, will be superposed on the signal light. Thus, the mixed ASE light causes a degradation of S/N ratio of the signal light (FIG. 17A (a-3)).

On the other hand, in the case of the configuration according to this embodiment, the signal light 1701 has a wavelength close to that of the fundamental wave light (1702-1 and 1702-2) (see FIG. 17B(b-1)).

The fundamental wave lights (1702-1 and 1702-2) from the weak optical power used for optical communication are amplified by the optical fiber amplifier to obtain sufficient power for optical parametric amplification. During this, the ASE light 1703, which is near wavelength of the fundamental lights, is superposed in the fundamental wave lights (see FIG. 17B(b-2)).

In the configuration according to this embodiment, after the amplification of the fundamental wave lights, the sum frequency light 1704, that is for the pump light, is generated from the fundamental wave lights 1702-1 and 1702-2 on which the ASE light 1703 is superposed. The sum frequency light 1704 is used as pump light in the degenerate parametric amplification. At a wavelength of the sum frequency light 1704, there is no wideband ASE light, which cause the noise, except for slight sum frequency light of ASE light (see FIG. 17B (b-3)).

The wavelength of the sum frequency light 1704 is about half of the wavelengths of the fundamental wave lights 1702-1 and 1702-2. Thus, the wavelength of the sum frequency light is sufficiently separated from the wavelengths of the fundamental wave lights. Therefore, it is relatively easy to realize a filter with a high extinction ratio, for example by using a dichroic mirror, to separate only the sum frequency light (1704) from the fundamental wave lights (1702-1 and 1702-2) and the sum frequency light (1704). By connecting such a filter to the output of the first second-order nonlinear optical element, it is possible to completely remove the fundamental wave lights (1702-1 and 1702-2) and the ASE light (1703) from the wavelength band of the sum frequency light (1704), which is used as pump light in the degenerate parametric amplification (see FIG. 17B (b-3)).

Next, only the signal light and the sum frequency light are multiplexed, and the multiplexed lights are launched into the second second-order nonlinear optical element. Then, the phase sensitive amplification by the degenerate parametric amplification can be realized (see FIG. 17B (b-4)).

With reference to FIG. 16 again, the configuration of this embodiment will be described in detail. In this embodiment, a configuration of the phase sensitive amplifier including a carrier wave phase recovery system to amplify the 1.54 μm signal light with the binary phase-shift keying (BPSK) or binary differential phase-shift keying (DPSK) will be described.

A polarization component of the signal light 1640 is adjusted via the polarization controller 1630. Then, the signal light is tapped by the light splitting section 1603-1. And the tapped signal light is multiplexed with the first fundamental wave light 1641-1. Then, the multiplexed lights are amplified by the erbium-doped fiber laser amplifier (EDFA) 1601-1.

The amplified signal light and the first fundamental wave light are inputted to the third second-order nonlinear optical element 1602-3. The second-order nonlinear optical element 1602-3 in this embodiment includes an optical waveguide 1605-3 consisting of the periodically poled lithium niobate (PPLN). The periodically poled structure of the PPLN waveguide 1605-3 satisfies the phase matching conditions for providing the generation of a second harmonic wave of the signal light and the generation of a difference frequency between the generated second harmonic wave and the first fundamental wave light 1641-1.

Figure 18A:
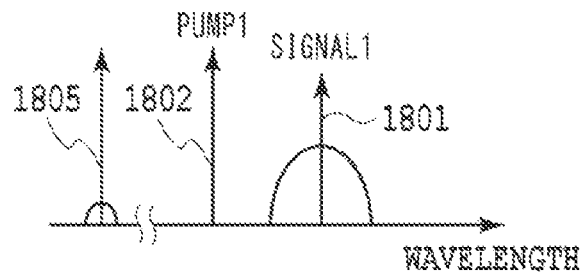
FIG. 18A is a diagram for explaining the concept of a phase sensitive amplifier according to the fifth embodiment of the present invention including a method for recovering the carrier wave of signal light.
Figure 18B:
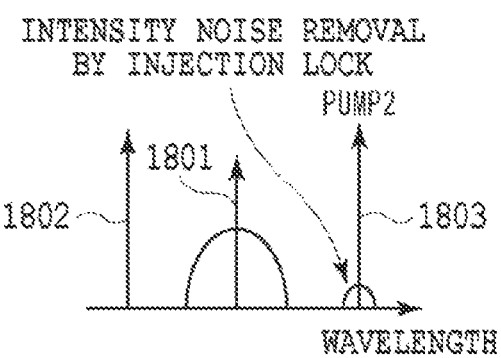
FIG. 18B is a diagram for explaining the concept of a phase sensitive amplifier according to the fifth embodiment of the present invention including the method for recovering the carrier wave of signal light.

The second harmonic wave 1805, which has a half wavelength a of the signal light, is generated by launching the signal light and the first fundamental wave light into the third second-order nonlinear optical element 1602-3, as shown in FIG. 18A, Furthermore, the difference frequency light between the internally-generated second harmonic wave and the first fundamental wave light is generated as shown in FIG. 18B. The following relation, as shown the following (formula 7), among the phase $\phi_s$ of the signal light, the phase $\phi_{p\,1}$ of the first fundamental wave light, and the phase $\phi_{p\,2}$ of the difference frequency light is satisfied.

$$2\phi_s - \phi_{p1} - \phi_{p2} = 0 \quad \text{(formula 7)}$$

Thus, the phase $\phi_{p\,2}$ of the difference frequency light is represented, as shown by the following (formula 8), by the phase $\phi_s$ of the signal light and the phase $\phi_{p\,1}$ of the first fundamental wave light.

$$\phi_{p2} = 2\phi_s - \phi_{p1} \quad \text{(formula 8)}$$

By the use of the generation of the second harmonic wave, the phase $\phi_s$ of the signal light can be doubled. Usually, it is difficult to recover a carrier wave phase because a data signal is generally modulated. However, it is possible to achieve an elimination of the binary phase modulation by doubling the phase $\phi_s$ of the signal light. Furthermore, the difference frequency light including the phase information of the carrier wave can be obtained in the 1.55-μm band, which is the same wavelength band as that of the signal light, by the difference frequency generation. Only desired light is obtained without additional converted light because the phase matching condition is uniquely determined for the PPLN waveguide functioning as a second-order nonlinear optical element differently from the four multiplexing mixing of fiber.

If the transmitted signal light is in a completely-binary phase modulation status, no influence by the modulation appears in the difference frequency light. However, an optical signal, which is propagated through a transmission path such as fibers, is different from ideally-binary phase modulated state because the transmitted signal is superposed on phase noises. Thus, influence due to the ununiform modulation is remained in actually-obtained difference frequency light. Furthermore, the optical intensity of the actually-obtained difference frequency light is very small because the intensity of the signal light itself is small and further is splitted which means that the intensity of the inputted signal light into the third second-order nonlinear is small. In order to solve these disadvantages, the optical injection locking is utilized by using the difference frequency light.

As shown in FIG. 16, the signal light, the first fundamental wave light, and the difference frequency light outputted from the third second-order nonlinear optical element 1602-3 are subsequently divided to the respective lights after pass through the light circulator 1613. The demultiplexing is carried out using a wavelength multiplexing/demultiplexing filter 1612 based on an arrayed waveguide grating (AWG).

The signal light outputted from the demultiplexing filter 1612 is outputted to a free space. The first fundamental wave light outputted from the demultiplexing filter 1612 is extinguished by an isolator 1634. A semiconductor laser 1632 oscillating at substantially the same wavelength as that of the difference frequency light is connected at the output port of the demultiplexing filter 1612 having the same wavelength as that of the difference frequency light. The difference frequency light, which is adjusted to have a light intensity from 10 μW to 100 μW, is injected to the semiconductor laser 1632. Then, an optical injection locking is achieved. The optical injection locking can provide the second fundamental wave light 1641-2 having the same phase as that of the difference frequency light.

The second fundamental wave light 1641-2 has the same phase as that of the difference frequency optical phase $\phi_{p\,2}$. Since the light intensity is determined by the output from the semiconductor laser, the second fundamental wave light of over 10 mW can be obtained by using the weak difference frequency light of about a few dozens of μW.

Furthermore, the influence by the ununiform modulation of the signal light, which is superposed on the difference frequency light, is also mitigated. The first fundamental wave light is launched into the multiplexing side of the AWG multiplexing/demultiplexing filter 1612. The first fundamental wave light is multiplexed with the second fundamental wave light. Then, the multiplexed lights are extracted by the circulator 1613.

As described above, in this embodiment, the first fundamental wave light and the second fundamental wave light, which are obtained by using the nonlinear element and the optical injection locking to recover a signal light carrying-phase, are used as fundamental wave light.

The fundamental wave light is amplified by the erbium-doped fiber laser amplifier (EDFA) 1601-2. The amplified fundamental wave light is inputted to the first second-order nonlinear optical element 1602-1. In this embodiment, a bandpass filter 1604 is inserted between the EDFA 1601-1 and the first second-order nonlinear optical element 1602-1 to cut unnecessary ASE light. This configuration prevents wavelength conversion of the wideband ASE light generated from the EDFA 1601-2 by the first second-order nonlinear optical element 1602-1.

The second-order nonlinear optical elements 1602-1 and 1602-2 have optical waveguides 1605-1 and 1605-2 consisting of periodically poled lithium niobate (PPLN). The PPLN waveguide can use the highest nonlinear optical constant d33 of lithium niobate by the quasi-phase matching. And the structure of optical waveguide provides a high optical power density. Thus, high wavelength conversion efficiency can be achieved by using the structure as shown in the figure. When high intensity light is launched into the PPLN waveguide, a shift of the phase-matching wavelength may be cased due to an optical damage by the photorefractive effect. To prevent such disadvantage, direct bonded waveguides as shown in Non-patent Literature 4 are used in this embodiment.

In this embodiment, the fluctuation of the phase-matching wavelength is suppressed by using the direct bonded waveguide. Zn-doped lithium niobate having a superior optical damage resistance is used as a core for the direct bonded waveguide. Furthermore, high wavelength conversion efficiency is realized by reducing the core diameter to about 4 µm by the dry etching processing.

The sum frequency light and the fundamental wave light outputted from the first PPLN waveguide 1605-1 are separated by the dichroic mirror 1606-2. The sum frequency light at the wavelength of 0.77 µm reflected by the dichroic mirror 1606-2. And the sum frequency light is guided to the second second-order nonlinear optical element 1602-2 via the polarization maintaining optical fibers having a single mode propagation characteristic at the wavelength of 0.77 µm. In this time, the fundamental wave light and ASE light at a wavelength of about 1.54 µm are also launched into the polarization maintaining optical fibers when the fundamental wave light and ASE light dose not completely removed by the dichroic mirror 1606-2. However, confinement of the light at a wavelength of 1.54 µm is much weak because the fiber is a single mode at 0.77 µm. Thus, these unnecessary lights consisting the fundamental wave light and ASE light can be attenuated effectively after propagation in the fiber at a length of about 1 m.

The sum frequency light guided through the polarization maintaining optical fibers is multiplexed by the dichroic mirror 1606-3 with the signal light 1640 at a wavelength of 1.54 µm. The dichroic mirror 1606-3 reflects only the sum frequency light. Thus, such remaining components composed of the fundamental wave light and the ASE light at a wavelength of about 1.54 µm can be effectively removed that are emitted from the first PPLN waveguide 1605-1 through the dichroic mirror 1606-2 and the polarization maintaining optical fibers.

The signal light and the sum frequency light are multiplexed and are launched into the second PPLN waveguide 1605-2. The second PPLN waveguide 1605-2 has the performance and the phase-matching wavelength similar to those of the first PPLN waveguide 1605-1. Thus, the phase sensitive amplification of the signal light can be achieved by the degenerate parametric amplification.

In this embodiment, the two PPLN waveguides 1605-1 and 1605-2 are controlled to have fixed temperature by individual temperature controllers, respectively. There may be a mismatch between phase-matching wavelengths of the two PPLN waveguides at same temperature because of the fabrication error. Even in such a case, the two PPLN waveguides can be individually temperature-controlled to provide an identical phase-matching wavelength therebetween.

The light outputted from the second PPLN waveguide 1605-2 is separated by the dichroic mirror 1606-4 to the sum frequency light that is pump light and the amplified signal light. Since the sum frequency light and the amplified signal light have completely-different wavelengths, an unnecessary second harmonic component can be effectively removed at the output.

The phase sensitive amplification requires the synchronization of the phase of the pump light and the phase of the signal light. In this embodiment, a part of the outputted amplified signal light is tapped by the light splitting section 1603-4 and is received by the photodetector 1608. Then, the signal light and pump light are phase-synchronized by the phase-locked loop circuit (PLL) 1609. The phase modulator 1610 in front of the AWG multiplexer 1612 is used to add weak phase modulation based on a sin wave to the first fundamental wave light 1641-1. The phase shift of the phase modulation is detected by the photodetector 1608 and the PLL circuit 1609. Then, a feedback is sent to the driving voltage of the expander of the optical fibers 1611 by PZT placed in front of the AWG multiplexer 1612 and the bias voltage of the phase modulator 1610. The fluctuation of the optical phase due to the vibration of the optical fiber component or the temperature fluctuation is compensated. Then, stable phase sensitive amplification is achieved.

Figure 18C:
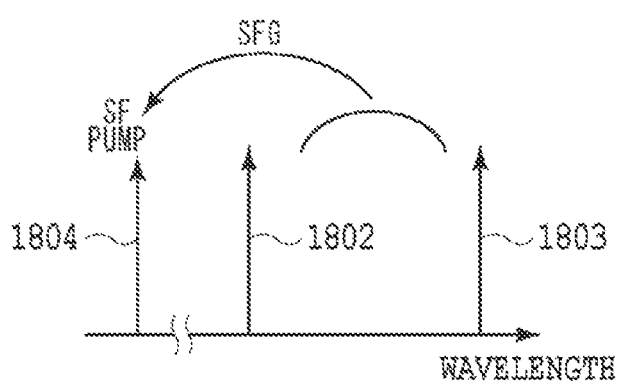
FIG. 18C is a diagram for explaining the concept of a phase sensitive amplifier according to the fifth embodiment of the present invention including the method for recovering the carrier wave of signal light.

As shown in FIG. 18C, the first fundamental wave light 1802 and the second fundamental wave light 1803 are used to generate the sum frequency light 1804. During this, there is a relation of the following (formula 9) among the first fundamental wave optical phase $\phi_{p\,1}$, the second fundamental wave optical phase $\phi_{p\,2}$, and the sum frequency optical phase $\phi_{S\,F}$.

$$\phi_{SF} = \phi_{p1} + \phi_{p2} = 2\phi_S \quad \text{(formula 9)}$$

Figure 18D:
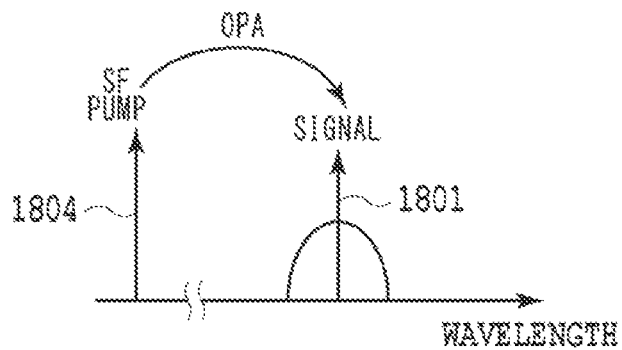
FIG. 18D is a diagram for explaining the concept of a phase sensitive amplifier according to the fifth embodiment of the present invention including the method for recovering the carrier wave of signal light.

As shown in FIG. 18D, the phase sensitive amplification is obtained by the parametric amplification of the signal light and the sum frequency light. During this, there is a relation satisfying the following (formula 10) between the signal light phase $\phi_s$ and the sum frequency optical phase $\phi_{S\,F}$.

$$\Delta\Phi = \phi_{SF} - 2\phi_S = n\pi \text{ (wherein } n \text{ is an integer)} \quad \text{(formula 10)}$$

Thus, the gain is maximum when $\Delta\Phi$ is $-\pi$, 0, or $\pi$.

In this embodiment, the amplification characteristic is evaluated when a 40-Gbit/s binary phase-shift keying (BPSK) signal, which was generated using an LN Mach-Zehnder modulator, was inputted. The signal light wavelength was set to about 1536 nm.

First, in order to confirm that the carrier wave phase of the signal light subjected to binary phase modulation can be recovered, the signal light is launched into the third second-order nonlinear optical element (see FIG. 16, code 1602-3). An internally-generated second harmonic wave is observed.

Figure 19A:
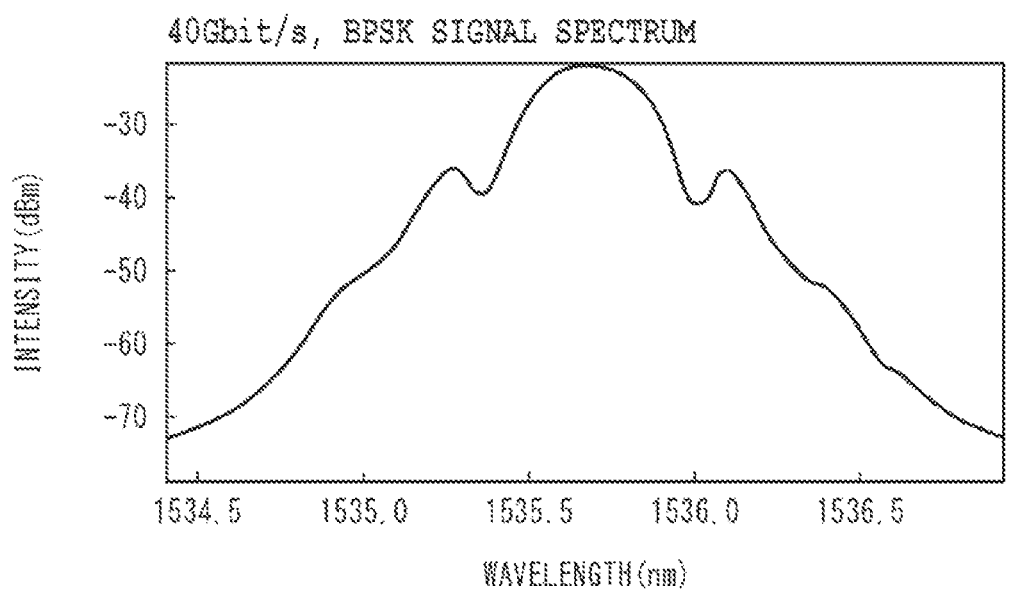
FIG. 19A is an optical spectrum for explaining the operation of phase sensitive amplifier according to the fifth embodiment of the present invention.
Figure 19B:
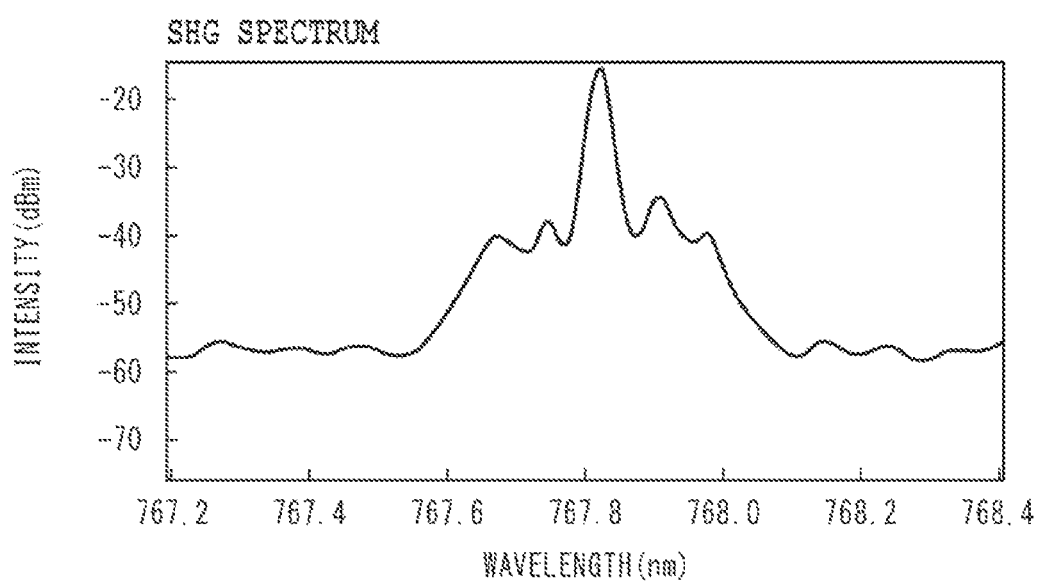
FIG. 19B is an optical spectrum for explaining the operation of phase sensitive amplifier according to the fifth embodiment of the present invention.

FIG. 19A shows the spectrum of the signal light measured by an optical spectrum analyzer. Since the signal light is subjected to the binary phase modulation, no peak is observed at the center wavelength of the carrier on the wavelength axis. FIG. 19B shows the spectrum to the second harmonic wave of the signal light subjected to the binary phase modulation. A peak having a high intensity is observed at the wavelength corresponding to the second harmonic wave. This shows that the phase modulation is cancelled by the generation of the second harmonic wave of the signal light.

Figure 20:
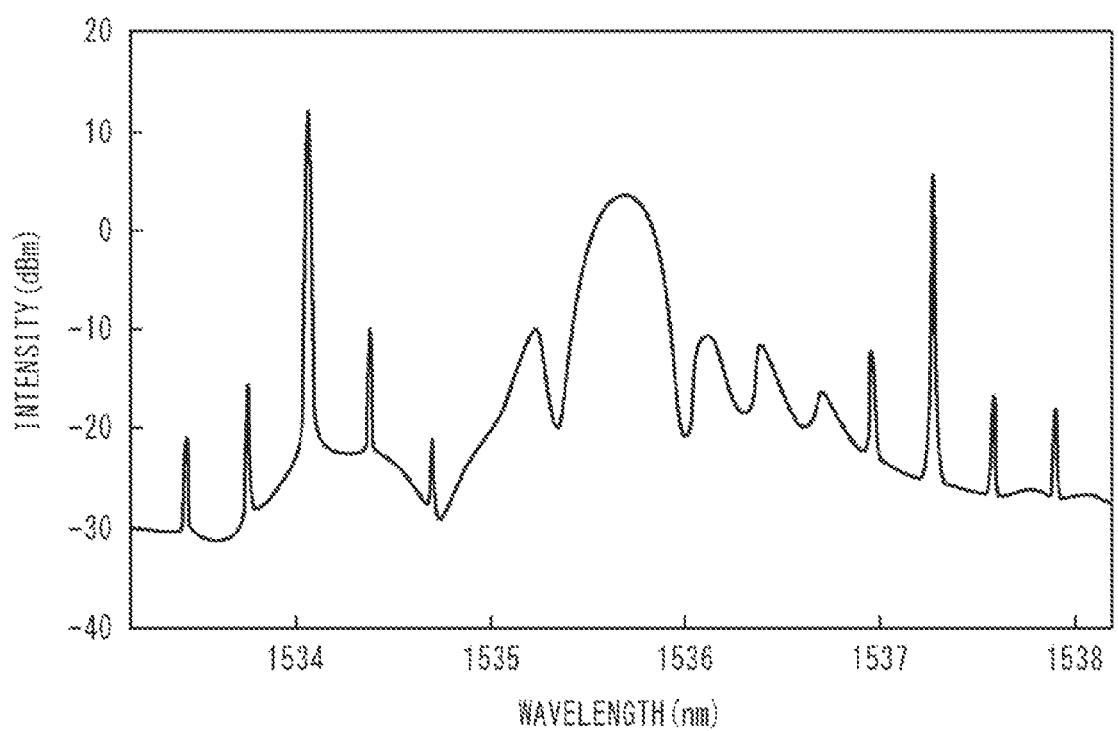
FIG. 20 is an optical spectrum for explaining the operation of phase sensitive amplifier according to the fifth embodiment of the present invention.

Next, the signal light subjected to the binary phase modulation is multiplexed with the first fundamental wave light. Then, the multiplexed lights are launched into the third second-order nonlinear optical element. Then the spectrum was measured. The first fundamental wave light has a wavelength of about 1534 nm. FIG. 20 shows the result of measuring the light outputted from the third second-order nonlinear optical element by the optical spectrum analyzer. The difference frequency light at a wavelength of about 1538 nm is generated by the difference frequency generation between the first fundamental wave light and the second harmonic wave of the signal light generated in the third second-order nonlinear optical element. As can be seen from the spectrum shape, no phase modulation is superposed on the difference frequency light.

The difference frequency light is separated by the wavelength multiplexing/demultiplexing filter. After that, the demultiplexed light is injected to semiconductor laser oscillating at substantially the same wavelength as that of the difference frequency light. The output of the semiconductor laser and the first fundamental wave light are multiplexed by the wavelength multiplexing/demultiplexing filter. Then, an optical circulator is used to extract the first fundamental wave light and the second fundamental wave light, which are used as fundamental wave light.

Figure 21A:
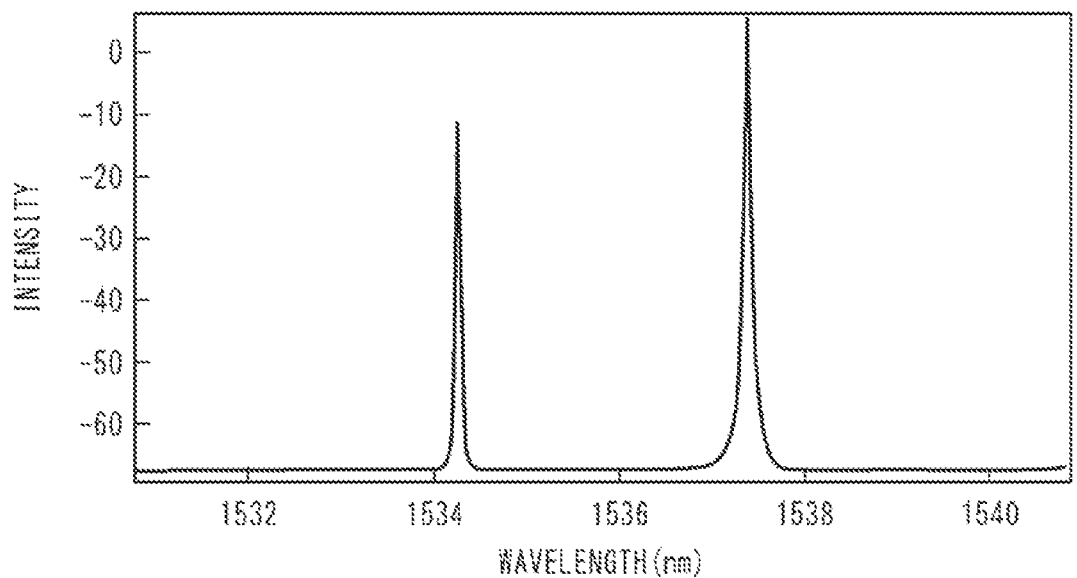
FIG. 21A is an optical spectrum for explaining the operation of phase sensitive amplifier according to the fifth embodiment of the present invention.
Figure 21B:
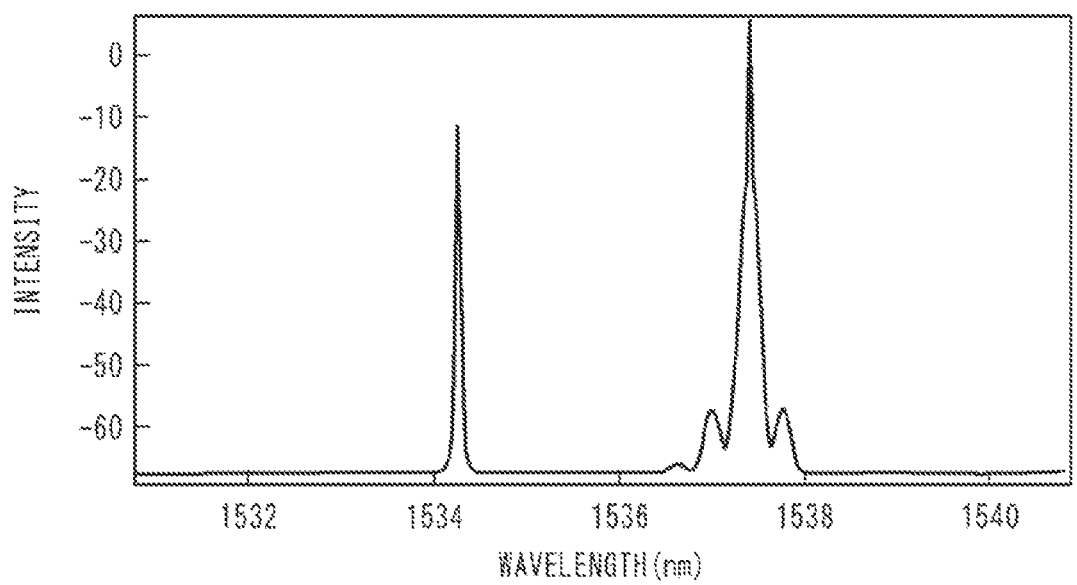
FIG. 21B is an optical spectrum for explaining the operation of phase sensitive amplifier according to the fifth embodiment of the present invention.

FIG. 21A and FIG. 21B show the measured spectra obtained by the optical spectrum analyzer for the output through the circulator. FIG. 21A shows the spectrum of the fundamental wave light when the difference frequency light is not injected to the semiconductor laser. FIG. 21B shows the spectrum of the fundamental wave light when the difference frequency light is injected to the semiconductor laser and the difference frequency light is used for an optical injection-locking.

When the spectra in FIG. 21A at a wavelength of around 1538 nm, which corresponds to the wavelength of the second fundamental wave light, are compared with the spectra in FIG. 21B, it can be found that the original semiconductor laser changes due to the optical injection locking. By the optical injection locking, the semiconductor laser oscillates at the same frequency as that of the difference frequency light including the phase information. During this, the injection power of the difference frequency light to the semiconductor laser is gradually increased. It was also observed that when the amount of the injection power reaches about a few dozens of the wavelength of the semiconductor laser is shifted to the wavelength of the difference frequency light, then the optical injection locking is performed.

The first fundamental wave light and the second fundamental wave light, which are used as fundamental wave light, are adjusted to have almost same optical intensity. Then, the fundamental wave light is amplified by an erbium-doped fiber laser amplifier. The amplified fundamental wave light is launched into the second-order nonlinear optical element to thereby generate the sum frequency light. Next, the signal light and the generated sum frequency light are launched into the second-order nonlinear optical element to perform degenerate parametric amplification, thereby perform a phase sensitive amplification.

In order to confirm the amplification characteristic, the gain of the amplified signal was investigated. In this embodiment, the PLL is used to match the phase of the pump light with the phase of the signal light. The gain of about 11 dB could be obtained under the conditions in which the sum frequency light having power of 300 mW was launched into the PPLN waveguide.

In this embodiment, the operation by the CW pump light, that is a condition required in an application to optical communication, is achieved by the use of the optical fiber amplifier. Furthermore, while the optical fiber amplifier is used in the configuration according to this embodiment, the ASE light generated from the optical fiber amplifier is effectively suppressed. Thus, phase sensitive amplification could be performed without a degradation of S/N ratio.

In this embodiment, the CW pump light was used for an application to optical communication. However, this embodiment is not limited to the use of CW light as pump light. CW light also can be effectively used as pump light in other embodiments.

(2) Second Configuration

Figure 22:
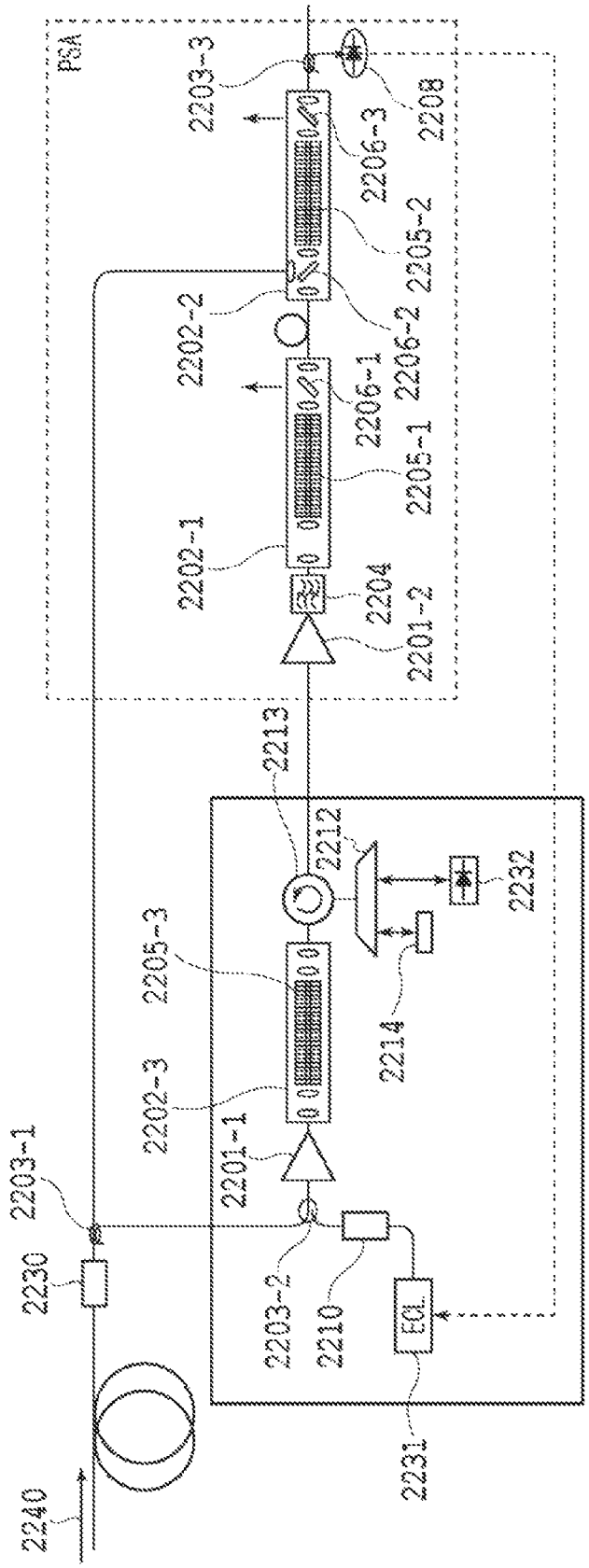
FIG. 22 is a diagram for explaining the configuration of another phase sensitive amplifier according to the fifth embodiment of the present invention.

Next, the following section will describe another configuration of the fifth embodiment (second configuration). FIG. 22 illustrates the second configuration of this embodiment.

In this configuration, the device is configured so as to amplify signal of 1.54 This configuration is the same as the configuration shown in FIG. 16 in terms of the use of three PPLN waveguides for carrying phase recovery of the signal light, a sum frequency generation, and optical parametric amplification.

The difference is a method of separating the sum frequency light from the fundamental wave light and a method of multiplexing the sum frequency light with the signal light. Furthermore, this configuration uses a more simple recovery system for recovering the carrier phase of the signal light.

According to the present invention, the phase sensitive amplification can be performed with suppressing a degradation of the S/N ratio of the signal light due to the ASE light generated from the optical fiber amplifier. In this configuration, this effect can be effectively used.

This configuration also uses a dichroic mirror to separate sum frequency light from fundamental wave light and to multiplex the sum frequency light with signal light. Generally, a dichroic mirror is used to separate or multiplex two lights having different wavelengths. The light having one wavelength is reflected while the light having the other wavelength is transmitted to pass through. In an application to cut unnecessary light in particular, such a configuration is desired in which light having a specific wavelength to be cut is reflected.

On the contrary, in the case where light having a specific wavelength to be cut is transmitted and required light is reflected and extracted, it is required that a mirror has a very low reflectance for an unnecessary wavelength. The reduction of the transmittance of the light having a specific wavelength to be cut is relatively easy compared with the reduction of the mirror reflectance for an unnecessary wavelength to be a very low reflectance. Thus, the configuration for reflecting light having an unnecessary wavelength can more effectively suppress the unnecessary light. In this configuration, the device is configured based on the concept as described above.

With reference to FIG. 22, this configuration will be described. A polarization component of the signal light 2240 is adjusted by the polarization controller 2230. The light is tapped by the light splitting section 2203-1 and is multiplexed with the first fundamental wave light. Then, the light is amplified by the erbium-doped fiber laser amplifier (EDFA) 2201-1.

The first fundamental wave light from the external cavity laser 2231 is sent through the LN phase modulator 2210 for phase synchronization and is subsequently multiplexed.

The amplified signal light and the first fundamental wave light are inputted to the third second-order nonlinear optical element 2202-3. In this configuration, the second-order nonlinear optical element includes an optical waveguide consisting of periodically poled lithium niobate (PPLN).

The third second-order nonlinear optical element 2202-3 generates a second harmonic wave of the signal light. A difference frequency light is obtained by a difference frequency generation between the generated second harmonic wave and the first fundamental wave light.

The signal light, the first fundamental wave light, and the difference frequency light, which are outputted from the third second-order nonlinear optical element 2202-3, are sent through the optical circulator and are demultiplexed respectively. The demultiplexing is carried out by an array waveguide grating (AWG) wavelength multiplexing/demultiplexing filter 2212. The signal light outputted from the demultiplexing filter 2212 is outputted to the free space.

A semiconductor laser 2232 oscillating at substantially the same wavelength as that of the difference frequency light is connected to the output port of the demultiplexing filter, which have the same wavelength as that of the difference frequency light. An optical intensity of the difference frequency light is adjusted to be a power from 10 μW to 100 μW. The adjusted light is injected to the semiconductor laser 2232 to thereby perform an optical injection locking. Through the optical injection locking, the second fundamental wave light could be generated that had the same phase as that of the difference frequency light.

The first fundamental wave light outputted from the demultiplexing filter 2212 is reflected by the fiber mirror 2214 and is inputted again to the wavelength multiplexing/demultiplexing filter 2212. The use of this configuration allows the first fundamental wave light and the second fundamental wave light to move along substantially the same fiber path. This consequently could suppress the magnitude of the phase fluctuation due to a change in the fiber length caused by an environmental change.

The first fundamental wave light is launched from the multiplexing side of the AWG multiplexing/demultiplexing filter 2212 and is multiplexed with the second fundamental wave light. The multiplexed light is outputted by the circulator 2213. In this configuration, fundamental wave light is composed of the first fundamental wave light and the second fundamental wave light. The carrier wave phase of the signal light is recovered by the nonlinear element and the light injection synchronization.

The fundamental wave light amplified by the EDFA 2201-2 is launched into the first PPLN waveguide 2205-1 in the first second-order nonlinear optical element 2202-1. Then, a sum frequency light is generated.

In this configuration, the dichroic mirror 2206-1, that reflects a 1.55-μm band light and that transmits a 0.77-μm band light, is set after the first PPLN waveguide 2205-1 to achieve effective suppression of the ASE light generated from the EDFA 2201-1. Then, the sum frequency light is effectively extracted from the fundamental wave light and the sum frequency light.

The sum frequency light at a wavelength of 0.77 μm is guided to the second second-order nonlinear optical element 2202-2 through the polarization maintaining optical fibers having the single mode propagation characteristic at this wavelength. As in (the first configuration), for the fibers having a single mode at 0.77 μm, the confinement of the light at a wavelength of 1.54 μm is very weak. Thus, after propagation at a length of about 1 m, unnecessary fundamental wave light and ASE light having a wavelength of 1.54 μm can be effectively attenuated.

The sum frequency light guided by the polarization maintaining optical fiber is multiplexed by the dichroic mirror 2206-2 with the signal light 2240 at a wavelength of 1.54 μm. In this configuration, the dichroic mirror 2206-2, that reflects the 1.54 μm band light and that transmits the 0.77 μm band light, is used in order to effectively remove the fundamental wave light and ASE light having wavelength of about 1.54 μm having passed through the polarization maintaining optical fibers.

The signal light and the sum frequency light are multiplexed and are subsequently launched into the second PPLN waveguide 2205-2. Then, phase sensitive amplification of the signal light is achieved by the degenerate parametric amplification. The light outputted from the second PPLN waveguide 2205-2 is separated by the dichroic mirror 2206-3 to the sum frequency light and the amplified signal light. In this configuration, in order to effectively remove unnecessary sum frequency light for the output, the dichroic mirror 2206-3 is set to reflect the 0.77 μm band light and to transmit the 1.54 μm band light.

In this configuration, a part of the outputted amplified signal light is similarly tapped by the light splitting section 2203-3 and is received by the photodetector 2208. This tapped signal is subsequently used for a phase-locked loop circuit (PLL) (not shown) to a phase synchronization. Then, stable phase sensitive amplification is provided. The error signal of the phase-locked loop circuit (PLL) is feedbacked to the driving current of the light source of the first fundamental wave light. Then, the phase of the pump light is synchronized with the phase of the signal light.

In this configuration, dichroic mirrors having different characteristics are respectively used to separate the second harmonic wave from the fundamental wave light and to multiplex the second harmonic wave with the signal light. A phase sensitive amplifier with a high signal quality could be configured without causing the signal light to be mixed with the ASE light from the EDFA, which causes an adverse influence on the S/N ratio of the signal in particular. Furthermore, a simple configuration could be obtained by reducing the number of components for a carrier wave phase recovery.

(3) Third Configuration

Figure 23:
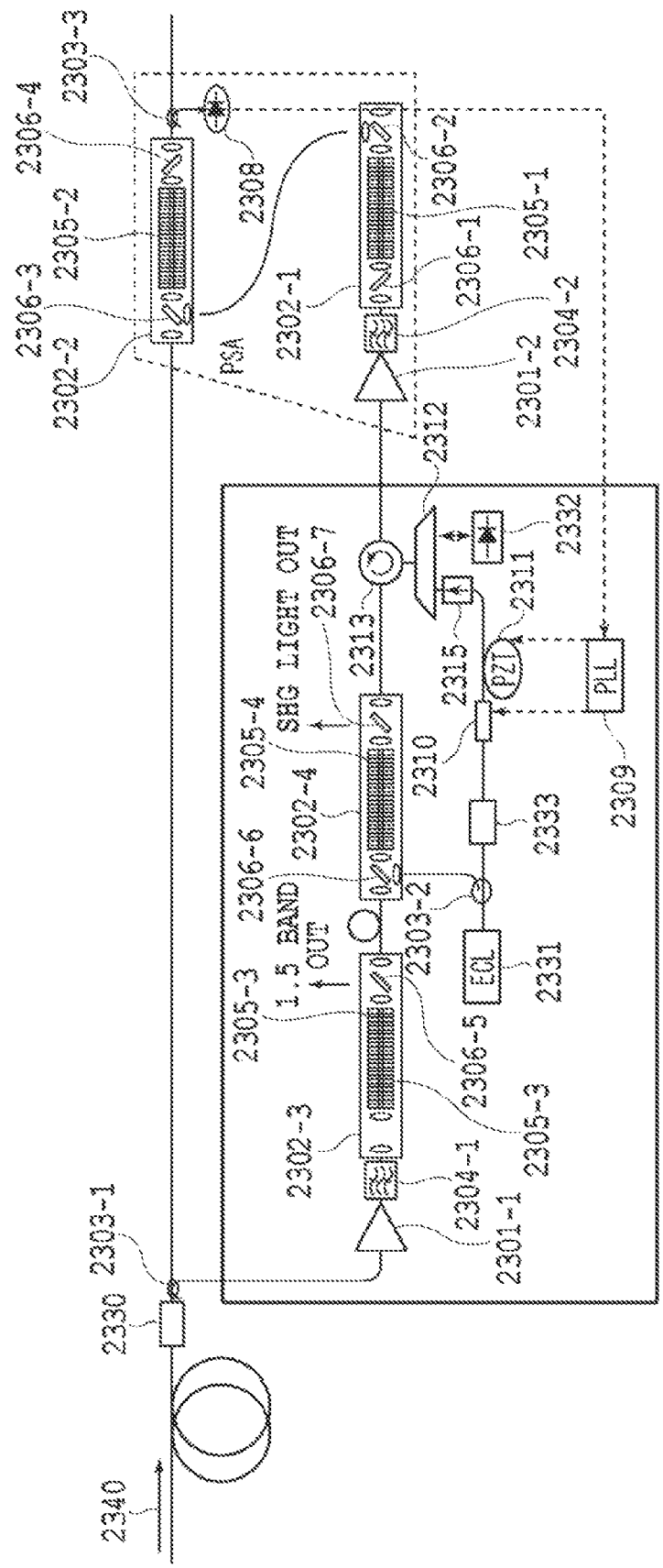
FIG. 23 is a diagram for explaining the configuration of yet another phase sensitive amplifier according to the fifth embodiment of the present invention.

Next, the following section will describe a yet another configuration of the fifth embodiment (which is called as a third configuration). FIG. 23 shows the third configuration of this embodiment.

In this configuration, the device is configured so as to amplify a 1.54-μm signal. This configuration is the same as that shown in (the first configuration) and (the second configuration) in terms of the use of the sum frequency generation and degenerate parametric amplification. There are differences in the configuration of the carrier wave phase recovery between (The third configuration) and these configurations.

An optical amplifier for optical communication must amplify even if optical power of a signal light is small. If the power of the signal light is very small, the power of the splitted signal light for a carrier wave phase recovery will be much small.

In (the first configuration), the second harmonic generation and the difference frequency generation process are performed simultaneously. An excess ASE will be caused when the very weak splitted signal light is amplified by a fiber amplifier. In this case, the ASE noise is superposed on the generated difference frequency light. As a result, a degradation of the S/N ratio of the difference frequency light will be caused. If the S/N ratio of the difference frequency light is sufficient, the S/N ratio can be improved by the optical injection locking. However, if the original signal light is too weak, it is difficult to keep the sufficient S/N ratio of the difference frequency light. Thus, it is impossible to maintain S/N ratio sufficiently for the first fundamental wave light.

A high S/N ratio of the pump light is very important because a high S/N ratio of the pump light is necessary for low-noise phase sensitive amplification. This configuration is configured for the purpose of avoiding the degradation of the S/N ratio of the difference frequency light.

With reference to FIG. 23, the following section will describe this configuration.

A polarization component of the signal light 2340 is adjusted by the polarization controller 2330. The adjusted light is tapped by the light splitting section 2303-1 and is subsequently amplified by the erbium-doped fiber laser amplifier (EDFA) 2301-1.

The amplified signal light is inputted to the second-order nonlinear optical element 2302-3. The second-order nonlinear optical element 2302-3 has an optical waveguide 2305-3 consisting of periodically poled lithium niobate (PPLN). The second harmonic wave of the signal light is generated by launching the signal light to the PPLN waveguide 2305-3. The dichroic mirror 2306-5 separates the second harmonic wave from the signal light.

The second harmonic wave, which is outputted from the second-order nonlinear optical element 2302-3, and the first fundamental wave light are launched into the second-order nonlinear optical element 2302-4. The second-order nonlinear optical element 2302-4 has dichroic mirrors 2306-6 and 2306-7 at the input and output.

The second harmonic wave and the first fundamental wave light are multiplexed by the dichroic mirror 2306-6 and the multiplexed lights are inputted to the PPLN waveguide 2305-4 in the second-order nonlinear optical element 2302-4. A difference frequency light is obtained by the difference frequency generation between the second harmonic wave and the first fundamental wave light in the PPLN waveguide 2305-4. By using the configuration as described above, the unnecessary ASE light is removed from the fiber laser amplifier 2301-1, which is used for amplification of the signal light for the second harmonic generation. Thereafter, the difference frequency light between the second harmonic wave and the first fundamental wave light can be generated. Thus, even when the signal light is very weak, the difference frequency light with a high S/N ratio could be generated.

The signal light, the first fundamental wave light, and the difference frequency light, which are outputted from the second-order nonlinear optical element 2302-4, are subsequently demultiplexed to the each light after passing through the optical circulator 2313. The demultiplexing was performed by an array waveguide grating (AWG) wavelength multiplexing/demultiplexing filter 2312. The signal light outputted from the demultiplexing filter 2312 is outputted to the free space. The first fundamental wave light outputted from the demultiplexing filter 2312 is extinguished by the isolator 2315.

The semiconductor laser 2332 oscillating at substantially the same wavelength as that of the difference frequency light is connected to an output port of the wavelength multiplexing/demultiplexing filter 2312, which has the same wavelength as that of the difference frequency light. By the optical injection locking, the second fundamental wave light could be generated that has the same phase as that of the difference frequency light. By the use of the difference frequency light having a high S/N ratio, the second fundamental wave light could be generated while maintaining the high S/N ratio.

The first fundamental wave light is launched from the multiplexing side of the AWG multiplexing/demultiplexing filter 2312. The first fundamental wave light is multiplexed with the second fundamental wave light. Then, the multiplexed light is outputted from the circulator 2313.

In this configuration, the first fundamental wave light and the second fundamental wave light are used as fundamental wave light. The phase of the carrier of the signal light is recovered by the nonlinear element and the optical injection locking.

The first fundamental wave light and the second fundamental wave light, which are used as fundamental wave light, are adjusted to substantially the same optical intensity. Thereafter, these lights are amplified by the erbium-doped fiber laser amplifier 2301-2. The amplified fundamental wave light is launched into the second-order nonlinear optical element 2302-1, thereby generating the sum frequency light. The signal light 2340 and the sum frequency light are launched into the second-order nonlinear optical element 2302-2 to thereby perform degenerate optical parametric amplification to perform phase sensitive amplification, thus providing a favorable characteristic. This configuration could realize a low-noise phase sensitive amplifier, even when an input signal is very weak.

Sixth Embodiment

In the above third to fifth embodiments, an embodiment has been described in which the phase sensitive amplifier is used as a repeater device. In this embodiment, the configuration and the effect thereof will be described for a case where the phase sensitive amplifier phase sensitive amplifier is used as a receiver (more specifically, a case where the phase sensitive amplifier is used as an input side amplifier in a receiver.

As with been described in the description of the embodiment, noise due to GAWBS does not exist in the configuration in which PPLN is used as a nonlinear gain medium and the signal light and the second harmonic wave are incident to perform degenerate parametric amplification. When the second harmonic generation is followed by the parametric amplification, the characteristic of a dichroic mirror functioning again as a multiplexer for example (e.g., see FIG. 6, 606-1 and 606-2) is used to remove a fundamental wave component to allow only the second harmonic wave and the signal light to input to the parametric amplification medium for the degenerate parametric amplification. This consequently prevents noise due to mixed ASE, thus providing low-noise amplification.

However, the current situation is that, when the second harmonic wave with the power of 300 mW is injected, the PPLN waveguide has a parametric gain of 11 dB. Thus, this gain is insufficient to receive a weak power signal inputting to the optical receiver by using a PD (photodiode) with a high S/N ratio. Thus, the amplifier according to the above-described embodiment cannot be used as an amplifier of the optical receiver.

Currently, the EDFA frequently used for an optical receiver has a gain of about 30 dB to 40 dB. Even when the input power level to the optical receiver is −35 dBm, an output power of about 0 dBm to +5 dBm can be obtained. On the other hand, from the PPLN waveguide, the current technique cannot obtain the same gain as that of the EDFA. Thus, even when a low-noise phase sensitive amplifier can be realized, a highly-sensitive optical receiver could not be obtained that exceeded a conventional optical receiver by using a laser amplifier. However, these disadvantages are solved by this embodiment described below.

Figure 24:
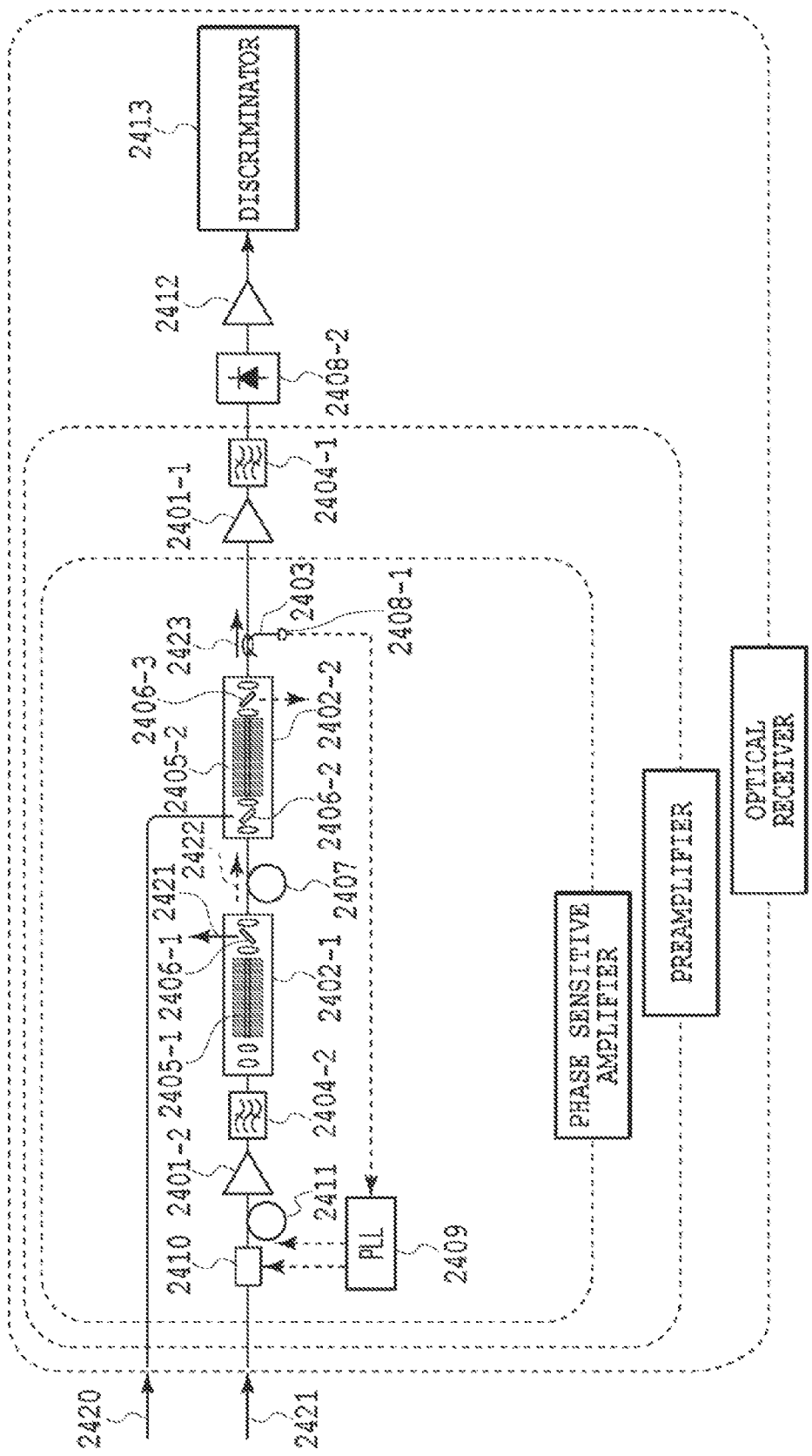
FIG. 24 is a diagram for explaining the configuration of an optical receiver including a phase sensitive amplifier according to the sixth embodiment of the present invention.

FIG. 24 shows the configuration of this embodiment. In this embodiment, the weak input signal 2420 is amplified with a phase sensitive amplifier by using the PPLN waveguide shown in the part in FIG. 24 shown as a "phase sensitive amplifier". The amplified signal light is further amplified by the optical fiber laser amplifier 2401-1. Then, the bandpass filter 2404-1 is used to remove unnecessary excess light. Next, the signal light is inputted to the photodiode (PD) 2408-2 functioning as a light detector and is converted to an electric signal. The electric signal is finally connected to a discriminator 2413 and is reproduced as a digital signal. The details of this embodiment will be described later.

By the configuration as described above, an effect as described below is obtained. This embodiment is characterized in the point that a weak input signal is amplified by the phase sensitive amplifier and is subsequently further amplified by the optical fiber laser amplifier. Next, the signal is inputted to the PD and is subjected to optical/electrical conversion.

The following section will describe the behavior of the S/N ratio of the optical signal with a significant influence on the receiving sensitivity of the optical receiver according to an embodiment of the present invention. In a phase sensitive amplifier for amplifying a weak input signal, the dispersion $\sigma_{PSA}^2$ of the photon number of the amplified signal is given by the following (formula 11). However, it is assumed that there is completely no phase difference between the pump light and the signal light, and the synchronization is achieved therebetween.

Equation 1

$$\sigma_{PSA}^2 = G\langle n_{in}\rangle + \frac{1}{4}\left\{(G-1)+\left(\frac{1}{G}-1\right)\right\}\Delta f + \{G(G-1)\}\langle n_{in}\rangle + \frac{1}{8}\left\{(G-1)^2+\left(\frac{1}{G}-1\right)^2\right\}\Delta f \quad \text{(formula 11)}$$

In the formula, $\langle n_{in}\rangle$ shows the input light average photon number, G shows the gain of the phase sensitive amplifier, $\Delta f$ shows the parametric fluorescence bandwidth inputting to an optical receiver. $\Delta f$ shows the filter bandwidth when the filter is placed at the rear side of the phase sensitive amplifier and shows the bandwidth of the parametric amplification medium when no filter is provided. The first term of the right side of (formula 11) shows the shot noise of the amplified light. The second term shows the shot noise of the parametric fluorescence caused by the parametric amplification effect. The third term shows the beat noise between the amplified signal light and the parametric fluorescence. The fourth term shows the beat noise between the parametric fluorescences.

The noise power obtained when the dispersion $\sigma_{PSA}$ of the photon number shown in (formula 11) is used and the amplified signal light is detected by the PD is given by the following (formula 12) when assuming that the receiving system has a bandwidth B and the load resistance for performing the conversion between the current and a voltage is $R_L$. For brief description, it is assumed that the quantum efficiency of the PD is 100%.

Equation 2

$$N = 2e^2 \sigma_{PSA}^2 B R_L \quad \text{(formula 12)}$$

When considering a case where an NRZ code with the mark rate ½ and the time slot T is detected, the signal power is given by (formula 13).

Equation 3

$$S = e^2 (G\langle n_{in}\rangle)^2 R_L \quad \text{(formula 13)}$$

From these formulae, the signal has an S/N ratio given by (formula 14).

Equation 4

$$S/N_{out} = \frac{(G\langle n_{in}\rangle)^2}{2B\left[\begin{array}{c}G\langle n_{in}\rangle + \frac{1}{4}\left\{(G-1)+\left(\frac{1}{G}-1\right)\right\}\Delta f + \\ \{G(G-1)\}\langle n_{in}\rangle + \\ \frac{1}{8}\left\{(G-1)^2+\left(\frac{1}{G}-1\right)^2\right\}\Delta f\end{array}\right]} \quad \text{(formula 14)}$$

When the gain G of the phase sensitive amplifier become increasing, the third term and the beat noise of the parametric fluorescence are dominant and the S/N ratio converges to (formula 15).

Equation 5

$$S/N_{out} = \frac{G\langle n_{in}\rangle}{2(G-1)B} \quad \text{(formula 15)}$$

On the other hand, the input light not using an amplifier has an S/N ratio given by (formula 16).

Equation 6

$$S/N_{in} = \frac{\langle n_{in}\rangle}{2B} \quad \text{(formula 16)}$$

Based on (formula 15) and (formula 16), the noise figure F of the phase sensitive amplifier can be calculated by (formula 17).

Equation 7

$$F = \frac{S/N_{in}}{S/N_{out}} = \frac{G-1}{G} \quad \text{(formula 17)}$$

As can be seen from (formula 17), when the gain is high, the noise figure F is asymptotic to 1, thus providing amplification without degrading the S/N ratio. In order to actually perform such low-noise amplification, such noise must be avoided that include GAWBS noise or excess noise due to ASE from a laser amplifier used to generate pump light. Thus, these accidental noises cannot be avoided by conventional technique using optical fibers as a third-order nonlinear medium.

On the other hand, the configuration using the PPLN waveguide as a second-order nonlinear medium can avoid these disadvantages, thus providing low-noise amplification. However, the current technique could not provide a sufficient gain only by a phase sensitive amplifier using a PPLN waveguide.

As a result of the hard investigation of a configuration for solving these disadvantages, it was found that, even when the phase sensitive amplification by the second-order nonlinear medium is followed further amplification by a laser amplifier to remove the unnecessary excess light by a bandpass filter, the degradation of the S/N ratio can be suppressed when compared with a case where only the conventional laser amplifier is used while using the low noise characteristic of the phase sensitive amplifier. The following section will describe the S/N ratio of the amplified signal light in the configuration according to this embodiment.

When the above-described signal amplified by the phase sensitive amplifier is further amplified by the laser amplifier, the output is considered to consist of, in an order of a higher intensity, the amplified signal light as the first output component, the amplified parametric fluorescence as the second output component by the laser amplifier, and the ASE generated from the laser amplifier as the third output component. It is considered that the dispersion of the photon number from the amplifier can be given by the sum of the following 8 components.

1. First dispersion: Shot noise of the first output component (amplified signal light)
2. Second dispersion: Shot noise of the second output component (light obtained by amplifying parametric fluorescence by the laser amplifier)

3. Third dispersion: Shot noise of the third output component (the ASE light generated by the laser amplifier)
4. Fourth dispersion: Beat noise between the first output component and the second output component
5. Fifth dispersion: Beat noise between the first output component and the third output component
6. Sixth dispersion: Beat noise between the second output component and the third output component
7. Seventh dispersion: Beat noise between the second output components
8. Eighth dispersion: Beat noise between the third output components For example, the PPLN waveguide used in this embodiment has a parametric gain of a very wide band of about 60 nm. Thus, even when the second output component (light obtained by amplifying the parametric fluorescence by the laser amplifier) exhibits a smaller spectrum density than the component 1, when the light obtained by amplifying the parametric fluorescence of the entire band is integrated, the contribution by the beat noise between the second output components as the seventh dispersion among the sixth to seventh dispersions cannot be ignored.

Thus, the optical receiver according to this embodiment is configured so that the laser amplifier is followed by the bandpass filter so that the contribution by the second output component (light obtained by amplifying the parametric fluorescence by the laser amplifier) other than the band of the signal component and the contribution by the third output component (the ASE light generated by the laser amplifier) are reduced, thus extracting only the light with the signal band.

In order to simplify the estimate of noise, among components causing the photon number dispersion, such a component with a high intensity is considered. A component highly contributing as noise is considered as a component of the fourth dispersion and the fifth dispersion. Based on such an approximation, the magnitude of a component highly contributing to the dispersion of the photon number can be calculated as shown by (formula 18).

Equation 8

$$\sigma_{PSA+PIA}^2 \cong G_2^2 G_1(G_1-1)\langle n_{in}\rangle + 2G_1 G_2(G_2-1)\langle n_{in}\rangle \quad \text{(formula 18)}$$

In the formula, $G_1$ shows the gain of the phase sensitive amplifier and $G_2$ shows the gain of the laser amplifier. When the S/N ratio in this embodiment is calculated from (formula 18), the S/N ratio results in (formula 19).

Equation 9

$$S/N_{PSA+PIAout} = \frac{G_1 G_2 \langle n_{in}\rangle}{2B[G_2(G_1-1)+2(G_2-1)]} \quad \text{(formula 19)}$$

Based on the ratio between the S/N ratio shown by (formula 19) and the S/N ratio of the input light shown by (formula 16), the noise figure F of this embodiment can be calculated as shown in (formula 20).

Equation 10

$$F_{PSA+PIAout} = \frac{G_1-1}{G_1} + \frac{2(G_2-1)}{G_2}\frac{1}{G_1} = F_{PSA} + \frac{F_{PIA}}{G_1} \quad \text{(formula 20)}$$

In the formula, $F_{PSA}$ represents the noise figure of the above-described phase sensitive amplifier and $F_{PIA}$ represents the noise figure of the laser amplifier.

$F_{PIA}$ is 3 dB (which corresponds to $F_{PIA}=2$) in the case of an ideal laser amplifier theoretically and is about 4 dB to 5 dB (which corresponds to $F_{PIA}=2.5\sim3.2$) in the case of a practical EDFA. Specifically, according to the configuration in this embodiment, the contribution by the noise figure of the laser amplifier connected to the 2nd stage is reduced by $1/G_1$. When the phase sensitive amplifier has a high gain $G_1$, the entire noise figure is asymptotic to the noise figure of the phase sensitive amplifier. Thus, according to this embodiment, while using the low noise characteristic of the phase sensitive amplifier, a gain sufficient for the use of a preamplifier such as a receiver can be entirely obtained.

In order to suppress the influence by the noise due to the beat of the background lights (e.g., parametric fluorescence or ASE) (i.e., the sixth to eighth dispersions), a bandpass filter is desirably placed to remove the background light other than the signal band. The bandpass filter is desirably placed between the phase sensitive amplifier and the laser amplifier or is placed at the 2nd stage of the laser amplifier. When the bandpass filter is placed only at the 2nd stage of the laser amplifier, the degradation of the S/N ratio due to the insertion loss of the bandpass filter can be effectively suppressed reducing the number of components.

With reference to FIG. 24 again, the following section will describe the configuration of this embodiment in detail. In this embodiment, in order to confirm the principle of the present invention, the signal light 2420 and the fundamental wave light 2421 are generated from a light source with a wavelength of 1.54 p.m. In order to verify the sensitivity of the optical receiver, signal light with attenuated power is inputted to the optical receiver.

The following section will describe the configuration of the phase sensitive amplifier used in this embodiment. In this embodiment, in order to obtain power sufficient to obtain the nonlinear optical effect from weak fundamental wave light, the fiber laser amplifier (EDFA) 2401-2 is used to amplify the fundamental wave light 2421. The amplified fundamental wave light is inputted to the first second-order nonlinear optical element 2402-1 to thereby generate the second harmonic wave 2422. Next, the second second-order nonlinear optical element 2402-2, the signal light 2420 and the second harmonic wave 2422 are inputted to perform degenerate parametric amplification, thereby performing phase sensitive amplification.

In the phase sensitive amplification, the phase of the pump light must be synchronized with the phase of the signal light. In this embodiment, the outputted amplified signal light 2423 is partially split by a splitter 2403 and the split part is received by the photodetector 2408-1 and is phase-synchronized by the Phase-locked loop circuit (PLL) 2409. The phase modulator 2410 placed before the EDFA 2401-2 is used to produce phase dithering between the signal and pump light subjecting the fundamental wave light 2421 to weak phase modulation by a sinusoidal wave. The photodetector 2408-1 and the PLL circuit 2409 are used to detect the phase mismatching the loop. Then, the feedback system send the information to compensate the phase mismatch to the applying voltage to the optical fiber stretcher 2411 by PZT placed before the EDFA 2401-2 and the bias voltage of the phase modulator 2410. This can consequently absorb the vibrations of the optical fiber components and the fluctuations of the optical phases due to the temperature fluctuation to thereby achieve stable phase sensitive amplification.

The fundamental wave light 2421 is amplified with an EDFA 2401-2. The amplified fundamental wave light 2421 is inputted to the first second-order nonlinear optical element 2402-1. In this embodiment, in order to prevent the wideband ASE generated from the EDFA 2401-2 to be converted by the first second-order nonlinear optical element 2402-1, the EDFA 2401-2 and the first second-order nonlinear optical element 2402-1 have therebetween a bandpass filter 2404-2 to cut off unnecessary excess ASE.

As shown in FIG. 24, the second-order nonlinear optical elements (2402-1 and 2402-2) according to this embodiment include optical waveguides (2405-1 and 2405-2) consisting of periodically-poled lithium niobate (PPLN). The PPLN waveguides (2405-1 and 2405-2) can use the highest nonlinear optical constant d33 of lithium niobate by the quasi-phase matching and also can provide a high optical power density by the optical waveguide structure. Thus, the configuration as shown can provide high wavelength conversion efficiency.

When high intensity power is inputted to the PPLN waveguide, there may be a case where the optical damage due to the photorefractive effect causes a change in the phase matching wavelength. This embodiment prevents such a disadvantage by using the waveguide made by the direct bonding shown in Non-patent Literature 4.

In this embodiment, the fluctuation of the phase matching wavelength is suppressed by using the waveguide with direct bonding in which Zn doped lithium niobate with a superior optical damage resistance is used as a core. Furthermore, high wavelength conversion efficiency is realized by reducing the core diameter to about 4 μm by a dry etching.

The first PPLN waveguide 2405-1 emits fundamental wave light and a second harmonic wave. The second harmonic wave 2422 is separated from the fundamental wave light 2421 by the dichroic mirror 2406-1.

The second harmonic wave 2422 of 0.77 μm passed through the dichroic mirror 2406-1 is guided, at this wavelength (i.e., a wavelength of 0.77 μm), to the second second-order nonlinear optical element 2402-2 via the polarization-maintaining fiber 2407 with the single mode propagation characteristic. The second harmonic wave 2422 guided to the second second-order nonlinear optical element 2402-2 via the polarization-maintaining fiber 2407 is multiplexed by the dichroic mirror 2406-2 with the signal light 2420 with a wavelength of 1.54 μm. Since the dichroic mirror 2406-2 allows only the second harmonic wave 2422 to pass therethrough, the remaining components of the fundamental wave light 2421 of wavelength of about 1.54 μm and the ASE can be effectively removed that are emitted from the first PPLN waveguide 2405-1 and that are sent through the dichroic mirror 2406-1 and the polarization-maintaining fiber 2407.

The signal light 2420 and the second harmonic wave 2422 are multiplexed and are inputted to the second PPLN waveguide 2405-2. The second PPLN waveguide 2405-2 has the performance and the phase matching wavelength similar to those of the first PPLN waveguide 2405-1. The degenerate parametric amplification can be used to subject signal light to phase sensitive amplification.

The light output from the second PPLN waveguide 2405-2 is separated by the dichroic mirror 2406-3 to the second harmonic wave as pump light and the amplified signal light 2423. Since the second harmonic wave and the amplified signal light have totally-different wavelengths as described above, the unnecessary second harmonic component can be effectively removed at the output.

In this embodiment, in order to separate or multiplex two lights with different wavelengths, such a dichroic mirror is used that reflects one light with one wavelength and that allows the other light with another wavelength to pass therethrough. For an application to cut of unnecessary light in particular, the dichroic mirror desirably has a configuration to reflect light with a specific wavelength light to be cut.

When the dichroic mirror has a configuration to allow light with a specific wavelength to be cut and to reflect and extract required light, the mirror must have a very-low reflectance at an unnecessary wavelength. When compared with the significant reduction of the mirror reflectance at the unnecessary wavelength, it is relatively easy to reduce the transmittance of the light with a specific wavelength light to be cut. Thus, the configuration for reflecting the light with the unnecessary specific wavelength can more effectively suppress the unnecessary light.

This embodiment is configured based on the concept as described above. The use of the configuration as described above can completely suppress the mixed ASE from the EDFA in particular that accidentally degrades the S/N ratio of the phase sensitive amplifier, thus achieving the amplification with low noise.

In this embodiment, the parametric gain obtained by the second PPLN waveguide 2405-2 is 11 dB. The insertion loss of a module containing the second PPLN waveguide is 5 dB. Thus, the phase sensitive amplifier has a gain of 6 dB. In this manner, the phase sensitive amplified signal light 2423 is inputted to the EDFA 2401-1 and is subjected to further amplification. The output from the EDFA is allowed to pass through the bandpass filter 2404-1 with a band of 1 nm to remove, from among the parametric fluorescence generated from the phase sensitive amplifier, the light amplified by the EDFA and the ASE generated from the EDFA with components not within the signal band.

Figure 25:
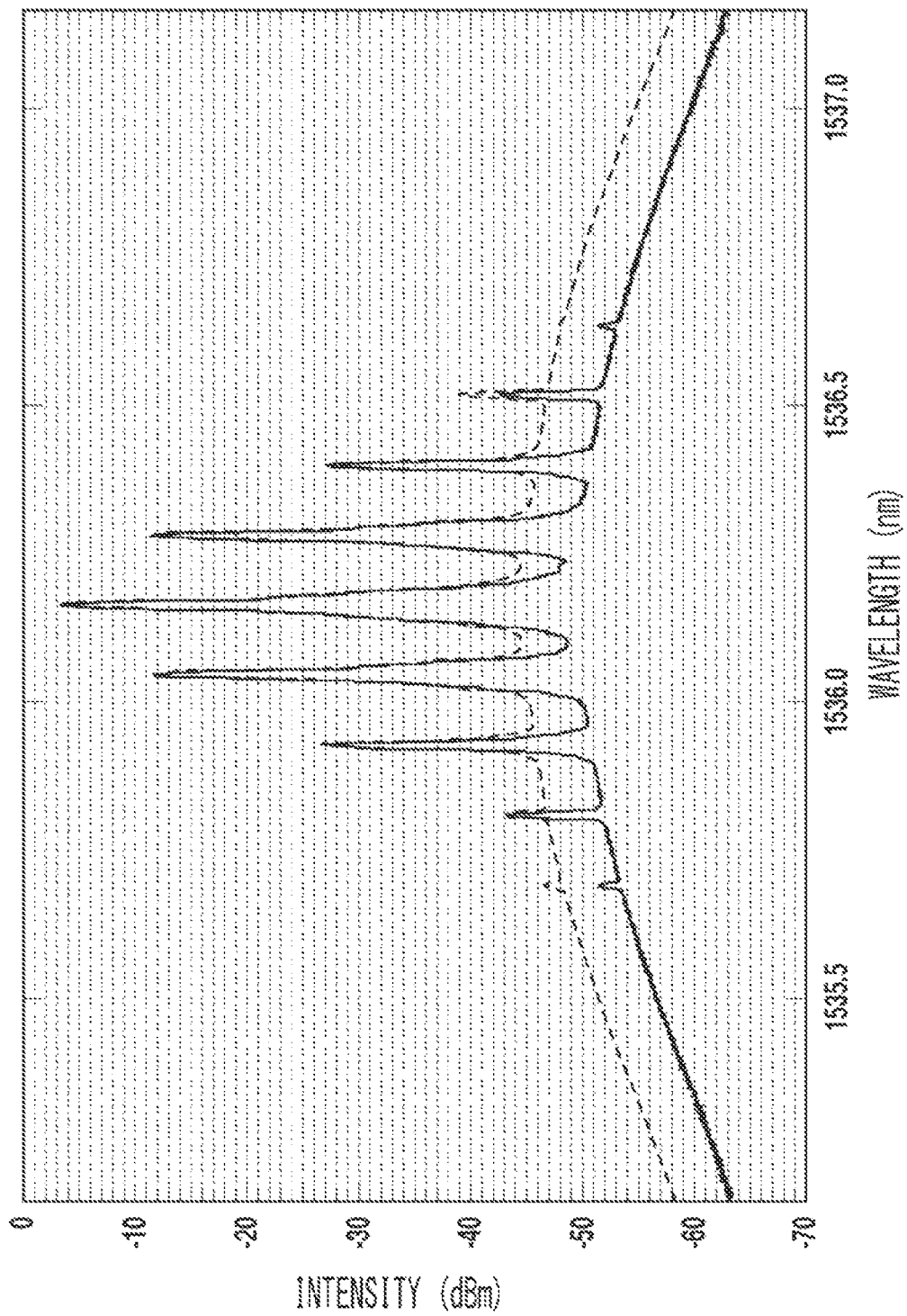
FIG. 25 is an optical spectrum showing a case in which the optical amplification is performed using the phase sensitive amplifier according to the sixth embodiment of the present invention.

FIG. 25 shows an example of the optical spectrum when this embodiment is used to perform the amplification of the signal light. In FIG. 25, the solid line shows the optical spectrum of the amplified light by this embodiment. The dotted line shows the optical spectrum of the amplified light by the optical amplifier of conventional technique.

In order to compare the invention with conventional technique, the optical spectrum of the amplified light only by the EDFA and the bandpass filter was also measured. For comparison, the input signal was modulated using with a 15 GHz sinusoidal wave to attenuate the resultant signal to −20 dBm so as to have the total gain of 18 dB.

As can be seen from FIG. 25, the background light (ASE, light obtained by amplifying the parametric fluorescence) observed around the amplified signal light has a level suppressed by the amplification by the phase sensitive amplifier followed by the amplification by the EDFA. As described above, in spite of the fact that this embodiment uses a laser amplifier, the phase sensitive amplifier provided at the 1st stage can suppress the noise level, while providing the same gain as that of the conventional laser amplifier, than in the case of the conventional case, thus providing a higher S/N ratio than the conventional case.

Figure 26:
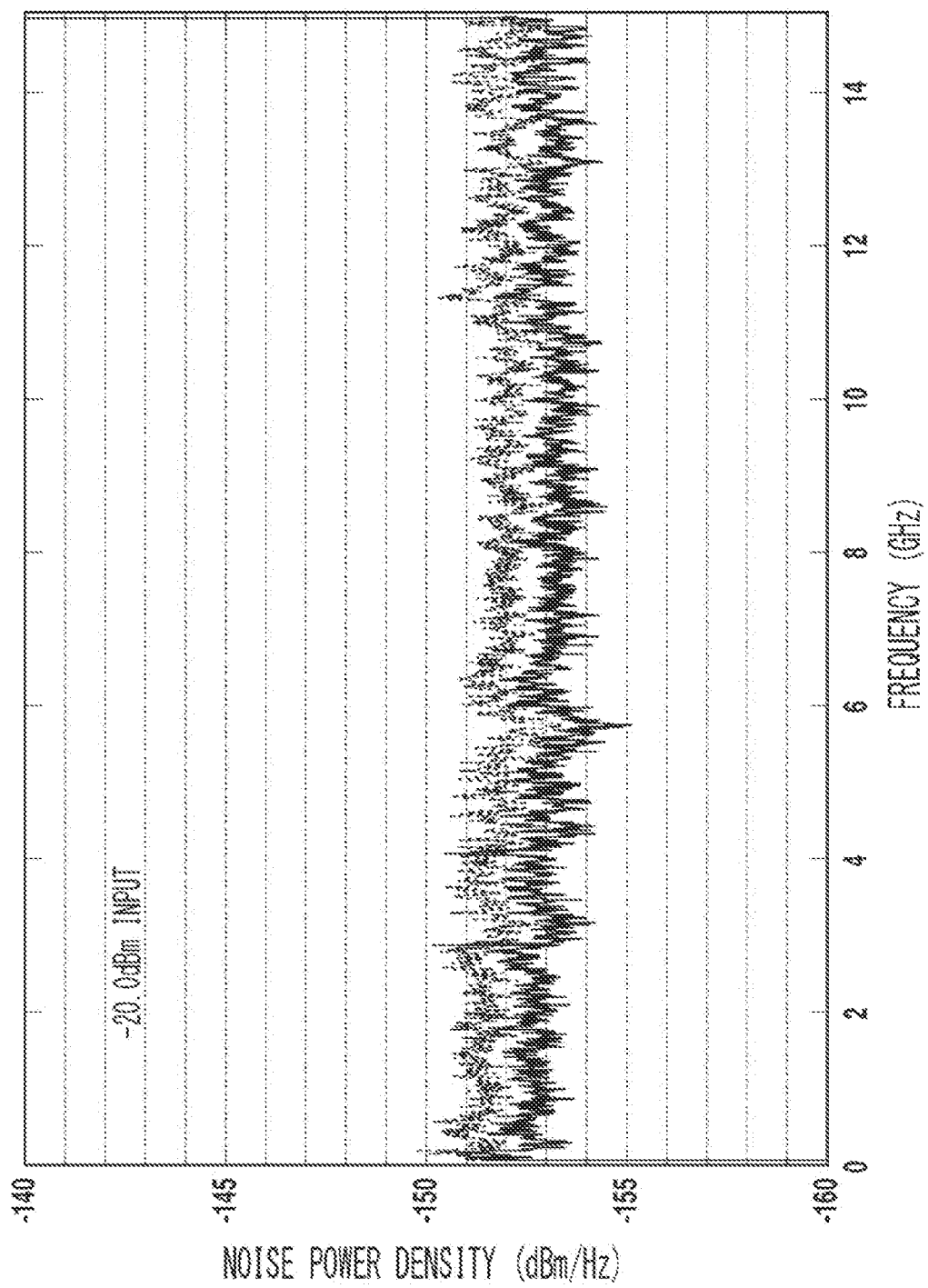
FIG. 26 is a graph illustrating the evaluation result of the phase sensitive amplifier according to the sixth embodiment of the present invention.

FIG. 26 shows the result of the evaluation of the noise floor when the above-described amplified signal modulated by the sinusoidal wave with a frequency of 15 GHz is subjected to optical/electrical conversion by an electrical spectrum analyzer including a commercially-available OE converter.

In FIG. 26, the solid line shows the electrical spectrum obtained by subjecting the amplified signal to optical/electrical conversion in this embodiment. The dotted line shows the electrical spectrum obtained by subjecting the amplified signal to optical/electrical conversion by the optical amplifier of conventional technique. The result showed not only an improved S/N ratio of the light but also the noise level suppressed by about 1.5 dB even after the optical/electrical conversion when compared with the amplification by the conventional EDFA.

In the phase sensitive amplifier using conventional optical fibers, the noise due to GAWBS prevents only a partial band from exhibiting lower noise than that of EDFA. In contrast with this, this embodiment could realize low-noise amplification over a wide frequency bandwidth while obtaining a sufficient gain. This low-noise amplification characteristic as described above shows that this embodiment can be used not only as an optical receiver but also as an optical repeater amplifier.

Next, in order to confirm the effectiveness as an optical receiver, the signal light was modulated by an NRZ signal of 40-Gbit/s to evaluate the characteristic of receiver when the signal was inputted. The gain of the EDFA of the 2nd stage was set so that the power inputting to the PD via the bandpass filter was 0 dBm. The phase sensitive amplifier in this embodiment has a gain of 6 dB. Thus, when the input light has power of −30 dBm for example, the gain of the EDFA is set to 24 dB. For comparison, a case was also evaluated in which only the EDFA and bandpass filter based on conventional technique was used as a preamplifier. This case was also set to that the power inputting to the PD via the bandpass filter was 0 dBm. Thus, when the input light has power of −30 dBm for example, the gain of the EDFA is set to 30 dB.

Figure 27:
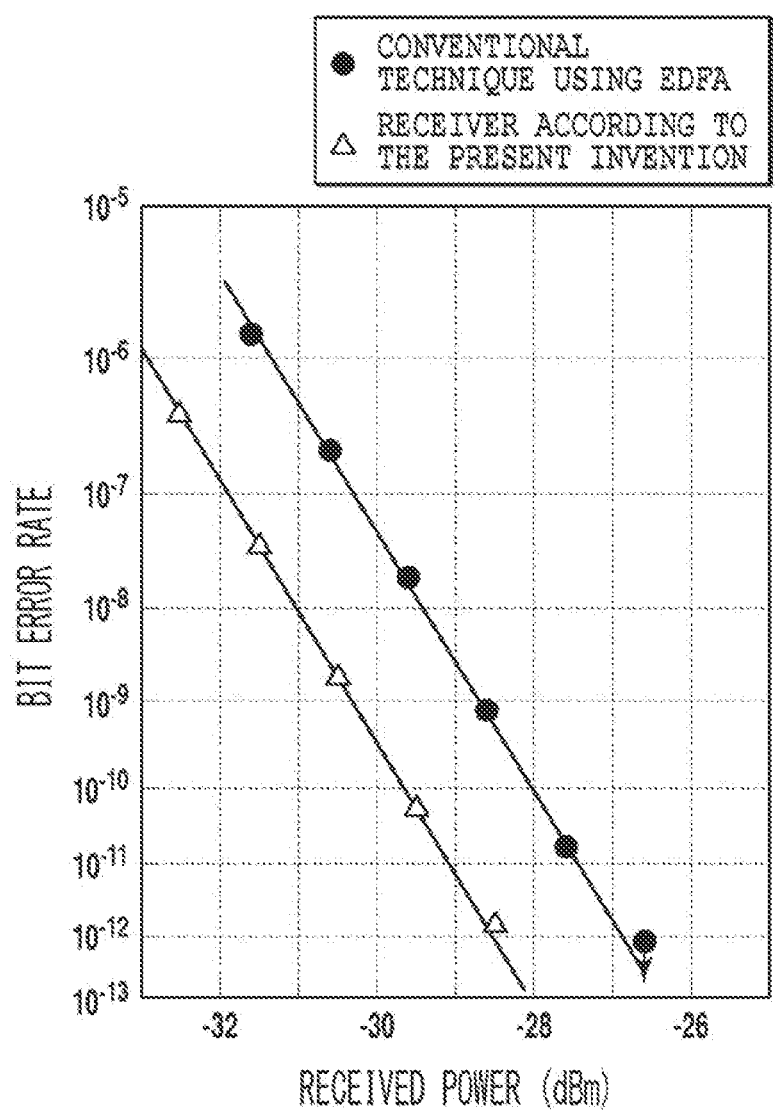
FIG. 27 is a graph illustrating the bit error rate characteristic for evaluating the receiver sensitivity of the phase sensitive amplifier according to the sixth embodiment of the present invention.

FIG. 27 shows the result of evaluating the receiving sensitivity of this embodiment obtained through the bit error rate measurement of an input signal attenuated by an optical attenuator. FIG. 27 shows the characteristic of the bit error rate for evaluating the receiving sensitivity. As an example, when the conventional EDFA was used, the incident power for providing an error rate of $10^{-9}$ was −28.8 dBm. On the other hand, this embodiment showed the same error rate at −30.3 dBm lower by about 1.5 dBm. As described above, it could be confirmed that the optical receiver by this embodiment using low-noise light amplification could provide improved receiving sensitivity. Such an effect can be realized only by the configuration of the present invention providing the low noise characteristic over a wide frequency bandwidth.

In this illustrative embodiment, according to the method of generating fundamental wave light for phase synchronization, a configuration was used in which light directly tapped from signal light was used and the phase synchronization system from modulated optical signal was not used. However, the method of generating fundamental wave light also may use the above-described methods according to the third to fifth embodiments.

Furthermore, in this illustrative embodiment, a configuration has been described in which an optical receiver was illustratively used to achieve both of a low noise characteristic and a high gain. However, even when the optical receiver is used as a linear repeater device, if both of a low noise characteristic and a high gain must be achieved for the purpose of increasing the relay interval for example, the configuration as described in this embodiment is very useful in which a phase sensitive amplifier and the EDFA are connected to multiple stages.

Seventh Embodiment

Figure 28A:
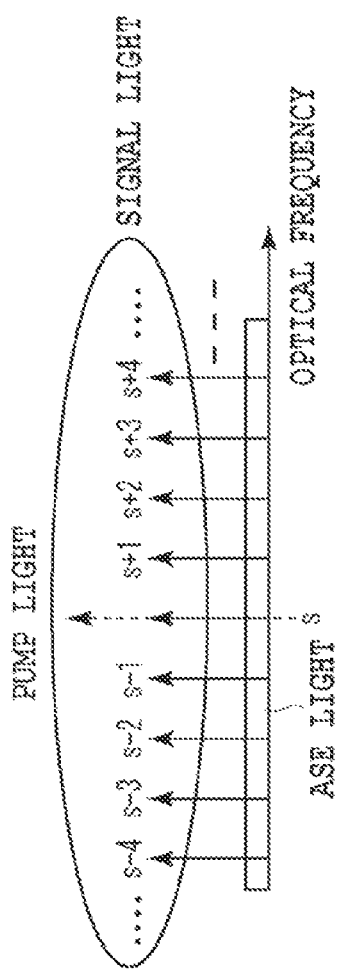
FIG. 28A illustrates a signal used in the seventh embodiment of the present invention.
Figure 28B:
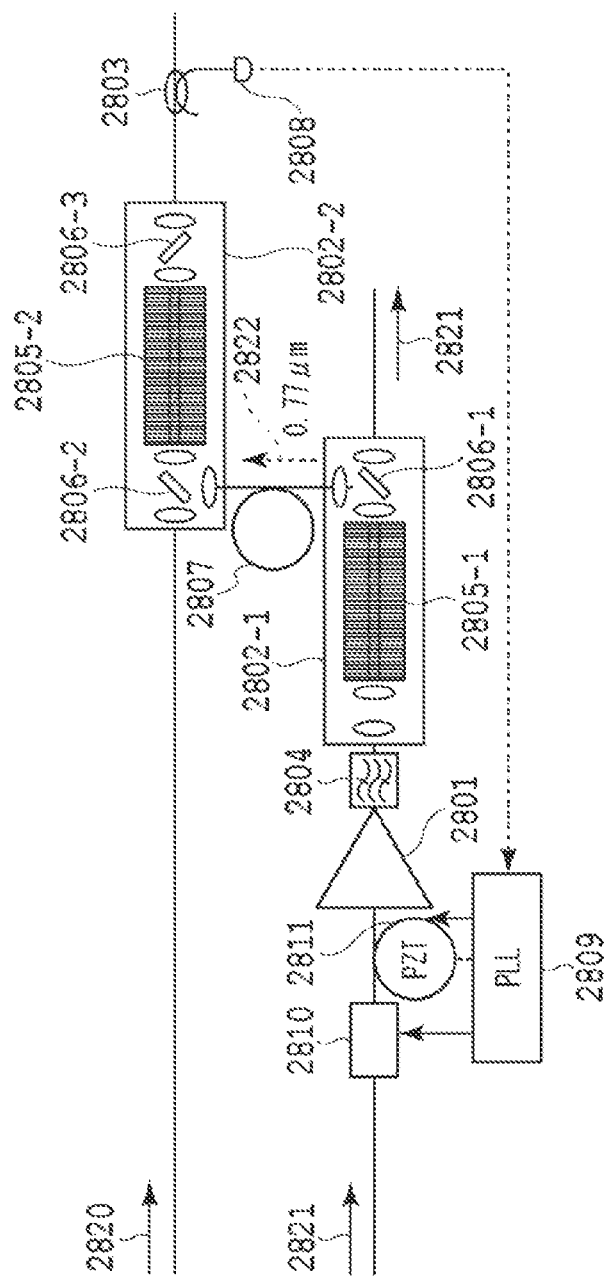
FIG. 28B illustrates the configuration of a phase sensitive amplifier according to the seventh embodiment of the present invention.

FIG. 28A and FIG. 28B are diagrams for explaining the configuration of the seventh embodiment of the phase sensitive amplifier according to the present invention. As shown in FIG. 28B, in this embodiment, in order to obtain sufficient power to induce (or generate) the nonlinear optical effect from weak laser light used for optical communication, the (or an erbium-doped) fiber amplifier (EDFA) 2801 is used to amplify the fundamental wave light 2821. The amplified fundamental wave light is input into the first second-order nonlinear optical element 2802-1 to thereby generate the second harmonic wave 2822. The signal light 2820 and the second harmonic wave 2822 are input into the second second-order nonlinear optical element 2802-2 to perform optical parametric amplification, thus performing phase sensitive amplification.

Although the details of the configuration shown in FIG. 28B will be described later, the configuration as described above provides an effect as described below that cannot be achieved by conventional technique. According to this embodiment, the CW light with a wavelength of 1.54 µm is used as fundamental wave light. As shown in FIG. 28A, a pair of signal lights (e.g., s+1 and s−1, s+2 and s−2, s+3 and s−3, s+4 and s−4) whose frequency is symmetric about a frequency of the fundamental wave light is used as input signal light.

The signal light group and the fundamental wave light are mutually phase-synchronized. The signal light and the fundamental wave light as described above can be generated, for example, by splitting the light from one light source and modulating one of the splitted light, by a modulator, to generate sideband waves.

As shown in FIG. 28B, the fundamental wave light 2821 pass through the phase modulator 2810 and the fiber expander 2811 using PZT and is amplified by the erbium-doped fiber amplifier (EDFA) 2801. After the amplification, the fundamental wave light pass through the bandpass filter 2804 to cut off unnecessary spontaneous emission light generated from the EDFA 2801. Then, the fundamental wave light is input into the PPLN waveguide 2805-1 of the first second-order nonlinear optical element 2802-1 and is converted to the light 2822 at a wavelength of 0.77 µm as a second harmonic wave of fundamental wave light 2821.

The signal light group 2820 and the second harmonic wave of fundamental wave light 2822 are multiplexed by the dichroic mirror 2806-2 and are subsequently input into the PPLN waveguide 2805-2 in the second second-order nonlinear optical element 2802-2. A signal light group is amplified by the optical parametric amplification in the PPLN waveguide 2805-2.

The following section will describe the details of the operation to amplify the signal light group. In this embodiment, each pair of input signals has the same phase. For example, the signals s+1 and s−1 are assumed to have the same phase information.

In the non-degenerate parametric amplification, the pump light (in this embodiment, the second harmonic wave of the fundamental wave light 2822), the signal light, and the idler light are input into second-order nonlinear optical element to perform an optical amplification by the nonlinear mutual action by the three lights. In the non-degenerate parametric amplification, both of the signal light and the idler light are amplified by parametric amplification when the three lights satisfy the following phase relations (formula 21).

$$\phi_{SH} = \phi_S + \phi_i + 2n\pi \text{ (n is an integer.)} \quad \text{(formula 21)}$$

In the formula, $\phi_{S\ H}$, $\phi_S$, and $\phi_i$ show the phases of the second harmonic wave of the fundamental wave light, the signal light, and the idler light. When assuming that the signal light and the idler light have the same phase as in the pair in this embodiment of the signal s+1 and the signal s−1, the following formula can be realized based on $\phi_i = \phi_S$.

$$\phi_S = \phi_{SH}/2 + n\pi = \phi_p + n\pi \text{ (n is an integer.)} \quad \text{(formula 22)}$$

In the formula, $\phi_p$ represents the phase of the fundamental wave light. The second harmonic wave has a phase $\phi_{S\ H}$ represented by $2\phi_p$.

As can be seen from (formula 22), when the signal light has the same phase as that of the fundamental wave light or has a phase shifted from that of the fundamental wave light by $\pi$, namely when one of two orthogonal phase components of the signal light is in-phase with the pump light of, parametric amplification is performed. When a signal pair with a phase relation orthogonal to the phase of fundamental wave light is input, the signal light is attenuated.

As described above, when a signal light pair with the same phase information is input, phase-sensitive parametric-amplification is performed. In this embodiment, since the signal light and the pump light is multiplexed by a fiber component, the temperature fluctuation or the fiber expansion and contraction due to vibration is compensated by the PLL technique. In this embodiment, the signal light pair symmetrically spaced on the frequency axis at the same interval is entirely phase-synchronized. Thus, signal light groups can be amplified.

Figure 5:
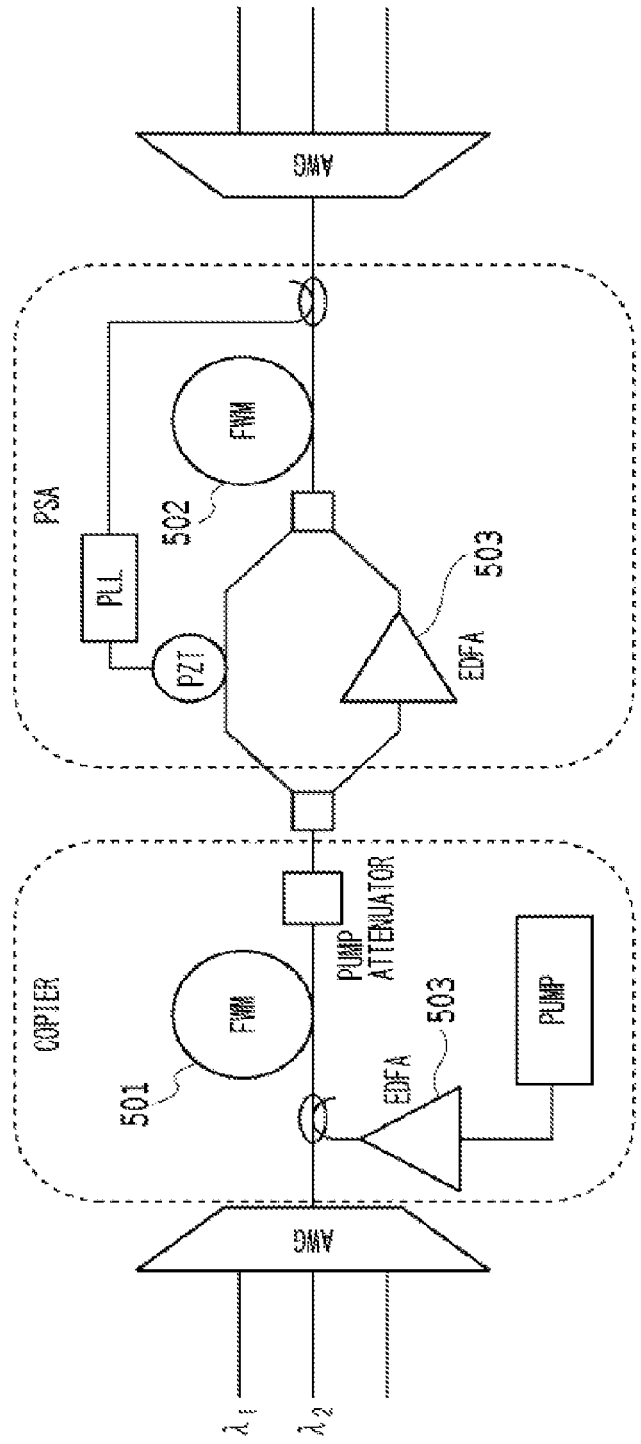
FIG. 5 is a schematic view for explaining a conventional amplification method of carrier waves of multiple wavelengths using the four-wave mixing in optical fibers.
Figure 30:
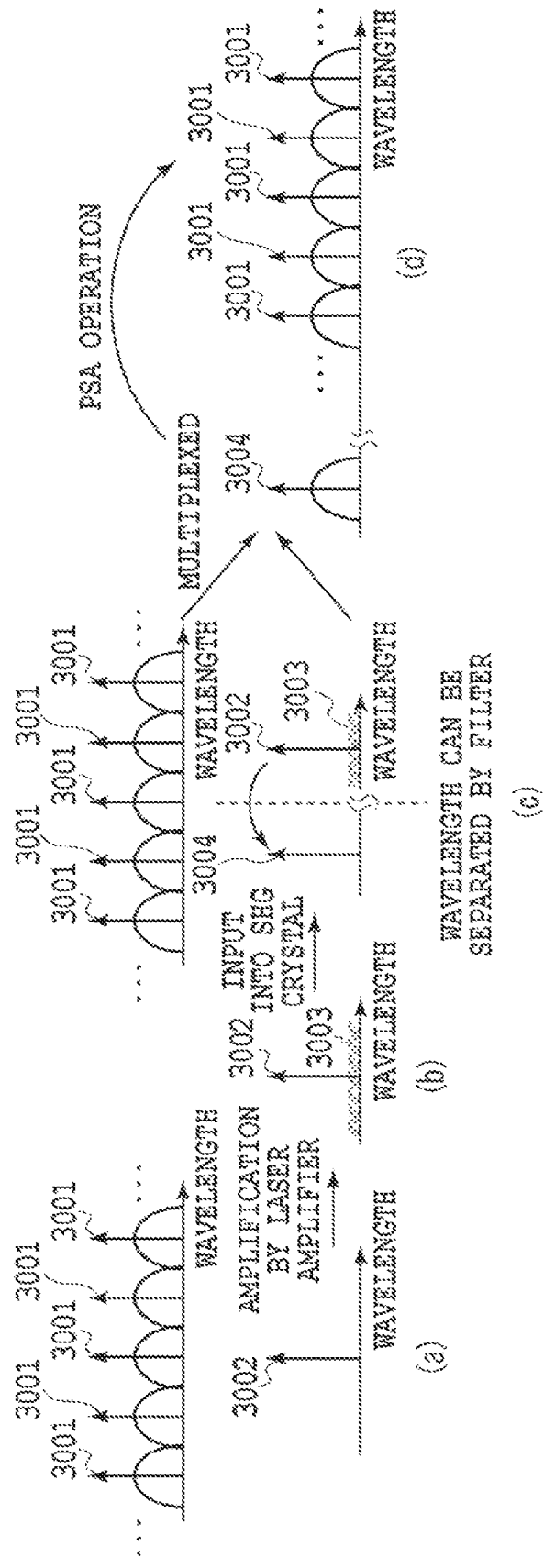
FIG. 30 is a diagram for explaining the operation of a phase sensitive amplification according to the seventh embodiment of the present invention.

FIG. 29 and FIG. 30 are schematic views of the spectra of the multi-carrier signal light and the pump light used in the phase sensitive amplification. FIG. 29 shows the configuration in which optical fibers are used as the conventional fiber laser amplifier and nonlinear medium shown in FIG. 5. FIG. 30 shows a case where the configuration shown in FIG. 28B according to this embodiment is used.

The conventional phase sensitive amplifier using conventional optical fibers uses a four-wave mixing. Thus, in order to allow the pump light and the multi-carrier signals for performing optical parametric amplification to have wavelengths satisfying the phase matching conditions, these wavelengths must be adjacent to one another. As illustrated in FIG. 29, when the multi-carrier signal light 2901 and the pump light 2902 have the same 1.55 µm wavelength band and the pump light 2902 is amplified by an optical fiber amplifier, the optical fiber amplifier undesirably causes the ASE light 2903 in the vicinity of the pump light wavelength.

In order not to mix the ASE light in the signal wavelength band, a configuration is possible in which the multi-carrier signal light is do not pass through the optical fiber amplifier. However, when the pump light and the multi-carrier signal light are multiplexed, the former and the latter have wavelengths close to each other, thus making it difficult to realize an ultra-narrow-bandwidth optical filter. Thus, the ASE light cannot be completely eliminated. As a result, the ASE light generated in the signal wavelength band is undesirably mixed in the multi-carrier signal wavelengths. Thus, S/N ratio of multi-carrier signal light is degraded due to the mixed ASE (FIG. 29(c)).

On the other hand, according to the configuration in this embodiment, in order to obtain sufficient power to generate optical parametric amplification from weak laser light used for optical communication, the fundamental wave light 3002 is amplified with the optical fiber amplifier. The ASE light 3003 is added on the wavelength around the fundamental wave light 3002 (FIG. 30(b)). In the configuration according to this embodiment, the fundamental wave light 3002 on which the ASE light 3003 is added is input into the first second-order nonlinear optical element to thereby generate the second harmonic wave 3004. Here, in a wavelength band around the second harmonic wave 3004 used as a pump light, wideband ASE light as noise does not generate except for the slight second harmonic wave of ASE light. The wavelength of the second harmonic wave 3004 is a half of that of the fundamental wave light 3002. The two wavelengths are sufficiently separated from each other. Thus, it is relatively easy to realize, by a dichroic mirror for example, a filter having a high extinction ratio to separate spectrally only the second harmonic wave 3004 from the fundamental wave light 3002 and the second harmonic wave 3004 of the fundamental wave light (FIG. 30(c)). By connecting such a filter to the output of the first second-order nonlinear optical element, the fundamental wave light and the ASE light of the pump light wavelength band can be completely removed. Next, only the multi-carrier signal light 3001 and the second harmonic wave 3004 are multiplexed and input into the second second-order nonlinear optical element. Thus, the phase sensitive amplification based on a non-degenerate parametric amplifier can be realized (FIG. 30(d)).

Furthermore, it was found that, as described below, the operation according to this embodiment could provide an advantage which is not provided by conventional technique.

In the conventional configuration in which the four-wave mixing in optical fibers is used to perform the phase sensitive amplification of the multi-carrier signal light, as shown in Non-patent Literature 7, this conventional configuration cannot cause only the four-wave mixing around the pump light wavelength as a center wavelength with the multi-carrier signal light but also phase-matching conditions are undesirably satisfied among various wavelengths. Thus, an additional process is undesirably caused for example in which the signal light around the pump light as a center wavelength is converted to have another wavelength. Thus, amplified signal lights are copied one by one, thus undesirably resulting in a plurality of signals (FIG. 29(c), 2904).

Due to this, the power of the amplified signal light is undesirably dissipated, thus limiting the power to amplify the desired signal light. Furthermore, an additionally-generated signal is undesirably generated among wavelengths of the signal light for example. Thus, it is very difficult to remove the additionally-generated unnecessary signals. In order to separate these unnecessary signals, a method using an ultra-narrow-band optical filter, for example, may be considered. However, the narrower band the optical filter has, the higher signal loss the filter has. AS the number of the wavelength multiplexing of the multi-carrier signal light becomes higher, the number of additionally-generated signals increases. As a result, an additional signal may be added in the wavelength band of the original signal light. In such a case, the separation with an optical filter is impossible, thus S/N ratio of the optical signal is degraded.

On the other hand, in this embodiment, only the signal light and the second harmonic wave are inputted into the second PPLN waveguide. Thus, an unwanted wavelength conversion process as in the conventional technique is prevented. In this embodiment, even when output power is increased to +22 dBm, no output saturation is observed and stable amplification can be performed. Furthermore, an unnecessary signal which is generated in the conventional configuration using four-wave mixing is not generated.

With reference to FIG. 28A and FIG. 28B again, the configuration of this embodiment will be described in detail. In this embodiment, the fundamental wave light 2821 is amplified by an erbium-doped fiber amplifier (EDFA) 2801. The amplified fundamental wave light is inputted into the first second-order nonlinear optical element 2802-1. In this embodiment, in order to prevent the wideband ASE light generated from the EDFA 2801 from being converted by the first second-order nonlinear optical element 2802-1, a band-pass filter 2804 is inserted between the EDFA 2801 and the first second-order nonlinear optical element 2802-1 to cut off unnecessary ASE light.

The second-order nonlinear optical elements (2802-1 and 2802-2) of this embodiment include an optical waveguides (2805-1 and 2805-2) consisting of periodically-poled lithium niobate (PPLN).

When high-intensity power is input into the PPLN waveguide, the phase-matching wavelength may change due to the optical damage caused by the photorefractive effect. In this embodiment, a waveguide by the direct bonding technique shown in Non-patent Literature 4 is used in order to avoid this problem.

In this embodiment, the fluctuation of the phase-matching wavelength is suppressed by a direct bonding waveguide that uses, as a core, Zn-doped lithium niobate having a superior optical damage resistance. Furthermore, a dry etching processing is used to reduce the core diameter to about 4 µm, thereby realizing high wavelength conversion efficiency.

The second harmonic wave 2822 and the fundamental wave light 2821 output from the first PPLN waveguide 2805-1 are separated spectrally by the dichroic mirror 2806-1.

The 0.77-µm second harmonic wave 2822 reflected by the dichroic mirror 2806-1 is guided to the second second-order nonlinear optical element 2802-2 via the polarization-maintaining fiber 2807 having a single mode propagation characteristic at this wavelength of 0.77 µm. During this, the fundamental wave light and ASE light at the wavelength of around 1.54 µm that could not be completely removed by the dichroic mirror 2806-1 are also input into polarization-maintaining fiber 2807. However, this fiber, which is in a single mode at 0.77 µm, weakly confines light at a wavelength of 1.54 µm, thereby attenuating these unnecessary light effectively, during propagating the fiber at a length of about 1 m.

The second harmonic wave output from the polarization-maintaining fiber 2807 is multiplexed by the dichroic mirror 2806-2 with the signal light 2820 at a wavelength of 1.54 µm. The dichroic mirror 2806-2 reflects only the second harmonic wave. Thus, the remaining components of the fundamental wave light at the wavelength of about 1.54 µm and the accompanying ASE light, which are emitted from the first PPLN waveguide 2805-1 through the dichroic mirror 2806-1 and the polarization-maintaining fiber 2807, can be removed effectively.

The signal light 2820 and the second harmonic wave 2822 are multiplexed by the dichroic mirror 2806-2 and are subsequently input into the second PPLN waveguide 2805-2. The second PPLN waveguide 2805-2 has the performance including phase-matching wavelength similar to those of the first PPLN waveguide 2805-1. Thus, using non-degenerate parametric amplification, the signal light can be amplified by phase sensitive amplification.

In this embodiment, the two PPLN waveguides (2805-1 and 2805-2) are controlled independently by the temperature controllers to have fixed temperature. There may be a case where a fabrication error of the two PPLN waveguides causes different phase-matching wavelengths even at the same temperature. Even in such a case, these two PPLN waveguides can be independently temperature-controlled in order to have the same phase-matching wavelength.

The light output from the second PPLN waveguide 2805-2 is separated spectrally by the dichroic mirror 2806-3 to the second harmonic wave as pump light and amplified signal light. Since the second harmonic wave and the amplified signal light have completely-different wavelengths, the unnecessary second harmonic component can be effectively removed at the output of the phase sensitive amplifier.

In the phase sensitive amplification, the phase of the pump light must be synchronized with the phase of the signal light.

In this embodiment, apart of the output amplified signal light is tapped by the light splitting section 2803 and is received by the photodetector 2808. Then, the light is phase-synchronized by the phase-locked loop circuit (PLL) 2809. The phase modulator 2810 placed in front of the EDFA 2801 is used to perform weak phase modulation by a sinusoidal wave to the fundamental wave light. The photodetector 2808 and the PLL circuit 2809 are used to detect the phase shift of the phase modulation. A feedback is provided to the driving voltage of the optical fiber expander 2811 by the PZT placed in front of the EDFA 2801 and the bias voltage of the phase modulator 2810. This consequently compensates the vibration of the optical fiber component and the fluctuation of the optical phase due to the temperature fluctuation, thus providing stable phase sensitive amplification.

By the way, when an optical comb is tapped by a splitting device and is modulated by a modulator and is subsequently multiplexed by a multiplexer, S/N ratio is generally degraded due to the large loss by the modulation. Furthermore, even when the optical comb is generated by the modulator, the optical power is reduced due to the modulator loss and the loss of the conversion to multi-carrier waves, and that degrades S/N ratio. Furthermore, when the attenuated optical comb is amplified by an optical laser amplifier such as EDFA, amplified spontaneous emission light (ASE light) is undesirably mixed. As a result, S/N ratio is degraded due to the amplification.

However, when the signal light group mixed with ASE light as described above is amplified by the amplifier according to this embodiment, a unique behavior which cannot be obtained in the conventional case was found, thus leading to this embodiment.

Figure 31A:
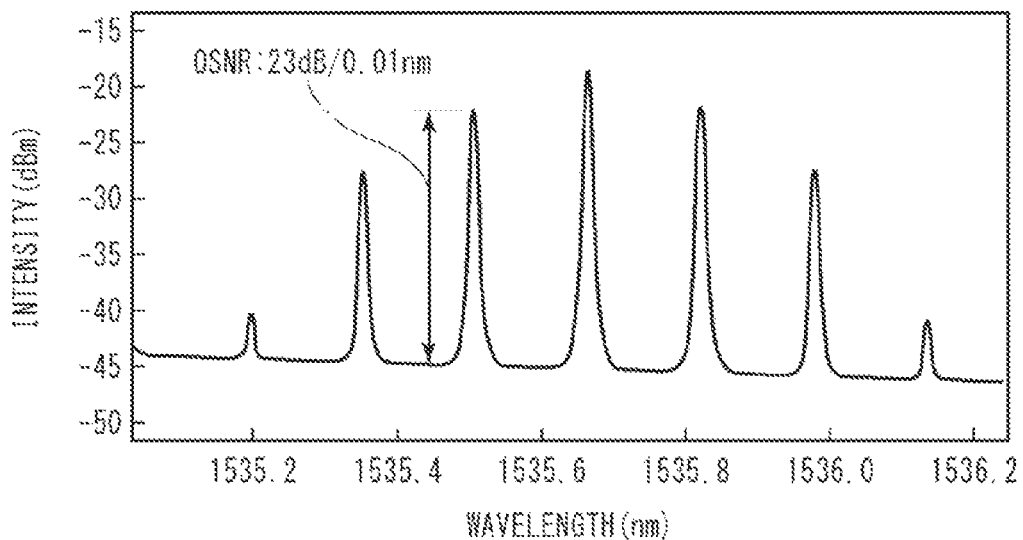
FIG. 31A is a diagram for explaining the effect when the phase sensitive amplifier according to the seventh embodiment of the present invention is used and shows the optical spectrum of a signal light group in which ASE light generated from EDFA is intentionally added.
Figure 31B:
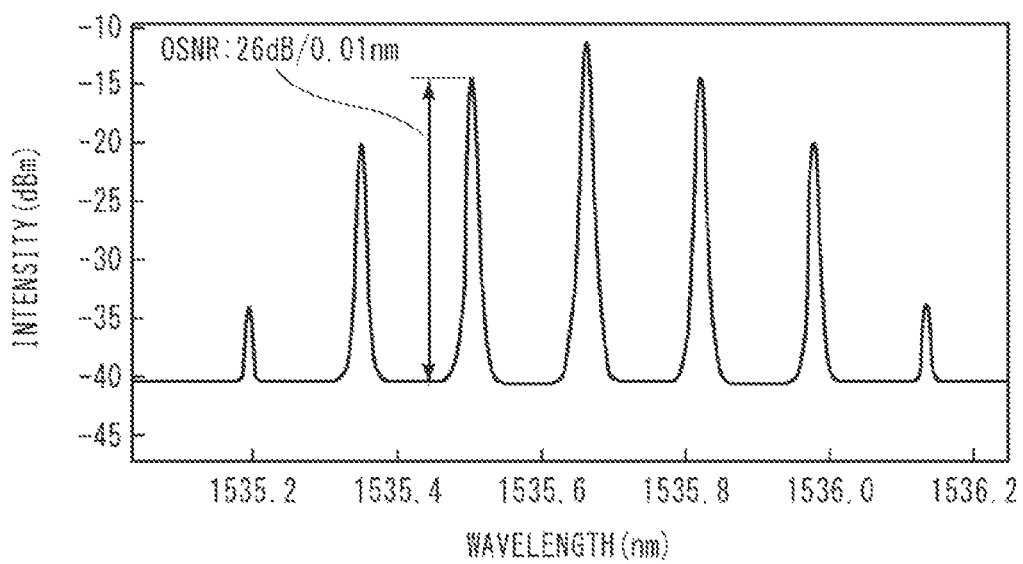
FIG. 31B is a diagram for explaining the effect when the phase sensitive amplifier according to the seventh embodiment of the present invention is used and shows the optical spectrum of the output when a signal light group in which ASE light generated from EDFA is intentionally added is amplified by the phase sensitive amplifier having the configuration according to the seventh embodiment of the present invention.

FIG. 31A and FIG. 31B illustrate the effect obtained by the use of the phase sensitive amplifier according to this embodiment. FIG. 31A shows the optical spectrum of the signal light group in which the ASE light generated from the EDFA is intentionally added. FIG. 31B shows the optical spectrum of the output when the signal light group in which the ASE light generated from the EDFA is intentionally added is amplified by the phase sensitive amplifier using the configuration according to the seventh embodiment of the present invention.

As can be seen from FIG. 31A and FIG. 31B, by amplifying the signal light group by the phase sensitive amplifier according to this embodiment, the optical-power difference between the amplified signal light and the ASE light (i.e., optical S/N ratio (OSNR)) is remarkably improved by 3 dB when compared with the input.

Following section will describe an example focused on one signal of a signal pair symmetrically separated from the center wavelength that has a shorter wavelength than the center wavelength. When the input signal light is measured at 0.01 nm resolution, 23 dB OSNR is observed as shown in FIG. 31A. On the other hand, as shown in FIG. 31B, the amplified output signal has OSNR of 26 dB, showing that the output optical S/N ratio is improved by about 3 dB when compared with the input light. The amplifier according to this embodiment depends on the polarization of the light. Thus, in order to fairly evaluate the S/N ratio, the evaluation of the input spectrum is performed by inserting a polarizer to compare between only one polarization component components to be amplified.

The reason why such a phenomenon is observed will be described as shown below.

First, the following section will describe the operation at a non-degenerating point except for a degenerating point at which the wavelength which is two times higher than that of the pump light is equal to the wavelength of the signal light. In this embodiment, a signal light pair having a fixed phase relation to the pump light is input. As in this embodiment, when the signal light pair with the same phase at the wavelength corresponding to the signal light wavelength and the idler light wavelength is input, as described above, all components of the signal light are amplified when the phase of the signal light synchronizes that of the pump light.

As in the PSA using optical fibers, by some wavelength conversion process using optical fibers or PPLN, idler light with phase information $\phi_i = -\phi_s + \alpha$ ($\alpha$ is a phase determined by the optical length which is determined by fiber length for example) which is conjugate to the phase of the signal light is generated. And, even when the signal light and the idler light are input, parametric amplification is performed when the phase relation among SH light, the signal light, and the idler light satisfy the following (formula 23).

$$\phi_{SH} = \phi_S + \phi_I + 2n\pi = \phi_S - \phi_S + \alpha + 2n\pi = \alpha + 2n\pi \text{ (wherein } n \text{ is an integer.)} \quad \text{(formula 23)}$$

When phase-conjugate signal-idler pair is input, when the phase a determined by the optical length is matched to the pump light, all components of the signal light are amplified. As described above, when the signal light and the pump light with a fixed phase relation are input, by properly controlling the optical length, all components of the signal light are amplified.

Next, the amplification of the input ASE light will be considered. When considering a relative phase to the phase $\phi_{S\_H}$ of the second harmonic wave, since the ASE contains random-phase light, the ASE is considered to equally contain in-phase and quadrature-phase components to the pump light.

When considering in particular the amplification of the ASE at the same wavelength as those of the signal and the idler light when the signal light and the idler light are input, when assuming that the ASE generated in the signal wavelength has a phase $\phi_{S-ASE}$ and the ASE generated in the idler wavelength has a phase of $\phi_{i-ASE}$, only the phase component satisfying the following (formula 24) is amplified by parametric amplification.

$$\phi_{SH} = \phi_{S-ASE} + \phi_{i-ASE} + 2n\pi \text{ (wherein } n \text{ is an integer.)} \quad \text{(formula 24)}$$

In the case of the ASE, in contrast with the above-described signal-idler pair with a fixed phase relation, the ASEs generated at the signal wavelength and the idler wavelength have random phases $\phi_{S-ASE}$ and $\phi_{i-ASE}$ that have no correlation with each other. Furthermore, $\phi_{S-ASE}$ and $\phi_{i-ASE}$ does not have a correlation with the phase $\phi_{SH}$ of the second harmonic wave. Thus, when $\phi_{S-ASE}$ is considered as being fixed, among $\phi_{i-ASE}$ that may have a random value, parametric amplification is performed only on a component with a conjugate phase to $\phi_{S-ASE}$ based on the phase $\phi_S$ of the second harmonic wave as a reference.

When considering the randomness of the phase of the ASE, the gain to the ASE is a half of that of the signal light with a correlation. Thus, the S/N ratio compared with regard to the optical spectrum can be improved by the optical amplifier according to this embodiment.

It is difficult for non-degenerate parametric amplification using optical fibers to obtain the effect as described above. The reason is that the amplification using four-wave mixing in the optical fibers utilizes the pump light, the signal light, and the idler light at the wavelength entirely within the 1.55-μm band and normally EDFA is used to generate pump light, therefore the wavelength of the signal light and the idler light close to the wavelength of the pump light are undesirably mixed with the ASE light generated from the EDFA. Furthermore, since the power of the pump light is relatively higher than that of the signal light or the idler light, the performance is degraded greatly by the noise due to the externally-mixed ASE light. Thus, as in this embodiment, such an effect cannot be obtained that can improve the S/N ratio.

On the other hand, in this embodiment, after the fundamental wave light is amplified by the EDFA, the fundamental wave light is converted to a second harmonic wave. Then, the ASE light of the 1.55-μm band is also removed, and the resultant light is input into the parametric medium and is used to perform non-degenerate parametric amplification. This can cut off the mixed ASE light generated by the EDFA used to generate pump light. Thus, this embodiment can improve the S/N ratio using the phase sensitive amplification between the signal light and the idler light.

Next, the following section will describe the operation at the degenerating point excepted in the above description at which the wavelength two times higher than that of the pump light is equal to the wavelength of the signal light.

As shown in FIG. 28A, in this embodiment, the signal light with the same wavelength that is two times higher than the wavelength of the pump light is also input. At this wavelength, the S/N ratio is improved according to FIG. 31A and FIG. 31B. However, as described below, when optical degenerate parametric amplification is performed by which the wavelength two times higher than that of the pump light is equal to the wavelength of the signal light, the comparison of the input and the output after the optical-to-electrical conversion does not show an improved S/N ratio. In the optical degenerate parametric amplification, amplification is performed when the following relation (formula 25) is satisfied between the signal light phase $\phi_S$ and the pump light phase $\phi^P$.

$$\phi_S = \phi_{SH}/2 + n\pi = \phi_p + n\pi \text{ (wherein } n \text{ is an integer.)} \quad \text{(formula 25)}$$

Specifically, only components in the signal light that are in-phase with the pump light phase are amplified. As is the same with the ASE light as input. Considering the random phase of ASE light, the gain is a half of the gain obtained when the signal light which is phase-synchronized with the pump light is input. Thus, the S/N ratio when compared with optical power is improved by 3 dB. This point is the same as in the operation at the non-degenerating point.

In the operation at the degenerating point, a component of the input ASE light that is in-phase with the signal light is amplified and the orthogonal phase component is attenuated. The orthogonal phase component, which is not amplified, appears as a difference in gain of the optical power. However, the component with an orthogonal phase to the signal light does not generate intensity noise even when interfering with the signal light. On the other hand, a component of the ASE light in-phase with the signal light, which interferes with the signal light and generates intensity noise, is amplified with the same gain as the signal. Thus, the phase sensitive parametric amplification in the degenerating point does not reduce the component of the ASE light interfering with the signal light. Therefore, there is no change in the S/N ratio after the optical-to-electrical conversion of the optical signal.

Next, the following section will describe the behavior of the S/N ratio after the optical-to-electrical conversion in the non-degenerate parametric amplification used in this embodiment. As described above, in the non-degenerate parametric amplification, the ASE light obtains a gain that is a half of that of the signal light. When considering the phase of the amplified ASE light, among the ASE light components as described above that are mixed with the wavelength of the signal light and the idler light, only those components satisfying the following (formula 26) are amplified.

$$\phi_{SH} = \phi_{S-ASE} + \phi_{i-ASE} + 2n\pi \text{ (wherein } n \text{ is an integer.)} \quad \text{(formula 26)}$$

In the operation at the degenerating point, only a component of the input ASE light that is in-phase with the pump light is amplified. On the other hand, in the operation at the non-degenerating point, the amplification only requires a condition that the phases of the ASE light at the signal light wavelength and the idler light wavelength satisfy a conjugate relation. Thus, not particular phase relation is required among the amplified ASE light, the signal light, and the idler light. Thus, unlike the operation at the degenerating point, in the operation at the non-degenerating point, it is considered that the amplified ASE light equally contains in-phase and quadrature-phase components of the signal light. Thus, both at the input and output, the ASE light has a random phase and the ASE light obtains a gain that is a half of that of the signal. Thus, the SN ratio determined by the beat noise by the ASE light after the optical-to-electrical conversion is improved by 3 dB after the amplification.

In the non-degenerating operation, the in-phase ASE light as intensity noise has an intensity that is a half of the intensity of the in-phase ASE light in the degenerating operation. The entire intensity of ASE light after the amplification is the same both in the degenerating operation and in the non-degenerating operation. Thus, when considering that only an in-phase component of the amplified ASE light causes intensity noise due to the interference with the signal, the non-degenerating operation provides the improvement of the SN ratio by 3 dB when compared with the degenerating operation.

In order to confirm this improvement of SN ratio, from the optical comb signal input into the amplifier of the present invention and an amplified optical comb signal, respectively, one carrier wave is separated by a bandpass filter. An optical attenuator is used to equalize the power of these signals. Then, an electrical spectrum analyzer containing an O/E converter is used to compare the level of the beat noise due to the signal light and the ASE light between these input and output signals.

Figure 32A:
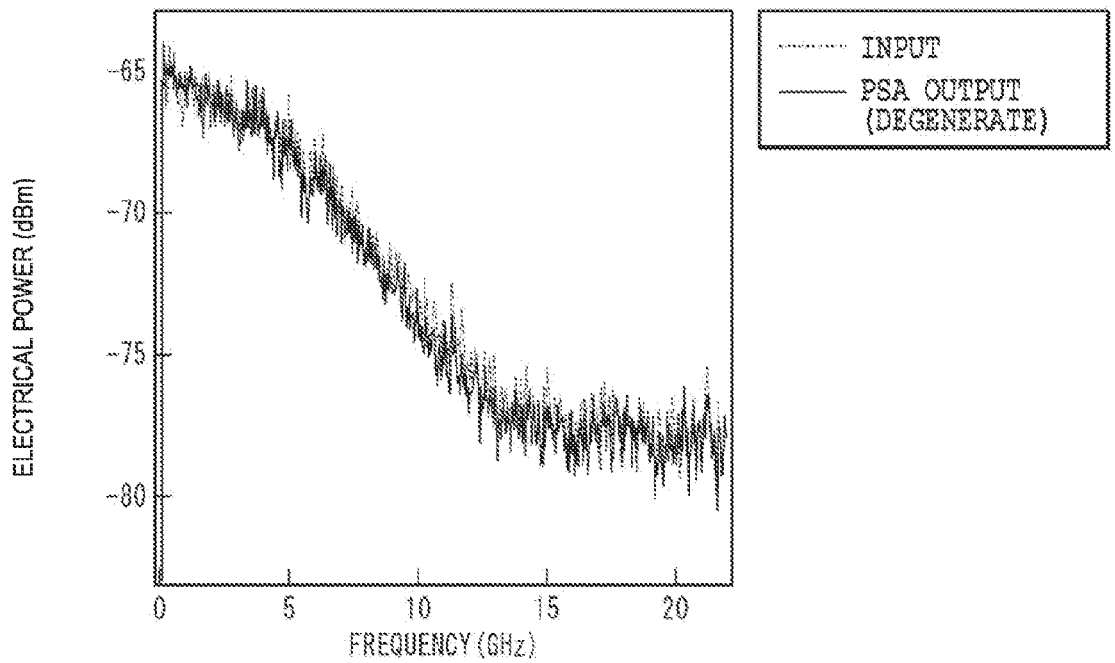
FIG. 32A is a diagram for explaining the effect of the phase sensitive amplifier according to the seventh embodiment of the present invention and shows the beat noise level between the signal light at the input and output amplified by the phase sensitive amplifier and the ASE light at a degenerating point.
Figure 32B:
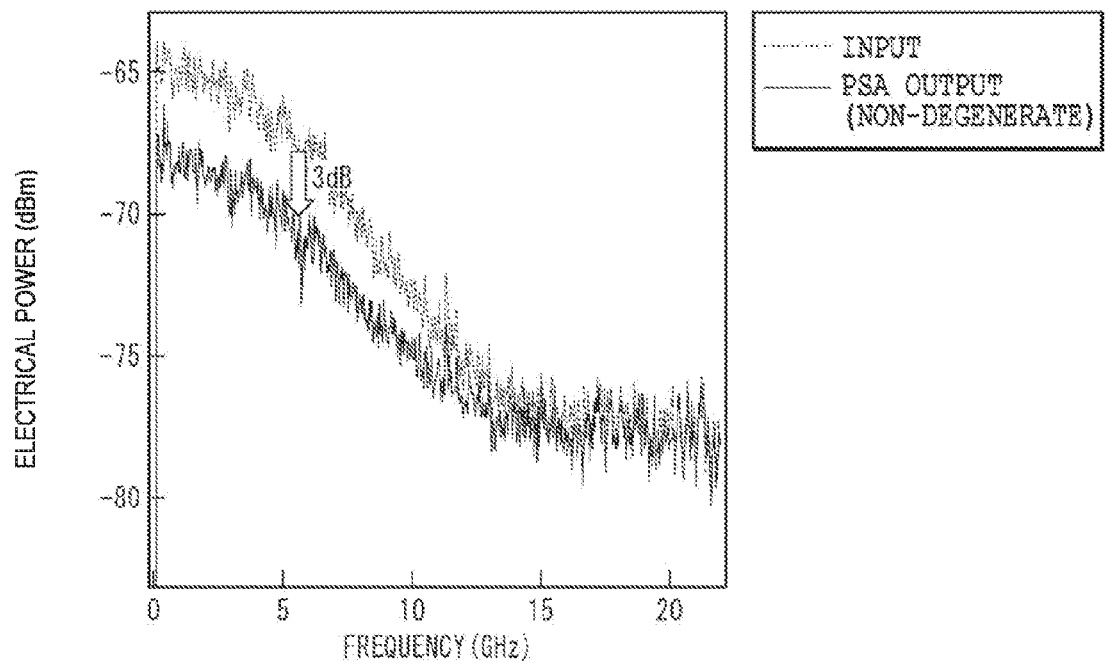
FIG. 32B is a diagram for explaining the effect of the phase sensitive amplifier according to the seventh embodiment of the present invention and shows the beat noise level between the signal light at the input and output amplified by the phase sensitive amplifier and the ASE light at a non-degenerating point.

FIG. 32A and FIG. 32B show the result of the level of beat noise due to the signal light and ASE light, between the input and output signals, measured by an electrical spectrum analyzer. As shown in FIG. 32A, when the peak of the degenerating point is observed, no difference is observed in the noise level between the input and output of the amplifier. On the other hand, as shown in FIG. 32B, when the peak of the non-degenerating point is observed, it is observed that the noise level is reduced by 3 dB due to the amplification (i.e., the S/N ratio is improved by 3 dB). As described above, according to this embodiment, by amplifying a signal which is amplified by a laser amplifier with a degraded S/N ratio, a remarkable effect can be obtained that the S/N ratio can be improved than the input.

A data-modulated signal was input into the phase sensitive amplifier according to this embodiment. Then, the effect of improving the S/N ratio according to this embodiment was investigated.

Figure 33:
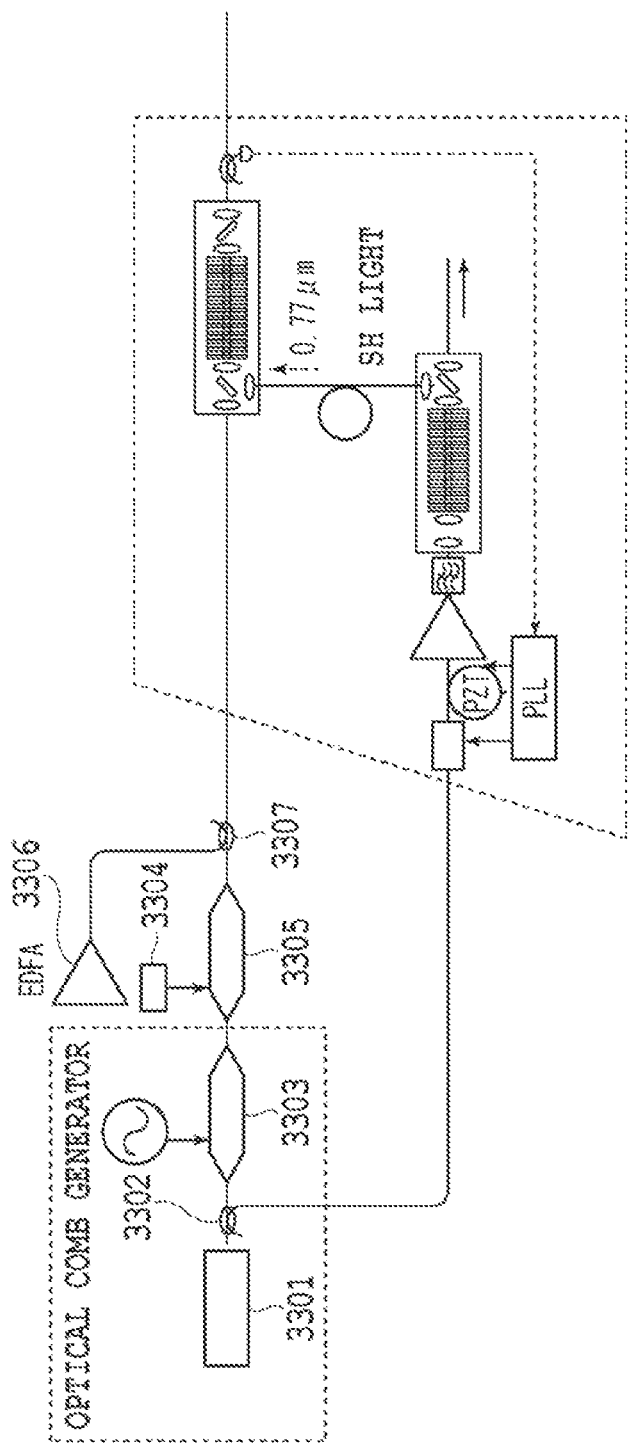
FIG. 33 is a diagram for explaining the configuration, according to the configuration of the seventh embodiment of the present invention that is used to investigate the effect of improving the S/N ratio by the amplification of an optical comb signal with data modulation.

FIG. 33 shows the experiment configuration to investigate the effect of improving the S/N ratio using a data-modulated optical comb signal. The optical comb generated by modulating the single wavelength light source 3301 by the optical modulator 3303 is modulated with the LN modulator 3305 for BPSK modulation. Then, the modulated optical comb is input into the phase sensitive amplifier according to this embodiment shown in FIG. 28B.

In actual modulation of an optical comb, in order to compensate for the loss due to the generation of an optical comb and the data modulation, the signal is subsequently amplified by a laser amplifier such as EDFA. During this amplification, the noise due to the ASE light is undesirably added to the signal.

In the experiment for evaluating this embodiment, in order to investigate the effect of improving the S/N ratio, ASE noise is intentionally added, via the EDFA 3306, to a data-modulated optical comb signal.

The fundamental wave light which input into the phase sensitive amplifier was obtained by splitting the light from the single wavelength light source 3301 used to generate an optical comb. The peak of the non-degenerating point is separated from the signals before and after the amplification by the demultiplexer. The received power was controlled by an optical attenuator and was received by a receiver.

Figure 34:
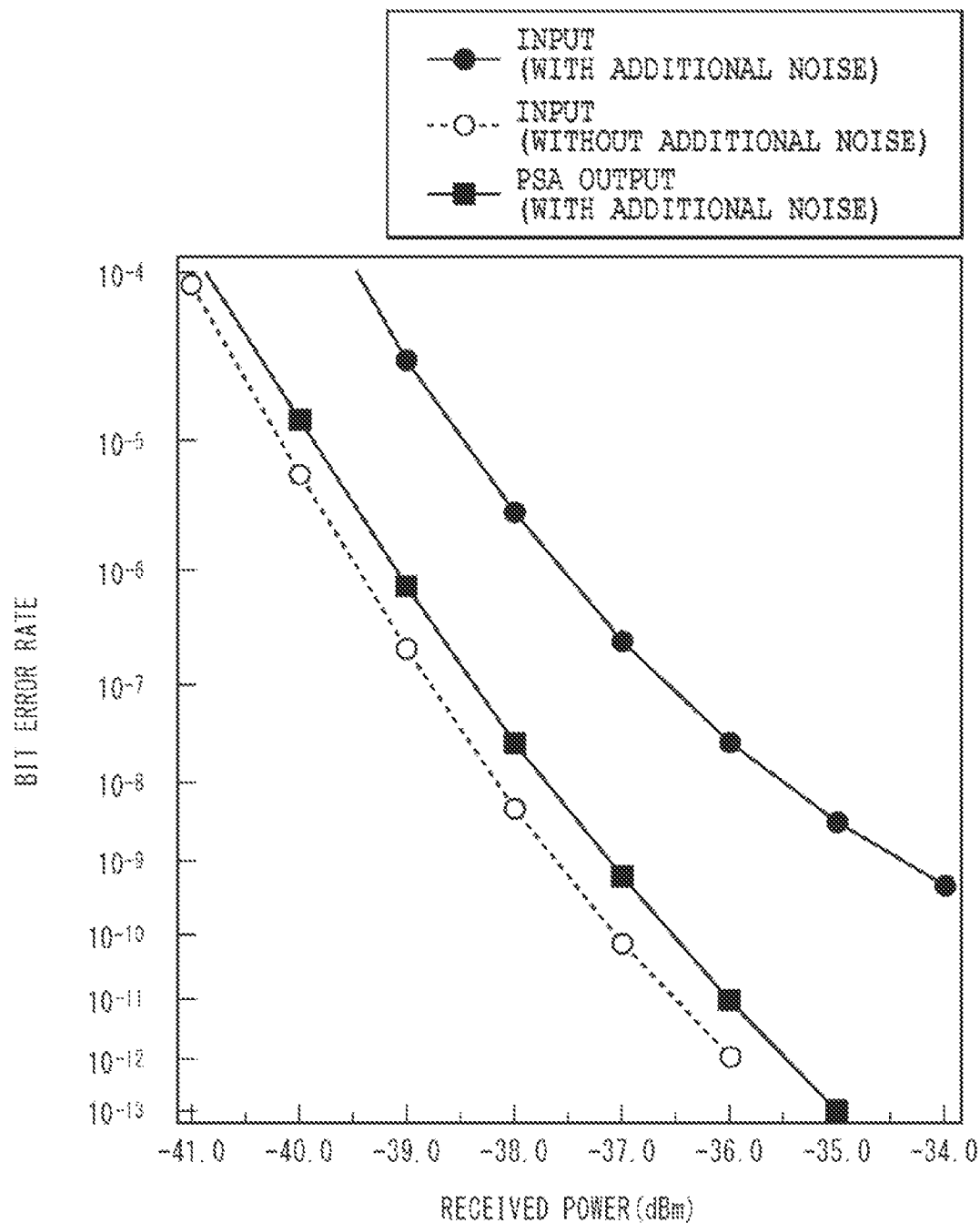
FIG. 34 is a graph for illustrating the effect of the phase sensitive amplifier according to the seventh embodiment of the present invention.

FIG. 34 shows the data of the bit error rate as a function of the received power. When an optical comb with an optical power which is attenuated by the loss due to the generation of the optical comb and the data modulation is amplified by an optical laser amplifier such as EDFA, a disadvantage is caused in which amplified spontaneous emission light (ASE light) is undesirably mixed and thus the S/N ratio is undesirably degraded by the amplification. As can be seen from the result shown in FIG. 34, when the ASE noise is intentionally added, a very-high received power is required to obtain the same bit error rate as that for the case where no ASE noise is added.

However, the bit error rate of output signal obtained by input the signal to which the ASE noise is intentionally added into the phase sensitive amplifier according to this embodiment showed a significant improvement when compared with original input signal to which the ASE noise was added at the same received power. With regard to the bit error rate of $10^{-9}$, the use of the phase sensitive amplifier according to the present invention showed a significant improvement of the power penalty due to the ASE noise by 3 dB.

In this embodiment, the second harmonic wave was used as pump light. However, as in the fifth embodiment, a sum frequency light as pump light also may be used to configure the phase sensitive amplifier for the non-degenerating signal. In this embodiment, as periodically-polled second-order nonlinear optical material, Zn-doped lithium niobate ($LiNbO_3$) was used. However, the invention is not limited to lithium niobate. Thus, the same effect also can be obtained by typical second-order nonlinear optical materials can also be used including, for example, mixed crystal of lithium niobate and lithium tantalate ($LiNb_xTa_{1-x}O_3$ ($0 \leq x \leq 1$), potassium niobate ($KNbO_3$), potassium titanyl phosphate ($KTiOPO_4$). A dopant to the second-order nonlinear optical material is not limited to Zn and Mg, Zn, Sc, In, or Fe also may be used instead of Zn or no dopant may be added.

Eighth Embodiment

Figure 35:
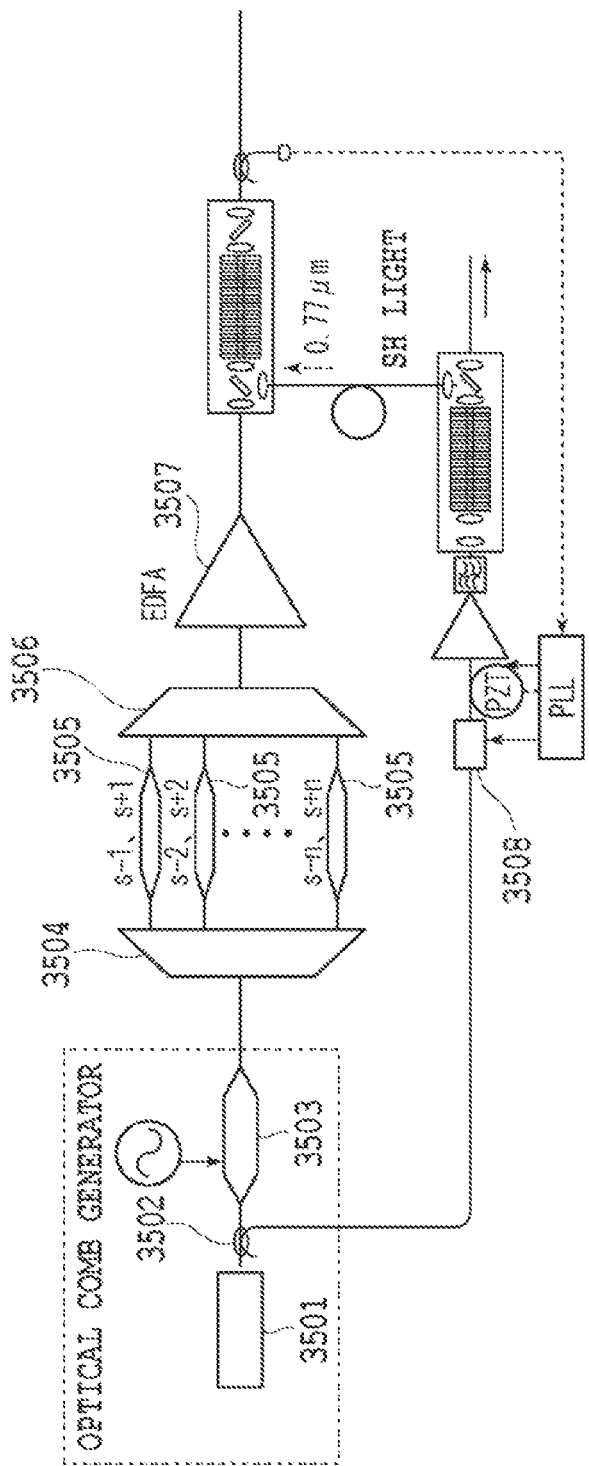
FIG. 35 is a diagram for explaining the configuration of an optical transceiver including a phase sensitive amplifier according to the eighth embodiment of the present invention.

FIG. 35 shows the configuration of the eighth embodiment of the phase sensitive amplifier in the present invention. The single wavelength light source 3501 generates CW light of 1.54 µm. The modulator 3503 is used to generate an optical comb composed of signal light pairs (e.g., s+1 and s−1, s+2 and s−2, s+3 and s−3, s+4 and s−4) symmetrically spaced from the frequency corresponding to double of the wavelength of the fundamental wave light with the same light frequency difference.

In this embodiment, an optical comb generator that is composed of the single wavelength light source 3501 and the optical modulator 3503 is used. On the other hand, other methods such as a method for using a mode-locked laser as a light source and a method for using a nonlinear optical medium to generate an optical comb can also be used to obtain an optical comb.

The respective wavelengths of the optical comb were splitted from multiple wavelengths by using an optical demultiplexer 3504 designed to output two wavelengths which are symmetrically spaced from one wavelength of multiple wavelengths with the same frequency difference, to the same optical path. The optical demultiplexer may be a waveguide optical multiplexer/demultiplexer like an array waveguide grating (AWG: Arrayed Waveguide Grating), or a free-space optical multiplexer/demultiplexer like a WSS (Wavelength Selective Switch) using MEMS.

The respective outputs of the optical demultiplexer 3504 are connected to the optical modulator 3505 to perform data modulation to the respective signal light pairs. Next, the multiplexer 3506 is used to multiplex the respective signal light pairs. Thereafter, the laser amplifier 3507 such as EDFA is used to amplify the signals. In the configuration shown in FIG. 35, after the data modulation signals are multiplexed, the signals are collectively amplified. When the data modulation can be performed by a semiconductor modulator in which semiconductor amplifier such as SOA is integrated, for example, the respective signal light pairs can be amplified by the laser amplifier and can be subsequently multiplexed as shown in FIG. 36.

Figure 36:
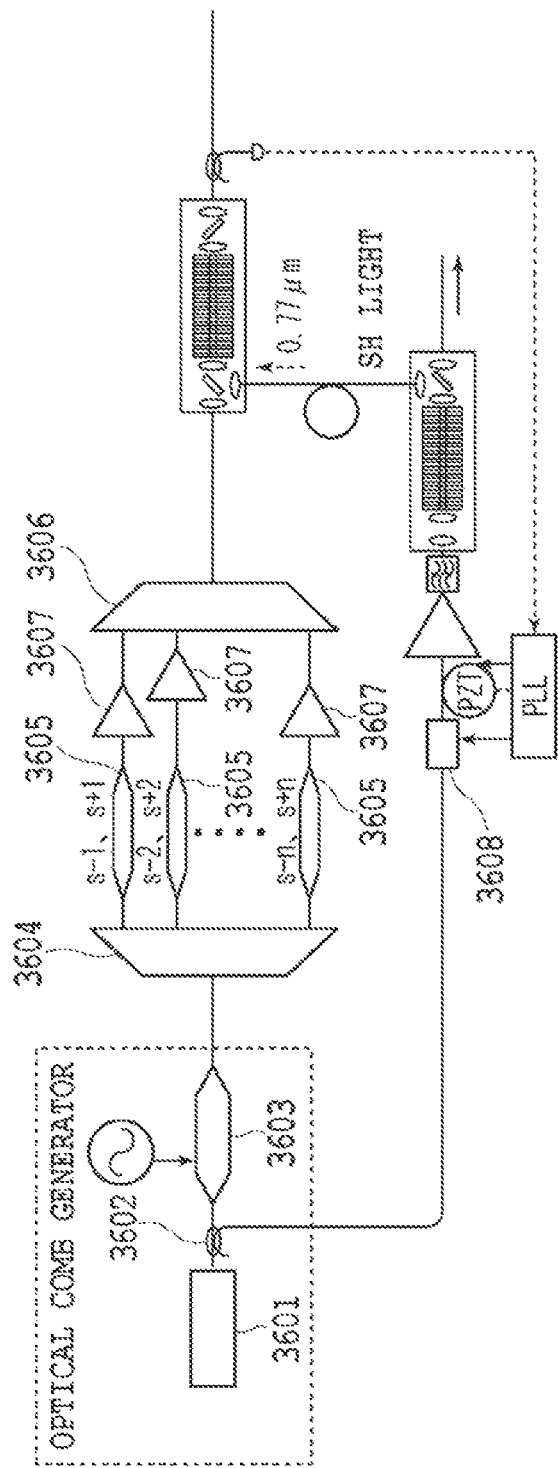
FIG. 36 is a diagram for explaining another example of the configuration of an optical transceiver including a phase sensitive amplifier according to the eighth embodiment of the present invention.
Figure 37:
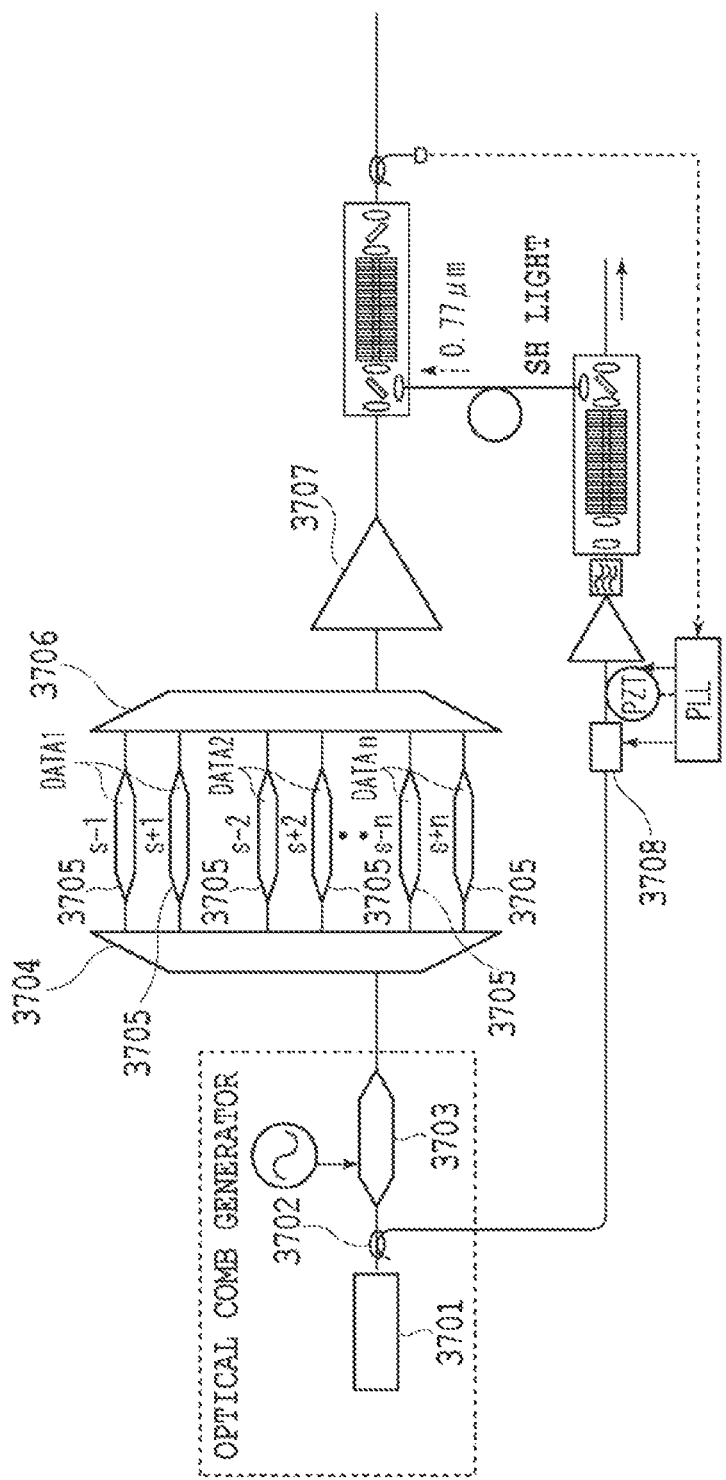
FIG. 37 is a diagram for explaining another example of the configuration of an optical transceiver including a phase sensitive amplifier according to the eighth embodiment of the present invention.

In the configurations shown in FIG. 35 and FIG. 36, data modulation are performed to the respective signal pairs after an optical demultiplexer that outputs a pair of two wavelengths symmetrically spaced from one wavelength of multiple wavelengths with the same frequency difference to a single optical path is used. On the other hand, another configuration as shown in FIG. 37 also may be used, in which the optical demultiplexer 3704 for separating the respective wavelengths of the optical comb and the optical modulator 3705 connected to the respective outputs of the optical demultiplexer are used to modulate a signal pair of the optical comb symmetrically spaced from one wavelength of multiple wavelengths with the same frequency difference, by using the same data.

The process of generating an optical comb undesirably causes the reduction of the optical power according to the loss of the modulator or the conversion loss for multiple carrier waves. When the optical comb signals are splitted by the optical demultiplexer and data modulation is performed by the modulator and then the signals are multiplexed by the multiplexer, the insertion loss of the respective components remarkably reduces the power compared with the power of the original optical comb signals. When an optical amplifier based on conventional laser medium is used to amplify signals to the power level required for the optical fiber transmission, the S/N ratio of the optical signal is remarkably degraded due to the small input power to the optical amplifier. Although the principle of the low-noise optical amplification with the phase sensitive amplifier has been known, simultaneous amplification of multiple carrier waves have not been realized because the conventional phase sensitive amplifier based on degenerate optical parametric amplification amplifies one signal wavelength.

However, by using the phase sensitive amplifier in this embodiment, an optical comb with multiple wavelengths can be amplified with low noise. Furthermore, as a remarkable effect, it can be provided that the S/N ratio degraded by the beat noise between signal light and ASE light can be improved than that of the input by using the phase sensitive amplifier in this embodiment.

The fundamental wave light of the phase sensitive amplifier was obtained by splitting lights output from a single wavelength light source which is used to generate an optical comb. The optical comb signal was input into the phase sensitive amplifier in this embodiment. As a result of the examination for the optical S/N ratio (OSNR) of the respective input and output and the S/N ratio after the optical-to-electrical conversion, an output signal showed the S/N ratio improved by 3 dB as compared with the S/N ratio of the input signal. By using the configuration in this embodiment, the S/N ratio degraded by the beat noise, which is intensity noise, between the signal light and the ASE light was improved.

In addition to the effect of improving the S/N ratio, by using the configuration in this embodiment, a synergetic effect of suppressing a phase chirp component also can be obtained by attenuating a quadrature phase component. In order to confirm the amplification characteristic, the amplified signal light was measured to obtain the temporal waveform.

Figure 38A:
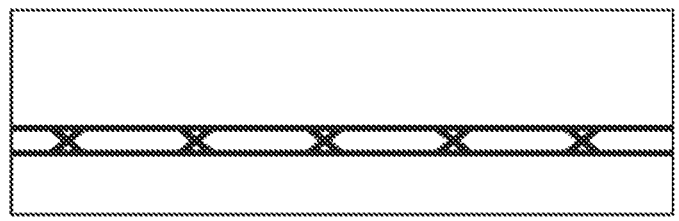
FIG. 38A illustrates the temporal waveform of a signal amplified by the phase sensitive amplifier according to the eighth embodiment of the present invention and shows the output waveform when no pump light enters.
Figure 38B:
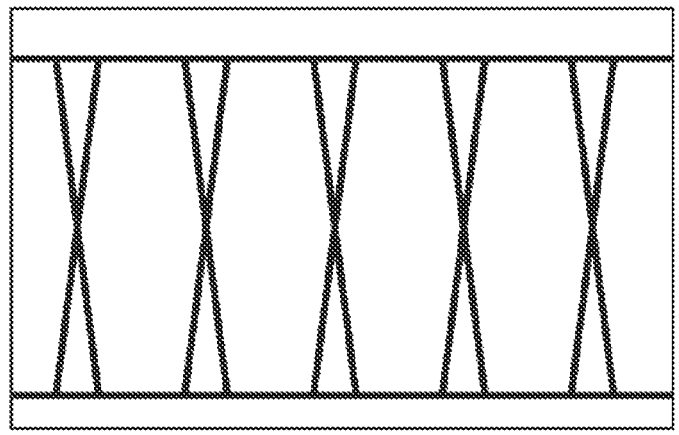
FIG. 38B is a diagram for explaining the temporal waveform of the signal amplified by the phase sensitive amplifier according to the eighth embodiment of the present invention and shows the output waveform when the phase of the pump light has the same as that of the signal light.
Figure 38C:
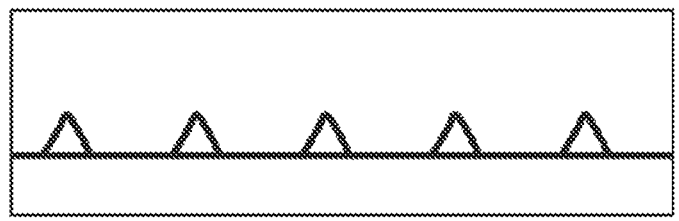
FIG. 38C is a diagram for explaining the temporal waveform of the signal amplified by the phase sensitive amplifier according to the eighth embodiment of the present invention and shows the output waveform when the phase of the pump light has orthogonal to that of the signal light.

FIG. 38A, FIG. 38B, and FIG. 38C illustrate the temporal waveform of the signal light amplified by the phase sensitive amplifier in this embodiment. FIG. 38A shows the output waveform of the signal light when no pump light was input. FIG. 38B shows the output waveform when PLL is used to match the pump light phase with the signal light phase. FIG. 38C shows the output waveform when the phase of the pump light is set to be orthogonal to that of the signal light with PLL.

As shown in FIG. 38C, when the phase of the pump light is set to be orthogonal to that of the signal light, the ON level of the signal is attenuated. This shows that phase sensitive amplification is achieved. A waveform which indicated that only a transient part between the ON level and the OFF level of the signal was amplified was observed. This shows that phase noise was superposed on the signal light.

For example, when a modulator in which only one arm is used for phase modulation is used for data generation, chirping is caused by the modulation. Specifically, the transition between ON and OFF causes the fluctuation of the modulator output. When the ON status is used as a reference, a quadrature phase component is generated. And then, when the signal light phase and the pump light phase are set to be orthogonal to each other, only a phase chirp component is phase-sensitively amplified. This shows that even though the input signal includes a phase chirp component, the chirp component can be removed and an amplified chirpless signal can be obtained when the phase of pump light is matched to the phase of the signal light at the ON status.

The configuration shown in FIG. 35 was used to transmit signals generated by using the configuration in the second embodiment through the optical fibers. The result shows that a three-times-or-more long transmission distance can be obtained by the effect of removing the beat noise, which is intensity noise, between signal light and ASE light and the effect of suppressing a phase chirp component.

Figure 39:
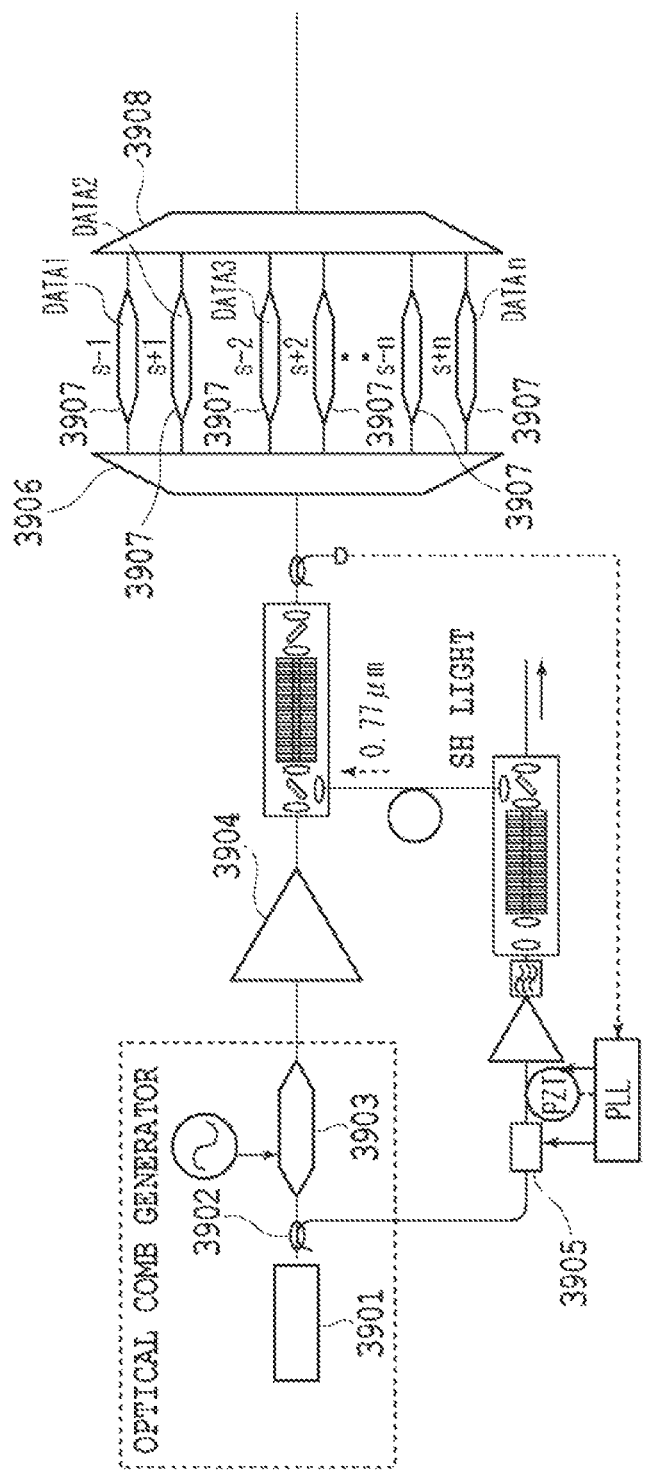
FIG. 39 is a diagram for explaining another example of the configuration of the phase sensitive amplification according to the eighth embodiment of the present invention.

Next, the following section will describe another configuration of the eighth embodiment. FIG. 39 shows another configuration of the eighth embodiment of the phase sensitive amplifier in the present invention. The single wavelength light source 3901 and the modulator 3903 are used to generate an optical comb composed of signal light pairs (e.g., s+1 and s−1, s+2 and s−2, s+3 and s−3, s+4 and s−4) symmetrically spaced from the center light frequency corresponding to the double of the wavelength of the pump light with the same light frequency difference. In the process of generating the optical comb, in order to compensate for the loss of modulator or the conversion loss for multiple carrier waves, a laser amplifier 3904 such as EDFA is used to amplify the optical comb signal. The fundamental wave light for the phase sensitive amplifier is obtained by splitting signal light output from the single wavelength light source 3901 to generate an optical comb. Then, the optical comb signal is input into the phase sensitive amplifier and is amplified.

The optical comb signal was input into the phase sensitive amplifier in the present invention. Using the same method as shown in the seventh embodiment, the optical S/N ratio (OSNR) of the respective input and output and the S/N ratio after the optical-to-electrical conversion were examined. The result showed that the S/N ratio of output signal from the phase sensitive amplifier in this embodiment improved by 3 dB as compared with the S/N ratio of the input signal. As shown in FIG. 39, after a conventional laser amplifier 3904 was used to amplify the optical comb signal, the phase sensitive amplifier in the present invention could generate an optical comb signal with a high S/N ratio.

Data modulation was individually performed to the respective combs by the optical modulator 3907 connected to the respective outputs of the optical demultiplexer 3906 after the respective combs were splitted by the optical demultiplexer 3906 for separating the respective wavelengths of the optical comb. Then, the optical multiplexer 3908 was used to input the optical comb signal into an optical fiber to send the signal.

By using the phase sensitive amplifier in this embodiment, a signal with a high S/N ratio could be generated. Therefore the transmission distance could be increased.

Ninth Embodiment

Figure 40:
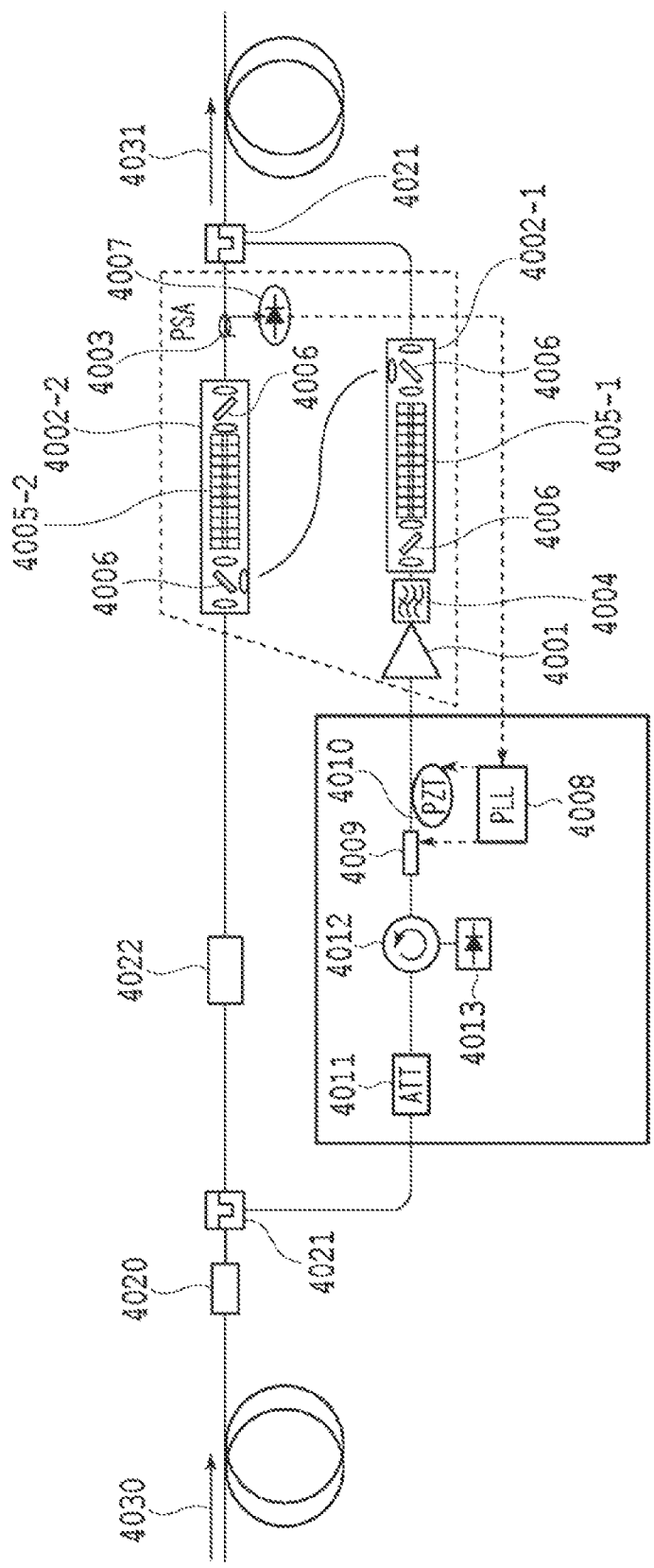
FIG. 40 is a diagram for explaining the configuration of the phase sensitive amplification according to the ninth embodiment of the present invention.

When a light source generating a signal light is located close to phase sensitive amplification section for the case in which the phase sensitive amplifier is used immediately after the transmission of an optical signal, a part of the signal light can be splitted and the splitted light can be used as fundamental wave light. On the other hand, when the phase sensitive amplifier is used as a repeater amplifier for optical transmission or a preamplifier at a receiver end, the phase synchronization system must be used to synchronize the pump light phase and the signal light phase in the phase sensitive amplifier to satisfy the relation of (formula 1). As a phase synchronization system, the configuration of the phase sensitive amplifier in the ninth embodiment of the present invention using a center wavelength signal is shown in FIG. 40.

In this embodiment, as input signals, data signals in which the center wavelength signal of the multiple-wavelength signal lights is a pilot tone of CW light is used. Binary phase modulation is performed to a signal light pair (e.g., s+1 and s−1, s+2 and s−2, s+3 and s−3, s+4 and s−4) symmetrically spaced from one frequency of the multiple-wavelength signal lights with the same light frequency difference. The signal of the center wavelength is not modulated. These signals of multiple wavelengths with a pilot tone of CW light at center wavelength is used as the signal light 4030.

The modulated signal light 4030 of which the center wavelength is the pilot tone of the CW light is transmitted through the transmission medium. The transmission medium was optical fibers. The rotation of the polarization in the optical fibers is corrected by the polarization controller 4020. Then, the pilot tone of the CW light was separated using a notch filter 4021 for obtaining only the center wavelength.

The signal light intensity was very small and the S/N ratio is degraded due to the transmission loss of the optical fibers. After the intensity of the pilot tone was adjusted by the attenuator 4011, the fundamental wave light source 4013 in the phase sensitive amplifier was optically injection-locked through the circulator 4012. The fundamental wave light source 4013 was a DFB semiconductor laser.

The attenuator 4011 was used to change the intensity of the light input into the fundamental wave light source 4013. Then, examination was made by the optical spectrum analyzer. When the light intensity was a few dozens of μW, it was observed that the wavelength of the semiconductor laser was moved to the pilot tone wavelength. This shows that the fundamental wave light source in the phase sensitive amplifier is phase-locked to the pilot tone. As a result, the pump light with a superior S/N ratio could be generated from the pilot tone of the signal light with a degraded S/N ratio.

The phases of each pair of signal lights with multiple wavelengths were shifted due to the dispersion effect in the optical fibers. In order to compensate for the shifted phases, a dispersion compensation (adjustment) medium 4022 was inserted in the phase sensitive amplifier. The dispersion compensation (adjustment) medium was composed of a phase shifter using liquid crystal such as LCOS. Another method (e.g., using fibers with an opposite dispersion) also may be used to adjust the phases. The phases of the signal-light pair were adjusted by using the phase shifter (not shown).

When the fundamental wave phase-locked with the pilot tone of the signal lights was used for the phase sensitive amplification described in the seventh embodiment to perform optical amplification. The result showed the similar characteristic as that of the first embodiment. According to the configuration in this embodiment, by using the phase synchronization system, phase sensitive amplification could be obtained even in the place in which a light source generating signal light is not placed close to the phase sensitive amplification section, for example in a repeater amplifier or in a preamplifier at a receiver end.

In this embodiment, the signal light of a degenerate wavelength is phase-locked by using the pilot tone. On the other hand, other methods can also be used. Among the methods shown in the third to fifth embodiments described with regard to the amplification of a degenerate signal, any phase synchronization system and phase recovery method for carrier wave also may be used.

Tenth Embodiment

Figure 41:
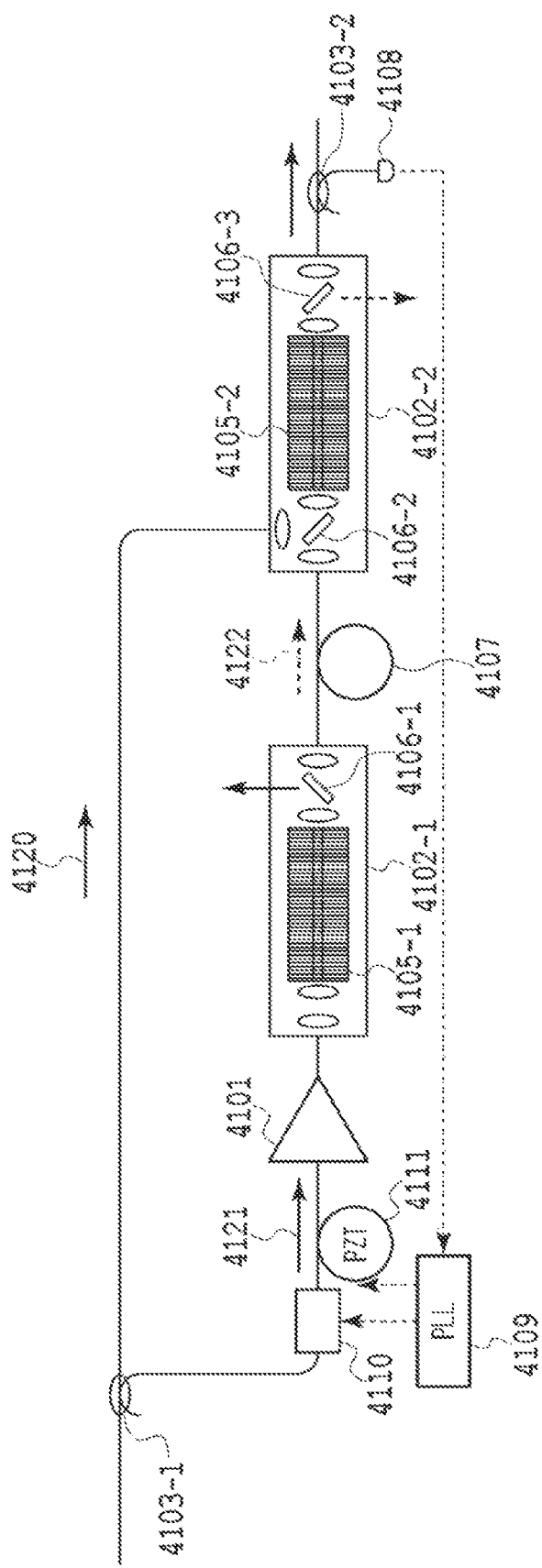
FIG. 41 is a diagram for explaining the configuration of the phase sensitive amplification according to the tenth embodiment of the present invention.

FIG. 41 shows the configuration of this embodiment. In this embodiment, as in the first embodiment, the device was configured to amplify a 1.54-μm signal. This embodiment is common to the first embodiment in the point that the two PPLN waveguides 4105-1 and 4105-2 are used to generate a second harmonic wave 4122 to perform a degenerate parametric amplifier. The difference between the first embodiment and this embodiment is a method of separating the second harmonic wave 4122 from the fundamental wave light 4121 and a method of multiplexing the second harmonic wave 4122 with the signal light 4120.

Phase sensitive amplification described in the present invention can be performed while suppressing the degradation of the S/N ratio of the signal light caused by the ASE light generated from the optical fiber amplifier. The configuration in this embodiment is changed in order to use this effect effectively. This embodiment also uses the dichroic mirrors 4106-1 and 4106-2 to separate the second harmonic wave 4122 and to multiplex the second harmonic wave 4122 and the signal light 4120.

Generally, in order to separate or multiplex two lights with different wavelengths, a dichroic mirror is frequently used to reflect light with one wavelength and to pass light with the other wavelength. In the case of an application to cut off unnecessary light in particular, such a configuration is desired to reflect specific wavelength light to be cut. On the contrary, in the case of a configuration to pass specific wavelength light to be cut to therethrough and to reflect and use required light, the mirror must have a very-low reflectance at an unnecessary wavelength.

Compared with the reduction of the mirror reflectance at an unnecessary wavelength to have a very low reflectance, the reduction of the mirror transmittance of the light at a specific wavelength to be cut is relatively easy. Thus, the configuration for reflecting an unnecessary wavelength light can more effectively suppress the unnecessary light. In this configuration, the device is configured based on the concept as described above.

The light splitting section 4103-1 is used to split the fundamental wave light 4121 at a wavelength of 1.54 μm from the signal light 4120. Then, via the LN phase modulator 4110 for phase synchronization and the optical fiber expander 4111 using PZT, the light 4121 is amplified by the EDFA 4101. The amplified fundamental wave light is injected into the first PPLN waveguide 4105-1 in the first second-order nonlinear optical element 4102-1 to generate the second harmonic wave 4122.

In this embodiment, in order to effectively select the second harmonic wave 4122 from the outputs of the first PPLN waveguide 4105-1, which contains the fundamental wave light and the second harmonic wave and to effectively remove the ASE light generated from the EDFA 4101, the first PPLN waveguide 4105-1 is followed by the dichroic mirror 4106-1 that reflects a 1.55-μm band light and that passes a 0.77-μm band light.

The second harmonic wave 4122 at a wavelength of 0.77 μm is launched into the second second-order nonlinear optical element 4105-2 via the polarization-maintaining fiber 4107 with a single mode propagation characteristic at this wavelength. As in the first embodiment, the fiber with a single mode at 0.77 μm weakly confines the light at a wavelength of 1.54 μm. Thus, the unnecessary fundamental wave light and ASE light at a wavelength of about 1.54 μm can be effectively attenuated by means of propagation in the fiber with a length of about 1 m.

The second harmonic wave 4122 guided by the polarization-maintaining fiber 4107 is multiplexed by the dichroic mirror 4106-2 with the signal light at a wavelength of 1.54 μm. In this embodiment, in order to effectively remove the remaining components of the fundamental wave light and ASE light at a wavelength of about 1.54 μm which passed through the polarization-maintaining fibers, a dichroic mirror was used that reflects a 1.54-μm band light and that passes a 0.77-μm band light.

The signal light 4120 and the second harmonic wave 4122 are multiplexed and are subsequently input into the second PPLN waveguide 4105-2. Then, the phase sensitive amplification of the signal is performed by using the degenerate optical parametric amplification.

The output light from the second PPLN waveguide 4105-2 is separated by the dichroic mirror 4106-3 to the second harmonic wave and the amplified signal light. In this embodiment, the dichroic mirror 4106-3 is used so as to reflect a 0.77-μm band light and to pass a 1.54-μm band light for the purpose of effectively removing the unnecessary second harmonic wave at the output.

A part of the outputted amplified signal light is splitted by the light splitting section 4103-2 and the outputted signal light is received by the photodetector 4108. Then, the phase-locked loop circuit (PLL) 4109 performs a phase synchronization based on the detecting signal at the photodetector 4108, thereby performing stable phase sensitive amplification. This PLL and phase amplification procedures in this embodiment are common to the first embodiment.

In this embodiment, dichroic mirrors with different characteristics from that in the first embodiment are used to separate the second harmonic wave from the fundamental wave light and to multiplex the second harmonic wave with the signal light. Thus, a phase sensitive amplifier with maintaining a high signal quality could be configured without mixing the ASE light from the EDFA, which adds an adverse influence on the S/N ratio of the signal into the signal light in particular.

In this illustrative embodiment, the configuration showed in the first embodiment was used. Specifically, the amplification method was the degenerate parametric method. The second harmonic wave from a fundamental wave light was used as a pump light. Furthermore, as a method of generating fundamental wave light for phase synchronization, a light directly splitted from the signal light is used without using a phase synchronization system derived from a modulated optical signal. However, this illustrative embodiment is also applicable to any amplification methods, the pump light type, the method of generating fundamental wave light for phase synchronization, and a simple combination described in the first to ninth embodiments.

Specifically, the non-degenerate parametric method described in the seventh to ninth embodiments also may be used as an amplification method.

As a method of obtaining pump light, a method using sum-frequency generation from two different wavelengths showed in the fifth embodiment also may be used to generate pump light.

The method of generating fundamental wave light for phase synchronization also may be the method to send a pilot tone signal in addition to the signal light as described in the third embodiment, the method to extract and recover the carrier wave signal from the modulated signal light as described in the fourth and fifth embodiments. In this embodiment, Zn-doped lithium niobate ($LiNbO_3$) was used as periodically poled second-order nonlinear optical material. However, the invention is not limited to lithium niobate. Thus, the same effect also can be obtained by typical second-order nonlinear optical materials, for example, mixed crystals of lithium niobate and lithium tantalate ($LiNb_xTa_{1-x}O_3$ ($0 \leq x \leq 1$), potassium niobate ($KNbO_3$), potassium titanyl phosphate ($KTiOPO_4$). A dopant of the second-order nonlinear optical material is not limited to Zn. Mg, Zn, Sc, In, or Fe also may be used instead of Zn as a dopant. Furthermore, the second-order nonlinear optical material with no dopant can be applicable.

Eleventh Embodiment

Figure 42:
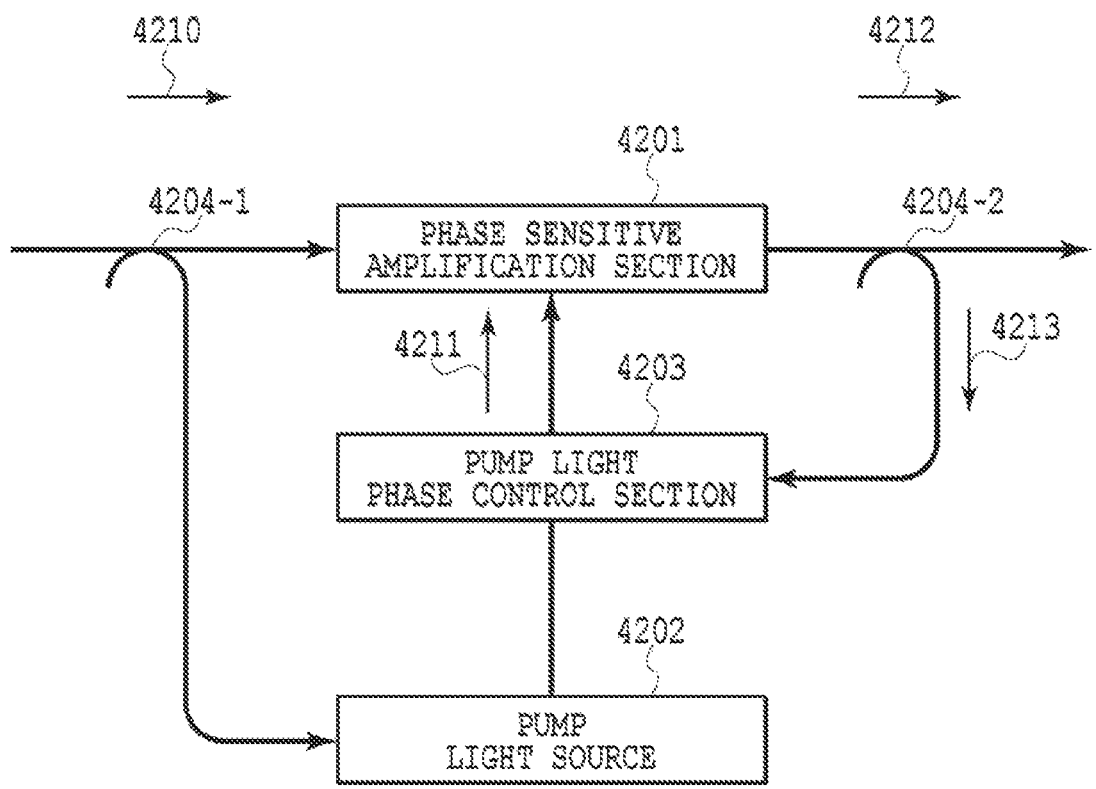
FIG. 42 is a diagram for explaining the configuration of the phase sensitive amplification according to the eleventh embodiment of the present invention.

FIG. 42 shows the basic configuration of the phase sensitive amplifier according to this embodiment. This optical amplifier is composed of: the phase sensitive amplification section 4201; the pump light source 4202; the pump light phase control section 4203; and the two light splitting sections 4204-1 and 4204-2. This optical amplifier is configured so that, when the phase of the signal light and the phase of the pump light in the phase sensitive amplification section 4201 satisfy the above-described relation of (formula 1), the input signal light 4210 is amplified. On the other hand, when these phases have an quadrature phase relation dislocated by 90 degrees from the relation of (formula 1), the input signal light 4210 is attenuated. When this attenuating characteristic is used to synchronize the phase of the signal light and the phase of the pump light so as to maximize the amplification gain, the signal light can be amplified without causing the spontaneous emission light with an quadrature phase to the signal light (i.e., without degrading the S/N ratio). Main deference between this embodiment and the first embodiment is a method of achieving the phase synchronization. The detail will be described later In order to achieve the synchronization of the phase between the signal light and the pump light, the phase of the pump light 4211 is controlled so as to be synchronized with the phase of the input signal light 4210 splitted by the light splitting section 4204-1 while satisfying the relation of (formula 1). Instead of using the light splitting section 4204-2 to partially split the output signal light 4212, the second harmonic wave 4213 as pump light is detected by a photodetector with narrow band width. The phase of the pump light 4211 is controlled by the pump light phase control section 4203 so that the second harmonic wave 4213 has the minimized output signal. As a result, the phase sensitive amplification section 4201 controls the phase of the signal light and the phase of the pump light so as to be synchronized while satisfying the relation of (formula 1), thus realizing light amplification without causing a degraded S/N ratio. The pump light phase control section 4203 is not limited to the configuration as shown in FIG. 42 in which the output side of the pump light source 4202 controls the phase of the pump light. Another configuration also may be used to directly control the phase of the pump light source 4202. When a light source generating signal light is placed closer with the phase sensitive amplification section, the signal light source also can be partially splitted and the resultant light can be used as pump light.

Figure 43:
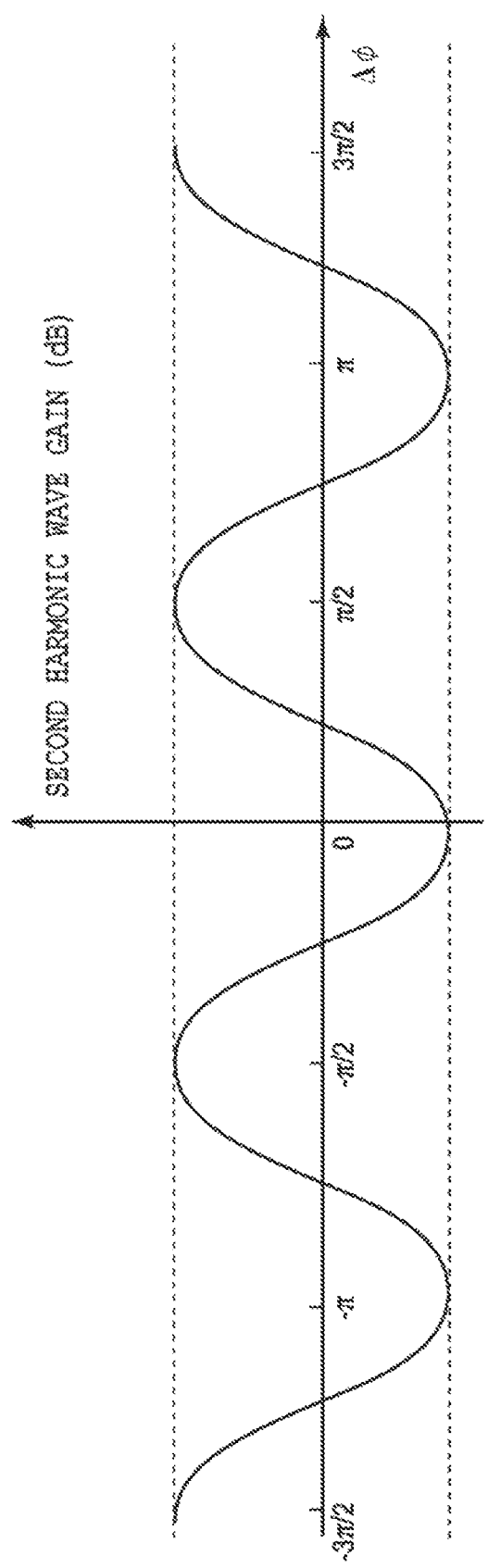
FIG. 43 is a graph showing the relation between the second harmonic wave gain and the phase difference $\Delta\phi$ between the input signal light and the pump light in the phase sensitive amplifier according to the eleventh embodiment of the present invention.

FIG. 43 is a graph, in the phase sensitive amplifier according to this embodiment, illustrating the relation between the gain (dB) of the second harmonic wave and the phase difference $\Delta\phi$ between the input signal light and the pump light. As can be seen in FIG. 43, when $\Delta\phi$ is $-\pi$, 0, or $\pi$, the gain of the signal light by the parametric amplification is maximum, thus minimizing the gain of the second harmonic wave used for amplification.

Figure 44:
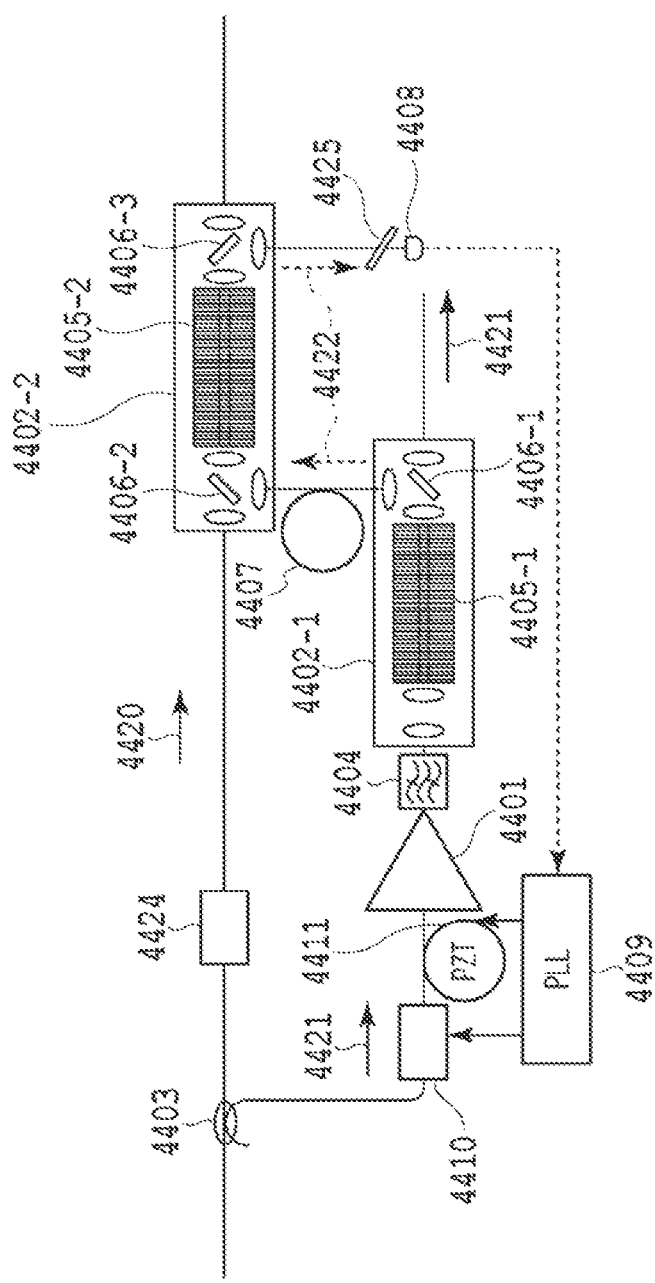
FIG. 44 is a diagram for explaining the configuration of the phase sensitive amplifier according to the eleventh embodiment of the present invention.

FIG. 44 shows the configuration of this embodiment. In this embodiment, an LN Mach-Zehnder modulator was used as a data signal intensity modulator 4424 and it was used to evaluate the amplification characteristic when a 10-Gbit/s NRZ signal was inputted. In this embodiment, in order to obtain sufficient power to realize a nonlinear optical effect from weak laser light used for optical communication, the fiber amplifier (EDFA) 4401 is used to amplify the fundamental wave light 4421. The amplified fundamental wave light is injected into the first second-order nonlinear optical element 4402-1 to generate the second harmonic wave 4422. The signal light 4420 and the second harmonic wave 4422 are injected into the second second-order nonlinear optical element 4402-2 and the signal light 4420 are phase-sensitively amplified by means of degenerate optical parametric amplification.

In this embodiment, in order to amplify the signal light at a wavelength of 1.54 μm, a part of the signal light is splitted by the light splitting section 4403 and the splitted signal light is used as the fundamental wave light 4421. The fundamental wave light 4421 is amplified by the erbium-doped fiber amplifier (EDFA) 4401. The amplified fundamental wave light is inputted to the first second-order nonlinear optical element 4402-1. In this embodiment, in order to prevent the wideband ASE light generated in the EDFA 4401 from being converted by the first second-order nonlinear optical element 4402-1, the EDFA 4401 and the first second-order nonlinear optical element 4402-1 have therebetween a bandpass filter 4404 to cut off unnecessary ASE light.

The second-order nonlinear optical elements (4402-1 and 4402-2) of this embodiment include the light waveguides (4405-1 and 4405-2) consisting of periodically poled lithium niobate (PPLN). The highest nonlinear optical constant d33 of lithium niobate can be utilized in the PPLN waveguide by means of the quasi-phase matching method, and the light waveguide structure also can realize a high optical power density. Thus, the configuration as shown in FIG. 44 can provide high wavelength conversion efficiency.

When a high power light is injected into the PPLN waveguide, the phase-matching wavelength may change due to the optical damage caused by the photorefractive effect. This embodiment prevents such a disadvantage by using a waveguide prepared by the direct bonding method shown in Non-patent Literature 4.

In this embodiment, by using the direct bonding waveguide with a core made of Zn-doped lithium niobate which showed a superior optical damage resistance, the fluctuation of the phase-matching wavelength was suppressed. Furthermore, high wavelength conversion efficiency was realized by reducing the core diameter to about 4 μm by a dry etching process. The second harmonic wave 4422 and the fundamental wave light 4421 emitted from the first PPLN waveguide 4405-1 are separated by the dichroic mirror 4406-1. The second harmonic wave at a wavelength of 0.77 μm reflected by the dichroic mirror 4406-1 is launched to the second second-order nonlinear optical element 4402-2 via the polarization-maintaining fiber 4407 with a single mode propagation characteristic at this wavelength of 0.77 μm. During this process, fundamental wave light and ASE light at a wavelength of about 1.54 μm not completely removed by the dichroic mirror 4406-1 are also injected into the polarization-maintaining fiber 4407. However, because the fiber with a single mode at 0.77 μm weakly confines the light at a wavelength of 1.54 μm, these unnecessary lights can be attenuated effectively during propagating the fiber with a length of about 1 m.

The second harmonic wave 4422 propagating in the polarization-maintaining fiber 4407 is multiplexed by the dichroic mirror 4406-2 with the signal light 4420 at a wavelength of 1.54 μm. The dichroic mirror 4406-2 reflects only the second harmonic wave. Thus, such remaining components composed of the fundamental wave light and the ASE light at a wavelength of about 1.54 μm, that are emitted from the first PPLN waveguide 4405-1 through the dichroic mirror 4406-1 and the polarization-maintaining fiber 4407, can be effectively removed.

The signal light 4420 and the second harmonic wave 4422 are multiplexed and are injected into the second PPLN waveguide 4405-2. The second PPLN waveguide 4405-2 has almost the same performance and the same phase-matching wavelength with those of the first PPLN waveguide 4405-1. Thus, the signal light can be phase-sensitively amplified by means of the degenerate optical parametric amplification.

In this embodiment, the two PPLN waveguides (4405-1 and 4405-2) are controlled to have constant temperatures by individual temperature controllers, respectively. There may be a case where the two PPLN waveguides do not have an identical phase-matching wavelength at the same temperature because of the fabrication error of the waveguide fabrication. Even in such a case, the temperatures of the two PPLN waveguides can be individually controlled to have an identical phase-matching wavelength therebetween.

The output light from the second PPLN waveguide 4405-2 is splitted by the dichroic mirror 4406-3 into the second harmonic wave 4422 as a pump light and the amplified signal light. Since the second harmonic wave 4422 and the amplified signal light have completely-different wavelengths, the amplified signal light and the second harmonic wave are effectively separated at the output stage.

The phase sensitive amplification according to this embodiment requires the synchronization of the phase of the pump light and the phase of the signal light. In this embodiment, in contrast with the first embodiment in which a part of the outputted amplified signal light is splitted and the resultant light is used for a phase synchronization, the second harmonic wave 4422 as pump light separated by the dichroic mirror 4406-3 is received by the photodetector 4408 to subsequently perform the phase synchronization by the phase-locked loop circuit (PLL) 4409. There may be a case in which 1.54 μm-band light reflected by the dichroic mirror 4406-3 is undesirably included in the port for 0.77 μm-band light used for the phase synchronization, thus causing noise in the phase synchronization. To prevent such a case, as shown in FIG. 44, a high-pass filter 4425 may be inserted to cut off the 1.54-μm-band light.

The phase modulator 4410 placed in the input stage of the EDFA 4401 is used to add the fundamental wave light to weak phase modulation by a sinusoidal wave. The photodetector 4408 and the PLL circuit 4409 are used to detect the phase shift of the phase modulation. Then, a feedback is sent to the driving voltage of the optical fiber expander 4411 by PZT placed in the input stage of the EDFA 4401 and the bias voltage of the phase modulator 4410. This can consequently compensate the vibration of the optical fiber component and the fluctuation of the optical phase due to the temperature fluctuation. Thus, stable phase sensitive amplification is achieved.

In this embodiment, because the second harmonic wave as pump light is used to synchronize the phase of the pump light with the phase of the signal light so as to satisfy the relation of (formula 1), all amplified signal light can be utilized. Thus, when this embodiment is compared with the first embodiment, the amplified signal light has an increased gain by an amount of about 15%.

As in the first embodiment, when the phase is matched to the signal light ON status, the chirped component can be removed and a chirpless signal can be reshaped and amplified, even when an input signal includes a phase chirping.

Figure 45:
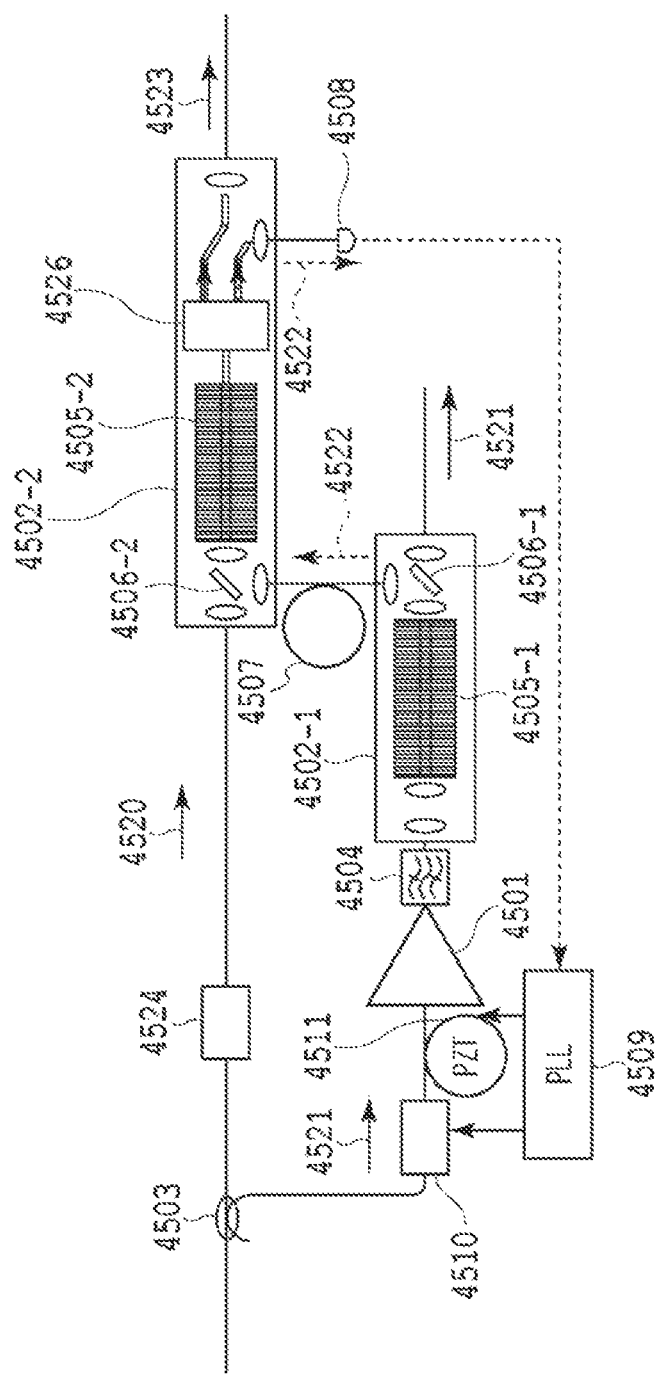
FIG. 45 is a diagram for explaining the configuration of the phase sensitive amplifier according to the eleventh embodiment of the present invention.

In the embodiment shown in FIG. 44, the dichroic mirror was used as a filter to separate the second harmonic wave as pump light from the amplified signal light. However, the optical multiplexing/demultiplexing filter 4526 as shown in FIG. 45 also may be used that uses a multimode interference (MMI: Multi-Mode Interference) provided in the output stage of the second second-order nonlinear optical element 4502-2.

By integrating the MMI multiplexing/demultiplexing filter 4526 designed to separate the second harmonic wave 4522 from the amplified signal light 4523 in the same substrate, a compact phase sensitive amplifier can be obtained. The MMI multiplexing/demultiplexing filter may be substituted with a light multiplexing/demultiplexing filter using a directional coupling to thereby achieve a similar compact phase sensitive amplifier.

Figure 46:
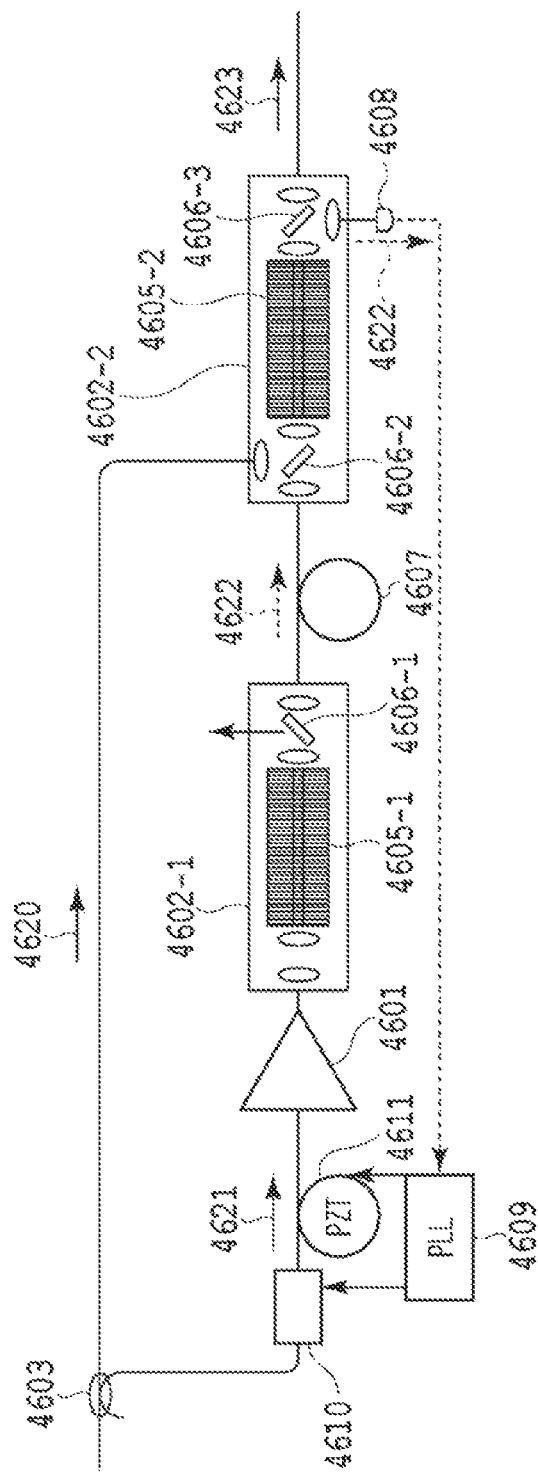
FIG. 46 is a diagram for explaining the configuration of the phase sensitive amplifier according to the eleventh embodiment of the present invention.

Next, the following section will describe another configuration of the phase sensitive amplifier according to this embodiment. FIG. 46 shows this configuration. In this configuration, as shown in the configuration in FIG. 44, the device was configured so as to amplify a 1.54 μm signal. This configuration is common to the configuration shown in FIG. 44 in that the two PPLN waveguides (4605-1 and 4605-2) are used to generate a second harmonic wave and to perform an optical parametric amplifier.

The configuration shown in FIG. 44 is different from the configuration shown in FIG. 46 in a method of separating the second harmonic wave from the fundamental wave light and a method of multiplexing the second harmonic wave with the signal light. According to the present invention, phase sensitive amplification can be performed while suppressing the degradation of the S/N ratio of the signal light caused by the ASE light generated from the optical fiber amplifier. This configuration uses this suppressing effect effectively.

The configuration shown in FIG. 46 also uses the dichroic mirrors (4606-1 and 4606-2) to separate the second harmonic wave 4622 from the fundamental wave light 4621 and to multiplex the second harmonic wave 4622 with the signal light 4620. Generally, in order to separate or multiplex two lights with different wavelengths, a dichroic mirror is frequently used to reflect light at one wavelength and to pass light at the other wavelength. In the case of an application to cut off unnecessary light in particular, a configuration is desired to reflect specific wavelength light to be cut. On the contrary, in the case of a configuration to pass specific wavelength light to be cut and to reflect required light, the mirror must have a very-low reflectance at an unnecessary wavelength. Compared with the reduction of the mirror reflectance at an unnecessary wavelength, the reduction of the transmittance of the light at a specific wavelength to be cut is relatively easy. Thus, the configuration for reflecting light at an unnecessary wavelength can more effectively suppress the unnecessary light. In this configuration, the device is configured based on the concept as described above.

The light splitting section 4603 is used to split the fundamental wave light 4621 at a wavelength of 1.54 μm from the signal light. Then, via the LN phase modulator 4610 for phase synchronization and the optical fiber expander 4611 using PZT, the light is amplified by the EDFA 4601.

The amplified fundamental wave light is injected into the first PPLN waveguide 4605-1 in the first second-order nonlinear optical element 4602-1, thereby generating the second harmonic wave 4622. In this configuration, in order to effectively extract only the second harmonic wave from the fundamental wave light outputted from the first PPLN waveguide 4605-1 and the second harmonic wave thereof and to effectively remove the ASE light generated from the EDFA 4601, the first PPLN waveguide 4605-1 is followed by the dichroic mirror 4606-1 that reflects a 1.55-μm band and that passes a 0.77-μm band.

The second harmonic wave 4622 at a wavelength of 0.77 μm is injected into the second second-order nonlinear optical element 4602-2 via the polarization-maintaining fiber 4607 with single mode propagation characteristics at this wavelength. As in the above-described configuration, because this fiber 4607 with single mode characteristics at 0.77 μm weakly confines the light at a wavelength of 1.54 μm, the unnecessary fundamental wave light and ASE light at a wavelength of about 1.54 μm can be effectively attenuated by means of propagating in this fiber with a length of about 1 m at least.

The second harmonic wave propagating in the polarization-maintaining fiber 4607 is multiplexed by the dichroic mirror 4606-2 with the signal light 4620 at a wavelength of 1.54 μm.

In this configuration, in order to effectively remove the remaining components of the fundamental wave light and ASE light at a wavelength of about 1.54 μm having passed through the polarization-maintaining fiber 4607, the dichroic mirror 4606-2 was used that reflects a 1.54-μm band light and that passes a 0.77-μm band light. The signal light and the second harmonic wave are multiplexed and are subsequently injected into the second PPLN waveguide 4605-2. Then, phase sensitive amplification of the signal can be performed by means of the degenerate optical parametric amplification.

The output light from the second PPLN waveguide 4605-2 is divided into the second harmonic wave 4622 and the amplified signal light 4623 by the dichroic mirror 4606-3. In this configuration, the dichroic mirror 4606-3 is configured so as to reflect a 0.77 μm band light and to pass a 1.54-μm band light.

Similarly in this configuration, the second harmonic wave 4622 as separated pump light is received by the photodetector 4608 and is subsequently phase-synchronized by the phase-locked loop circuit (PLL) 4609, thus providing stable phase sensitive amplification. The phase sensitive amplifier according to this configuration can use all amplified signal lights. Thus, when this embodiment is compared with the phase sensitive amplifier according to the tenth embodiment, the amplified signal light showed an about-15%-increased gain.

In this configuration, the dichroic mirrors (4606-1 and 4606-2) with different characteristics are used to separate the second harmonic wave from the fundamental wave light and to multiplex the second harmonic wave with the signal light. Thus, a phase sensitive amplifier with high signal quality characteristics could be configured without mixing the signal light with the ASE light from the EDFA which had an adverse influence on the S/N ratio of the signal in particular.

Next, the following section will describe a yet another configuration of the phase sensitive amplifier according to this embodiment.

Figure 47:
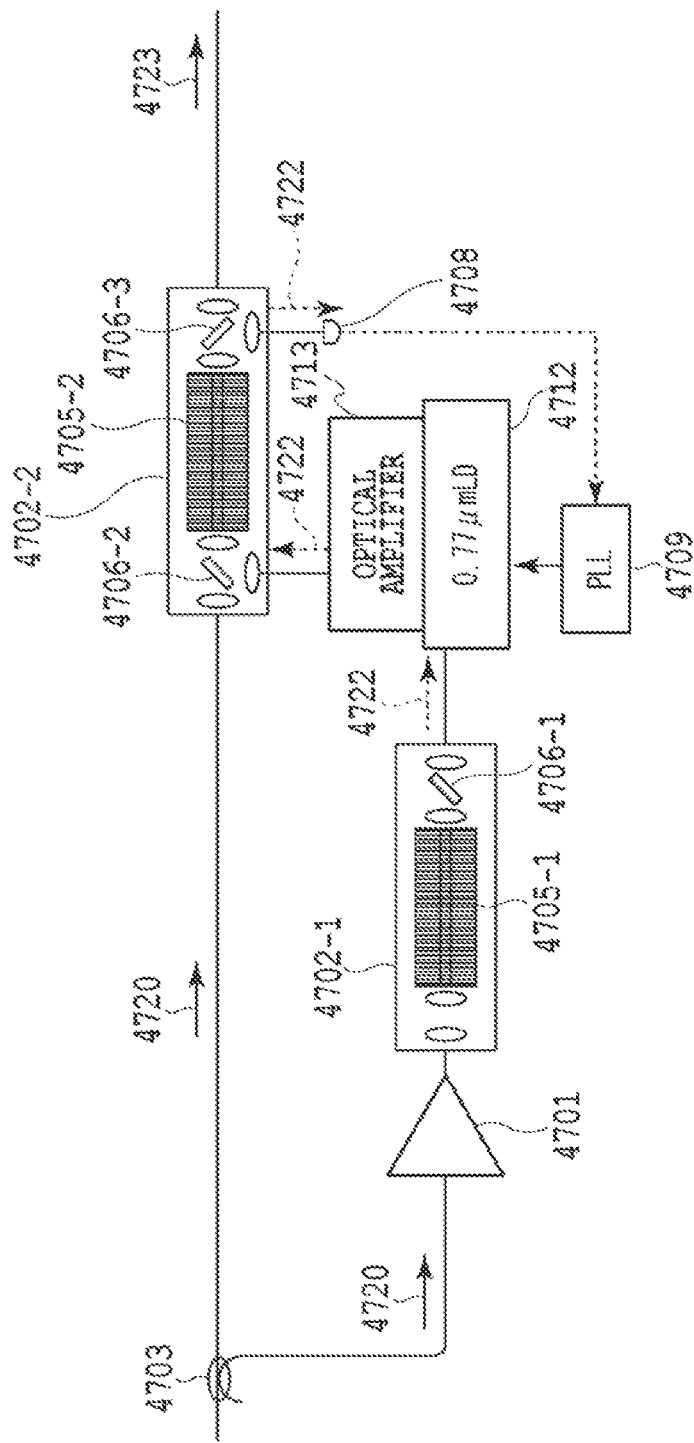
FIG. 47 is a diagram for explaining the configuration of the phase sensitive amplifier according to the eleventh embodiment of the present invention.

In the configurations shown in FIG. 44 to FIG. 46, light splitted from the signal light was used as fundamental wave light. Specifically, fundamental wave light was obtained by amplifying the same light source with that of the signal light. For example, for a transmitter in optical communication, the same light source is used for the signal light and the fundamental wave light as having been described above and the signal light may be modulated with a required modulation format after the signal light is divided from the fundamental wave light. On the other hand, in this configuration, the device was configured as shown in FIG. 47 so that signal light modulated in advance can be amplified.

The device according to this configuration can amplify binary phase-shift keying (BPSK) or binary differential phase shift keying (DPSK) signal or conventional intensity-modulated signal without adding noise.

In this configuration, in order to obtain fundamental wave light, signal light is splitted by the light splitting section 4703 and the splitted signal light is amplified by the EDFA 4701. The amplified signal light is injected into the first PPLN waveguide 4705-1 in the first second-order nonlinear optical element 4702-1, thereby generating a second harmonic wave 4722 of the signal light. In order to separate only the second harmonic wave from the output light from the first PPLN waveguide 4705-1, the dichroic mirror 4706-1 is used. By injecting the separated second harmonic wave to the semiconductor laser 4712 at the wavelength of 0.77 μm, injection-locking is performed. The output of the semiconductor laser 4712 is amplified by the semiconductor optical amplifier 4713 with a gain in the same wavelength band as that of the semiconductor laser. Then, the amplified output is multiplexed by the dichroic mirror 4706-2 with the signal light 4720 at a wavelength of 1.54 μm. The signal light 4720 and the second harmonic wave 4722 at a wavelength of 0.77 μm used as pump light are multiplexed and are subsequently injected into the second PPLN waveguide 4705-2. Then, phase sensitive amplification of the signal light can be performed by using the degenerated optical parametric amplification.

In order to perform the phase sensitive amplification, such pump light must be generated that is synchronized with the average phase of the injected signal light to the amplifier. In this embodiment, even when a signal modulated with a binary phase shift keying is used, pump light synchronized with the average phase can be generated. The operating principle thereof has been described in the above fourth embodiment.

In order to obtain pump light including no intensity modulation component in an actual phase modulation signal, it may be desirable as mentioned in the fourth embodiment to use the second harmonic wave whose phase modulation component is removed as mentioned above and whose phase is synchronized to the average phase of the signal light by using injection locking as showed in this configuration and whose wavelength is a half wavelength of the signal light as a pump.

In this configuration, pump light synchronized with the average phase with no intensity modulation using the injection locking is generated from the signal light with the phase modulation. As a result, even when the signal light is added with phase noise, a phase component orthogonal to the original signal can be attenuated by a phase sensitive amplification, thus achieving the signal regeneration where the noise component of the signal phase and the orthogonal phase is removed.

In this configuration, the second harmonic wave 4722 as pump light separated by the dichroic mirror 4706-3 is received by the photodetector 4708. Then, a feedback is sent from the phase-locked loop circuit (PLL) 4709 to driving current of a 0.77-μm semiconductor laser so as to provide the synchronization satisfying the relation of (formula 1). This can consequently compensate the vibration of the optical fiber component and the fluctuation of the optical phase due to the temperature fluctuation to thereby achieve stable phase sensitive amplification.

Specifically, a phase control is performed through driving current so as to minimize the output of the second harmonic wave 4722 as pump light. This configuration also can use all amplified signal light. Thus, when this embodiment is compared with the fourth embodiment, the amplified signal light showed an about-15%-increased gain.

In this configuration, in order to obtain enough power to generate the second harmonic wave in the first PPLN 4705-1, the EDFA 4701 was used. Since the ASE light generated from the EDFA 4701 does not enter the second PPLN waveguide 4705-2 for performing phase sensitive amplification, this configuration also can prevent the degradation of the S/N ratio of the signal light caused by the ASE light of the optical amplifier. There is also ASE light from the semiconductor optical amplifier 4713 operating at a wavelength of 0.77-μm. However, since this light has a wavelength quite different from that of the signal light, the ASE light can be substantially completely removed by the dichroic mirrors 4706-2 and 4706-3, thus achieving phase sensitive amplification without causing a degraded S/N ratio of the signal light.

In the above-described eleventh embodiment, a configuration has been described in which the amplification method is a degenerate parametric method and the second harmonic wave from the fundamental wave light is used as pump light. However, the configuration described in the eleventh embodiment also may include any amplification method, the pump light type, the method of generating fundamental wave light for phase synchronization, and a simple combination thereof described in the first to tenth embodiments.

Specifically, as an amplification method, the non-degenerate parametric method described in the seventh to ninth embodiments also may be used.

As a method of obtaining pump light, a method described in the fifth embodiment also may be used to generate pump light as sum-frequency light generated using two different wavelengths. In this case, pump light that is detected to perform a phase synchronization and that receives a feedback is not a second harmonic wave but sum frequency light.

The method for generating fundamental wave light for phase synchronization also may be the method to send a pilot tone signal in addition to the signal light as described in the third embodiment or the method to extract and recover a carrier wave signal from modulated signal light as described in the fourth and fifth embodiments.

In this embodiment, as periodically poled second-order nonlinear optical material, Zn-doped lithium niobate ($LiNbO_3$) was used. However, the invention is not limited to lithium niobate. Thus, the same effect also can be obtained by using typical second-order nonlinear optical materials including, for example, mixed crystals of lithium niobate and lithium tantalate ($LiNb_xTa_{1-x}O_3$ ($0 \leq x \leq 1$), potassium niobate ($KNbO_3$), potassium titanyl phosphate ($KTiOPO_4$). A dopant of the second-order nonlinear optical material is not limited to Zn. Mg, Zn, Sc, In, or Fe also may be used instead of Zn. Furthermore, the second-order nonlinear optical material with no dopant can be applicable.

Twelfth Embodiment

As described with reference to FIG. 6, the first embodiment can be used to achieve phase sensitive amplification by a simple configuration. However, the first embodiment has a disadvantage as described below. This will be described with reference to FIG. 6 again.

The phase modulator 610 used for phase synchronization is placed at the input stage of the EDFA 601, thus causing the input power to the EDFA to be reduced in proportion with the insertion loss of the phase modulator. It has been well-known that a laser amplifier such as an EDFA has an S/N ratio undesirably degraded in proportion to the loss in the input stage of the amplifier (see Non-patent Literature 8). If the insertion loss of the phase modulator undesirably causes the degradation of the S/N ratio of the pump light, the noise component is undesirably converted to the noise of the amplification light by the parametric amplification process, thus failing to provide low-noise amplification. However, the disadvantage of the noise can be solved by the twelfth embodiment of the present invention described below.

This embodiment uses the same configuration as described in the first embodiment was used. Specifically, the amplification method is a degenerate parametric method and the second harmonic wave from the fundamental wave light is used as pump light. As fundamental wave light for phase synchronization, a light directly splitted from the signal light is used. A phase synchronization system using a modulated optical signal is not used.

However, this embodiment also includes any amplification method, the pump light type, the method of generating fundamental wave light for phase synchronization, and a simple combination thereof described in the first to eleventh embodiments.

Specifically, as an amplification method, the non-degenerate parametric method described in the seventh to ninth embodiments also may be used. A method as described in the fifth embodiment also may be used to generate pump light as the sum-frequency light generated using two different wavelengths. The method for generating fundamental wave light for phase synchronization also may be a method to send a pilot tone signal in addition to the signal light described in the third embodiment or the method to extract and recover a carrier wave signal from modulated signal light as described in the fourth and fifth embodiments. As a phase synchronization method, the phase synchronization method as described in the eleventh embodiment also may be used to send a feedback derived from pump light.

An example of the configuration of this embodiment will be described in detail with reference to FIG. 48. In this embodiment, the configuration as shown in FIG. 48 was used in order to prevent the disadvantage of the first embodiment of the degradation of the S/N ratio of the optical fiber amplifier caused by the loss of the phase modulator for phase synchronization.

As shown in Non-patent Literature 8, when the input stage of the laser amplifier includes a loss, the loss undesirably causes a proportionally-degraded S/N ratio. When the output stage of the laser amplifier includes a loss on the other hand, the loss undesirably causes a proportionally-reduced output but does not cause a degraded S/N ratio. Using this characteristic, this embodiment uses a configuration as shown in FIG. 48 in which the phase modulator 4810 is placed at the output side of the optical fiber laser amplifier 4801.

Figure 48:
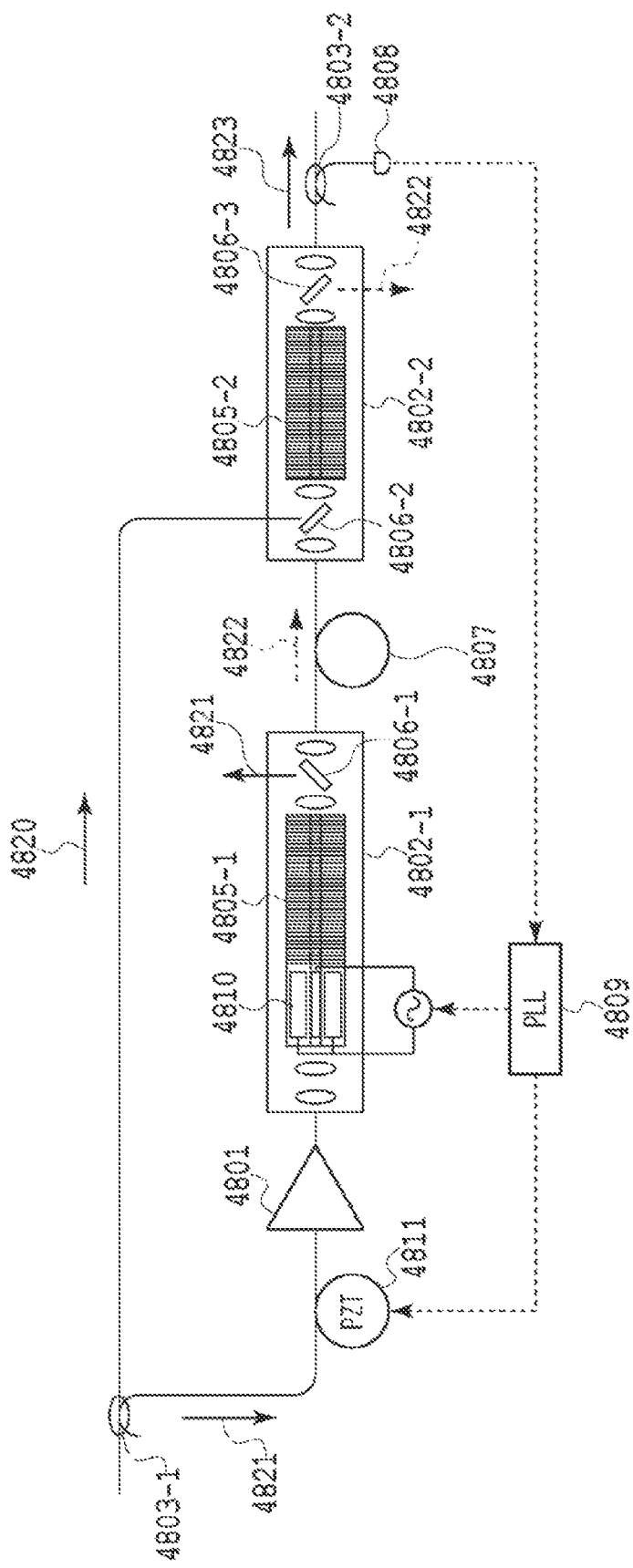
FIG. 48 is a diagram for explaining the configuration of the phase sensitive amplifier according to the twelfth embodiment of the present invention.

The conventional technique cannot use the configuration as shown in FIG. 48. The reason is that waveguide structures of many popular phase modulators are fabricated by using Ti-diffusion in $LiNbO_3$(LN) crystals. The Ti-diffused waveguide causes a remarkable optical-damage. Thus, when a high optical power is injected into the Ti-diffused waveguide, a change in the refractive index is caused due to the photorefractive effect, thus undesirably causing a drift phenomenon which is a change of a voltage for providing the same phase condition. Thus, the permissible optical power to the phase modulator is undesirably limited to about +20 dBm. Furthermore, a phase modulator with a high insertion loss placed at the output stage of the laser amplifier undesirably causes attenuation of power of the pump light. This consequently prevents sufficient pump power for performing a parametric effect, thus failing to realize phase sensitive amplification with a high amplification gain.

In this embodiment, by integrating, the waveguide 4805-1 for generating the second harmonic wave 4822 as pump light and the waveguide used for phase modulation in the same substrate, the connection loss between the elements can be reduced and the phase modulator 4810 can be placed at the output side of the EDFA 4801.

Since the second harmonic generator handles the second harmonic wave which causes an optical damage more-remarkably, the second harmonic generator is generally prepared based on a method by which a waveguide has a higher optical damage resistance than that by Ti diffusion. Higher pump power can be obtained by using the phase modulator fabricated by a method similar to the second harmonic generator.

In this configuration, in order to amplify the signal light 4820 at 1.54 μm, a part of the signal light 4820 is splitted by the splitting section 4803-1 and the resultant light is used as the fundamental wave light 4821. The fundamental wave light 4821 is amplified by the erbium-doped fiber amplifier (EDFA) 4801 and is launched to the light waveguide where the phase modulator 4810 and the first second-order nonlinear optical element 4805-1 are integrated. The second-order nonlinear optical elements (4802-1 and 4802-2) include the light waveguides (4805-1 and 4805-2) consisting of periodically poled lithium niobate (PPLN).

The highest nonlinear optical constant d33 of lithium niobate can be utilized in the PPLN waveguide by means of the quasi-phase matching method, the light waveguide structure also can accept a high optical power density, thus providing high wavelength conversion efficiency. When high power intensity is launched to the PPLN waveguide, the phase-matching wavelength may change due to the optical damage caused by the photorefractive effect. This embodiment prevents such a disadvantage by using a waveguide prepared by the direct bonding shown in (see Non-patent Literature 4).

In this embodiment, by using the direct bonding waveguide with a core made of Zn-doped lithium niobate which showed a superior optical damage resistance, the fluctuation of the phase-matching wavelength was suppressed. Furthermore, high wavelength conversion efficiency was realized by reducing the core diameter to about 4 μm by a dry etching process. On the same substrate where the PPLN waveguide 4805-1 was formed, the phase modulator 4810 including no periodically poled structure was integrated by the same waveguide fabrication method. The phase modulation section was configured so that the waveguide has thereon an electric field applying electrode, thus achieving the phase modulation by the electro-optic (EO) effect. As described above, this waveguide fabrication method provides a high optical damage resistance. Thus, even when the fundamental wave light 4821 amplified by the EDFA 4801 has high power, the phase modulation of the pilot tone for the optical phase-locked loop circuit (PLL) can be applied to the fundamental wave light 4821 without causing the drift phenomenon of the operation voltage.

In this embodiment, the refractive index change by the electro-optic effect was used for phase modulation as described above. This method is not limited to this embodiment. Other embodiments also can use a phase modulator based on the electro-optic effect.

The fundamental wave light 4821 and the second harmonic wave 4822 emitted from the first PPLN waveguide 4805-1 are separated by the dichroic mirror 4806-1. The second harmonic wave ate wavelength of 0.77 μm having passed through the dichroic mirror is launched to the second second-order nonlinear optical element 4802-2 via the polarization-maintaining fiber 4807 with a single mode propagation characteristic at a wavelength of 0.77 μm. The second harmonic wave 4822 guided via the polarization-maintaining fiber 4807 is multiplexed by the dichroic mirror 4806-2 with the signal light 4820 at a wavelength of 1.54 μm. Since the dichroic mirror 4806-2 passes only the second harmonic wave 4822, the remaining components of the fundamental wave light 4821 and the ASE light at the wavelength of about 1.54 μm that are emitted from the first PPLN waveguide 4805-1 can be effectively removed during passing through the dichroic mirror 4806-1 and the polarization-maintaining fiber 4807. The signal light 4820 and the second harmonic wave 4822 multiplexed by the dichroic mirror 4806-2 are injected into the second PPLN waveguide 4805-2. The second PPLN waveguide 4805-2 has the same performance and the same phase-matching wavelength as those of the first PPLN waveguide 4805-1. The signal light can be phase-sensitively amplified by means of the degenerate optical parametric amplification. The output light from the second PPLN waveguide 4805-2 is separated by the dichroic mirror 4806-3 to the second harmonic wave 4822 generated by fundamental wave light and the amplified signal light 4823. Since the second harmonic wave and the amplified signal light have quite different wavelengths as described above, the unnecessary second harmonic wave component 4822 can be effectively removed at the output.

The phase sensitive amplification requires the synchronization of the phase of the pump light and the phase of the signal light. In this embodiment, a part of the outputted amplified signal light 4823 is splitted by the light splitted section 4803-2 and the resultant light is received by the photodetector 4808. Then, phase synchronization was performed by the phase-locked loop circuit (PLL) 4809.

In this embodiment, the LN phase modulator 4810 that is integrated with the second harmonic generation PPLN 4805-1 on the same substrate and that is placed at the output side of the EDFA is used to modulate the fundamental wave light with weak phase modulation by a sinusoidal wave. Then, the photodetector 4808 and the PLL circuit 4809 are used to detect the phase shift of the phase modulation. Then, a feedback is sent to the driving voltage of the optical fiber expander 4811 by PZT placed in the input stage of the EDFA 4801 and the bias voltage of the LN phase modulator 4810. This can consequently compensate the vibration of the optical fiber component and the fluctuation of the optical phase due to the temperature fluctuation to thereby achieve stable phase sensitive amplification.

In this embodiment, an LN Mach-Zehnder modulator was used as the data signal modulator 4810. Then, the resultant amplification characteristic was evaluated when a 10-Gbit/s NRZ signal was used as an input signal.

In this embodiment, under a condition in which the power of the second harmonic wave 4822 injected into the second PPLN waveguide 4805-2 was 300 mW, a gain of about 11 dB could be obtained. During this, the output power of the EDFA 4801 was about 1 W and the input power to the direct bonding waveguide was 630 mW. Even when such a high power light was injected, a stable phase synchronization operation could be realized without causing a drift phenomenon of the operation voltage.

When the configuration of this embodiment is compared with the configuration shown in FIG. 6, this embodiment has a configuration in which the phase modulator 4810 is not placed in the input stage of the EDFA 4801, thus improving the S/N ratio of the fundamental wave light 4821 by about 5 dB. Furthermore, the PPLN 4805-1 integrated with the phase modulator 4810 could perform efficient conversion of the output of the EDFA 4801 to the second harmonic wave 4822 without causing an excessive loss. As a result, compared with the conventional case, a low noise amplification operation by phase sensitive amplification could be performed while suppressing a degradation of S/N ratio of the fundamental wave light 4821 in the EDFA 4801.

Figure 49:
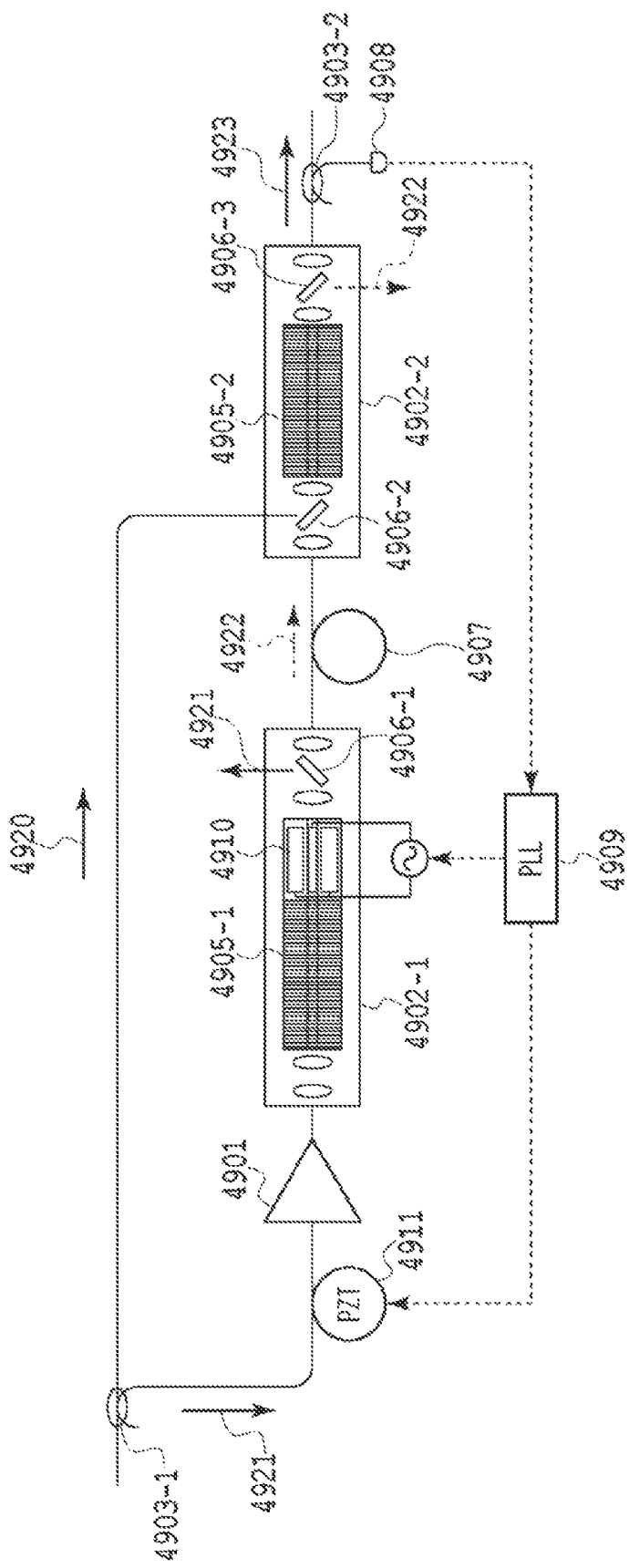
FIG. 49 is a diagram for explaining the configuration of the phase sensitive amplifier according to the twelfth embodiment of the present invention.

Next, the following section will describe another example of the configuration of this embodiment with reference to FIG. 49.

In this configuration, as shown in the configuration in FIG. 48, the device was configured to amplify the 1.54-μm signal 4920. This configuration is common to the configuration shown in FIG. 48 in the points as follows; the two PPLN waveguides (4905-1 and 4905-2) are used, one PPLN waveguide (4905-1) is integrated with a phase modulation waveguide, and the second harmonic wave 4922 is generated to perform an optical parametric amplifier. The main difference is that the PPLN waveguide 4905-1 to generate the second harmonic wave 4922 is placed at the signal input side of the synchronization phase modulator 4910.

In this configuration, by placing the LN phase modulator 4910 at the output side of the second harmonic generation PPLN waveguide 4905-1, the driving voltage required for the phase modulation could be halved compared with that in the case of the configuration shown in FIG. 48.

The following section will describe an effect obtained by placing the LN phase modulator 4910 at the output side of the second harmonic generation PPLN waveguide 4905-1. When optical material receives an externally-applied electric field or an external force such as stress, a refractive index change is caused in the optical material. When the electro-optic effect in the LN crystal is used for a phase modulator and a phase is modulated by an electric field application, a half wavelength driving voltage Vπ, showing the performance of the modulator, depends on the LN's electro-optic coefficient, refractive index, applied electric field, or input wavelength as shown in Non-patent Literature 9. When attention is paid on an input wavelength in particular, the relation as shown in the following (formula 27) is obtained.

$$V\pi \propto \lambda \quad \text{(formula 27)}$$

The half wavelength driving voltage, or a voltage required for phase modulation can be drastically reduced by using the arrangement described in this configuration. The amount of the voltage reduction is about a half of that obtained by the arrangement used in the configuration shown in FIG. 48. Thus, a driving power source can have a smaller size and consumption power can be reduced. In the configuration shown in FIG. 48, a driving voltage required for synchronization was about 0.1V. On the other hand, since the phase modulator 4910 in the optical PLL is placed at the output side of the PPLN waveguide 4905-1 in this configuration, the driving voltage required for the synchronization could be drastically reduced to 50 mV.

As shown in the configuration in FIG. 48, this configuration also could suppress the drift of the operation voltage of the phase modulation section by using the direct bonding waveguide with a core made of Zn-doped lithium niobate which showed a superior optical damage resistance. Furthermore, the waveguide of the phase modulation section 4910 is designed to be single mode at a fundamental wave wavelength of 1.54 μm as in the PPLN waveguide section. Thus, it showed multimode characteristics at the second harmonic wave at a wavelength of 0.77 μm. However, the second harmonic wave 4922 generated in the PPLN section 4905-1 propagates only in a fundamental mode due to the limitation by the phase matching conditions. Thus, even a simple waveguide structure with the same design in a waveguide of the PPLN section 4905-1 and the phase modulation section 4910 can provide a stable phase synchronization operation.

Figure 50:
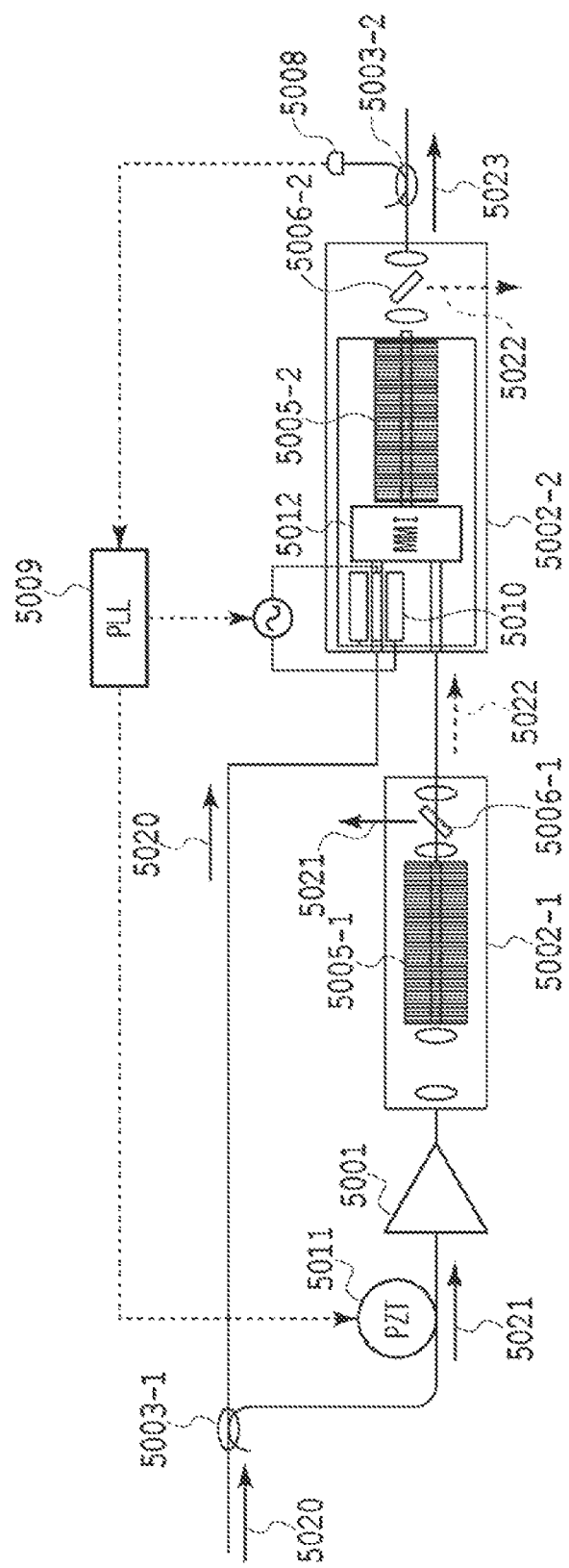
FIG. 50 is a diagram for explaining the configuration of the phase sensitive amplifier according to the twelfth embodiment of the present invention.

Next, the following section will describe another example of the configuration of this embodiment with reference to FIG. 50.

In this configuration, as shown in the configurations in FIG. 48 and FIG. 49, the device was configured so as to amplify a signal at 1.54 μm. This configuration is common to the configurations shown in FIG. 48 and FIG. 49 in the points that the two PPLN waveguides 5005-1 and 5005-2 are used and that the second harmonic wave 5022 is generated to perform degenerate parametric amplification.

In this configuration, a configuration as shown in FIG. 50 was used in which a multimode interferometer (Multi-mode interferometer: MMI) 5012 was used as a multiplexer of the signal light 5020 and the second harmonic wave 5022. In this configuration, the MMI 5012, the pilot tone phase modulator 5010 for the optical PLL, and the second PPLN waveguide 5005-2 for performing degenerate parametric amplification were integrated on the same substrate prepared by the direct bonding method.

In this configuration, a ridge shape was formed by a dry etching on the waveguide layer fabricated by a direct bonding method using a periodically poled LN substrate only in a region performing degenerate parametric amplification. Furthermore, a metal electrode for applying electric field was formed on the ridge of the signal light input port of the MMI.

The MMI 5012, which is a multiplexer integrated on the substrate, is designed to have optimal width, length, input and output port positions to have multiplexing characteristics with insertion losses of 1 dB or less for both signal light and pump light to the second PPLN waveguide 5005-2.

The shape of the MMI is optimized so that a signal light component remaining in the pump light port is not multiplexed. As a result, this configuration could minimize influences by the coupling losses between the phase modulator and the multiplexer and between the multiplexer and the second PPLN waveguide, which was not avoided by the configuration shown in FIG. 49. In this configuration, the signal light port integrated with the phase modulator 5010 can minimize the coupling loss between the PPLN waveguide 5005-2 and the phase modulator 5010. This could consequently minimize the insertion loss of the entire phase sensitive amplifier.

An insertion loss at an input port of a phase sensitive amplifier directly causes an increase of noise figure of the amplifier. In order to modulate the phase of the signal light in the configurations shown in FIG. 48 and FIG. 49, a phase modulator independent from the PPLN must be used. Thus, the connection loss thereof undesirably causes an increase of noise figure. The configuration according to this configuration can achieve a low-noise operation of a phase sensitive amplifier while avoiding such an increase of noise figure due to the coupling loss.

This configuration also could suppress the drift of the operation voltage of the phase modulation section by using the direct bonding waveguide with a core made of Zn-doped lithium niobate which showed a superior optical damage resistance.

Figure 51:
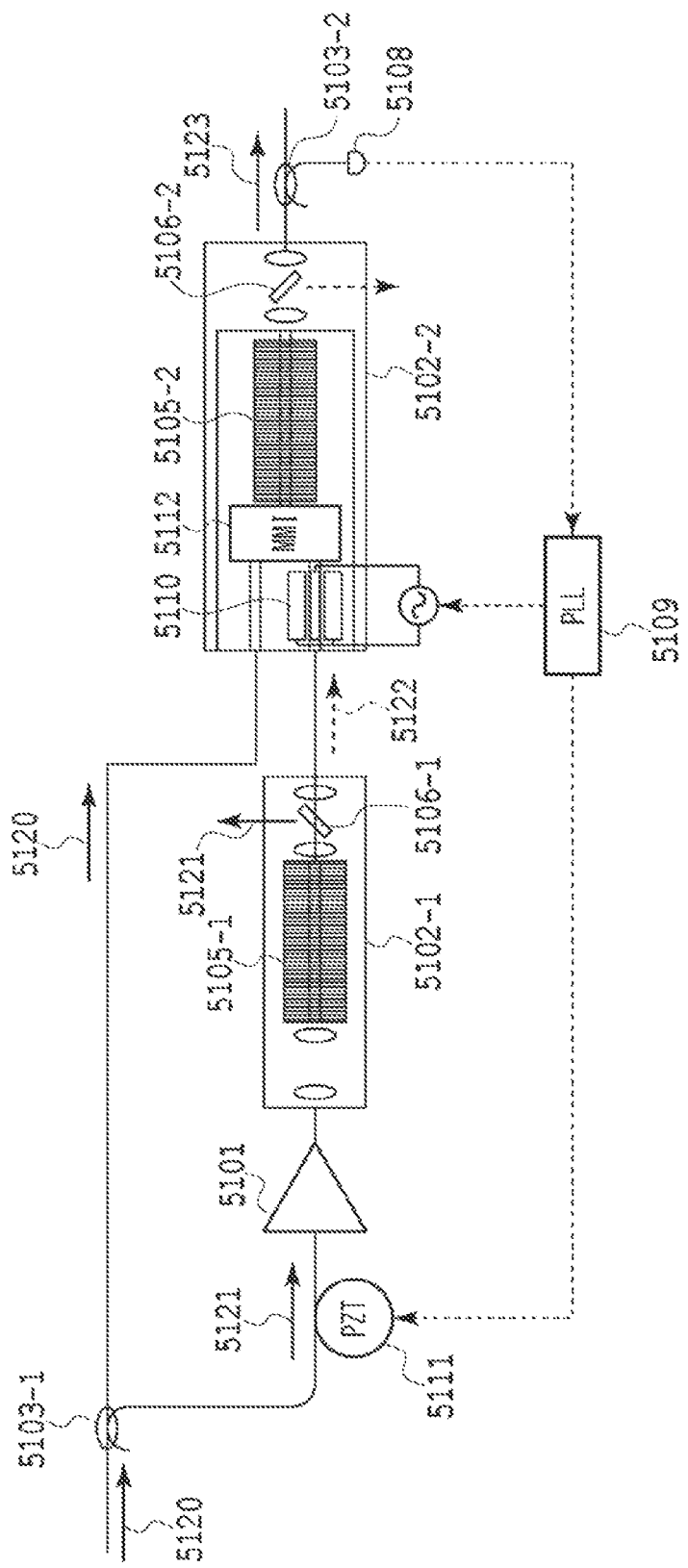
FIG. 51 is a diagram for explaining the configuration of the phase sensitive amplifier according to the twelfth embodiment of the present invention.

Next, the following section will describe another example of the configuration of this embodiment with reference to FIG. 51.

This configuration is the same as that shown in FIG. 50 in the point that the integrated MMI 5112, phase modulator 5110, and second PPLN waveguide 5105-2 for performing a degenerate parametric amplifier are used.

This configuration is different from that shown in FIG. 50 in the points that the pump light 5122 generated from the second-order nonlinear optical element 5102-1 for generating a second harmonic wave is injected into the port to the phase modulator 5110 and that the signal light 5120 is injected into the other port. By injecting the pump light 5122 into the phase modulator 5110, phase modulation can be performed on the pump light at a ½ wavelength of the signal, as shown in the configuration in FIG. 49. As a result, when this configuration is compared with that shown in FIG. 50, the driving voltage for the phase modulation could be halved while retaining the similar S/N ratio and amplification gain characteristic.

This configuration also could suppress the drift of the operation voltage of the phase modulation section by using the direct bonding waveguide with a core made of Zn-doped lithium niobate which showed a superior optical damage resistance. Thus, the phase modulator 5110 can be placed at the output side of the EDFA 5101 for generating fundamental wave light. Thus, amplification operation can be performed while minimizing the degradation of the S/N ratio at the EDFA 5101.

In the configuration of the present invention shown in FIG. 50 and FIG. 51, a dichroic mirror was used as a filter to separate only the signal light from output lights from an element obtained by integrating the MMI, phase modulator, and PPLN waveguide. On the other hand, a smaller phase sensitive amplifier also can be obtained by integrating the MMI designed to separate only the signal light on the same substrate.

Figure 52:
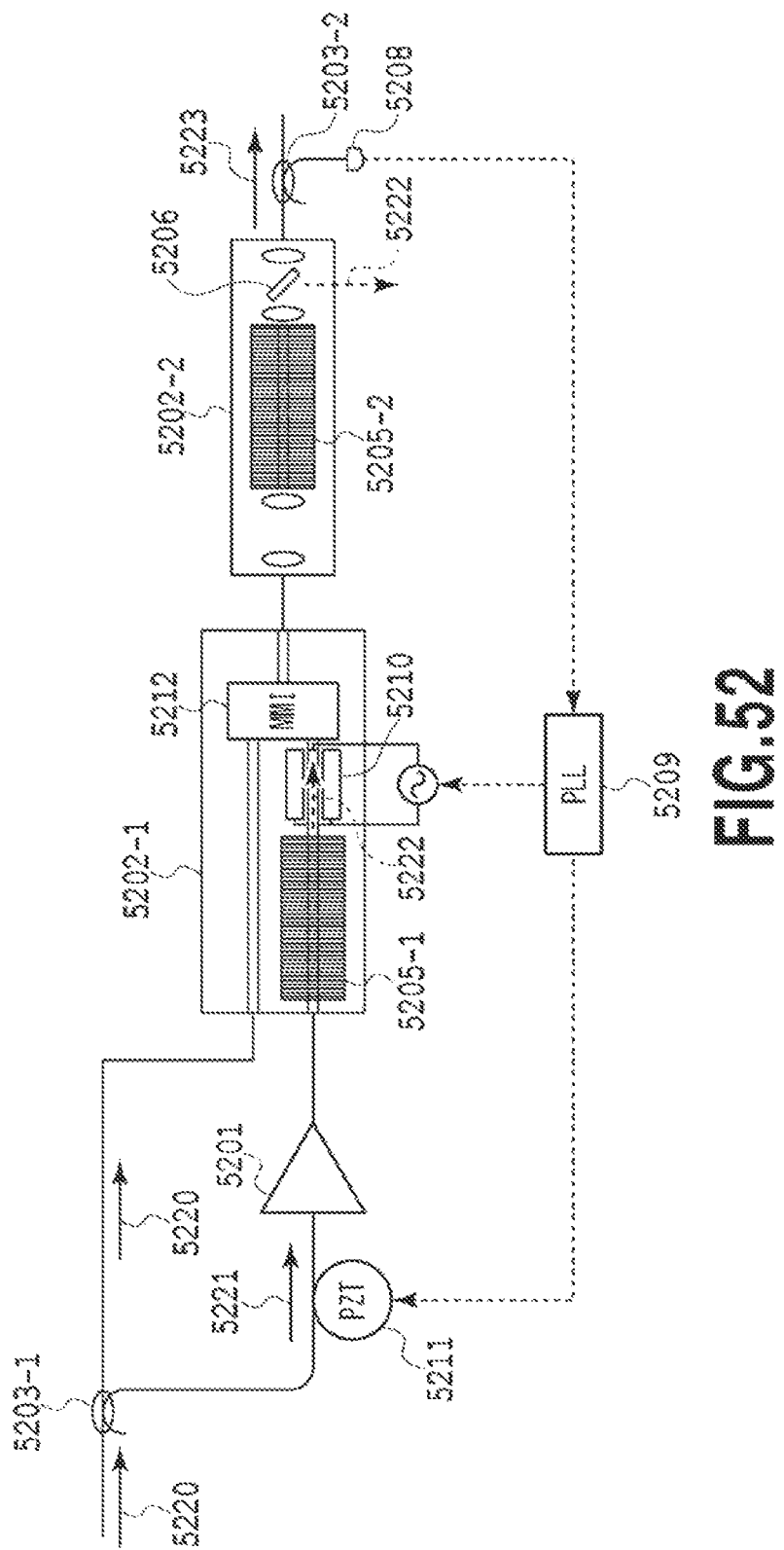
FIG. 52 is a diagram for explaining the configuration of the phase sensitive amplifier according to the twelfth embodiment of the present invention.

Next, the following section will describe another example of the configuration of this embodiment with reference to FIG. 52.

This configuration is common to the configuration shown in FIG. 51 in the point that the device is configured to amplify a 1.54-μm signal 5220. This configuration is also common to the configuration shown in FIG. 51 in the points that the two PPLN waveguides 5205-1 and 5205-2 are used and that the second harmonic wave 5222 is generated to perform a degenerate parametric amplifier.

The configuration shown in FIG. 52 is different from the configuration shown in FIG. 51 in the point that the PPLN waveguide 5205-1 for generating pump light, the pilot tone phase modulator 5210 for optical PLL, and the MMI 5212 for multiplexing the pump light with the signal light are integrated on the LN crystal substrate on which the first PPLN waveguide 5205-1 for generating a second harmonic wave is formed by using a direct bonding method.

The MMI 5212, which is a multiplexer integrated on the substrate, is designed to have optimal width, length, input and output port positions. The MMI 5212 has characteristics of insertion losses of 1 dB or less for both signal light and pump light.

By using this configuration, influences of the connection losses between the second-order nonlinear optical element and the phase modulator and between the phase modulator and the multiplexer could be minimized, which were not avoided by the configuration shown in FIG. 49.

In this embodiment, Zn-doped lithium niobate ($LiNbO_3$) was used as periodically poled second-order nonlinear optical material. However, the invention is not limited to lithium niobate. Thus, the same effect also can be obtained by typical second-order nonlinear optical materials, for example, mixed crystals of lithium niobate and lithium tantalate ($LiNb_x Ta_{1-x}O_3$ ($0 \leq x \leq 1$), potassium niobate ($KNbO_3$), potassium titanyl phosphate ($KTiOPO_4$). A dopant of the second-order nonlinear optical material is not limited to Zn. Mg, Zn, Sc, In, or Fe also may be used instead of Zn as a dopant. Furthermore, the second-order nonlinear optical material with no dopant can be applicable.

Thirteenth Embodiment

Figure 53:
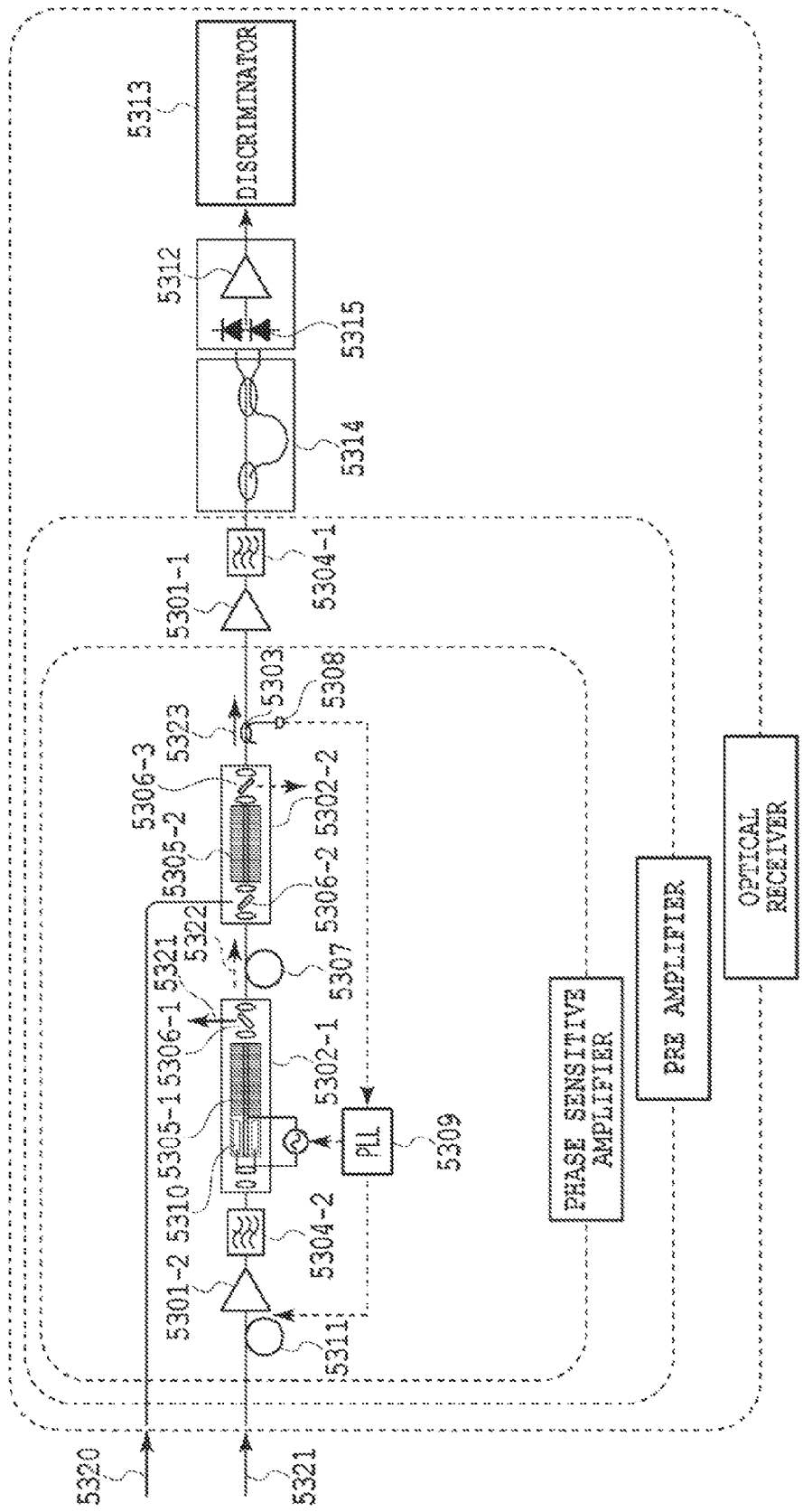
FIG. 53 is a diagram for explaining the configuration of an optical receiver including a phase sensitive amplifier according to the thirteenth embodiment of the present invention.

FIG. 53 shows the configuration of the optical receiver including the phase sensitive amplifier in this embodiment. In this embodiment, as in the sixth embodiment, the device was configured to amplify the 1.54-μm signal. This embodiment is common to the sixth embodiment in the points that the two PPLN waveguides are used, a second harmonic wave is used, an degenerated optical parametric amplifier is performed, and the phase synchronization using an optical phase-locked loop circuit (PLL) with a phase modulator is performed (see FIG. 24).

The embodiment shown in FIG. 53 is different from embodiment shown in FIG. 24 in the points that a waveguide for phase modulation is integrated with one PPLN and the whole receiver is configured so as to receive a differential phase shift keying (DPSK) signal.

On the other hand, a phase modulator is used for phase synchronization in the present invention. Because an input to the first EDFA used to generate the fundamental wave light is weak due to a high loss caused by this phase modulator, thus the S/N ratio of the pump light is degraded. When a loss is in the output stage of the laser amplifier in order to suppress this effect, the loss causes a reduced output but no degradation in S/N ratio.

In order to use this characteristic, this embodiment has a configuration in which the phase modulator 5310 is integrated at the output side of the fiber laser amplifier 5301-2.

When the amplified fundamental wave light amplified by the EDFA is input into a conventional LN modulator using Ti diffusion, the drift of the operation point is caused by the photorefractive effect. Thus, the configuration described as in this embodiment is not adopted for using the Ti-diffusion LN modulator. Furthermore, a high insertion loss of a phase modulator placed at the output stage of the laser amplifier causes low power of the fundamental wave light. Consequently, sufficient power of pump light for generating optical parametric amplification cannot be obtained, which leads efficient phase sensitive amplification to fail.

Thus, in this embodiment, the connection loss between the elements was reduced by integrating the light waveguide 5305-1 for generating the second harmonic wave as pump light and the waveguide used for the phase modulator 5310 in the same substrate. Furthermore, the phase modulator 5310 was placed at the output side of the optical fiber laser amplifier 5301-2.

In this embodiment, the fluctuation of the phase-matching wavelength was suppressed by using the direct bonding waveguide in which Zn-doped lithium niobate with a superior photorefractive damage resistance is used as a core. Furthermore, by using a dry etching process to reduce the core width to about 4 μm, the high wavelength conversion efficiency was obtained. On the same substrate on which the PPLN waveguide is formed, a phase modulator without periodically poled structure was integrated by using the similar fabrication method. In the phase modulation section, an electrode for electric field application was formed on the waveguide for providing the phase modulation by the EO effect. As described above, this waveguide fabrication method has a high photorefractive damage resistance. Thus, even when the fundamental wave light amplified by EDFA has high power, the phase modulation can be performed to the fundamental wave light (i.e. the pilot tone) for the optical phase-locked loop circuit (PLL) without causing the drift of the operation voltage.

The phase sensitive amplification is same as in the sixth embodiment. The first fiber laser amplifier (EDFA) 5301-2 is used to amplify the fundamental wave light 5321. The amplified fundamental wave light is input into the first second-order nonlinear optical element 5302-1 to generate the second harmonic wave 5322. Then, the signal light 5320 and the second harmonic wave 5322 are input into the second second-order nonlinear optical element 5302-2 to perform an optical parametric amplifier, thereby performing phase sensitive amplification.

Between the EDFA 5301-2 and the first second-order nonlinear optical element 5302-1, a bandpass filter 5304-2 is inserted to remove unnecessary ASE light.

In this embodiment, a part of the output of amplified signal light is splitted by the light splitter section 5303 and the splitted light is received by the photodetector 5308. Then, phase synchronization was performed by phase-locked loop circuit (PLL) 5309.

The phase modulator 5310 integrated with the first PPLN waveguide 5305-1 is used to perform small phase modulation to the fundamental wave light 5321 by a sinusoidal wave. The photodetector 5308 and the PLL circuit 5309 are used to detect the phase mismatch identified by the phase modulation. Then, a feedback is performed to the driving voltage of the expander of the optical fibers 5311 using PZT placed at input stage of the EDFA 5301-2 and the bias voltage of the phase modulator 5310. This can consequently compensate for the fluctuation of the optical phase due to the vibration of the optical fiber component and the fluctuation of the optical phase due to the temperature fluctuation to achieve stable phase sensitive amplification.

The output of the phase sensitive amplifier was connected to the EDFA 5301-1 to perform further amplification. Then, the bandpass filter 5304-1 was used to remove the background light other than the band of the signal. While the device was configured to receive an NRZ signal in the sixth embodiment, the device can receive a signal of the differential phase shift keying in this embodiment according to setting a delay interferometer 5314 and a balanced PD 5315 and a limiting amplifier 5312 in the output stage of preamplifier.

Figure 54:
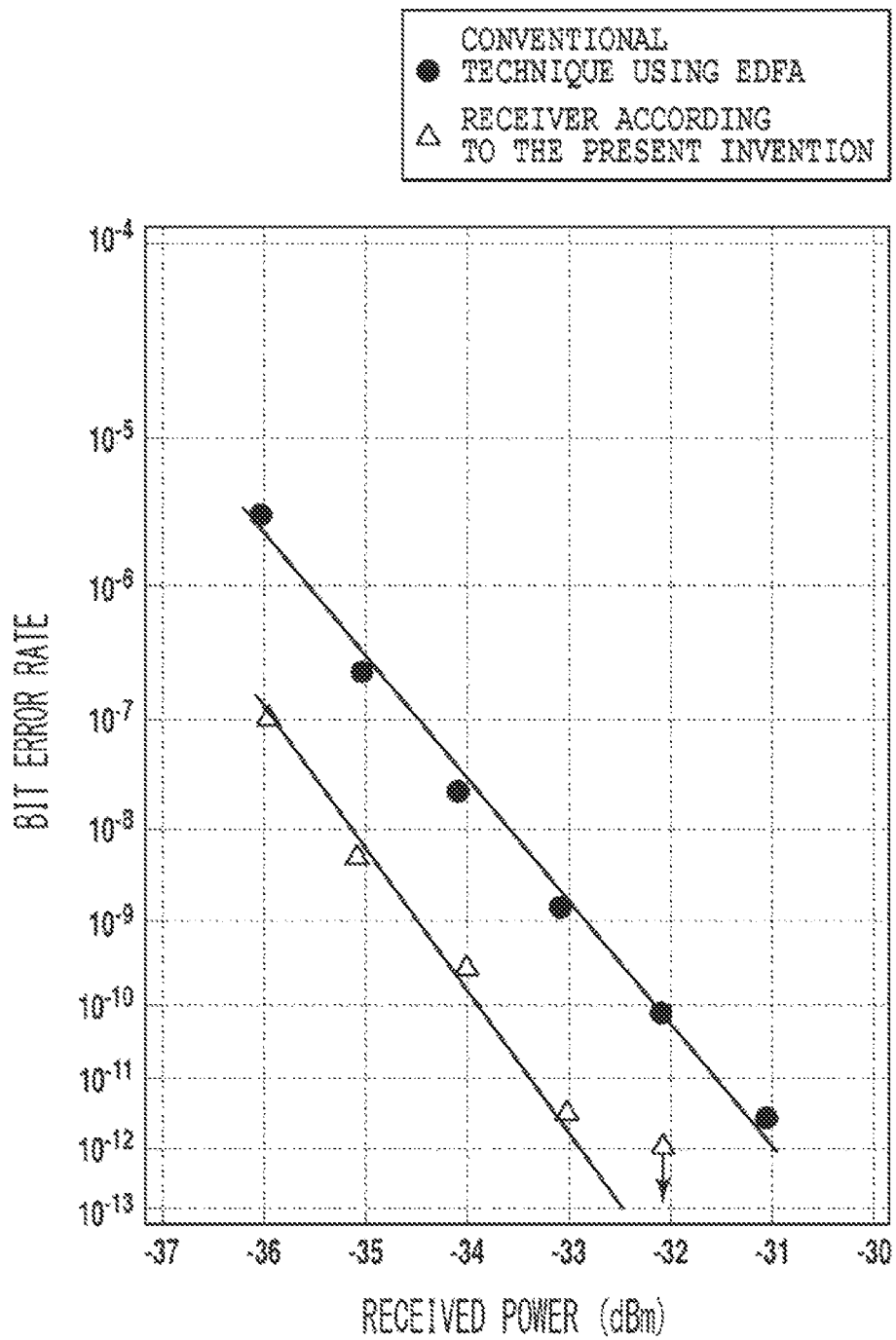
FIG. 54 is a graph illustrating the effect by the phase sensitive amplifier according to the thirteenth embodiment of the present invention.

A 40-Gbit/s DPSK signal was input into the optical receiver in this embodiment, and the receiver characteristic was evaluated. FIG. 54 shows the result of evaluating receiver sensitivity of the optical receiver in this embodiment based on a bit error rate measurement.

With reference to FIG. 54, the input power for obtaining a $10^{-9}$ bit error rate was −32.9 dBm, for example when a conventional EDFA was used. By using of this embodiment, the same bit error rate at −34.5 dBm, which was about 1.6 dB lower than −32.9 dBm was obtained. Thus, it was confirmed that the optical receiver using the low-noise optical amplification in this embodiment provided improved receiver sensitivity.

In this embodiment, the device was configured to receive DPSK. On the other hand, a format for receiving a signal is not limited to this. For example, other signal formats such as optical duobinary signal can also be used for improving the receiver sensitivity of the device using a preamplifier by changing the receiver configuration based on the present invention.

In this embodiment, the receiver sensitivity was improved by about 1.6 dB. Additionally, a further improvement can be achieved. A connection loss between the second PPLN waveguide for performing the parametric amplification and the input fiber causes the degradation of the total noise figure. In this embodiment, the connection loss between the input fiber and the PPLN waveguide was 2 dB. By optimizing the optics used for the coupling, the receiver sensitivity can be improved according to the reduction of the connection loss.

In this embodiment, phase modulator for the synchronization (FIG. 53, 5310) was placed at input stage of the PPLN waveguide (FIG. 53, 5305-1) for generating a second harmonic wave. On the other hand, when the connection order is inverted, the phase of the second harmonic wave is modulated. In this case, a voltage required for the phase modulation can be halved. In the embodiments shown above, the respective PPLN waveguides were combined with dichroic mirrors to multiplex and demultiplex the fundamental wave light or the second harmonic wave. On the other hand, these multiplexing and demultiplexing functions also may be integrated with the PPLN waveguides on the same substrate by using a waveguide circuit for the multiplexer and the demultiplexer. For the integration as described above, when the loss of the signal light or pump light can be reduced, further improvement of the total S/N ratio is achieved.

Additionally, by integrating these multiplexing and demultiplexing functions on the same substrate, the function for phase modulation, the function for generating a second harmonic wave, and an optical parametric amplification function as necessary, the connection loss between the parts of the respective functions can be further reduced. Thus, the further improvement of the S/N ratio and an increased gain of the phase sensitive amplifier can be achieved.

When the gain $G_1$ of the phase sensitive amplifier in the above-described (formula 20) is increased, the contribution of the noise figure of the laser amplifier located at the output stage is further reduced. Thus, the total noise figure can be reduced. And, low-noise optical amplification can be achieved. As a result, by using this amplifier for an optical repeater, the repeating span can be increases. Also, by using this amplifier for an optical receiver, a further improvement of the receiver sensitivity can be obtained.

In this embodiment, the configuration described as in the first embodiment was also used. Specifically, the amplification method was degenerate parametric amplification and the second harmonic wave of the fundamental wave light was used as pump light. As fundamental wave light for obtaining easy phase synchronization, alight directly splitted from the signal light was used (i.e. a phase synchronization system using the modulated optical signal is not used).

On the other hand, this embodiment also includes any amplification method described in the first to eleventh embodiments, the pump light type, the method to obtain easy phase synchronization for generating fundamental wave light, and a simple combination thereof.

Specifically, as an amplification method, the non-degenerate parametric amplification described in the seventh to ninth embodiments also may be used. Sum frequency light generated from two different wavelength lights as in the fifth embodiment also may be used as the pump light. The method for generating fundamental wave light to obtain easy phase synchronization also may be sending a pilot tone signal in addition to the signal light as described in the third embodiment or recovering a carrier wave signal from modulated signal light as described in the fourth and fifth embodiments. As a phase synchronization system, the system as described in the eleventh embodiment also may be used to obtain a feedback by using pump light.

In this embodiment, as periodically-polled second-order nonlinear optical material, Zn-doped lithium niobate ($LiNbO_3$) was used. However, the invention is not limited to using lithium niobate. The same effect also can be obtained by typical second-order nonlinear optical materials can also be used including, such as mixed crystals of lithium niobate and lithium tantalate ($LiNb_xTa_{1-x}O_3$ ($0 \leq x \leq 1$), potassium niobate ($KNbO_3$), potassium titanyl phosphate ($KTiOPO_4$). A dopant of the second-order nonlinear optical material is not limited to Zn. Mg, Zn, Sc, In, or Fe also may be used instead of Zn as a dopant. Furthermore, the second-order nonlinear optical material with no dopant can be applicable.

Fourteenth Embodiment

Figure 55:
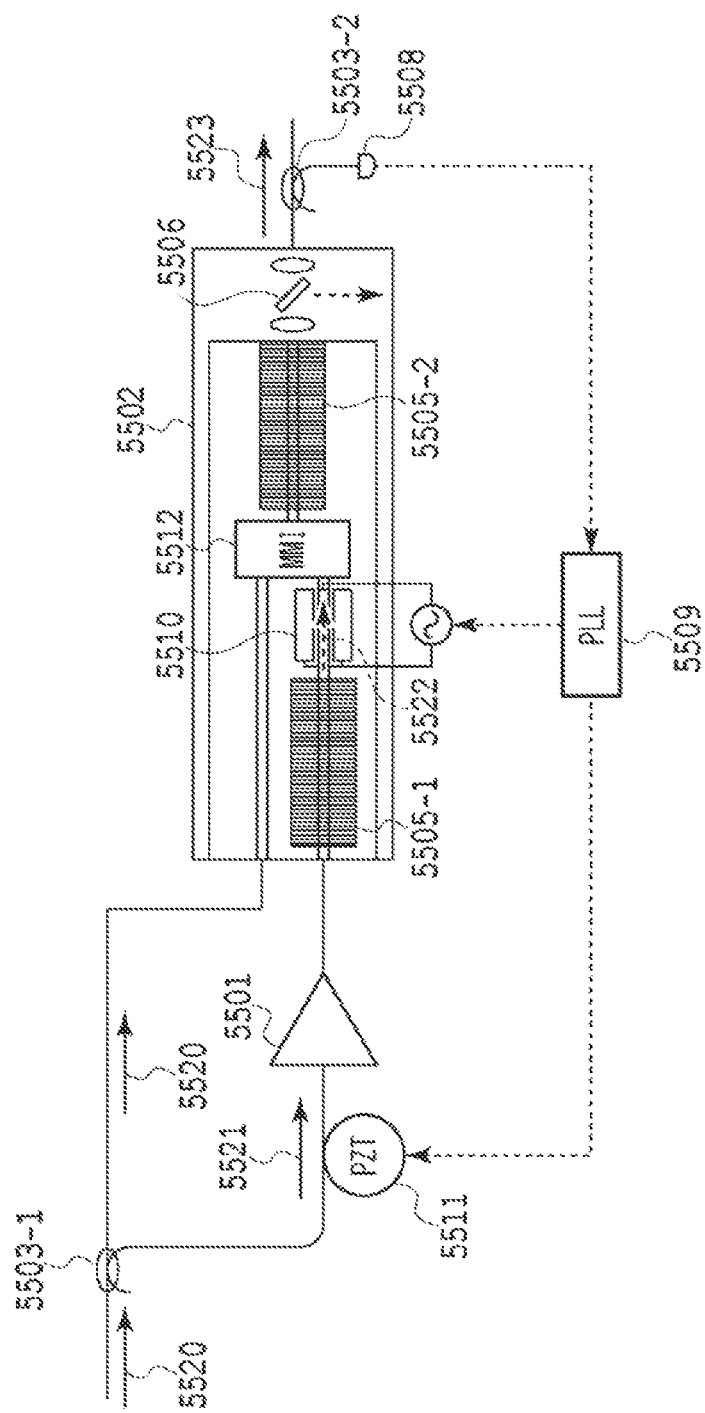
FIG. 55 is a diagram for explaining the configuration of the phase sensitive amplifier according to the fourteenth embodiment of the present invention.

FIG. 55 shows the configuration of the phase sensitive amplifier in this embodiment. This embodiment is common to the twelfth embodiment in that the device was configured to amplify a 1.54-μm signal 5520 (see FIG. 52). This embodiment is also common to the twelfth embodiment in the point that the two PPLN waveguides 5505-1 and 5505-2 are used and the second harmonic wave 5522 is generated to perform optical parametric amplification.

The embodiment shown in FIG. 55 is different from the embodiment shown in FIG. 52 in the point that the first PPLN waveguide 5505-1 for generating pump light, a pilot-tone-phase modulator 5510 for optical PLL, the MMI 5512 for multiplexing the pump light with the signal light, and the second PPLN waveguide 5505-2 for performing optical parametric amplification are prepared and integrated in the same substrate.

As shown in FIG. 55, in this embodiment, most modules required for the phase sensitive amplification are integrated in the same LN crystal waveguide. Thus, no connection loss is caused between the second-order nonlinear optical element for generating a second harmonic wave and the phase modulator, between the phase modulator and the multiplexer, and between the multiplexer and the second second-order nonlinear optical element. Thus, a low-noise operation by phase sensitive amplification can be achieved while suppressing an increased noise figure or a loss of the pump light.

As can be seen from FIG. 55, this embodiment is common to the twelfth embodiment or the thirteenth embodiment in that a dichroic mirror 5506 was used to separate only the signal light from the signal outputted from the second PPLN waveguide 5505-2. However, a compact phase sensitive amplifier also can be obtained by integrating, in the same substrate, the MMI designed to separate only the signal light.

IN this embodiment, the configuration is also uses as in the first embodiment. Specifically, the amplification method was the degenerate parametric amplification. The second harmonic wave from a fundamental wave light was used as pump light. As a method for generating fundamental wave light to obtain easy phase synchronization, a light directly splitted from the signal light is used (i.e. phase synchronization without using a modulated optical signal.

However, this embodiment also includes any amplification method as described in the first to eleventh embodiments, the pump light type, the method for generating fundamental wave light to obtain easy phase synchronization, a phase synchronization system, and a simple combination thereof.

Specifically, as an amplification method, the non-degenerate parametric amplification described in the seventh to ninth embodiments also may be used. Sum frequency light generated from two different wavelength lights as in the fifth embodiment also may be used as the pump light. The method for generating fundamental wave light to obtain easy phase synchronization also may be sending a pilot tone signal in addition to the signal light as described in the third embodiment or recovering a carrier wave signal from modulated signal light as described in the fourth and fifth embodiments. As a phase synchronization system, the system as described in the eleventh embodiment also may be used to obtain a feedback by using pump light.

In this embodiment, as periodically-polled second-order nonlinear optical material, Zn-doped lithium niobate (LiNbO$_3$) was used. However, the invention is not limited to using lithium niobate. The same effect also can be obtained by typical second-order nonlinear optical materials can also be used including, such as mixed crystals of lithium niobate and lithium tantalate (LiNb$_x$Ta$_{1-x}$O$_3$ (0≤x≤1), potassium niobate (KNbO$_3$), potassium titanyl phosphate (KTiOPO$_4$). A dopant of the second-order nonlinear optical material is not limited to Zn. Mg, Zn, Sc, In, or Fe also may be used instead of Zn as a dopant. Furthermore, the second-order nonlinear optical material with no dopant can be applicable.

Fifteenth Embodiment

Figure 56:
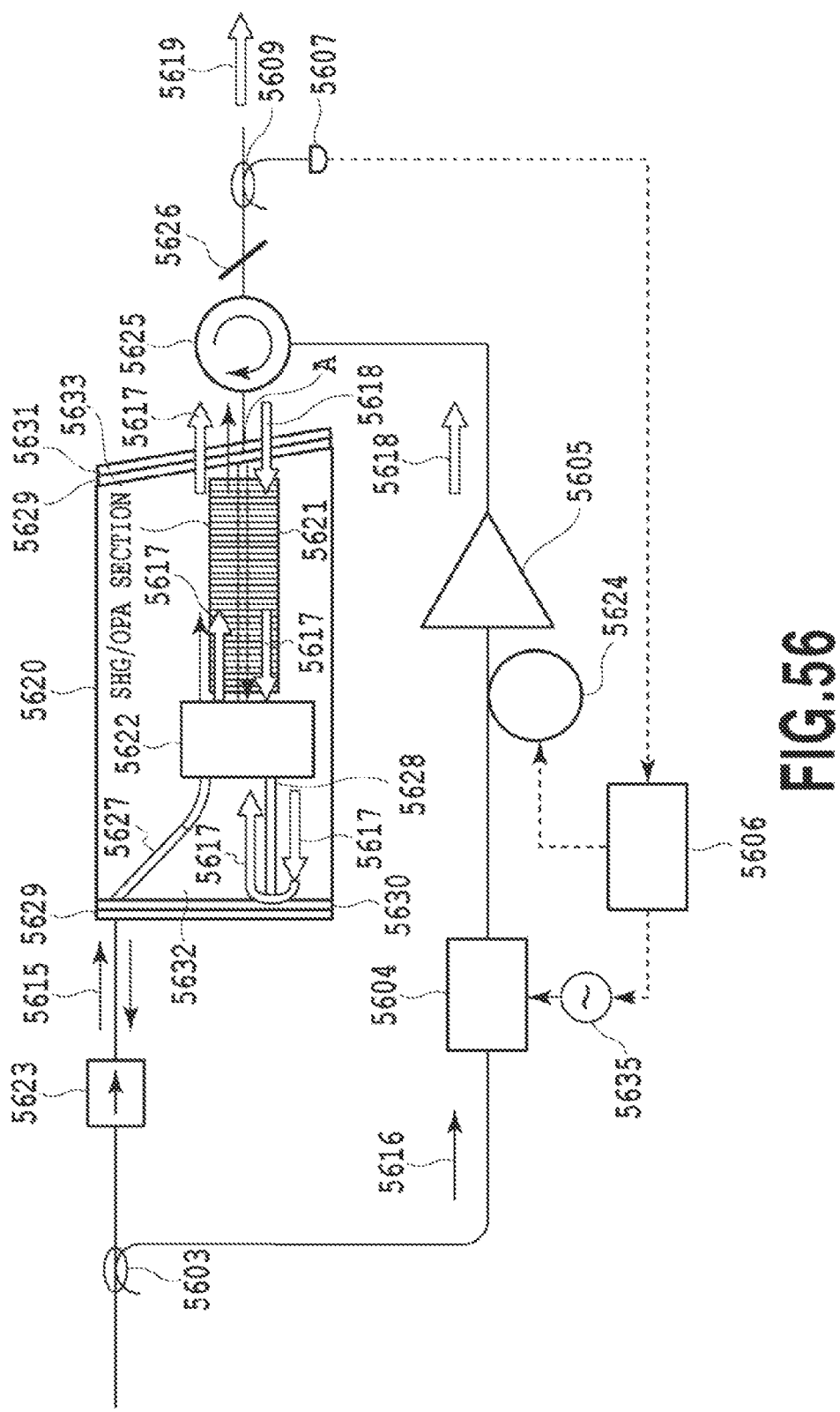
FIG. 56 is a diagram for explaining the configuration of the phase sensitive amplifier according to the fifteenth embodiment of the present invention.

The following section will describe en example of the configuration of the phase sensitive amplifier in this embodiment with reference to FIG. 56. The amplifier having the configuration as shown in FIG. 56 has a purpose for preventing the disadvantage of increased substrate size which is not avoided by using conventional technique when the PPLN for second harmonic generation (SHG), the multiplexing/demultiplexer for the signal light and the second harmonic wave, and the PPLN for degenerate parametric amplification (DPA) are integrated in the same substrate.

A configuration is used in which the PPLN 5621 for performing both of the second harmonic generation and the optical parametric amplification and the multimode interferometer (MMI) 5622 functioning as a multiplexing/demultiplexer are integrated in the identical LN substrate 5620. Then, the signal light 5615 having a wavelength of 1.56 μm input through the optical isolator 5623 is amplified.

The integrated MMI 5622 had a characteristic that, by the optimally-designed waveguide width, waveguide length, and input and output port positions, the signal light having a wavelength of 1.56 μm is coupled to a PPLN 5621 for low-loss optical parametric amplification having an insertion loss of about 1.0 dB.

A part of the signal light is splitted by the coupler 5603 and the splitted light is used as fundamental wave light 5616. The fundamental wave light 5616 is input to the EDFA 5605 through the phase modulator 5604 for the phase synchronization of the signal light and the pump light. After the fundamental wave light 5616 is amplified by the EDFA 5605, the light is input from the right end of the substrate via the optical circulator 5625. The amplified fundamental wave light 5618 input from the right end propagates through the PPLN waveguide 5621 in which the second harmonic generation and the optical parametric amplification are both performed. Then, almost all of the light is converted to second harmonic wave until the light reaches the MMI 5622. The MMI 5622 for coupling this second harmonic wave to the output waveguide 5628 at the output side has a low loss at an insertion loss of 1.0 dB.

Thereafter, the second harmonic wave 5617 is efficiently reflected by a multi-layer optical film filter at the left end of the substrate. This filter has a high reflection rate of 99.99% at a wavelength of 0.78 μm.

Next, the second harmonic wave 5617 is again coupled to the PPLN waveguide 5621 via the MMI. In the PPLN waveguide 5621, the second harmonic generation and the optical parametric amplifier are both performed. Then, the second harmonic wave 5617 propagates through the PPLN waveguide 5621. While propagating through the PPLN waveguide 5621, the second harmonic wave 5617 is mixed with the signal light 5615 multiplexed by the MMI. Then, the optical parametric amplifier amplifies the signal light.

The following section will describe the process of the end face in the substrate. In this embodiment, two left waveguides 5627 and 5628 are formed to have different shapes. Specifically, the waveguide 5627 for signal light having a wavelength of 1.56 μm is formed to have a curved section. The waveguide 5328 for the pump light (second harmonic wave) having a wavelength of 0.78 μm is formed in a straight manner. One end face common to the input sections of these two waveguides is determined. By cutting the two waveguides along this end face, the end face processing is performed. The output end is shaped for being positioned so that the 1.56-μm signal light waveguide 5627 is inclined to the end face and is vertical to the 0.78-μm pump light waveguide 5638, thus performing the end face processing. As a result, the 1.56 μm signal light waveguide 5627 can have an end face shaped to have an angle of 6°. Furthermore, the right end to which the fundamental wave light is input is similarly processed as in the left end so that the right end has an angle of 6° to the PPLN waveguide.

Furthermore, after the left and right substrate end faces are processed, the left and right substrate end faces are processed in respective ways. After the left and right substrate end faces are processed, the left end has, by sputtering, an antireflection (AR) film 5629 against 1.56-μm light and a high reflection (HR) film 5630 against 0.78-μm light.

The substrate right end had antireflection (AR) films 5629 and 5631 against 1.56 μm and 0.78 μm-light, in which they were formed by sputtering as in the left end. By the processing as described above, a waveguide end face that has a function to reflect or not to reflect the light having a desired wavelength was realized.

In this embodiment, as in the first embodiment, an LN Mach-Zehnder modulator was used as a data signal modulator and a 10-Gbit/s NRZ signal was input as an input signal. Then, the resultant amplification characteristic was evaluated. The result showed a gain of about 11 dB. However, this configuration has a disadvantage as described below.

The parametric amplification itself by the nonlinear optical medium in the phase sensitive amplifier essentially can provide low-noise light amplification. However, an actual operation based on this configuration may be influenced by the following accidental noise. Specifically, there may be a case in which noise included in the pump light is converted to the noise of the amplification light by the parametric amplification process.

In the configuration shown in FIG. 56, the phase modulator 5604 used for phase synchronization is placed in the input side of the EDFA 5605, thus causing the incident power to the EDFA to be reduced by insertion loss of the phase modulator. It has been well-known that a laser amplifier such as EDFA has S/N ratio degraded in proportion to the loss in input side of the amplifier (see Non-patent Literature 8). If the insertion loss of the phase modulator causes the degrade S/N ratio of the pump light as described above, the noise component is converted to the noise of the amplification light by the parametric amplification process, thus failing to provide low-noise amplification. However, the disadvantage of the noise can be resolved by this embodiment of the present invention described below.

Another example of the phase sensitive amplifier in the configuration of this embodiment will be described with reference to FIG. 57. A configuration as shown in FIG. 57 was used in order to avoid a disadvantage of the configuration example shown in FIG. 56 of the degraded S/N ratio of the optical fiber laser amplifier due to the loss of the phase modulator for the phase synchronization.

As shown in Non-patent Literature 8, a laser amplifier has S/N ratio undesirably degraded in proportion to the loss in the input side of the amplifier. When the output side of the laser amplifier includes a loss on the other hand, the loss causes a reduced output but does not cause a degraded S/N ratio. Using this characteristic, a configuration as shown in FIG. 57 in which the phase modulator 5704 is placed at the output side of the optical fiber laser amplifier 5705 is used in this configuration.

Figure 57:
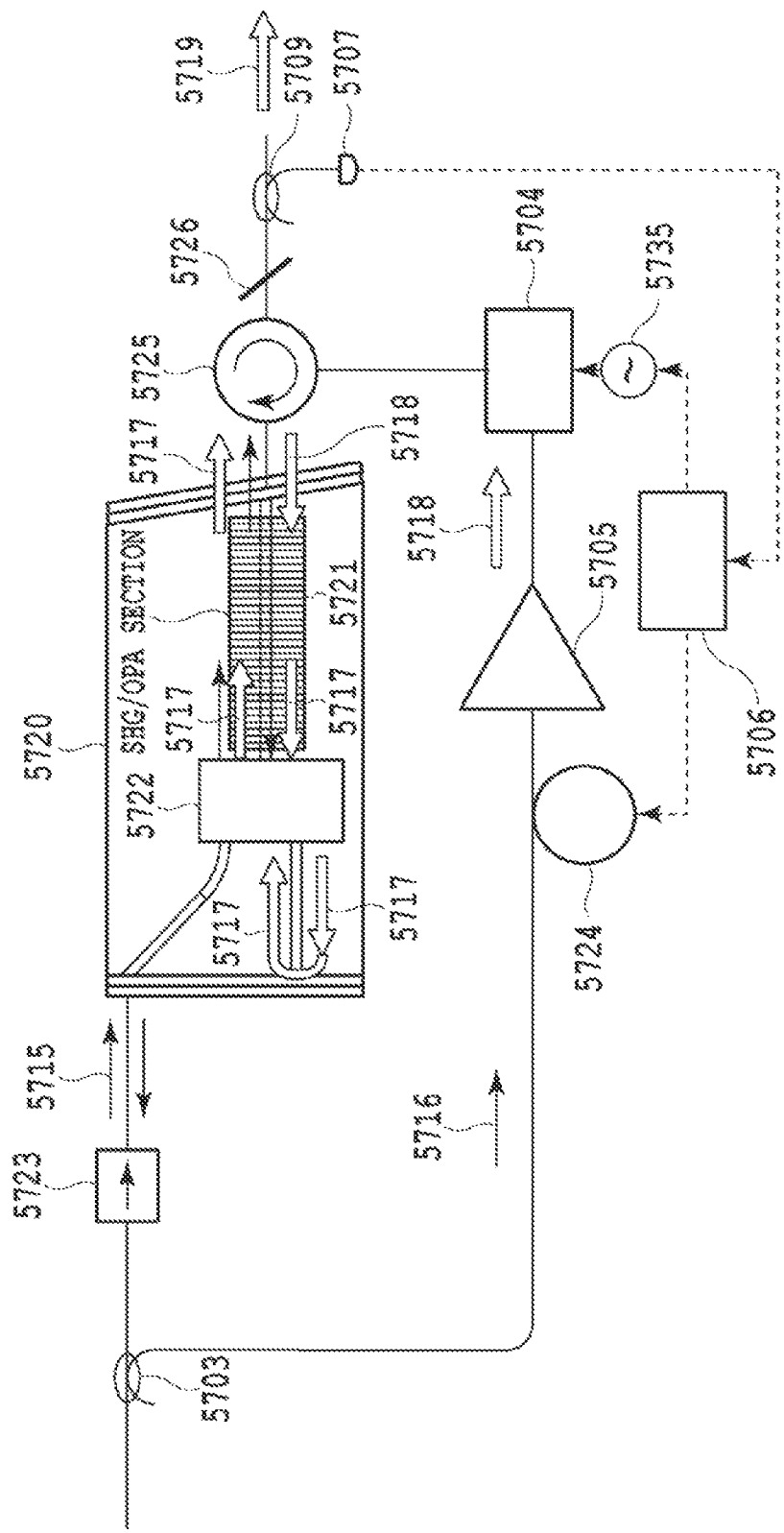
FIG. 57 is a diagram for explaining the configuration of the phase sensitive amplifier according to the fifteenth embodiment of the present invention.

The conventional technique cannot be used in the configuration as shown in FIG. 57. The reason is that many conventional phase modulators consist of an optical waveguide in which Ti is diffused in $LiNbO_3$ (LN) crystals. The Ti-diffused waveguide causes a remarkably photorefractive damage. Thus, when a high power are input into the Ti-diffused waveguide, a change in the refractive index is caused due to the photorefractive effect, thus causing a drift phenomenon which changes a voltage for providing the same phase modulation. Thus, the optical power that can be input to the phase modulator is limited to about +20 dBm. Furthermore, a phase modulator having a high insertion loss placed at the output side of the laser amplifier causes attenuated power of the pump light. This consequently prevent sufficient pump light power for generating an optical parametric effect from being obtained, thus failing to realize phase sensitive amplification having a high amplification gain.

In the configuration shown in FIG. 57, the phase modulator 5704 can be placed at the output side of the EDFA 5705. Since in the second harmonic generation, a remarkable photorefractive damage can be caused, the system for second harmonic generation is conventionally prepared based on a method for forming a waveguide having a higher photorefractive damage resistance than that in Ti diffusion waveguide. Higher pump light power can be obtained by configuring the phase modulator with a light waveguide similar to the system for second harmonic generation.

In the configuration shown in FIG. 57, since the phase modulator 5704 is not provided in the input side of the EDFA 5705, the pump light could have an S/N ratio improved by about 5 dB.

Under a condition in which the second harmonic wave input into the PPLN waveguide had power of 300 mW, a gain of about 11 dB could be obtained. The output power of the EDFA was about 1 W and the input power into the directly bonded waveguide was 630 mW. Even when such light having a high power was input, stable phase synchronization could be realized without causing the drift phenomenon of the operation voltage.

When the high power is input into the PPLN waveguide, a change in the phase-matching wavelength may be caused due to the optical damage caused by the photorefractive effect. For the purpose of preventing the change of the phase-matching wavelength, the phase modulator 5704 used in the configuration shown in FIG. 57 also can be substituted with a second-order nonlinear optical device prepared by the directly bonding technique as a method for forming a waveguide having a high optical damage resistance. It was found that, by using the directly bonded waveguide fabricated using Zn-doped lithium niobate core having a superior optical damage resistance, the fluctuation of the phase-matching wavelength could be suppressed. Furthermore, by using a dry etching process to reduce the core size to about 4 μm, the high wavelength conversion efficiency was realized.

Figure 58:
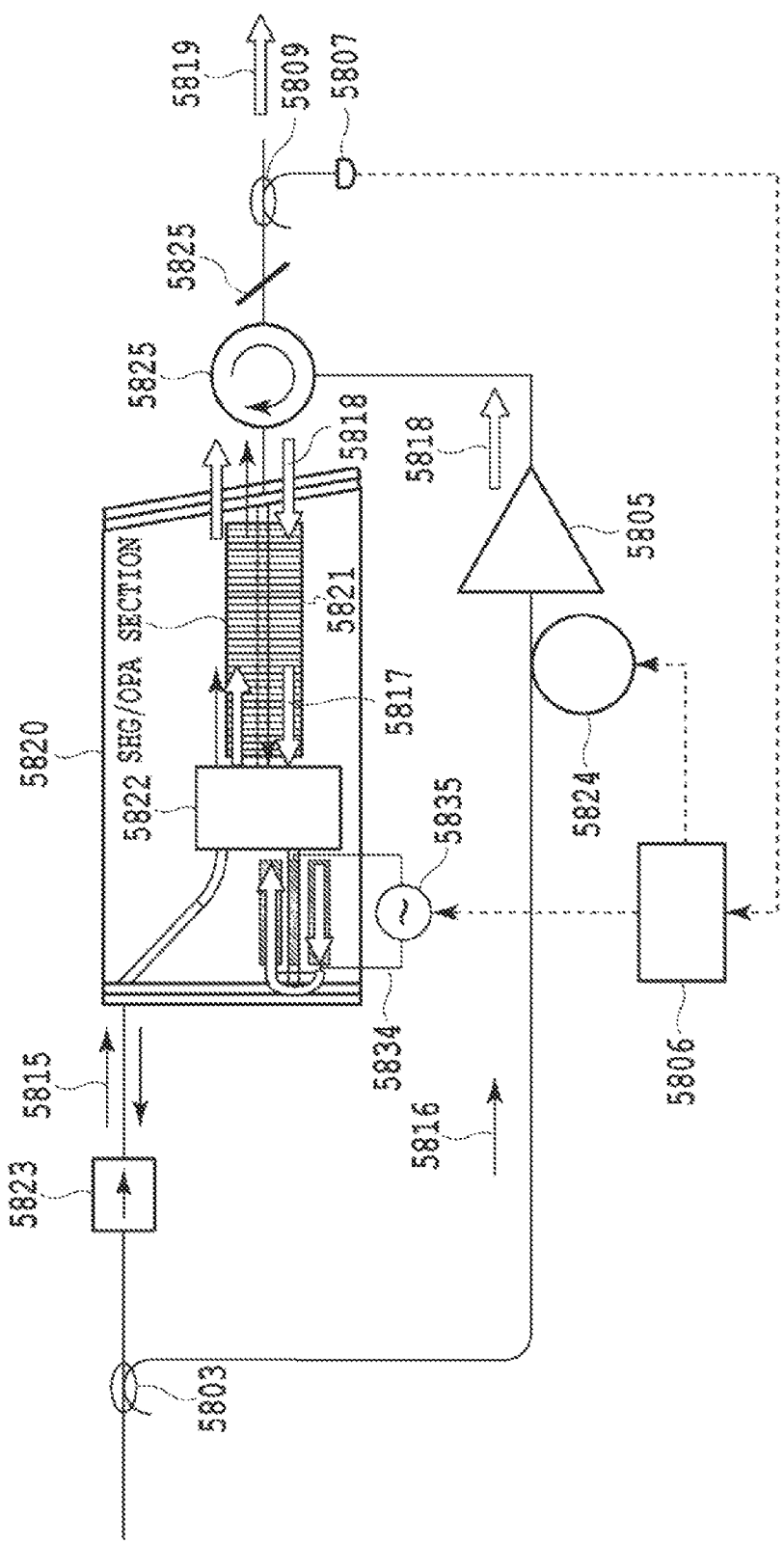
FIG. 58 is a diagram for explaining the configuration of the phase sensitive amplifier according to the fifteenth embodiment of the present invention.

The following section will describe another example of the configuration of the phase sensitive amplifier in this embodiment with reference to FIG. 58. In the configuration shown in FIG. 58, the second-order nonlinear optical device which is processed at an end face and is prepared by directly bonding technique is used. The difference between the configuration shown in FIG. 58 and the above-described configuration is that the phase modulator for synchronizing the signal light and the pump light was integrated with the nonlinear optical crystal element in the same substrate. Such an arrangement was used in which phase modulation was performed at a waveguide for returning the fundamental wave light in the integrated second-order nonlinear optical device.

On the same substrate on which the PPLN waveguide is formed, the phase modulator 5834 without periodically-poled structure was integrated by the similar waveguide formation method. The phase modulation section was configured so that the waveguide had the electrode 5835 for the electric field application to provide the phase modulation by the electro-optic (EO) effect.

As described above, since this waveguide formation method provides a high photorefractive damage resistance, even when the EDFA 5805 has an increased power of the amplified fundamental wave light, the phase modulation of the pilot tone for the optical PLL can be performed on the fundamental wave light without causing the drift phenomenon of the operation voltage.

In this configuration, the integrated phase modulator can reduce the connection loss as compared with the configuration as shown in FIG. 56 and FIG. 57 in which an individual device is externally connected. As a result, high power pump light could be obtained, thus achieving an improved S/N ratio.

Furthermore, the phase modulator electrode formed on the waveguide for returning the second harmonic wave of the fundamental wave light could provide the device having a significantly-reduced size.

The following section will describe the effect by placing the phase modulator on the waveguide for returning the second harmonic wave. When optical material receives an externally-applied external force such as electric field or stress, a refractive index change is caused in the optical material. When the electro-optic effect by the LN crystal is used as a phase modulator and a phase is modulated by an electric field application, as shown in Non-patent Literature 9, a half wavelength driving voltage $V\pi$ showing the performance of the modulator depends on the LN's electro-optic coefficient, refractive index, applied electric field, or wavelength for example. Concerning the wavelength, the relation as shown in the following (formula 28) is established.

$$V\pi \propto \lambda \quad \text{(formula 28)}$$

The half wavelength driving voltage (i.e., a voltage required for phase modulation) can be reduced, by the arrangement used in this configuration shown in FIG. 58, to a half of that obtained by the arrangement used in the configuration shown in the first embodiment, thus achieving a significant reduction. Furthermore, this second harmonic wave is efficiently reflected by the processed left end face, and when this second harmonic wave passes through the same phase modulator again, this second harmonic wave is modulated at the same amount in the return path as the phase change amount in the first path. Thus, the total phase change amount is doubled. Thus, by these synergetic effects, when the phase modulation has a fixed voltage, a required optical path length (i.e., the length of the phase modulation section) can be reduced significantly.

Similarly in this configuration, as described above, by using the directly bonded waveguide fabricated using Zn-doped lithium niobate core having a superior optical damage resistance, the drift of the operation voltage of the phase modulation section could be suppressed. Furthermore, the waveguide of the phase modulation section is designed, as in the PPLN waveguide section, to be in a single mode at a fundamental wave wavelength of 1.54 µm. Although a multimode is caused at the second harmonic wave having a wavelength of 0.77 µm, the second harmonic wave generated in the PPLN section propagates only in a base mode due to the limitation by the phase matching conditions. Thus, even a simple waveguide having the same design as a waveguide of the PPLN section and the phase modulation section could provide a stable phase synchronization operation.

Figure 59:
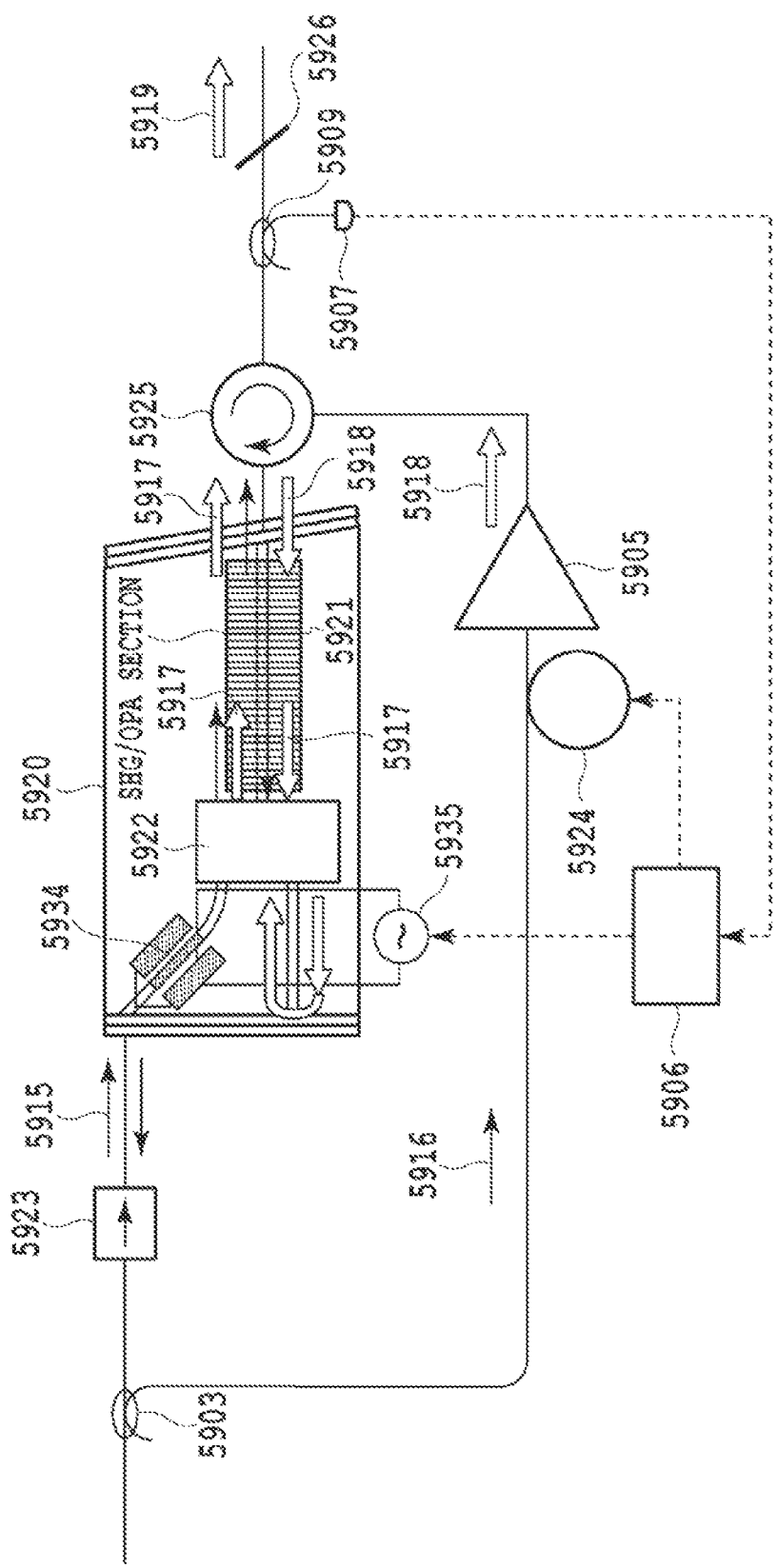
FIG. 59 is a diagram for explaining the configuration of the phase sensitive amplifier according to the fifteenth embodiment of the present invention.

The following section will describe another embodiment of the configuration of the phase sensitive optical amplifier in this embodiment with reference to FIG. 59.

The configuration shown in FIG. 59 is common to the configuration shown in FIG. 58 the second-order nonlinear optical device that is processed at an end face and that is prepared by directly bonding technique and the phase modulator for synchronizing signal light and pump light is integrated with nonlinear optical crystal elements on the same substrate is used.

The difference between the configuration shown in FIG. 59 and the configuration shown in FIG. 58 is the point that the phase modulator 5934 for synchronizing signal light and pump light is arranged so that the signal light phase is modulated in the waveguide for the signal light propagation in the integrated second-order nonlinear optical device. In the configurations shown in FIG. 56 to FIG. 58, an arrangement was used in which the optical PLL phase modulator was designed to modulate the pump light. However, an arrangement as shown in FIG. 59 also may be used in which the phase modulator is designed to modulate the signal light, thus realizing the completely—the same phase synchronization.

In the case in which a commercially-available phase modulator is inserted to the signal light side to configure a phase sensitive amplifier, a relatively-high influence is caused by the insertion loss of the phase modulator. Thus, the signal light is attenuated before reaching the degenerate parametric amplification (DPA) section. Thus, the amplifier cannot avoid a degraded S/N ratio. In order to resolve this disadvantage, a configuration as shown in FIG. 59 is used in which the phase modulation for the signal light is integrated within the same substrate. By the configuration shown in FIG. 59, an improvement of the S/N ratio by 3 dB was confirmed as compared with the case where the commercially-available phase modulator was inserted to the signal light side.

Also in this embodiment, a configuration as in the first embodiment was used. Specifically, the amplification method is degenerate parametric amplification and the second harmonic wave from the fundamental wave light is used as pump light. As a method for generating fundamental wave light to obtain easy phase synchronization, a light directly splitted from the signal light is used (i.e. phase synchronization without using the modulated optical signal).

On the other hand, this embodiment also includes any amplification method described in the first to eleventh embodiments, the pump light type, the method to obtain easy phase synchronization for generating fundamental wave light, and a simple combination thereof.

Specifically, as an amplification method, the non-degenerate parametric amplification described in the seventh to ninth embodiments also may be used. Sum frequency light generated from two different wavelength lights as in the fifth embodiment also may be used as the pump light. The method for generating fundamental wave light to obtain easy phase synchronization also may be sending a pilot tone signal in addition to the signal light as described in the third embodiment or recovering a carrier wave signal from modulated signal light as described in the fourth and fifth embodiments. As a phase synchronization system, the system as described in the eleventh embodiment also may be used to obtain a feedback by using pump light.

In this embodiment, as periodically-polled second-order nonlinear optical material, Zn-doped lithium niobate ($LiNbO_3$) was used. However, the invention is not limited to using lithium niobate. The same effect also can be obtained by typical second-order nonlinear optical materials can also be used including, such as mixed crystals of lithium niobate and lithium tantalate ($LiNb_xTa_{1-x}O_3$ ($0 \leq x \leq 1$), potassium niobate ($KNbO_3$), potassium titanyl phosphate ($KTiOPO_4$). A dopant of the second-order nonlinear optical material is not limited to Zn. Mg, Zn, Sc, In, or Fe also may be used instead of Zn as a dopant. Furthermore, the second-order nonlinear optical material with no dopant can be applicable.

REFERENCE SIGNS LIST

101 Phase sensitive amplification section
102 Pump light source
103 Pump light phase control section
104-1, 104-2 Light splitting section
110 Input signal light
111 Pump light
112 Output signal light
201 Laser light source
202 SHG crystal 203 OPA crystal
210 Signal light
211 Pump light
401 Pump light phase synchronizer
402 Erbium-doped fiber amplifier (EDFA)
403 Optical fibers
404 Filter
410 Input signal light
411-1, 411-2 Pump light
412 Output signal light
501 First optical fibers
502 Second optical fibers
503 Optical fiber amplifier
601 Erbium-doped fiber amplifier (EDFA)
602-1, 602-2 Second-order nonlinear optical element
603-1, 603-2 Light splitting section
604 Bandpass filter
605-1, 605-2 PPLN waveguide
606-1, 606-2, 606-3 Dichroic mirror
607 Polarization-maintaining fiber
608 Photodetector
609 Phase-locked loop circuit (PLL)
610 Phase modulator
611 Optical fiber expander by PZT
620 Signal light
621 Fundamental wave light
622 Second harmonic wave
623 Pump light
624 Intensity modulator
701 Signal light
702-1, 702-2 Pump light
703 ASE light
704 Fundamental wave light
705 Second harmonic wave
901-1, 901-2 Erbium-doped fiber amplifier (EDFA)
902-1, 902-2, 903-3 Second-order nonlinear optical element
903-1, 903-2 Light splitting section
904-1, 904-2 Bandpass filter
905-1, 905-2 PPLN waveguide
906-1, 906-2, 906-3, 906-4 Dichroic mirror
907 Single mode fiber
908 Photodetector (photodiode)
909 Phase-locked loop circuit (PLL)
910 Phase modulator
911 Optical fiber expander by PZT
912 Attenuator
922 Second harmonic wave
930 External cavity semiconductor LD (ECL)
931 Electro-absorption (EA) modulator
932 Pulse pattern generator (PPG)
933 Photodiode
934 Limiting amplifier
935 Clock data recovery (CDR) circuit
936 Error detector (ED)
1201 Erbium-doped fiber amplifier (EDFA)
1202-1, 1202-2 Second-order nonlinear optical element
1203 Light splitting section
1204 Bandpass filter
1206-1, 1206-2, 1206-3, 1206-4 Dichroic mirror
1208 photodetector (photodiode)
1209 Phase-locked loop circuit (PLL)
1210 Modulator
1211 Optical fiber expander by PZT
1212 Attenuator
1213 Circulator
1214 Light source
1230 Polarization controller
1231 Polarization beam splitter (PBS)
1240 Modulated signal light
1241 Amplified signal light
1300 External cavity semiconductor laser
1301 Light splitting device
1302 LN Mach-Zehnder modulator
1303 Erbium-doped fiber amplifier (EDFA)
1304 Polarizer
1305 Polarization beam splitter (PBS)
1310 Modulation signal light
1501 Erbium-doped fiber laser amplifier (EDFA)
1502-1, 1502-2 Second-order nonlinear optical element
1503-1, 1503-2 Light splitting section
1505-1, 1505-2 PPLN waveguide
1506-1, 1506-2, 1506-3 Dichroic mirror
1508 photodetector
1509 Phase-locked loop circuit (PLL)
1512 Semiconductor laser
1513 Semiconductor optical amplifier
1520 Signal light
1522 Second harmonic wave
1601-1, 1601-2 Erbium-doped fiber amplifier (EDFA)
1602-1, 1602-2, 1602-3 Second-order nonlinear optical element
1603-1, 1603-2, 1603-3, 1603-4 Light splitting section
1604 bandpass filter
1605-1, 1605-2, 1605-3 PPLN waveguide
1606-1, 1606-2, 1606-3, 1606-4 Dichroic mirror
1608 photodetector (photodiode)
1609 Phase-locked loop circuit (PLL)
1610 Phase modulator
1611 Optical fiber expander by PZT
1612 Wavelength multiplexing/demultiplexing filter
1613 optical circulator
1630 Polarization controller
1631 External cavity laser
1632 Semiconductor laser
1633 PM-VOA
1634 Isolator
1640 Input signal light
1641-1, 1641-2 Fundamental wave light
1642 Fundamental wave light
1701 Signal light
1702-1, 1702-2 Fundamental wave light
1703 ASE light
1704 Sum frequency light
1801 Signal light
1802 First fundamental wave light
1803 Second fundamental wave light
1804 Sum frequency light
1805 Second harmonic wave
2201-1, 2201-2 Erbium-doped fiber laser amplifier (EDFA)
2202-1, 2202-2, 2202-3 Second-order nonlinear optical element
2203-1, 2203-2, 2203-3 Light splitting section
2204 Bandpass filter
2205-1, 2205-2, 2205-3 PPLN waveguide
2206-1, 2206-2, 2206-3 Dichroic mirror
2208 photodetector (photodiode)
2210 Phase modulator
2212 Wavelength multiplexing/demultiplexing filter
2213 optical circulator
2214 Mirror
2230 Polarization controller
2231 External cavity laser
2232 Semiconductor laser
2240 Input signal light

2301-1, 2301-2 Erbium-doped fiber laser amplifier (EDFA)
2302-1, 2302-2, 2302-3, 2302-4 Second-order nonlinear optical element
2303-1, 2303-2, 2303-3 Light splitting section
2304-1, 2304-2 Bandpass filter
2305-1, 2305-2, 2305-3, 2305-4 PPLN waveguide
2306-1, 2306-2, 2306-3, 2306-4, 2306-5, 2306-6, 2306-7 Dichroic mirror
2308 photodetector (photodiode)
2309 Phase-locked loop circuit (PLL)
2310 Phase modulator
2311 Optical fiber expander by PZT
2312 Wavelength multiplexing/demultiplexing filter
2313 optical circulator
2315 Isolator
2330 Polarization controller
2331 External cavity laser
2332 Semiconductor laser
2333 PM-VOA2340 Input signal light
2401-1, 2401-2 Erbium-doped fiber amplifier (EDFA)
2402-1, 2402-2 Second-order nonlinear optical element
2403 light splitting section
2404-1, 2404-2 Bandpass filter
2405-1, 2405-2 PPLN waveguide
2406-1, 2406-2, 2406-3 Dichroic mirror
2407 Polarization-maintaining fiber
2408-1, 2408-2 Photodetector
2409 Phase-locked loop circuit (PLL)
2410 Phase modulator
2411 Optical fiber stretcher by PZT
2412 Limiting amplifier
2413 Discriminator
2420, 2423 Signal light
2421 Fundamental wave light
2422 Second harmonic wave
2801 Erbium-doped fiber amplifier (EDFA)
2802-1, 2802-2 Second-order nonlinear optical element
2803 Light splitting section
2804 Bandpass filter
2805-1, 2805-2 PPLN waveguide
2806-1, 2806-2, 2806-3 Dichroic mirror
2807 Polarization-maintaining fiber
2808 Photodetector
2809 Phase-locked loop circuit (PLL)
2810 Phase modulator
2811 Optical fiber stretcher by PZT
2820 Signal light
2821 Fundamental wave light
2822 Second harmonic wave
2901 Signal light
2902 Pump light
2903 ASE light
2904 Additional conversion light
3001 Signal light
3002 Fundamental wave light
3003 ASE light
3004 Second harmonic wave (SH wave)
3301 Single wavelength light source
3302 Light splitting section
3303 Optical modulator
3304 Pattern generator
3305 LN modulator
3306 EDFA
3307 Light splitting section
3501 Single wavelength light source
3502 Light splitting section
3503 Modulator
3504 Demultiplexer
3505 Optical modulator
3506 Multiplexer
3507 EDFA
3508 Phase modulator
3601 Single wavelength light source
3602 Light splitting section
3603 Modulator
3604 Demultiplexer
3605 Optical modulator
3606 Multiplexer
3607 EDFA
3608 Phase modulator
3701 Single wavelength light source
3702 Light splitting section
3703 Modulator
3704 Demultiplexer
3705 Optical modulator
3706 Multiplexer
3707 EDFA
3708 Phase modulator
3901 Single wavelength light source
3902 Light splitting section
3903 Modulator
3904 EDFA
3905 Phase modulator
3906 Demultiplexer
3907 Optical modulator
3908 Multiplexer
4001 Erbium-doped fiber amplifier (EDFA)
4002-1, 4002-2 Second-order nonlinear optical element
4003 Light splitting section
4004 Bandpass filter
4005-1, 4005-2 PPLN waveguide
4006 Dichroic mirror
4007 Photodetector
4008 Phase-locked loop circuit (PLL)
4009 Phase modulator
4010 Optical fiber expander by PZT
4011 Attenuator
4012 Circulator
4013 Pump light source (semiconductor laser)
4020 Polarization controller
4021 Center wavelength separation filter
4022 Dispersion compensation (adjustment) medium
4030 Signal light
4031 Amplified signal light
4101 Erbium-added fiber laser amplifier (EDFA)
4102-1, 4102-2 Second-order nonlinear optical element
4103-1, 4103-2 Light splitting section
4105-1, 4105-2 PPLN waveguide
4106-1, 4106-2, 4106-3 Dichroic mirror
4107 Polarization-maintaining fiber
4108 Photodetector
4109 Phase-locked loop circuit (PLL)
4110 Phase modulator
4111 Optical fiber expander by PZT
4120 Signal light
4121 Fundamental wave light
4122 Second harmonic wave
4201 Phase sensitive amplification section
4202 Pump light source
4203 Pump light phase control section
4204-1, 4204-2 Light splitting section
4210 Input Signal light
4211 Pump light
4212 Output Signal light 4213 Second harmonic wave
4401 Erbium-doped fiber amplifier (EDFA)
4402-1, 4402-2 Second-order nonlinear optical element
4403 Light splitting section
4404 Bandpass filter
4405-1, 4405-2 PPLN waveguide
4406-1, 4406-2, 4406-3 Dichroic mirror
4407 Polarization-maintaining fiber
4408 Photodetector
4409 Phase-locked loop circuit (PLL)
4410 Phase modulator
4411 Optical fiber expander by PZT
4420 Signal light
4421 Fundamental wave light
4422 Second harmonic wave
4424 Data signal modulator
4425 High-pass filter
4501 Erbium-doped fiber amplifier (EDFA)
4502-1, 4502-2 Second-order nonlinear optical element
4503 Light splitting section
4504 Bandpass filter
4505-1, 4505-2 PPLN waveguide
4506-1, 4506-2 Dichroic mirror
4507 Polarization-maintaining fiber
4508 Light detector
4509 Phase-locked loop circuit (PLL)
4510 Phase modulator
4511 Optical fiber expander by PZT
4520 Signal light
4521 Fundamental wave light
4522 Second harmonic wave
4523 Amplified Signal light
4524 Data signal modulator
4526 MMI light multiplexing/splitting filter
4601 Erbium-doped fiber amplifier (EDFA)
4602-1, 4602-2 Second-order nonlinear optical element
4603 Light splitting section
4605-1, 4605-2 PPLN waveguide
4606-1, 4606-2, 4606-3 Dichroic mirror
4607 Polarization-maintaining fiber
4608 Photodetector
4609 Phase-locked loop circuit (PLL)
4610 Phase modulator
4611 Optical fiber expander by PZT
4620 Signal light
4621 Fundamental wave light
4622 Second harmonic wave
4623 Amplified Signal light
4701 Erbium-doped fiber amplifier (EDFA)
4702-1, 4702-2 Second-order nonlinear optical element
4703 Light splitting section
4705-1, 4705-2 PPLN waveguide
4706-1, 4706-2, 4706-3 Dichroic mirror
4708 Photodetector
4709 Phase-locked loop circuit (PLL)
4712 Semiconductor laser
4713 Semiconductor optical amplifier
4720 Signal light
4722 Second harmonic wave
4723 Amplified Signal light
4801 Erbium-doped fiber amplifier (EDFA)
4802-1, 4802-2 Second-order nonlinear optical element
4803-1, 4803-2 Light splitting section
4805-1, 4805-2 PPLN waveguide
4806-1, 4806-2, 4806-3 Dichroic mirror
4807 Polarization-maintaining fiber
4808 Photodetector
4809 Phase-locked loop circuit (PLL)
4810 Phase modulator
4811 Optical fiber expander by PZT
4820 Input signal light
4821 Fundamental wave light
4822 Second harmonic wave
4823 Output signal light
4901 Erbium-doped fiber amplifier (EDFA)
4902-1, 4902-2 Second-order nonlinear optical element
4903-1, 4903-2 Light splitting section
4905-1, 4905-2 PPLN waveguide
4906-1, 4906-2, 4906-3 Dichroic mirror
4907 Polarization-maintaining fiber
4908 Photodetector
4909 Phase-locked loop circuit (PLL)
4910 Phase modulator
4911 Optical fiber expander by PZT
4920 Input signal light
4921 Fundamental wave light
4922 Second harmonic wave
4923 Output signal light
5001 Erbium-doped fiber amplifier (EDFA)
5002-1, 5002-2 Second-order nonlinear optical element
5003-1, 5003-2 Light splitting section
5005-1, 5005-2 PPLN waveguide
5006-1, 5006-2 Dichroic mirror
5008 Photodetector
5009 Phase-locked loop circuit (PLL)
5010 Phase modulator
5011 Optical fiber expander by PZT
5012 MMI
5020 Input signal light
5021 Fundamental wave light
5022 Second harmonic wave
5023 Output signal light
5101 Erbium-doped fiber amplifier (EDFA)
5102-1, 5102-2 Second-order nonlinear optical element
5103-1, 5103-2 Light splitting section
5105-1, 5105-2 PPLN waveguide
5106-1, 5106-2 Dichroic mirror
5108 Photodetector
5109 Phase-locked loop circuit (PLL)
5110 Phase modulator
5111 Optical fiber expander by PZT
5112 MMI
5120 Input signal light
5121 Fundamental wave light
5122 Second harmonic wave
5123 Output signal light
5201 Erbium-doped fiber amplifier (EDFA)
5202-1, 5202-2 Second-order nonlinear optical element
5203-1, 5203-2 Light splitting section
5205-1, 5205-2 PPLN waveguide
5206 Dichroic mirror
5208 Photodetector
5209 Phase-locked loop circuit (PLL)
5210 Phase modulator
5211 Optical fiber expander by PZT
5212 MMI
5220 Input signal light
5221 Fundamental wave light
5222 Second harmonic wave
5223 Output signal
5301-1, 5301-2 Erbium-doped fiber laser amplifier (EDFA)
5302-1, 5302-2 Second-order nonlinear optical element
5303 Light splitting section
5304-1, 5304-2 Bandpass filter 5305-1, 5305-2 PPLN waveguide
5306-1, 5306-2, 5306-3 Dichroic mirror
5307 Polarization-maintaining fiber
5308 Photodetector
5309 Phase-locked loop circuit (PLL)
5310 Phase modulator
5311 Optical fiber expander by PZT
5312 Limiting amplifier
5313 Discriminator
5314 Delay interferometer
5315 Balanced PD
5320 Signal light
5321 Fundamental wave light
5322 Second harmonic wave
5501 Erbium-doped fiber amplifier (EDFA)
5502 Second-order nonlinear optical element
5503-1, 5503-2 Light splitting section
5505-1, 5505-2 PPLN waveguide
5506 Dichroic mirror
5508 Photodetector
5509 Phase-locked loop circuit (PLL)
5510 Phase modulator
5511 Optical fiber expander by PZT
5512 MMI
5520 Input signal light
5521 Fundamental wave light
5522 Second harmonic wave
5523 Output signal light
5603, 5609 coupler
5604 Phase modulator
5605 Erbium-doped fiber amplifier (EDFA)
5606 Phase-locked loop circuit (PLL)
5607 Photodetector
5615 Signal light
5616 Fundamental wave light
5617 Second harmonic wave
5618 Amplified Fundamental wave light
5619 Output light
5620 LiNbO$_3$ substrate
5621 PPLN waveguide
5622 Multimode interferometer (MMI)
5623 Optical isolator
5624 Optical fiber expander
5625 Optical circulator
5626 Low-pass filter
5627 Signal light waveguide
5628 Pump light (Second harmonic) waveguide
5629 Antireflection optical thin film for signal light wavelength band
5630 Reflection optical thin film for second harmonic wavelength band
5631 Antireflection optical thin film for second harmonic wavelength band
5632, 5633 LN substrate end face
5635 Electrode for Electric field application
5703, 5709 Coupler
5704 Phase modulator
5705 Erbium-doped fiber amplifier (EDFA)
5706 Phase-locked loop circuit (PLL)
5707 Photodetector
5715 Signal light
5716 Fundamental wave light
5717 Second harmonic wave
5718 Amplified Fundamental wave light
5719 Output light
5720 LiNbO$_3$ substrate
5721 PPLN waveguide
5722 Multimode interferometer (MMI)
5723 Optical isolator
5724 Optical fiber expander
5725 Optical circulator
5726 Low-pass filter
5735 Electrode for Electric field application
5803, 5809 Coupler
5805 Erbium-doped fiber amplifier (EDFA)
5806 Phase-locked loop circuit (PLL)
5807 Photodetector
5815 Signal light
5816 Fundamental wave light
5817 Second harmonic wave
5818 Amplified Fundamental wave light
5819 Output light
5820 LiNbO$_3$ substrate
5821 PPLN waveguide
5822 Multimode interferometer (MMI)
5823 Optical isolator
5824 Optical fiber expander
5825 Optical circulator
5826 Low-pass filter
5834 Phase modulator using directly bonded LiNbO$_3$ ridge waveguide
5835 Electrode for Electric field application
5903, 5909 Coupler
5905 Erbium-doped fiber amplifier (EDFA)
5906 Phase-locked loop circuit (PLL)
5907 photodetector
5915 Signal light
5916 Fundamental wave light
5917 Second harmonic wave
5918 Amplified Fundamental wave light
5919 Output light
5920 LiNbO$_3$ substrate
5921 PPLN waveguide
5922 Multimode interferometer (MMI)
5923 Optical isolator
5924 Optical fiber expander
5925 Optical circulator
5926 Low-pass filter
5934 Phase modulator
5935 Electrode for Electric field application

The invention claimed is:
1. A phase sensitive amplifier that amplifies signal light based on the optical mixing using nonlinear optical effects, comprising:
an optical fiber laser amplifier for amplifying fundamental wave light;
a second-order nonlinear optical element that consists of a periodically-poled second-order nonlinear optical material and that includes an optical waveguide for generating a sum frequency light from fundamental wave light;
a filter for spectrally separating the sum frequency light from among the fundamental wave light and the sum frequency light;
a multiplexer for multiplexing the signal light and the sum frequency light that is pump light;
a second-order nonlinear optical element that consists of a periodically-poled second-order nonlinear optical material and that includes an optical waveguide for parametric amplification of the signal light by using pump light;
a filter for spectrally separating the amplified signal light from the pump light; and
a synchronization system for synchronizing the phase of the signal light with the phase of the pump light.

2. The phase sensitive amplifier according to claim 1, wherein the sum frequency light is second harmonic wave.

3. The phase sensitive amplifier according to claim 1, wherein the parametric amplification is degenerate parametric amplification.

4. The phase sensitive amplifier according to claim 1, wherein the parametric amplification is non-degenerate parametric amplification.

5. The phase sensitive amplifier according to claim 4, wherein the signal lights consist of one or multiple pair(s) of signal lights and each pair is symmetric about a half frequency of the sum frequency light and has the same or conjugate phase information.

6. The phase sensitive amplifier according to claim 1, wherein the synchronization system for synchronizing the phase of the signal light with the phase of the pump light comprises:
  a phase modulator and an expander of an optical path length;
  a system for splitting a part of the amplified signal light or a part of the pump light;
  a photodetector for detecting intensity change which corresponds to a phase change modulated by the phase modulator, of the light split by the splitting system; and
  a phase-locked loop circuit for performing, based on the intensity change of the light detected by the photodetector, a feedback on the phase modulator and the expander of an optical path length for the purpose of maximizing the intensity of the amplified signal light.

7. The phase sensitive amplifier according to claim 1, wherein the synchronization system for synchronizing the phase of the signal light with the phase of the pump light comprises:
  a semiconductor laser for generating fundamental wave light or a semiconductor laser for generating light whose phase is synchronized with the fundamental wave light or the pump light;
  a circuit for splitting a part of the amplified signal light or a part of the pump light;
  a photodetector for detecting intensity change of the light splitted split by the splitting system; and
  a phase-locked loop circuit for performing, based on the intensity change of the light detected by the photodetector, a feedback on the driving current of the semiconductor laser for generating fundamental wave light or the semiconductor laser for generating light whose phase is synchronized with the fundamental wave light or the pump light for the purpose of maximizing the intensity of the amplified signal light.

8. The phase sensitive amplifier according to claim 1, further comprising:
  a system for splitting the signal light; and
  a semiconductor laser light source,
  wherein the signal light further includes pilot tone of continuous wave light, the semiconductor laser light source is injection-locked by the pilot tone of continuous wave light, and the continuous wave light that is phase-locked with injection light and that is output from the semiconductor laser light source is used as fundamental wave light.

9. The phase sensitive amplifier according to claim 1, further comprising:
  a system for splitting the signal light; and
  a semiconductor laser light source,
  wherein the semiconductor laser light source is injection-locked with the sum frequency light output from a filter for spectrally separating only the sum frequency light, and
  wherein continuous wave light that is phase-locked with injection light and that is output from the semiconductor laser light source is used as the pump light.

10. The phase sensitive amplifier according to claim 1, further comprising:
  a circuit for splitting a part of the signal light;
  a semiconductor laser light source;
  a light source for generating the first fundamental wave light;
  a second-order nonlinear optical element that consists of a periodically-poled second-order nonlinear optical material and that includes an optical waveguide for generating a second harmonic wave of the signal light; and
  a second-order nonlinear optical element that consists of a periodically-poled second-order nonlinear optical material and that includes an optical waveguide for generating a difference frequency light between the generated second harmonic wave and the first fundamental wave light,
  wherein the semiconductor laser is phase-locked with the generated difference frequency light by injection-locking technique, and the phase-locked continuous-wave light is used as the second fundamental wave light, and the sum frequency light is generated using the first fundamental wave light and the second fundamental wave light in a second-order nonlinear optical element including an optical waveguide for generating the sum frequency light from fundamental wave lights.

11. The phase sensitive amplifier according to claim 1, further comprising:
  a circuit for splitting a part of the signal light;
  a semiconductor laser light source;
  a light source for generating first fundamental wave light; and
  a second-order nonlinear optical element that consists of a periodically-poled second-order nonlinear optical material and that includes an optical waveguide for generating a second harmonic wave of the signal light and for generating a difference frequency light between the generated second harmonic wave and the first fundamental wave light,
  wherein the semiconductor laser is phase-locked with the generated difference frequency light by injection-locking technique, the phase-locked continuous-wave light output from the semiconductor laser light source is used as the second fundamental wave light, the sum frequency light is generated using the first fundamental wave light and the second fundamental wave light in the second-order nonlinear optical element including an optical waveguide for generating the sum frequency light from fundamental wave lights.

12. The phase sensitive amplifier according to claim 1, wherein the filter for spectrally separating only the sum frequency light from among the fundamental wave light and the sum frequency light is a dichroic mirror using a dielectric film or a light splitting element using a multimode interferometer.

13. The phase sensitive amplifier according to claim 1, wherein the multiplexer for multiplexing the signal light and the sum frequency light that is the pump light is a dichroic mirror using a dielectric film or a light multiplexing element using a multimode interferometer.

14. The phase sensitive amplifier according to claim 1, wherein the filter for spectrally separating the amplified signal light from the pump light is a dichroic mirror using a dielectric film or a light splitting element using a multimode interferometer.

15. The phase sensitive amplifier according to claim 1, wherein the sum frequency light is transmitted by single-mode polarization-maintaining fibers at the wavelength of the sum frequency light.

16. The phase sensitive amplifier according to claim 1, further comprising a bandpass filter located between an optical fiber laser amplifier and a second-order nonlinear optical element including an optical waveguide for generating the sum frequency light.

17. The phase sensitive amplifier according to claim 1, wherein a second-order nonlinear optical element including an optical waveguide for generating the sum frequency light and a second-order nonlinear optical element including an optical waveguide for performing parametric amplification are individually temperature-adjustable.

18. An optical receiver comprising:
a phase sensitive amplifier that amplifies signal light based on the optical mixing using a nonlinear optical effect, the phase sensitive amplifier comprising:
an optical fiber laser amplifier for amplifying fundamental wave light;
a second-order nonlinear optical element that consists of a periodically-poled second-order nonlinear optical material and that includes an optical waveguide for generating a sum frequency light from fundamental wave light;
a filter for separating the sum frequency light from among the fundamental wave light and the sum frequency light;
a multiplexer for multiplexing the signal light and the sum frequency light that is pump light;
a second-order nonlinear optical element that consists of a periodically-poled second-order nonlinear optical material and that includes an optical waveguide for parametric amplification of the signal light by using pump light;
a filter for spectrally separating the amplified signal light from the pump light; and
a synchronization system for synchronizing the phase of the signal light with the phase of the pump light;
an optical fiber laser amplifier connected just after a phase sensitive amplifier; and
a bandpass filter for passing through a wavelength at around the amplified signal light wavelength; and
a photodiode.

19. An optical transceiver comprising:
a phase sensitive amplifier that amplifies signal light based on the optical mixing using a nonlinear optical effect, comprising:
an optical fiber laser amplifier for amplifying fundamental wave light;
a second-order nonlinear optical element that consists of a periodically-poled second-order nonlinear optical material and that includes an optical waveguide for generating a sum frequency light from fundamental wave light;
a filter for separating the sum frequency light from among the fundamental wave light and the sum frequency light;
a multiplexer for multiplexing the signal light and the sum frequency light that is pump light;
a second-order nonlinear optical element that consists of a periodically-poled second-order nonlinear optical material, and that includes an optical waveguide for parametric amplification of the signal light by using pump light;
a filter for spectrally separating the amplified signal light from the pump light; and
a synchronization system for synchronizing the phase of the signal light with the phase of the pump light, and
a light source for generating the signal light,
an optical modulator, and
a circuit for splitting an output from the light source, wherein the part of the split output from the light source is used as the fundamental wave light.

20. The phase sensitive amplifier according to claim 1, further comprising a phase modulator placed at the output side of the optical fiber laser amplifier,
wherein the phase modulator consists of an optical waveguide fabricated by direct bonding technique.

21. The phase sensitive amplifier according to claim 1, further comprising a phase modulator,
wherein the phase modulator is integrated in a second-order nonlinear optical element including an optical waveguide for generating the sum frequency light, and
wherein the phase modulator is formed to be adjacent to the same waveguide as that of an optical waveguide for generating the sum frequency light and is connected to the front stage or the rear stage of the optical waveguide for generating the sum frequency light wherein the phase modulator is formed on the same waveguide as an optical waveguide for generating the sum frequency light to be adjacent to the optical waveguide and is connected to the input side or the output side of the optical waveguide for generating the sum frequency light.

22. The phase sensitive amplifier according to claim 1, further comprising a phase modulator,
wherein the phase modulator, a filter for spectrally separating the sum frequency light from among the fundamental wave light and the sum frequency light, and a multiplexer for multiplexing signal light and pump light are integrated in a second-order nonlinear optical element including an optical waveguide for generating the sum frequency light,
wherein the filter and the multiplexer are formed to be adjacent to each other on the same waveguide as the optical waveguide,
wherein the phase modulator is connected to the input side of the multiplexer,
wherein the filter is connected to the input side of the multiplexer, and
wherein the optical waveguide for generating the sum frequency light is connected to the input side of the filter and the multiplexer.

23. The phase sensitive amplifier according to claim 1, further comprising a phase modulator,
wherein the phase modulator, a filter for spectrally separating the sum frequency light from among the fundamental wave light and the sum frequency light, and a multiplexer for multiplexing signal light and pump light are integrated in a second-order nonlinear optical element including an optical waveguide for performing parametric amplification,
wherein the phase modulator and the multiplexer are formed to be adjacent to each other on the same waveguide as the optical waveguide,
wherein the filter is connected to the input side of the multiplexer,
wherein the optical waveguide is connected to the output side of the multiplexer, and wherein the phase modulator is connected to the input side of the multiplexer.

24. The phase sensitive amplifier according to claim 1, further comprising a phase modulator, wherein the phase modulator, a filter for spectrally separating the sum frequency light from among the fundamental wave light and the sum frequency light, and a multiplexer for multiplexing signal light and pump light are integrated in a second-order nonlinear optical element including an optical waveguide for generating the sum frequency light, wherein the second-order nonlinear optical element that is used to generate the sum frequency light and second-order nonlinear optical element that is used to perform parametric amplification is integrated as one optical element wherein the second-order nonlinear optical element for generating the sum frequency light and a second-order nonlinear optical element for performing parametric amplification is integrated as one optical element, wherein the optical waveguide for generating the sum frequency light, a filter for separating the sum frequency light from among the fundamental wave light and the sum frequency light, a multiplexer for multiplexing signal light and pump light, and an optical waveguide for performing parametric amplification are formed to be adjacent to one another on the same waveguide, wherein the phase modulator is connected to the input side of the multiplexer for multiplexing signal light and pump light, the filter for spectrally separating only the sum frequency light from among the fundamental wave light and the sum frequency light is connected to the input side of the multiplexer, wherein the optical waveguide for generating the sum frequency light is connected to the input side of filter for spectrally separating the sum frequency light from among the fundamental wave light and the sum frequency light and the multiplexer, and wherein the optical waveguide for performing parametric amplification is connected to the output side of the multiplexer.

25. The phase sensitive amplifier according to claim 1, further comprising:

a phase modulator;

a reflector for reflecting a sum frequency light;

an optical circulator that inputs fundamental wave light into a second-order nonlinear optical element including an optical waveguide for generating the sum frequency light and that allows amplified signal light to pass through;

a first optical waveguide that is used to input signal light and that is used to output fundamental wave light separated by a filter for spectrally separating only the sum frequency light from among the fundamental wave light and the sum frequency light; and a second optical waveguide for connecting the reflector and the multiplexer for multiplexing signal light and pump light, wherein the filter, the multiplexer, and the first optical waveguide and the second optical waveguide are integrated in the second-order nonlinear optical element including an optical waveguide for generating the sum frequency light, wherein the optical waveguide of a second-order nonlinear optical element for generating the sum frequency light and an optical waveguide of a second-order nonlinear optical element for performing parametric amplification of the signal light using the pump light are shared, wherein the filter and the multiplexer are shared, wherein the shared optical waveguide, the shared multiplexer, and the second optical waveguide are formed to be adjacent to one another on the same waveguide, and wherein the shared optical waveguide, the first optical waveguide, and second optical waveguide are connected to the multiplexer.

26. The phase sensitive amplifier according to claim 25, wherein the cross section of the first optical waveguide at an opposite side of the contact surface connected to the multiplexer is cut to have such an angle with the axis of the first optical waveguide that the angle is larger than 0° and is smaller than 90°, and at least one input/output end face of the shared optical waveguide is processed to have such an angle with the axis of the shared optical waveguide that the angle is larger than 0° and is smaller than 90°.

27. The phase sensitive amplifier according to claim 25, wherein the phase modulator is integrated in a second-order nonlinear optical element including an optical waveguide for generating the sum frequency light from fundamental wave, and the phase modulator is formed to be adjacent to the multiplexer on the same waveguide.

28. The phase sensitive amplifier according to claim 1, wherein the periodically-poled second-order nonlinear optical material includes $LiNbO_3$, $KNbO_3$, $LiTaO_3$, $LiNb_xTa_{1-x}O_3 (0 \leq x \leq 1)$, $KTiOPO_4$, or one of those optical materials which further includes at least one selected from a group consisting of Mg, Zn, Fe, Sc, or In as dopant.

29. The phase sensitive amplifier according to claim 1, wherein the optical waveguide for generating the sum frequency light and the optical waveguide for performing parametric amplification are a directly bonded optical waveguide fabricated by directly bonding a first substrate having a nonlinear optical effect to a second substrate having a lower refractive index than that of the first substrate.

* * * * *